US012566158B2

(12) United States Patent
Low et al.

(10) Patent No.: US 12,566,158 B2
(45) Date of Patent: Mar. 3, 2026

(54) ROBOTIC SYSTEMS FOR ULTRASONIC SURFACE INSPECTION USING SHAPED ELEMENTS

(71) Applicant: Gecko Robotics, Inc., Pittsburgh, PA (US)

(72) Inventors: Kevin Y. Low, Pittsburgh, PA (US); Chase David, Montgomery, TX (US); Brandon J. Reitz, Magnolia, TX (US)

(73) Assignee: Gecko Robotics, Inc., Pittsburgh, PA (US)

( * ) Notice: Subject to any disclaimer, the term of this patent is extended or adjusted under 35 U.S.C. 154(b) by 0 days.

(21) Appl. No.: 19/180,997

(22) Filed: Apr. 16, 2025

(65) Prior Publication Data

US 2025/0244296 A1 Jul. 31, 2025

Related U.S. Application Data

(63) Continuation of application No. PCT/US2023/077835, filed on Oct. 26, 2023, which
(Continued)

(51) Int. Cl.
| | |
|---|---|
| *G01N 29/265* | (2006.01) |
| *G01N 29/04* | (2006.01) |
| *G01N 29/22* | (2006.01) |

(52) U.S. Cl.
CPC ......... *G01N 29/265* (2013.01); *G01N 29/041* (2013.01); *G01N 29/225* (2013.01); *G01N 2291/2634* (2013.01)

(58) Field of Classification Search
CPC .............. G01N 29/265; G01N 29/041; G01N 29/225; G01N 2291/2634
(Continued)

(56) References Cited

U.S. PATENT DOCUMENTS

| | | | |
|---|---|---|---|
| 2,135,307 | A | 11/1938 | Keator |
| 2,694,164 | A | 11/1954 | Geppelt |
| | | (Continued) | |

FOREIGN PATENT DOCUMENTS

| | | |
|---|---|---|
| BR | PI0805432 A2 | 9/2010 |
| CA | 3173120 A1 | 10/2022 |
| | (Continued) | |

OTHER PUBLICATIONS

"All Metals Fabrication", Painting Metal, Aug. 27, 2015, 7 pages.
(Continued)

*Primary Examiner* — Jacques M Saint Surin
(74) *Attorney, Agent, or Firm* — GTC Law Group PC & Affiliates

(57) ABSTRACT

A differential pivoting mechanism for a payload for an inspection robot. The mechanism includes a first rotational pivot joint that pivotally couples to a first sensor housing to pivot the first sensor housing in a first degree of freedom in a plane substantially perpendicular to a direction of travel of the inspection robot along an inspection surface plane defined, at least in part, by the surface. A second rotational pivot joint that pivotally couples to a second sensor housing to pivot the second sensor housing in the first degree of freedom in the plane substantially perpendicular to the direction of travel. A differential pivot joint that pivotally couples to a sensor frame of the inspection robot to pivot the first sensor housing with the second sensor housing in a second degree of freedom in the plane substantially perpendicular to the direction of travel.

7 Claims, 100 Drawing Sheets

Related U.S. Application Data is a continuation-in-part of application No. 17/726,336, filed on Apr. 21, 2022, now Pat. No. 11,971,389.

(60) Provisional application No. 63/419,624, filed on Oct. 26, 2022, provisional application No. 63/254,833, filed on Oct. 12, 2021, provisional application No. 63/178,497, filed on Apr. 22, 2021.

(58) Field of Classification Search
USPC ......................................................... 73/618
See application file for complete search history.

(56) References Cited

U.S. PATENT DOCUMENTS

| | | |
|---|---|---|
| 2,861,700 A | 11/1958 | James |
| 3,028,753 A | 4/1962 | Joy |
| 3,055,210 A | 9/1962 | Joy |
| 3,279,242 A | 10/1966 | Megoloff |
| 3,280,621 A | 10/1966 | Cardinal et al. |
| 3,326,037 A | 6/1967 | John |
| 3,420,097 A | 1/1969 | Batterman et al. |
| 3,427,866 A | 2/1969 | Weighart |
| 3,437,786 A | 4/1969 | Colinet et al. |
| 3,483,734 A | 12/1969 | Wood |
| 3,486,368 A | 12/1969 | Brech |
| 3,690,393 A | 9/1972 | Guy |
| 3,741,003 A | 6/1973 | Gunkel |
| 3,762,496 A | 10/1973 | Moore et al. |
| 3,789,700 A | 2/1974 | Cotreau et al. |
| 3,837,202 A | 9/1974 | Hetherington et al. |
| 3,895,685 A | 7/1975 | Gillette et al. |
| 3,952,581 A | 4/1976 | Gottelt |
| 4,027,528 A | 6/1977 | Tyree |
| 4,033,178 A | 7/1977 | Holt et al. |
| 4,043,185 A | 8/1977 | Siebert |
| 4,055,990 A | 11/1977 | Topping |
| 4,105,972 A | 8/1978 | Smith |
| 4,304,134 A | 12/1981 | Rouse et al. |
| 4,355,536 A | 10/1982 | Mcshane et al. |
| 4,368,644 A | 1/1983 | Wentzell et al. |
| 4,391,134 A | 7/1983 | Theurer et al. |
| 4,434,660 A | 3/1984 | Michaels et al. |
| 4,437,332 A | 3/1984 | Pittaro |
| 4,495,587 A | 1/1985 | Plante et al. |
| 4,526,037 A | 7/1985 | Wentzell et al. |
| 4,537,136 A | 8/1985 | Douglas |
| 4,558,598 A | 12/1985 | Young |
| 4,567,514 A | 1/1986 | Morgan et al. |
| 4,573,548 A | 3/1986 | Holland |
| 4,596,144 A | 6/1986 | Panton et al. |
| 4,654,702 A | 3/1987 | Tolino et al. |
| 4,706,120 A | 11/1987 | Slaughter et al. |
| 4,736,826 A | 4/1988 | White et al. |
| 4,757,258 A | 7/1988 | Kelly, Jr. et al. |
| 4,840,090 A | 6/1989 | Iwata |
| 4,862,748 A | 9/1989 | Woodmansee |
| 4,879,973 A | 11/1989 | Maeyama et al. |
| 4,881,405 A | 11/1989 | Paquet |
| 4,893,286 A | 1/1990 | Cobb |
| 4,954,949 A | 9/1990 | Rubin |
| 4,964,059 A | 10/1990 | Sugaya et al. |
| 4,993,912 A | 2/1991 | King et al. |
| 5,006,799 A | 4/1991 | Pfanstiehl |
| 5,007,291 A | 4/1991 | Walters et al. |
| 5,038,615 A | 8/1991 | Trulson et al. |
| 5,062,298 A | 11/1991 | Falcoff et al. |
| 5,097,710 A | 3/1992 | Palynchuk |
| 5,175,415 A | 12/1992 | Guest |
| 5,269,202 A | 12/1993 | Kiyosawa et al. |
| 5,271,274 A | 12/1993 | Khuri-Yakub et al. |
| 5,285,689 A | 2/1994 | Hapstack et al. |
| 5,350,033 A | 9/1994 | Kraft |
| 5,374,879 A | 12/1994 | Pin et al. |
| 5,404,755 A | 4/1995 | Olson et al. |
| 5,426,980 A | 6/1995 | Smith |
| 5,429,009 A | 7/1995 | Wolfe et al. |
| 5,440,929 A | 8/1995 | Huang et al. |
| 5,549,004 A | 8/1996 | Nugent |
| 5,559,696 A | 9/1996 | Borenstein |
| 5,619,423 A | 4/1997 | Scrantz |
| 5,635,644 A | 6/1997 | Ishikawa et al. |
| 5,663,502 A | 9/1997 | Nagashima et al. |
| 5,764,014 A | 6/1998 | Jakeway et al. |
| 5,782,253 A | 7/1998 | Cates et al. |
| 5,809,099 A | 9/1998 | Kim et al. |
| 5,853,655 A | 12/1998 | Baker |
| 5,857,534 A | 1/1999 | Devault et al. |
| 5,929,338 A | 7/1999 | Frankel et al. |
| 5,948,985 A | 9/1999 | Brautigan et al. |
| 6,000,484 A | 12/1999 | Zoretich et al. |
| 6,064,428 A | 5/2000 | Trosino et al. |
| 6,076,407 A | 6/2000 | Levesque et al. |
| 6,104,970 A | 8/2000 | Schmidt, Jr. et al. |
| 6,125,955 A | 10/2000 | Zoretich et al. |
| 6,145,583 A | 11/2000 | Gay et al. |
| 6,150,809 A | 11/2000 | Tiernan et al. |
| 6,220,099 B1 | 4/2001 | Marti et al. |
| 6,234,025 B1 | 5/2001 | Gieske et al. |
| 6,243,657 B1 | 6/2001 | Tuck et al. |
| 6,273,521 B1 | 8/2001 | Halvorson et al. |
| 6,298,727 B1 | 10/2001 | Fleming et al. |
| 6,300,893 B1 | 10/2001 | Schaff et al. |
| 6,317,387 B1 | 11/2001 | D'Amaddio et al. |
| 6,392,222 B1 | 5/2002 | Greenwood |
| 6,454,036 B1 | 9/2002 | Airey et al. |
| 6,491,127 B1 | 12/2002 | Holmberg et al. |
| 6,493,612 B1 * | 12/2002 | Bisset .................. G05D 1/0255 |
| | | 15/340.1 |
| 6,931,931 B2 | 8/2005 | Graff et al. |
| 6,981,417 B1 | 1/2006 | Oravecz |
| 7,337,673 B2 | 3/2008 | Kennedy et al. |
| 7,430,913 B2 | 10/2008 | Sarr |
| 7,733,084 B1 | 6/2010 | Odell et al. |
| 7,743,660 B2 | 6/2010 | Marsh et al. |
| 7,859,655 B2 | 12/2010 | Troy et al. |
| 8,570,629 B2 | 10/2013 | Spears |
| 8,833,169 B2 | 9/2014 | Lute, Jr. et al. |
| 8,943,892 B2 * | 2/2015 | Garvey ................ G01N 29/043 |
| | | 702/56 |
| 9,037,419 B2 | 5/2015 | Na et al. |
| 9,121,817 B1 | 9/2015 | Roach et al. |
| 9,221,506 B1 | 12/2015 | Georgeson et al. |
| 9,285,296 B2 | 3/2016 | Georgeson et al. |
| 9,310,482 B2 | 4/2016 | Rosenberg et al. |
| 9,335,305 B2 | 5/2016 | Smith et al. |
| 9,427,874 B1 | 8/2016 | Rublee |
| 9,463,574 B2 | 10/2016 | Purkayastha et al. |
| 9,586,636 B1 | 3/2017 | Burmeister et al. |
| 9,664,652 B2 | 5/2017 | Fetzer et al. |
| 9,733,219 B2 | 8/2017 | Spencer et al. |
| 9,784,599 B1 | 10/2017 | Close et al. |
| 9,796,089 B2 | 10/2017 | Lawrence, Iii et al. |
| 9,863,891 B1 | 1/2018 | Lara Magallanes et al. |
| 9,863,919 B2 | 1/2018 | Carrasco Zanini et al. |
| 9,963,836 B1 | 5/2018 | Brenner et al. |
| 10,014,587 B1 | 7/2018 | Boulais et al. |
| 10,281,912 B2 | 5/2019 | Hollister |
| 10,317,905 B2 | 6/2019 | Ouellette et al. |
| 10,481,608 B2 | 11/2019 | Loosararian et al. |
| 10,534,365 B2 | 1/2020 | Loosararian et al. |
| 10,689,113 B2 | 6/2020 | Prager et al. |
| 10,698,412 B2 | 6/2020 | Loosararian et al. |
| 10,739,779 B2 | 8/2020 | Loosararian et al. |
| 10,795,373 B2 | 10/2020 | Loosararian et al. |
| 10,884,423 B2 | 1/2021 | Loosararian et al. |
| 10,895,878 B2 | 1/2021 | Loosararian et al. |
| 10,942,522 B2 | 3/2021 | Loosararian et al. |
| 11,135,721 B2 | 10/2021 | Bryner et al. |
| 11,144,063 B2 | 10/2021 | Loosararian et al. |
| 11,148,292 B2 | 10/2021 | Bryner et al. |
| 11,157,012 B2 | 10/2021 | Loosararian et al. |
| 11,157,013 B2 | 10/2021 | Loosararian et al. |
| 11,307,063 B2 | 4/2022 | Low et al. |

(56) References Cited

U.S. PATENT DOCUMENTS

| | | | |
|---|---|---|---|
| 11,327,052 B2 | 5/2022 | Gagnon et al. | |
| 11,364,943 B1 | 6/2022 | Brick et al. | |
| 11,365,068 B2 | 6/2022 | Wertenberger et al. | |
| 11,385,650 B2 | 7/2022 | Loosararian et al. | |
| 11,429,109 B2 | 8/2022 | Loosararian et al. | |
| 11,435,192 B1 | 9/2022 | Ebrahimi Afrouzi et al. | |
| 11,468,588 B1 | 10/2022 | Ebrahimi Afrouzi et al. | |
| 11,511,426 B2 | 11/2022 | Bryner et al. | |
| 11,518,030 B2 | 12/2022 | Bryner et al. | |
| 11,518,031 B2 | 12/2022 | Bryner et al. | |
| 11,529,735 B2 | 12/2022 | Bryner et al. | |
| 11,548,577 B2 | 1/2023 | Abdellatif et al. | |
| 11,565,417 B2 | 1/2023 | Bryner et al. | |
| 11,648,671 B2 | 5/2023 | Bryner et al. | |
| 11,669,100 B2 | 6/2023 | Loosararian et al. | |
| 11,673,272 B2 | 6/2023 | Loosararian et al. | |
| 11,740,635 B2 | 8/2023 | Loosararian et al. | |
| 11,850,726 B2 | 12/2023 | Bryner et al. | |
| 11,865,698 B2 | 1/2024 | Bryner et al. | |
| 11,872,688 B2 | 1/2024 | Bryner et al. | |
| 11,872,707 B2 | 1/2024 | Bryner et al. | |
| 11,892,322 B2 * | 2/2024 | Low | G01D 11/30 |
| 11,904,456 B2 | 2/2024 | Jourde et al. | |
| 11,926,037 B2 | 3/2024 | Bryner et al. | |
| 11,964,382 B2 | 4/2024 | Jourde et al. | |
| 11,969,881 B2 | 4/2024 | Jourde et al. | |
| 11,971,389 B2 | 4/2024 | David et al. | |
| 11,975,585 B2 * | 5/2024 | Colaw | B60G 17/0165 |
| 11,977,054 B2 | 5/2024 | David et al. | |
| 11,992,935 B2 | 5/2024 | Bryner et al. | |
| 12,007,364 B2 | 6/2024 | David et al. | |
| 12,013,705 B2 | 6/2024 | Loosararian et al. | |
| 12,022,617 B2 | 6/2024 | Jourde et al. | |
| 12,038,412 B2 | 7/2024 | David et al. | |
| 12,050,202 B2 | 7/2024 | David et al. | |
| 12,061,173 B2 | 8/2024 | David et al. | |
| 12,061,483 B2 | 8/2024 | Loosararian et al. | |
| 12,061,484 B2 | 8/2024 | Loosararian et al. | |
| 12,072,319 B2 | 8/2024 | David et al. | |
| 12,156,334 B2 | 11/2024 | Bryner et al. | |
| 12,160,956 B2 | 12/2024 | Jourde et al. | |
| 12,162,160 B2 | 12/2024 | Pinero et al. | |
| 12,200,868 B2 | 1/2025 | Jourde et al. | |
| 12,228,550 B2 | 2/2025 | David et al. | |
| 12,313,599 B2 * | 5/2025 | David | G01N 29/265 |
| 2002/0104693 A1 | 8/2002 | Moore et al. | |
| 2002/0111712 A1 | 8/2002 | Peshkin et al. | |
| 2002/0116083 A1 | 8/2002 | Schulze | |
| 2002/0134159 A1 | 9/2002 | He | |
| 2002/0143421 A1 | 10/2002 | Wetzer | |
| 2002/0168532 A1 | 11/2002 | Sinsel et al. | |
| 2002/0190682 A1 | 12/2002 | Schempf et al. | |
| 2003/0060930 A1 | 3/2003 | Fujita et al. | |
| 2003/0089267 A1 | 5/2003 | Ghorbel et al. | |
| 2003/0129872 A1 | 7/2003 | Tolmie | |
| 2003/0137268 A1 | 7/2003 | Papanikolopoulos et al. | |
| 2003/0172735 A1 | 9/2003 | Lam et al. | |
| 2003/0188589 A1 | 10/2003 | Harthorn et al. | |
| 2004/0050165 A1 | 3/2004 | He | |
| 2004/0173116 A1 | 9/2004 | Ghorbel et al. | |
| 2004/0177681 A1 | 9/2004 | Harthorn et al. | |
| 2004/0207394 A1 | 10/2004 | Harthorn et al. | |
| 2004/0262060 A1 | 12/2004 | Kim | |
| 2005/0016008 A1 | 1/2005 | Raab et al. | |
| 2005/0056105 A1 | 3/2005 | Delacroix et al. | |
| 2005/0065651 A1 | 3/2005 | Ayers et al. | |
| 2005/0150300 A1 | 7/2005 | Nenno et al. | |
| 2005/0174086 A1 | 8/2005 | Iwashita et al. | |
| 2005/0183506 A1 | 8/2005 | Kawabata | |
| 2005/0252296 A1 | 11/2005 | Hock et al. | |
| 2006/0027952 A1 | 2/2006 | Meissner et al. | |
| 2006/0037430 A1 | 2/2006 | Kiyosawa et al. | |
| 2006/0055399 A1 | 3/2006 | Georgeson et al. | |
| 2006/0138732 A1 | 6/2006 | Buma et al. | |
| 2006/0162610 A1 | 7/2006 | Reboredo et al. | |
| 2006/0243051 A1 | 11/2006 | Bui et al. | |
| 2007/0006657 A1 | 1/2007 | Kennedy et al. | |
| 2007/0006658 A1 | 1/2007 | Kennedy et al. | |
| 2007/0044562 A1 | 3/2007 | Sarr | |
| 2007/0044564 A1 | 3/2007 | Bui et al. | |
| 2007/0055152 A1 | 3/2007 | Ukubo et al. | |
| 2007/0137905 A1 | 6/2007 | Lee et al. | |
| 2007/0146480 A1 | 6/2007 | Judge et al. | |
| 2007/0195712 A1 | 8/2007 | Thayer et al. | |
| 2007/0217672 A1 | 9/2007 | Shannon et al. | |
| 2007/0227250 A1 | 10/2007 | Kennedy et al. | |
| 2007/0278851 A1 | 12/2007 | Nakamura et al. | |
| 2007/0293997 A1 | 12/2007 | Couch | |
| 2008/0039974 A1 | 2/2008 | Sandin et al. | |
| 2008/0054540 A1 | 3/2008 | Buma | |
| 2008/0059114 A1 | 3/2008 | Coperet | |
| 2008/0079723 A1 | 4/2008 | Hanson et al. | |
| 2008/0087112 A1 | 4/2008 | Bagley et al. | |
| 2008/0087113 A1 | 4/2008 | Bagley et al. | |
| 2008/0092061 A1 | 4/2008 | Bankston et al. | |
| 2008/0148876 A1 | 6/2008 | Hock et al. | |
| 2008/0202245 A1 | 8/2008 | Young | |
| 2008/0220692 A1 | 9/2008 | Torres et al. | |
| 2008/0230289 A1 | 9/2008 | Schoon et al. | |
| 2008/0245151 A1 | 10/2008 | Roney et al. | |
| 2008/0302200 A1 | 12/2008 | Tobey | |
| 2009/0078484 A1 | 3/2009 | Kocijan | |
| 2009/0114025 A1 | 5/2009 | Sato et al. | |
| 2009/0161217 A1 | 6/2009 | Mimura | |
| 2009/0224493 A1 | 9/2009 | Buma et al. | |
| 2009/0287450 A1 | 11/2009 | Dubois et al. | |
| 2009/0301203 A1 | 12/2009 | Brussieux | |
| 2010/0011522 A1 | 1/2010 | Kim et al. | |
| 2010/0013174 A1 | 1/2010 | Buma et al. | |
| 2010/0060273 A1 | 3/2010 | Couchman | |
| 2010/0126403 A1 | 5/2010 | Rooney, Iii et al. | |
| 2010/0212983 A1 | 8/2010 | Lama | |
| 2010/0224001 A1 | 9/2010 | Brignac | |
| 2010/0263948 A1 | 10/2010 | Couture et al. | |
| 2011/0030478 A1 | 2/2011 | Park et al. | |
| 2011/0061197 A1 | 3/2011 | Shimomura | |
| 2011/0130238 A1 | 6/2011 | Schoon | |
| 2011/0167914 A1 | 7/2011 | Sutherland | |
| 2011/0169938 A1 | 7/2011 | Webster et al. | |
| 2011/0178727 A1 | 7/2011 | Hafenrichter et al. | |
| 2011/0222170 A1 | 9/2011 | Tanimura | |
| 2011/0231013 A1 | 9/2011 | Smoot et al. | |
| 2011/0253470 A1 | 10/2011 | Fischer | |
| 2011/0270705 A1 | 11/2011 | Parker | |
| 2012/0116583 A1 | 5/2012 | Beard et al. | |
| 2012/0186874 A1 | 7/2012 | Malone et al. | |
| 2012/0215348 A1 | 8/2012 | Skrinde | |
| 2012/0215355 A1 | 8/2012 | Bewley et al. | |
| 2012/0218868 A1 | 8/2012 | Kahn et al. | |
| 2012/0238389 A1 | 9/2012 | Schoon | |
| 2012/0255360 A1 | 10/2012 | Tippit, Jr. et al. | |
| 2012/0257042 A1 | 10/2012 | McKaigue et al. | |
| 2012/0271673 A1 | 10/2012 | Riley | |
| 2012/0273284 A1 | 11/2012 | Nesnas et al. | |
| 2013/0024067 A1 | 1/2013 | Troy et al. | |
| 2013/0070068 A1 | 3/2013 | Garvey, Iii et al. | |
| 2013/0140801 A1 | 6/2013 | Schlee et al. | |
| 2013/0142297 A1 | 6/2013 | Dean et al. | |
| 2013/0166193 A1 | 6/2013 | Goldman et al. | |
| 2013/0218490 A1 | 8/2013 | Poirier et al. | |
| 2013/0289766 A1 | 10/2013 | Hafenrichter et al. | |
| 2013/0317676 A1 | 11/2013 | Cooper et al. | |
| 2013/0340529 A1 | 12/2013 | Lama | |
| 2014/0069193 A1 | 3/2014 | Graham et al. | |
| 2014/0076642 A1 | 3/2014 | Gettings et al. | |
| 2014/0115860 A1 | 5/2014 | Sarh et al. | |
| 2014/0188649 A1 | 7/2014 | Messinger et al. | |
| 2014/0230711 A1 | 8/2014 | Lovelace et al. | |
| 2014/0268176 A1 | 9/2014 | Hundstad et al. | |
| 2014/0278221 A1 | 9/2014 | Troy et al. | |
| 2014/0305216 A1 | 10/2014 | Hafenrichter et al. | |
| 2014/0320640 A1 | 10/2014 | Barbier et al. | |
| 2014/0350722 A1 | 11/2014 | Skrinde | |
| 2015/0046018 A1 | 2/2015 | Hayashi et al. | |

(56) References Cited

U.S. PATENT DOCUMENTS

| | | |
|---|---|---|
| 2015/0151572 A1 | 6/2015 | Parrott et al. |
| 2015/0151797 A1 | 6/2015 | Outa et al. |
| 2015/0153170 A1 | 6/2015 | Gonzalez et al. |
| 2015/0153312 A1 | 6/2015 | Gonzalez et al. |
| 2015/0177194 A1 | 6/2015 | Xu et al. |
| 2015/0226369 A1 | 8/2015 | Troy et al. |
| 2015/0240984 A1 | 8/2015 | Choi et al. |
| 2015/0316195 A1 | 11/2015 | Penza et al. |
| 2015/0329221 A1 | 11/2015 | Georgeson et al. |
| 2015/0369916 A1 | 12/2015 | Nikolov et al. |
| 2016/0023696 A1 | 1/2016 | Hakes et al. |
| 2016/0033453 A1 | 2/2016 | Cegla et al. |
| 2016/0059939 A1 | 3/2016 | Lamonby et al. |
| 2016/0121486 A1 | 5/2016 | Lipinski et al. |
| 2016/0123933 A1 | 5/2016 | Fetzer et al. |
| 2016/0176452 A1 | 6/2016 | Gettings et al. |
| 2016/0231279 A1 | 8/2016 | Hoyt |
| 2016/0238565 A1 | 8/2016 | Gonzalez et al. |
| 2016/0268823 A1 | 9/2016 | Gonzalez et al. |
| 2016/0273992 A1 | 9/2016 | Frueh |
| 2016/0281910 A1 | 9/2016 | Troy et al. |
| 2016/0282877 A1 | 9/2016 | Gonzalez et al. |
| 2016/0318182 A1 | 11/2016 | Nakaya et al. |
| 2016/0334301 A1 | 11/2016 | Hafenrichter et al. |
| 2016/0349213 A1 | 12/2016 | Kollgaard et al. |
| 2017/0007336 A1 | 1/2017 | Tsuboi et al. |
| 2017/0108156 A1 | 4/2017 | Penza et al. |
| 2017/0191966 A1 | 7/2017 | Niri et al. |
| 2017/0199024 A1 | 7/2017 | Georgeson et al. |
| 2017/0221454 A1 | 8/2017 | Kim et al. |
| 2017/0225804 A1 | 8/2017 | Hafenrichter et al. |
| 2017/0305261 A1 | 10/2017 | Meager |
| 2017/0321790 A1 | 11/2017 | Klassen et al. |
| 2017/0334241 A1 | 11/2017 | Gonzalez et al. |
| 2017/0347624 A1 | 12/2017 | Jorgensen et al. |
| 2018/0009113 A1 | 1/2018 | Lauder et al. |
| 2018/0011462 A1 | 1/2018 | Bolin et al. |
| 2018/0024561 A1 | 1/2018 | Soh et al. |
| 2018/0036890 A1 | 2/2018 | Hollister |
| 2018/0059660 A1 | 3/2018 | Heatzig et al. |
| 2018/0065762 A1 | 3/2018 | Georgeson et al. |
| 2018/0073975 A1 | 3/2018 | Abdellatif et al. |
| 2018/0080904 A1 | 3/2018 | Al Nahwi et al. |
| 2018/0080905 A1 | 3/2018 | Al Nahwi et al. |
| 2018/0117718 A1 | 5/2018 | Rajagopalan et al. |
| 2018/0154954 A1 | 6/2018 | Bagheri et al. |
| 2018/0172121 A1 | 6/2018 | Potter et al. |
| 2018/0181136 A1 | 6/2018 | Loosararian et al. |
| 2018/0232874 A1 | 8/2018 | Østervold et al. |
| 2018/0239313 A1 | 8/2018 | Santarone et al. |
| 2018/0245923 A1 | 8/2018 | Han |
| 2018/0267554 A1 | 9/2018 | Loosararian et al. |
| 2018/0275670 A1 | 9/2018 | Loosararian et al. |
| 2018/0275671 A1 | 9/2018 | Loosararian et al. |
| 2018/0275672 A1 | 9/2018 | Loosararian et al. |
| 2018/0275673 A1 | 9/2018 | Loosararian et al. |
| 2018/0275674 A1 | 9/2018 | Loosararian et al. |
| 2018/0275675 A1 | 9/2018 | Loosararian et al. |
| 2018/0284794 A1 | 10/2018 | Loosararian et al. |
| 2018/0284795 A1 | 10/2018 | Loosararian et al. |
| 2018/0284796 A1 | 10/2018 | Loosararian et al. |
| 2018/0284797 A1 | 10/2018 | Loosararian et al. |
| 2018/0292838 A1 | 10/2018 | Loosararian et al. |
| 2018/0313715 A1 | 11/2018 | Cichosz et al. |
| 2018/0322699 A1 | 11/2018 | Gray et al. |
| 2019/0005465 A1 | 1/2019 | Taylor et al. |
| 2019/0015971 A1 | 1/2019 | Carrasco Zanini et al. |
| 2019/0017656 A1 | 1/2019 | Carrasco Zanini et al. |
| 2019/0018080 A1 | 1/2019 | Marauska et al. |
| 2019/0022848 A1 | 1/2019 | Akin et al. |
| 2019/0022849 A1 | 1/2019 | Akin et al. |
| 2019/0022877 A1 | 1/2019 | Akin et al. |
| 2019/0025851 A1 | 1/2019 | Ebrahimi Afrouzi |
| 2019/0046373 A1 | 2/2019 | Coulter et al. |
| 2019/0056541 A1 | 2/2019 | Roberts et al. |
| 2019/0086020 A1 | 3/2019 | Wehlin et al. |
| 2019/0118881 A1 | 4/2019 | Mcginn |
| 2019/0128851 A1 | 5/2019 | Wells |
| 2019/0128856 A1 | 5/2019 | Spay et al. |
| 2019/0152544 A1 | 5/2019 | Outa |
| 2019/0162703 A1 | 5/2019 | Melandsø et al. |
| 2019/0196020 A1 | 6/2019 | Aceti et al. |
| 2019/0242728 A1 | 8/2019 | Low et al. |
| 2019/0242743 A1 | 8/2019 | Patel et al. |
| 2019/0346034 A1 | 11/2019 | Noda |
| 2019/0360976 A1 | 11/2019 | Frueh et al. |
| 2019/0368594 A1 | 12/2019 | Sakata |
| 2019/0388998 A1 | 12/2019 | Huggett et al. |
| 2020/0011840 A1 | 1/2020 | Hafenrichter et al. |
| 2020/0133285 A1 | 4/2020 | Xiong et al. |
| 2020/0159237 A1 | 5/2020 | Loosararian et al. |
| 2020/0173879 A1 | 6/2020 | Morris et al. |
| 2020/0175667 A1 | 6/2020 | Morris et al. |
| 2020/0254615 A1 | 8/2020 | Bryner et al. |
| 2020/0262052 A1 | 8/2020 | Bryner et al. |
| 2020/0262066 A1 | 8/2020 | Bryner et al. |
| 2020/0262067 A1 | 8/2020 | Bryner et al. |
| 2020/0262072 A1 | 8/2020 | Bryner et al. |
| 2020/0262077 A1 | 8/2020 | Bryner et al. |
| 2020/0262261 A1 | 8/2020 | Loosararian et al. |
| 2020/0264614 A1 | 8/2020 | Bryner et al. |
| 2020/0264615 A1 | 8/2020 | Bryner et al. |
| 2020/0306969 A1 | 10/2020 | Bryner et al. |
| 2020/0310456 A1 | 10/2020 | Loosararian et al. |
| 2020/0393418 A1 | 12/2020 | Fetzer et al. |
| 2021/0001484 A1 | 1/2021 | Bogart et al. |
| 2021/0060782 A1 | 3/2021 | Bryner et al. |
| 2021/0060783 A1 | 3/2021 | Bryner et al. |
| 2021/0162588 A1 | 6/2021 | Yi et al. |
| 2021/0310597 A1 | 10/2021 | Takashima et al. |
| 2021/0336924 A1 | 10/2021 | Katoh |
| 2022/0011777 A1 | 1/2022 | Loosararian et al. |
| 2022/0019190 A1 | 1/2022 | Mohamed Shibly et al. |
| 2022/0083129 A1 | 3/2022 | Factor et al. |
| 2022/0196445 A1 | 6/2022 | Low et al. |
| 2022/0214315 A1 | 7/2022 | Serrill et al. |
| 2022/0222856 A1 | 7/2022 | Tang et al. |
| 2022/0268741 A1 | 8/2022 | Boerner et al. |
| 2022/0331945 A1 | 10/2022 | Bryner et al. |
| 2022/0331949 A1 | 10/2022 | Bryner et al. |
| 2022/0331978 A1 | 10/2022 | Bryner et al. |
| 2022/0331979 A1 | 10/2022 | Jourde et al. |
| 2022/0331980 A1 | 10/2022 | Jourde et al. |
| 2022/0331981 A1 | 10/2022 | Bryner et al. |
| 2022/0331982 A1 | 10/2022 | Jourde et al. |
| 2022/0331983 A1 | 10/2022 | Bryner et al. |
| 2022/0331984 A1 | 10/2022 | Bryner et al. |
| 2022/0331985 A1 | 10/2022 | Jourde et al. |
| 2022/0331986 A1 | 10/2022 | Bryner et al. |
| 2022/0331987 A1 | 10/2022 | Bryner et al. |
| 2022/0331988 A1 | 10/2022 | Bryner et al. |
| 2022/0334087 A1 | 10/2022 | Jourde et al. |
| 2022/0334582 A1 | 10/2022 | Bryner et al. |
| 2022/0341886 A1 | 10/2022 | David et al. |
| 2022/0341887 A1 | 10/2022 | David et al. |
| 2022/0341888 A1 | 10/2022 | David et al. |
| 2022/0341889 A1 | 10/2022 | David et al. |
| 2022/0341890 A1 | 10/2022 | David et al. |
| 2022/0341891 A1 | 10/2022 | David et al. |
| 2022/0341892 A1 | 10/2022 | David et al. |
| 2022/0373122 A1 | 11/2022 | Song et al. |
| 2023/0003687 A1 | 1/2023 | Vaganay et al. |
| 2023/0044908 A1 | 2/2023 | Jourde et al. |
| 2023/0087654 A1 | 3/2023 | Bryner et al. |
| 2023/0128262 A1 | 4/2023 | Colaw et al. |
| 2023/0153989 A1 | 5/2023 | Ryan et al. |
| 2023/0228719 A1 | 7/2023 | David et al. |
| 2023/0333566 A1 | 10/2023 | Loosararian et al. |
| 2023/0341865 A1 | 10/2023 | Loosararian et al. |
| 2023/0390930 A1 | 12/2023 | Loosararian et al. |
| 2024/0100717 A1 | 3/2024 | Bryner et al. |
| 2024/0112100 A1 | 4/2024 | Bryner et al. |
| 2024/0198519 A1 | 6/2024 | Roy et al. |
| 2024/0208288 A1 | 6/2024 | Harada et al. |

(56) References Cited

U.S. PATENT DOCUMENTS

| | | |
|---|---|---|
| 2024/0215168 A1 | 6/2024 | Jourde et al. |
| 2024/0255471 A1 | 8/2024 | David et al. |
| 2024/0316775 A1 | 9/2024 | Pinero et al. |
| 2024/0345036 A1 | 10/2024 | David et al. |
| 2024/0345580 A1 | 10/2024 | Loosararian et al. |
| 2025/0033212 A1 | 1/2025 | Pinero et al. |

FOREIGN PATENT DOCUMENTS

| | | |
|---|---|---|
| CN | 101368932 A | 2/2009 |
| CN | 102356311 A | 2/2012 |
| CN | 105150834 A | 12/2015 |
| CN | 205503912 U | 8/2016 |
| CN | 111844109 A | 10/2020 |
| CN | 112917483 A | 6/2021 |
| CN | 113319839 A | 8/2021 |
| DE | 009206011 U1 | 7/1992 |
| DE | 10300383 A1 | 7/2004 |
| DE | 102016117237 A1 | 3/2018 |
| EP | 1107442 A3 | 12/2003 |
| EP | 1742049 A2 | 1/2007 |
| EP | 1870313 A2 | 12/2007 |
| FR | 2861457 A1 | 4/2005 |
| FR | 2970199 A1 | 7/2012 |
| GB | 548910 A | 10/1942 |
| JP | 6018640 A | 1/1985 |
| JP | 61090052 | 5/1986 |
| JP | 61144503 A | 7/1986 |
| JP | 11211707 | 8/1999 |
| JP | H11305017 A | 11/1999 |
| JP | 2006219048 A | 8/2006 |
| JP | 2007302075 A | 11/2007 |
| JP | 2019138782 A | 8/2019 |
| JP | 2020527472 A | 9/2020 |
| JP | 2022049170 A | 3/2022 |
| KR | 200410388 Y1 | 3/2006 |
| KR | 200431177 Y1 | 11/2006 |
| KR | 200438708 Y1 | 2/2008 |
| KR | 20100078898 A | 7/2010 |
| KR | 20110033609 A | 3/2011 |
| KR | 20140040692 A | 4/2014 |
| KR | 20150123371 A | 11/2015 |
| KR | 102263144 B1 | 6/2021 |
| KR | 102263706 B1 | 6/2021 |
| KR | 102381365 B1 | 4/2022 |
| WO | 03087733 A2 | 10/2003 |
| WO | 2006066139 A2 | 6/2006 |
| WO | 2006114485 A1 | 11/2006 |
| WO | 2007082594 A2 | 7/2007 |
| WO | 2009086495 A2 | 7/2009 |
| WO | 2015059916 A1 | 4/2015 |
| WO | 2015152198 A1 | 10/2015 |
| WO | 2016051147 A1 | 4/2016 |
| WO | 2018119450 A1 | 6/2018 |
| WO | 2018146279 A1 | 8/2018 |
| WO | 2019204504 A1 | 10/2019 |
| WO | 2020185719 A2 | 9/2020 |
| WO | 2020185719 A3 | 10/2020 |
| WO | 2022202365 A1 | 9/2022 |
| WO | 2022225725 A1 | 10/2022 |
| WO | 2022226222 A1 | 10/2022 |
| WO | 2023102637 A1 | 6/2023 |
| WO | 2024073767 A1 | 4/2024 |
| WO | 2024073771 A2 | 4/2024 |
| WO | 2024073771 A3 | 5/2024 |
| WO | 2024092081 A1 | 5/2024 |
| WO | 2024097795 A2 | 5/2024 |
| WO | 2024097795 A3 | 6/2024 |
| WO | 2024138219 A2 | 6/2024 |
| WO | 2024138219 A3 | 7/2024 |
| WO | 2024254593 A2 | 12/2024 |
| WO | 2024254597 A1 | 12/2024 |
| WO | 2024259133 A2 | 12/2024 |
| WO | 2024254593 A3 | 1/2025 |

OTHER PUBLICATIONS

"Coordinate Systems in Two and Three Dimensions", Oregon State University, Department of Mathematics, 2015, 3 pages.

"Horizontal definition", Merriam-Webster Dictionary, 2014, 1 page.

"International Federation of Robotics,", World Robotics, Chapter 1 section 2, 2016, 10 pages.

"Merriam-Webster", Definition of Pivot, 2015, 5 pages.

"Reflectors, Maximum accuracy and range, Hexagon Geosystems, Leica Geosystems, https://leica-geosystems.com/products/total-stations/accessories/reflectors", available at https://web.archive.org/web/20160303225554/http://leica-geosystems.com:80/products/total-stations/accessories/reflectors, Together With Enlarged Copy of Text, Mar. 3, 2016, 4 pages.

"Reflectors, Maximum accuracy and range, Hexagon Geosystems, Leica Geosystems, https://leica-geosystems.com/products/total-stations/accessories/reflectors", available at https://web.archive.org/web/20220524042219/https://leica-geosystems.com/products/total-stations/accessories/reflectors, Together With Enlarged Copy of Text, May 24, 2022, 4 pages.

"Vertical Definition", Merriam Webster, 2014, 1 page.

"Yaskawa Motoman Robotics,", Robotics Glossary, 2019, 20 pages.

"Affidavit of Joshua Fuller", ECF No. 29-1, *Gecko Robotics, Inc. v. Summit NDE*, No. 1:23-cv-01918 (N.D. Ill., E.D.), May 12, 2023, 11 pages.

"Affidavit of Juan Roberto Mendoza Mora", ECF No. 29-2, *Gecko Robotics, Inc. v. Summit NDE*, No. 1:23-cv-01918 (N.D. Ill., E.D.), May 12, 2023, 6 pages.

"Agreed Order for Expedited Discovery", ECF No. 78, *Gecko Robotics, Inc. v. Summit NDE*, No. 2:2023-cv-00229 (N.D. Ind.), Aug. 21, 2023, 4 pages.

"Brief in Support of Plaintiff's Motion for Preliminary Injunction", ECF No. 12, *Gecko Robotics, Inc. v. Summit NDE*, No. 1:23-cv-01918 (N.D. Ill., E.D.), Apr. 4, 2023, 27 pages.

"Case Transfer", ECF No. 45, *Gecko Robotics, Inc. v. Summit NDE*, No. 2:23-cv-00229 (N.D. Ind.), Jul. 3, 2023, 2 pages.

"Civil Cover Sheet", ECF No. 2, *Gecko Robotics, Inc. v. Summit NDE*, No. 1:23-cv-01918 (N.D. Ill., E.D.), Mar. 27, 2023, 2 pages.

"Declaration of Ryan Desoto", ECF No. 10, *Gecko Robotics, Inc. v. Summit NDE*, No. 1:23-cv-01918 (N.D. Ill., E.D.), Apr. 4, 2023, 11 pages.

"Defendant, Summit NDC, LLC's, Response in Opposition To Plaintiff's Motion for Compel Discovery Responses and Request for Preliminary Pretrial Conference", ECF No. 80, *Gecko Robotics, Inc. v. Summit NDE*, No. 2:23-cv-00229-PPS-JEM (N.D. Ind.), Aug. 29, 2023, 16 pages.

"Defendant, Summit NDC, LLC's, Response in Opposition To Plaintiff's Second Motion To Compel Discovery Responses", ECF No. 103, *Gecko Robotics, Inc. v. Summit NDE*, No. 2:23-cv-00229 (N.D. Ind.), Nov. 14, 2023, 19 pages.

"Defendant's, Summit NDE, Brief On the Issue of Admissibility of Videos On Plaintiff's Website, Youtube Channel and Facebook Page", ECF No. 109, *Gecko Robotics, Inc. v. Summit NDE*, No. 2:23-cv-00229 (N.D. Ind.), Dec. 6, 2023, 5 pages.

"Defendants, Juan Roberto Mendoza Mora and Angel Ortega Response Motion in Opposition To Plaintiff's Motion To Compel Discovery Responses", ECF No. 81, *Gecko Robotics, Inc. v. Summit NDE*, No. 2:23-cv-00229-PPS-JEM (N.D. Ind.), Aug. 29, 2023, 6 pages.

"Defendants, Juan Roberto Mendoza Mora and Angel Ortega's Brief in Opposition To Motion To Compel", ECF No. 82, *Gecko Robotics, Inc. v. Summit NDE*, No. 2:23-cv-00229-PPS-JEM (N.D. Ind.), Aug. 29, 2023, 8 pages.

"Defendants, Juan Roberto Mendoza Mora and Angel Ortega's Motion for Leave", ECF No. 131, *Gecko Robotics, Inc. v. Summit NDE*, No. 2:23-cv-00229 (N.D. Ind.), Feb. 27, 2024, 2 pages.

"Defendants, Juan Roberto Mendoza Mora and Angel Ortega's Response in Opposition To Plaintiff's Second Motion To Compel Discovery Responses", ECF No. 101, *Gecko Robotics, Inc. v. Summit NDE*, No. 2:23-cv-00229 (N.D. Ind.), Nov. 14, 2023, 6 pages.

"Defendants' Consent Motion To Transfer Venue Under 28 U.S.C. § 1404(a)", ECF No. 42, *Gecko Robotics, Inc. v. Summit NDE*, No. 1:23-cv-01918 (N.D. Ill., E.D.), Jun. 7, 2023, 8 pages.

(56)            References Cited

OTHER PUBLICATIONS

"Defendants' Motion for Disclosure of Confidential Discovery Materials At Hearing On Motion for Preliminary Injunction", ECF No. 106, *Gecko Robotics, Inc.* v. *Summit NDE*, No. 2:23-cv-00229 (N.D. Ind.), Dec. 4, 2023, 17 pages.
"Defendants' Opposition To Plaintiff's Motion For Expedited Discovery", ECF No. 30, *Gecko Robotics, Inc.* v. *Summit NDE*, No. 1:23-cv-01918 (N.D. Ill., E.D.), May 12, 2023, 6 pages.
"Defendants' Opposition To Plaintiff's Motion For Preliminary Injunction And Supporting Brief", ECF No. 29, *Gecko Robotics, Inc.* v. *Summit NDE*, No. 1:23-cv-01918 (N.D. Ill., E.D.), May 12, 2023, 22 pages.
"District Transfer", ECF No. 44, *Gecko Robotics, Inc.* v. *Summit NDE*, No. 1:23-cv-01918 (N.D. Ill., E.D.), Jun. 27, 2023, 1 page.
"Exhibit 4, Defendants Mendoza and Ortega's Responses To Plaintiff's First Request for Production of Documents and Things", ECF No. 95-4, *Gecko Robotics, Inc.* v. *Summit NDE*, No. 2:23-cv-00229 (N.D. Ind.), Oct. 24, 2023, 7 pages.
"Exhibit A, Protective Order", ECF No. 87-1, *Gecko Robotics, Inc.* v. *Summit NDE*, No. 2:23-cv-00229 (N.D. Ind.), Sep. 13, 2023, 14 pages.
"Exhibit B, Initial Status Report", ECF No. 70-2, *Gecko Robotics, Inc.* v. *Summit NDE*, No. 2:2023-cv-00229 (N.D. Ind.), Aug. 15, 2023, 3 pages.
"GeckoRobotics Tri-Lateral Phased Array", ECF No. 29-3, *Gecko Robotics, Inc.* v. *Summit NDE*, No. 1:23-cv-01918 (N.D. Ill., E.D.), May 12, 2023, 3 pages.
"Joint Initial Status Report", ECF No. 24, *Gecko Robotics, Inc.* v. *Summit NDE*, No. 1:23-CV-01918 (N.D. Ill., E.D.), May 9, 2023, 9 pages.
"Joint Motion for Additional Limited Expedited Discovery and Resetting Preliminary Injunction Hearing Date", ECF No. 88, *Gecko Robotics, Inc.* v. *Summit NDE*, No. 2:23-cv-00229 (N.D. Ind.), Sep. 14, 2023, 4 pages.
"Joint Motion for Protective Order", ECF No. 87, *Gecko Robotics, Inc.* v. *Summit NDE*, No. 2:23-cv-00229 (N.D. Ind.), Sep. 13, 2023, 2 pages.
"Joint Motion To Extend Expedited Discovery By Four Days", ECF No. 93, *Gecko Robotics, Inc.* v. *Summit NDE*, No. 2:23-cv-00229 (N.D. Ind.), Oct. 10, 2023, 2 pages.
"Juan Roberto Mendoza Mora and Angel Ortega's Amended Answers To Gecko Robotics, Inc.'s Complaint", ECF No. 131-1, *Gecko Robotics, Inc.* v. *Summit NDE*, No. 2:23-cv-00229 (N.D. Ind.), Feb. 27, 2024, 46 pages.
"Juan Roberto Mendoza Mora and Angel Ortega's Answer To Gecko Robotics, Inc.'s Complaint", ECF No. 39, *Gecko Robotics, Inc.* v. *Summit NDE*, No. 1:23-cv-01918 (N.D. Ill., E.D.), May 30, 2023, 45 pages.
"Juan Roberto Mendoza Mora and Angel Ortega's Amended Answers To Gecko Robotics, Inc.'s Complaint", ECF No. 134, *Gecko Robotics, Inc.* v. *Summit NDE*, No. 2:23-cv-00229 (N.D. Ind.), Mar. 15, 2024, 46 pages.
"Notification of Docket Entry", ECF No. 43, *Gecko Robotics, Inc.* v. *Summit NDE*, No. 1:23-cv-01918 (N.D. Ill., E.D.), Jun. 12, 2023, 1 page.
"Opinion and Order", ECF No. 136, *Gecko Robotics, Inc.* v. *Summit NDE*, No. 2:23-cv-00229 (N.D. Ind.), Mar. 29, 2024, 16 pages.
"Opinion and Order", ECF No. 54, *Gecko Robotics, Inc.* v. *Summit NDE*, No. 2:2023-cv-00229 (N.D. Ind.), Jul. 20, 2023, 4 pages.
"Order", ECF No. 79, *Gecko Robotics, Inc.* v. *Summit NDE*, No. 2:23-cv-00229-PPS-JEM (N.D. Ind.), Aug. 22, 2023, 2 pages.
"Order", ECF No. 90, *Gecko Robotics, Inc.* v. *Summit NDE*, No. 2:23-cv-00229 (N.D. Ind.), Sep. 25, 2023, 2 pages.
"Order", ECF No. 92, *Gecko Robotics, Inc.* v. *Summit NDE*, No. 2:23-cv-00229 (N.D. Ind.), Oct. 6, 2023, 2 pages.
"Order", ECF No. 85, *Gecko Robotics, Inc.* v. *Summit NDE*, No. 2:23-cv-00229-PPS-JEM (N.D. Ind.), Sep. 6, 2023, 4 pages.
"Plaintiff Gecko Robotics, Inc.'s Consolidated Reply in Further Support of Its Proposed Findings of Fact and Conclusions of Law", ECF No. 132, *Gecko Robotics, Inc.* v. *Summit NDE*, No. 2:23-cv-00229 (N.D. Ind.), Mar. 5, 2024, 17 pages.
"Plaintiff Gecko Robotics, Inc.'s Proposed Findings of Fact and Conclusions of Law", EECF No. 126, *Gecko Robotics, Inc.* v. *Summit NDE*, No. 2:23-cv-00229 (N.D. Ind.), Feb. 2, 2024, 42 pages.
"Plaintiff Gecko Robotics, Inc.'s Reply Brief in Further Support of Motion for Expedited Discovery", ECF No. 37, *Gecko Robotics, Inc.* v. *Summit NDE*, No. 1:23-cv-01918 (N.D. Ill., E.D.), May 26, 2023, 5 pages.
"Plaintiff Gecko Robotics, Inc.'s Reply Brief in Further Support of Motion for Preliminary Injunction", ECF No. 36, *Gecko Robotics, Inc.* v. *Summit NDE*, No. 1:23-cv-01918 (N.D. Ill., E.D.), May 26, 2023, 9 pages.
"Plaintiff's Brief in Support of Motion To Compel Discovery Responses", ECF No. 71, *Gecko Robotics, Inc.* v. *Summit NDE*, No. 2:2023-cv-00229 (N.D. Ind.), Aug. 15, 2023, 12 pages.
"Plaintiff's Brief in Support of Renewed Motion for Expedited Discovery", ECF No. 64, *Gecko Robotics, Inc.* v. *Summit NDE*, No. 2:2023-cv-00229 (N.D. Ind.), Aug. 7, 2023, 15 pages.
"Plaintiff's Certificate of Compliance With L.R. 37-1", ECF No. 70-3, *Gecko Robotics, Inc.* v. *Summit NDE*, No. 2:2023-cv-00229 (N.D. Ind.), Aug. 15, 2023, 2 pages.
"Plaintiff's Consolidated Reply in Further Support of Its Motion To Compel Discovery Against Defendants Summit NDE, LLC, Juan Roberto Mendoza Mora and Angel Ortega", ECF No. 83, *Gecko Robotics, Inc.* v. *Summit NDE*, No. 2:23-cv-00229-PPS-JEM (N.D. Ind.), Sep. 1, 2023, 15 pages.
"Plaintiff's First Set of Interrogatories To Defendants, Exhibit A", ECF No. 70-1, *Gecko Robotics, Inc.* v. *Summit NDE*, No. 2:2023-cv-00229 (N.D. Ind.), Aug. 15, 2023, 24 pages.
"Plaintiff's Motion To Compel Discovery Responses", ECF No. 70, *Gecko Robotics, Inc.* v. *Summit NDE*, No. 2:2023-cv-00229 (N.D. Ind.), Aug. 15, 2023, 4 pages.
"Plaintiff's Renewed Motion for Expedited Discovery", ECF No. 63, *Gecko Robotics, Inc.* v. *Summit NDE*, No. 2:2023-cv-00229 (N.D. Ind.), Aug. 7, 2023, 5 pages.
"Protective Order", ECF No. 89, *Gecko Robotics, Inc.* v. *Summit NDE*, No. 2:23-cv-00229 (N.D. Ind.), Sep. 14, 2023, 21 pages.
"Report of Parties' Planning Meeting", ECF No. 91, *Gecko Robotics, Inc.* v. *Summit NDE*, No. 2:23-cv-00229 (N.D. Ind.), Oct. 4, 2023, 7 pages.
"Roberto Mendoza Mora and Angel Ortega's Response To Gecko's Request for a Preliminary Injunction Including Proposed Findings of Fact and Conclusions of Law", ECF No. 130, *Gecko Robotics, Inc.* v. *Summit NDE*, No. 2:23-cv-00229 (N.D. Ind.), Feb. 27, 2024, 32 pages.
"Summit NDE, LLC's Answer To Gecko Robotics, Inc.'S Complaint", ECF No. 35, *Gecko Robotics, Inc.* v. *Summit NDE*, No. 1:23-cv-01918 (N.D. Ill., E.D.), May 24, 2023, 46 pages.
"Summit NDE's Proposed Findings of Fact and Conclusions of Law", ECF No. 129, *Gecko Robotics, Inc.* v. *Summit NDE*, No. 2:23-cv-00229 (N.D. Ind.), Feb. 27, 24, 25 pages.
"Verified Complaint", ECF No. 1, *Gecko Robotics, Inc.* v. *Summit NDE*, No. 1:23-cv-01918 (N.D. Ill., E.D.), Mar. 27, 2023, 35 pages.
17884897.4, "European Application Serial No. 17884897.4, Extended European Search Report mailed Jun. 25, 2020", Gecko Robotics, Inc., 5 pages.
20769832.5, "European Application Serial No. 20769832.5, Extended European Search Report mailed Nov. 4, 2022", Gecko Robotics, Inc., 8 pages.
21201397.3, "European Application Serial No. 21201397.3, Extended European Search Report mailed May 11, 2022", Gecko Robotics, Inc., 12 pages.
22792205.1, "European Application Serial No. 22792205.1, Extended European Search Report mailed Feb. 6, 2025", Gecko Robotics, Inc., 10 pages.
22792521.1, "European Application Serial No. 22792521.1, Extended European Search Report mailed Mar. 19, 2025", Gecko Robotics, Inc., 8 pages.
AMS Controls, "Encoder Tracking and Mounting", 2015, 18 pages.

(56) References Cited

OTHER PUBLICATIONS

Bell, Stephanie , "Measurement Good Practice Guide A Beginner's Guide to Uncertainty of Measurement", National Physical Laboratory, Issue 2, 2001, 41 pages.

Berendsen, A.M , "Ship Painting: Current Practice and Systems in Europe", Technology Publishing Company, Sep. 1998, 10 pages.

Borenstein, Johann et al., "Where am I? Sensors and Methods for Mobile Robot Positioning", Retrieved from the Internet :URL :http ://www-personal.umich.edu/~johannb/Papers/pos96rep.pdf, Apr. 22, 1996, pp. 1-282.

Cai, Mingxue et al., "A Novel Pipeline Inspection Robot with Two Angle-changeable Crawler Drive Modules", Proceedings of 2018 IEEE 8th Annual International Conference on CYBER Technology in Automation, Control, and Intelligent Systems, Jul. 2018, 6 pages.

Carlsten, Roy , "Understanding Corrosion and How to Protect Against It", manufacturing.net, Mar. 11, 2002, 8 pages.

Chen, et al., "Laser Micromachined Flexible Ultrasound Line Array and Subplanar Multimodal Imaging Applications", retrieved on [Oct. 16, 2024]. Retrieved from the internet <URL: https://ieeexplore. ieee.org/absbact/document/9819962> entire document, Jul. 8, 2022.

Connor, David et al., "Improved dead reckoning using caster wheel sensing on a differentially steered 3-wheeled autonomous vehicle", Proceedings vol. 4195, Mobile Robots XV and Telemanipulator and Telepresence Technologies VII, 2001, 13 pages.

Curran, Patrick , "Make the right choice for metal coating for the right application", Design World, Jun. 2, 2016, 18 pages.

Edlinger, Raimund et al., "MARC—Modular Autonomous Adaptable Robot Concept", 2019 IEEE International Symposium On Safety, Security, and Rescue Robotics (SSRR), IEEE, Sep. 2, 2019, pp. 1-7.

Felsch, Torsten et al., "Robotized Inspection of Vertical Structures of a Solar Power Plant Using NDT Techniques", doi:10.3390/robotics4020103, 2015, pp. 103-119.

Few, Stephen , "Practical Rules for Using Color in Charts", Perceptual Edge, Visual Business Intelligence Newsletter, Feb. 2008, 13 pages.

Fowler, Kenneth A. et al., "Theory and Application of Precious Ultrasonic Thickness Gaging", 2015, 12 pages.

General Electric, "BWCI Automated Boiler Wall Cleaning & Inspection", inspection-robotics.com, 2016, 4 pages.

Ginzel, et al., "Acoustic Properties of the Elastomeric Materials Aqualene and ACE", The e-Journal of Nondestructive Testing—ISSN 1435-4934, Dec. 2015, 13 pages.

Gonzalez, Carlos , "What's the Difference between Pneumatic, Hydraulic, and Electrical Actuators", Machine Design, 2015, 4 pages.

Guglielmelli, E. et al., "Avoiding obstacles by using a proximity US/IR sensitive skin", IEEE, 1993, pp. 2207-2214.

Haitao, et al., "Simulation, Test and Analysis of Three-phase Short-Circuit Braking in IGCT-based MV Adjustable Speed Drive Systems", 2005 International Conference on Electrical Machines and Systems, Nanjing, China, IEEE, 2005, pp. 1437-1441.

Harrison, David M. , "Uncertainty in Physical Measurements", Module 4—Repeated Measurements, Dept. of Physics, Univ. of Toronto, 2015, 18 pages.

Hongo, Takero et al., "An Automatic Guidance System of a Self-Controlled Vehicle", In: "Autonomous Robot Vehicles", Jan. 1, 1990 (Jan. 1, 1990), Springer New York, New York, NY,, Retrieved from the Internet: URL:https://ieeexplore.ieee.org/stampPDF/getPDF. jsp?tp=&arnumber=4158818&ref=aHR0cHM6Ly9pZWVVleHBsb3 JILmllZWUub3JnL2RvY3VTZW50LzQxNTg4MTg=, Jan. 1, 1990, pp. 32-37.

Hutter, Marco et al., "Force Control for Active Chassis Balancing", IEEE/ASME Transactions On Mechatronics, vol. 22, No. 2, Apr. 2017, 10 pages.

Lebowitz, Carol A. et al., "Ultrasonic Measurement of Pipe Thickness", Review of Progress in Quantitative Nondestructive Evaluation, vol. 12, 1987, 8 pages.

Lee, Giuk et al., "Combot: Compliant Climbing Robotic Platform with Transitioning Capability and Payload Capacity", IEEE International Conference on Robotics and Automation RiverCentre, Saint Paul, Minnesota,, 2012, 6 pages.

Lins, Romulo G. et al., "Autonomous Robot System for Inspection of Defects in Civil Infrastructures", IEEE, 2016, pp. 1414-1422.

Lion Precision, "Understanding Sensor Resolution Specifications and Performance", TechNote, LT05-0010, 2014, pp. 1-6.

Martinez, Angelo et al., "Fuzzy logic based collision avoidance for a mobile robot", IEEE, 1993, pp. 66-69.

Mims, Christopher , "America's Bridges, Factories and Highways Are in Dire Need of Repairs. Bring in the Robots.", The Wall Street Journal, available at https://www.wsj.com/tech/inspection-robots-infrastructure-ebb4172c, Aug. 2023, 5 pages.

Miskon, Muhammad F. et al., "Close Range Inspection Using Novelty Detection Results", Intelligent Robotic Research Center (IRRC), Monash University, Australia, ICIRA2009, LNAI 5928,, 2009, pp. 947-956.

Myers, Brad A. , "The importance of percent-done progress indicators for computer-human interfaces", Proceedings of the SIGCHI conference on Human factors in computing systems., CHI '85. ACM, New York, NY., 1985, pp. 11-17.

National Geographic, "Encyclopedic Entry Location", 2016, 3 pages.

NDT Resource Center, "NDT Glossary D", Webpage, 2016, 4 pages.

NDT Resource Center, "NDT Glossary R", Webpage, 2016, 5 pages.

NDT Resource Center, "Transducer Types", Webpage, 2005, 1 page.

NIDEC, "Flexwave Catalog", 2018, 52 pages.

Olympus, "BondMaster Probes and Accessories Catalog", Catalog, 2008, 24 pages.

Olympus, "Flaw Detectors Delay Line", Olympus, Flaw Detectors Delay Line, 2014, Jan. 9, 2014, 1 page.

Olympus, "Ultrasonic Transducers Technical Notes", Notes, 2006, 11 pages.

Openstax College, "College Physics Textbook Equity Edition", vol. 1 of 3: Chapters 1 -12, Chapter 9 page 294, 2013, 464 pages.

Papadimitriou, Vasileious et al., "An adaptable and self-calibrating service robotic nozzle-vessel welds", 2012 2nd International Conference on Applied Robotics for the Power Industry (CARPI), 2012, 6 pages.

Parallax Tutorial, "Going the Distance—Using the Drive Distance Block Encoders and Motor Gearing", 2017, 5 pages.

PCT/US17/68326, "International Application Serial No. PCT/US17/68326, International Preliminary Report on Patentability mailed Jul. 4, 2019", Gecko Robotics, Inc., 11 pages.

PCT/US20/21779, "International Application Serial No. PCT/US20/21779, International Preliminary Report on Patentability mailed Sep. 23, 2021", Gecko Robotics, Inc., 13 pages.

PCT/US20/21779, "International Application Serial No. PCT/US20/21779, International Search Report and Written Opinion mailed Sep. 2, 2020", Gecko Robotics, Inc., 14 pages.

PCT/US20/21779, "International Application Serial No. PCT/US20/21779, Invitation to Pay Additional Fees and, Where Applicable, Protest Fee mailed Jul. 9, 2020", Gecko Robotics, Inc., 2 pages.

PCT/US2017/068326, "International Application Serial No. PCT/US2017/068326, International Search Report and Written Opinion mailed May 4, 2018", Gecko Robotics, Inc., 14 pages.

PCT/US2017068326, "International Application Serial No. PCT/US2017068326, Invitation to Pay Additional Fees and, Where Applicable, Protest Fee mailed Feb. 27, 2018", Gecko Robotics, Inc., 2 Pages.

PCT/US2019/027958, "International Application Serial No. PCT/US2019/027958, International Preliminary Report on Patentability mailed Oct. 29, 2020", Gecko Robotics, Inc., 8 pages.

PCT/US2019/027958, "International Application Serial No. PCT/US2019/027958, International Search Report and Written Opinion mailed Jul. 16, 2019", Gecko Robotics, Inc., 9 pages.

PCT/US2022/023993, "International Application Serial No. PCT/US2022/023993, International Preliminary Report on Patentability mailed Nov. 2, 2023", Gecko Robotics, Inc., 28 pages.

PCT/US2022/023993, "International Application Serial No. PCT/US2022/023993, International Search Report and Written Opinion mailed Aug. 24, 2022", Gecko Robotics, Inc., 31 pages.

(56) References Cited

OTHER PUBLICATIONS

PCT/US2022/023993, "International Application Serial No. PCT/US2022/023993, Invitation to Pay Additional Fees and, Where Applicable, Protest Fee mailed Jun. 16, 2022", Gecko Robotics, Inc., 3 pages.
PCT/US2022/025816, "International Application Serial No. PCT/US2022/025816, International Preliminary Report on Patentability mailed Oct. 24, 2023", Gecko Robotics, Inc., 30 pages.
PCT/US2022/025816, "International Application Serial No. PCT/US2022/025816, International Search Report and Written Opinion mailed Sep. 28, 2022", Gecko Robotics, Inc, 33 pages.
PCT/US2022/025816, "International Application Serial No. PCT/US2022/025816, Invitation to Pay Additional Fees and, Where Applicable, Protest Fee mailed Jul. 8, 2022", Gecko Robotics, Inc., 3 pages.
PCT/US2023/075691, "International Application Serial No. PCT/US2023/075691, International Preliminary Report on Patentability mailed Apr. 10, 2025", Gecko Robotics, Inc., 7 pages.
PCT/US2023/075691, "International Application Serial No. PCT/US2023/075691, International Search Report and Written Opinion mailed Feb. 7, 2024", Gecko Robotics, Inc., 9 pages.
PCT/US2023/075722, "International Application Serial No. PCT/US2023/075722, International Preliminary Report on Patentability mailed Apr. 10, 2025", Gecko Robotics, Inc., 23 pages.
PCT/US2023/075722, "International Application Serial No. PCT/US2023/075722, International Search Report and Written Opinion mailed Mar. 1, 2024", International Search Report and Written Opinion, 38 pages.
PCT/US2023/075722, "International Application Serial No. PCT/US2023/075722, Invitation to Pay Additional Fees and, Where Applicable, Protest Fee mailed Dec. 12, 2023", Gecko Robotics, Inc., 3 pages.
PCT/US2023/077835, "International Application Serial No. PCT/US2023/077835, International Search Report and Written Opinion mailed Mar. 19, 2024", Gecko Robotics, Inc., 21 pages.
PCT/US2023/077835, "International Application Serial No. PCT/US2023/077835, Invitation To Pay Additional Fees And, Where Applicable, Protest Fee mailed Jan. 23, 2024", Gecko Robotics, Inc., 3 pages.
PCT/US2023/078409, "International Application Serial No. PCT/US2023/078409, International Search Report and Written Opinion mailed Mar. 28, 2024", Gecko Robotics, Inc., 17 pages.
PCT/US2023/085922, "International Application Serial No. PCT/US2023/085922, International Search Report and Written Opinion mailed May 21, 2024", Gecko Robotics, Inc., 25 pages.
PCT/US2023/085922, "International Application Serial No. PCT/US2023/085922, Invitation to Pay Additional Fee and Where Applicable Protest Fees, mailed Mar. 8, 2024", Gecko Robotics, Inc., 3 pages.
PCT/US2024/033260, "International Application Serial No. PCT/US2024/033260, International Search Report and Written Opinion mailed Sep. 5, 2024", Gecko Robotics, Inc., 15 pages.
PCT/US2024/033270, "International Application Serial No. PCT/US2024/033270, International Search Report and Written Opinion mailed Oct. 25, 2024", Gecko Robotics, Inc., 23 pages.
PCT/US2024/033270, "International Application Serial No. PCT/US2024/033270, Invitation To Pay Additional Fees And, Where Applicable, Protest Fee mailed Aug. 28, 2024", Gecko Robotics, Inc., 4 pages.
PCT/US2024/033851, "International Application Serial No. PCT/US2024/033851, International Search Report and Written Opinion mailed Nov. 7, 2024", Gecko Robotics, Inc., 21 pages.
PCT/US2024/033851, "International Application Serial No. PCT/US2024/033851, Invitation to Pay Additional Fees and, Where Applicable, Protest Fee mailed Aug. 29, 2024", Gecko Robotics, Inc., 3 pages.
PCT/US2024/035076, "International Application Serial No. PCT/US2024/035076, International Search Report and Written Opinion mailed 12-17-20204", Gecko Robotics, Inc., 22 pages.
PCT/US2024/035076, "International Application Serial No. PCT/US2024/035076, Invitation to Pay Additional Fees and, Where Applicable, Protest Fee mailed Sep. 20, 2024", Gecko Robotics, Inc., 3 pages.
PCT/US2024/061446, "International Application Serial No. PCT/US2024/061446, Invitation to Pay Additional Fees and, Where Applicable, Protest Fee mailed Feb. 24, 2025", Gecko Robotics, Inc., 4 pages.
Reinhold, Reif , "Machine Translation DE 10300383", 2019, 4 pages.
Roudsari, "Destructive and Robotic Assisted Non-Destructive Evaluation of Concrete Structures", <URL: https://dialog.proquest.com/professional/docview/2451414731/fulltextPDF/1909E9B91236ED61271/1accountid=139900&accountid=139900&t:ac=1909E9B91236ED61271/l&t:cp=maintain/resultcitationblocksdialog&t: zoneid=transactionalZone_72788c278028b, Dec. 31, 2020.
Sabatini, Angelo M. et al., "Correlation Techniques for Digital Time-of-Flight Measurement by Airborne Ultrasonic Rangefinders", Published in: Proceedings of IEEE/RSJ International Conference on Intelligent Robots and Systems (IROS'94), Date of Conference: Sep. 12-16, 1994,, 1994, pp. 2168-2175.
Salik, John et al., "Pipe Inspections: Robotic Laser Profiling Demystified", National Precast Concrete Association, Apr. 1, 2013, 12 pages.
Sanchez-Cuevas, Pedro J. et al., "Robotic System for Inspection by Contact of Bridge Beams Using UAVs", Sensors 2019, 19, 305, 2019, 17 pages.
Schroeder, S C. et al., "Ultrasonic Culvert Thickness Determination", US Army Armament Research Development and Engineering, Technical Report ARCCB-TR-95027, 1995, 36 pages.
Sirken, Aaron et al., "Bridge Risk Investigation Diagnostic Grouped Exploratory (Bridge)", IEEE/RSJ International Conference on Intelligent Robots and Systems (IROS), Sep. 24-28, 2017, Vancouver, BC, Canada (Year: 2017), 2017, 7 pages.
Smith, Oliver et al., "Machine Translation KR20140040692A", Apr. 3, 2014, 18 pages.
Stepson, W.A.V et al., "Design and Development of a Mobile Crawling Robot with Novel Halbach Array Based Magnetic Wheels", IEEE/ RSJ International Conference on Intelligent Robots and Systems (IROS), Vancouver, BC, Canada, Sep. 2017, 6 pages.
Svilainis, Linas , "Review of high resolution time of flight estimation techniques for ultrasonic signals,", Sep. 2013Conference: NDT 2013At: Telford Project: In-SMART, 2013, 13 pages.
Tufte, Edward R. , "The Visual Display of Quantitative Information", Published By Graphics Press LLC, Second edition, fifth printing, Aug. 2007, 191 pages.
Ueura, Keiji et al., "Development of the Harmonic Drive Gear for Space Applications", 1999, 6 pages.
Wisegeek, "What is an Articulated Robot?", Webpage, 2015, 4 pages.
Xing, et al., "Design and Realization of DC Motor Speed Measurement and Control Based on an Electromagnetic Sensor", Atlantis Press, DOI10.2991/cisia-15.2015.69, 2015, 4 pages.
Yasuda, Gen'ichi , "Behavior-based autonomous cooperative control of intelligent mobile robot systems with embedded Petri nets", IEEE, 2014, pp. 1085-1090.
Zhang, Lei et al., "Analysis of Traveling-capability and Obstacle-climbing Capability for Radially Adjustable Tracked Pipeline Robot", Proceedings of the 2016 IEEE International Conference on Robotics and Biomimetics Gingdao, China, Dec. 2016, 6 pages.
Zhang, Lei et al., "Stable Motion Analysis and Verification of a Radial Adjustable Pipeline Robot", Proceedings of the 2016 IEEE International Conference on Robotics and Biomimetics Oingdao, China, Dec. 2016, 6 pages.
Zhao, B. et al., "Estimation of ultrasound attenuation and dispersion using short time Fourier transform,", Ultrasonics 43 (2005) 375-381, 2005, pp. 375-381.
Zimmer Group, "Die Schnittstelle—Zimmer Group", Retrieved from the Internet: URL:https://web.archive.org/web/20210623063817/https://www.zimmer-group.com/de/technologien-komponenten/robotik/match-end-of-arm-ecosystem/die-schnittstelle, Jun. 23, 2021, pp. 1-6.

(56) References Cited

OTHER PUBLICATIONS

Zwicker, Ekkehard et al., "A Modular Inspection Robot Platform for Power Plant Applications", IEEE, 2010 1st International Conference on Applied Robotics for the Power Industry Delta Centre-Ville Montreal, Canada, 2010, 6 pages.

U.S. Appl. No. 18/508,795, filed Nov. 14, 2023, Abandoned, Edward A. Bryner, et al.

U.S. Appl. No. 18/753,090, filed Jun. 25, 2024, Pending, Jennifer Padgett, et al.

U.S. Appl. No. 18/935,035, filed Nov. 1, 2024, Pending, Chase David, et al.

U.S. Appl. No. 18/949,591, filed Nov. 15, 2024, Pending, Edward A. Bryner, et al.

PCT/US2024/035076, Jun. 21, 2024, Pending, Jennifer Padgett, et al.

PCT/US2024/061446, Dec. 20, 2024, Pending, Mark Cho, et al.

* cited by examiner

502

702

500

7002

7002

7004

7402

7610

7604

7608

7602

7604

7803

7802

7803

7803

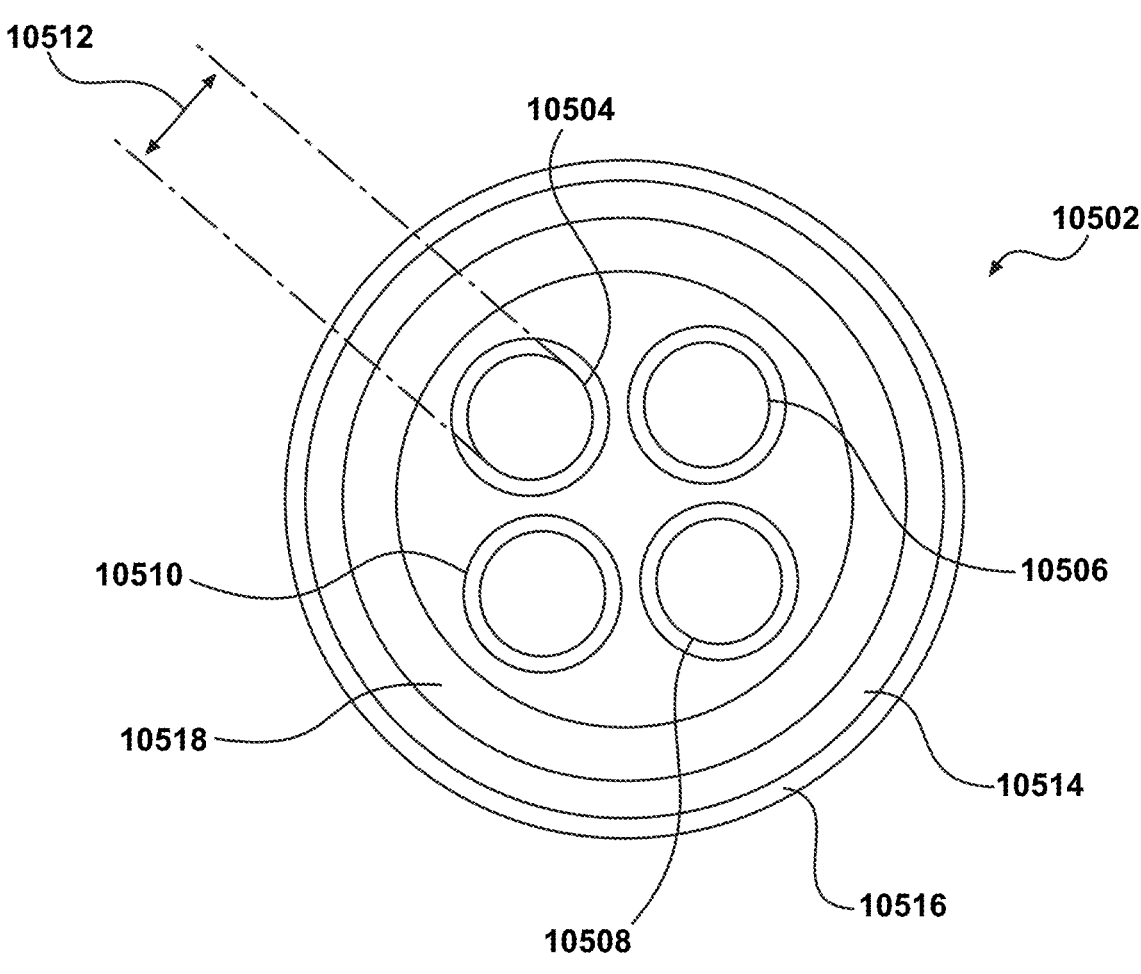
FIG. 42

5600

5700

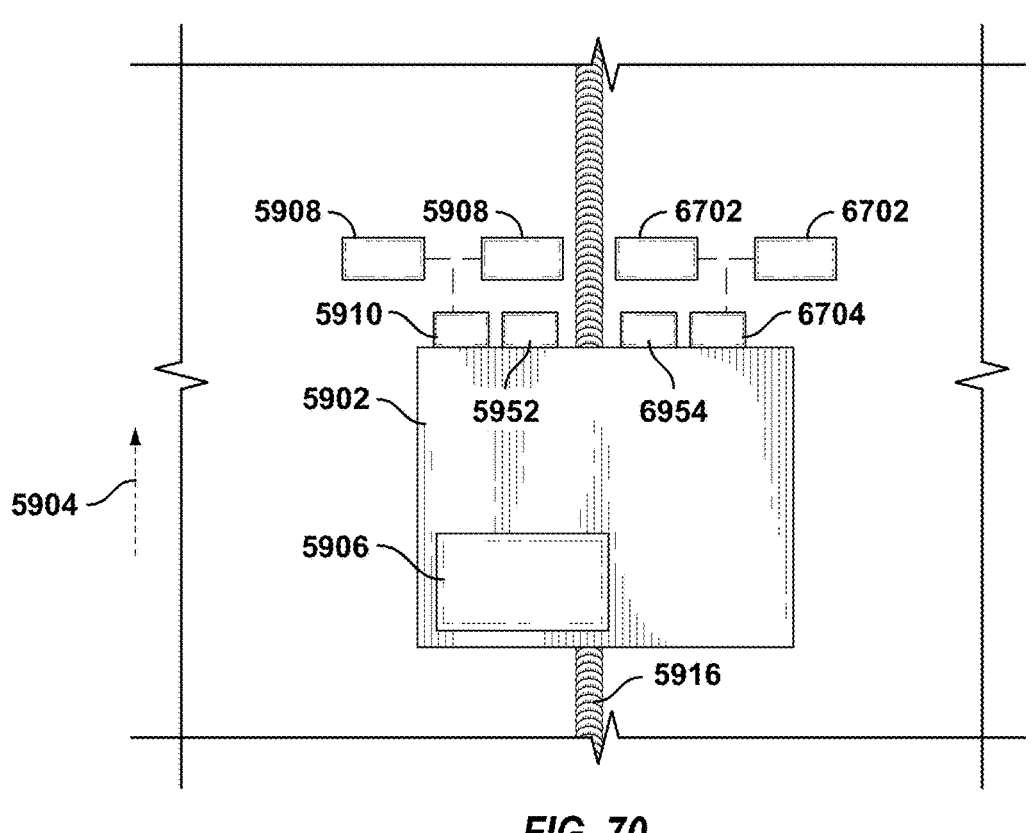
FIG. 70
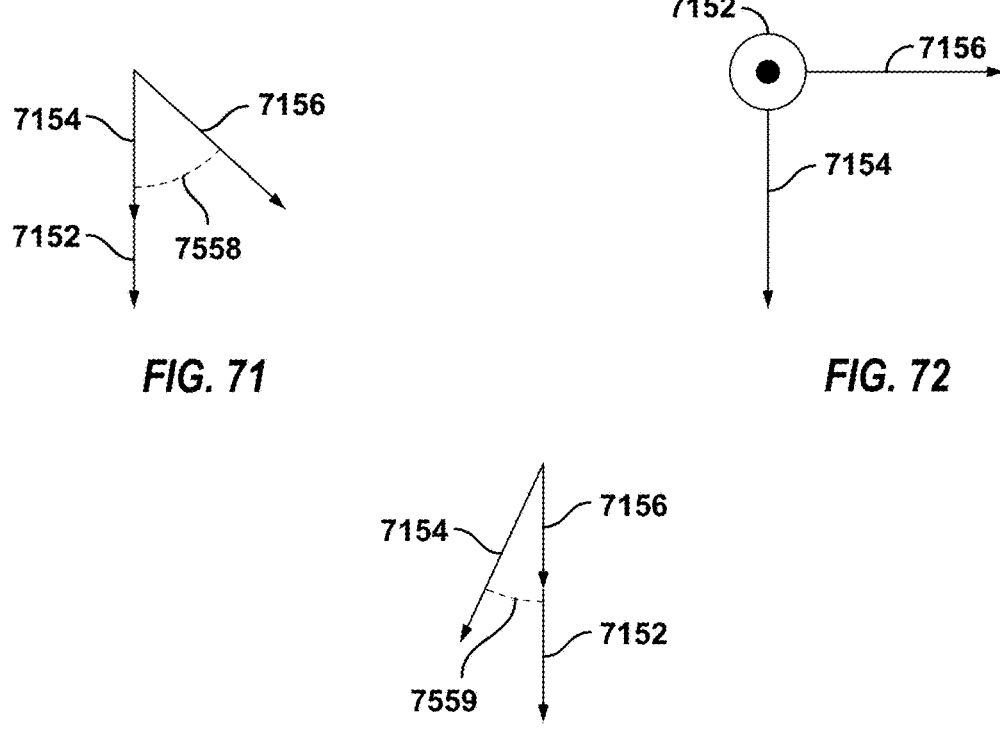
FIG. 71
FIG. 72
FIG. 73

8500

8700

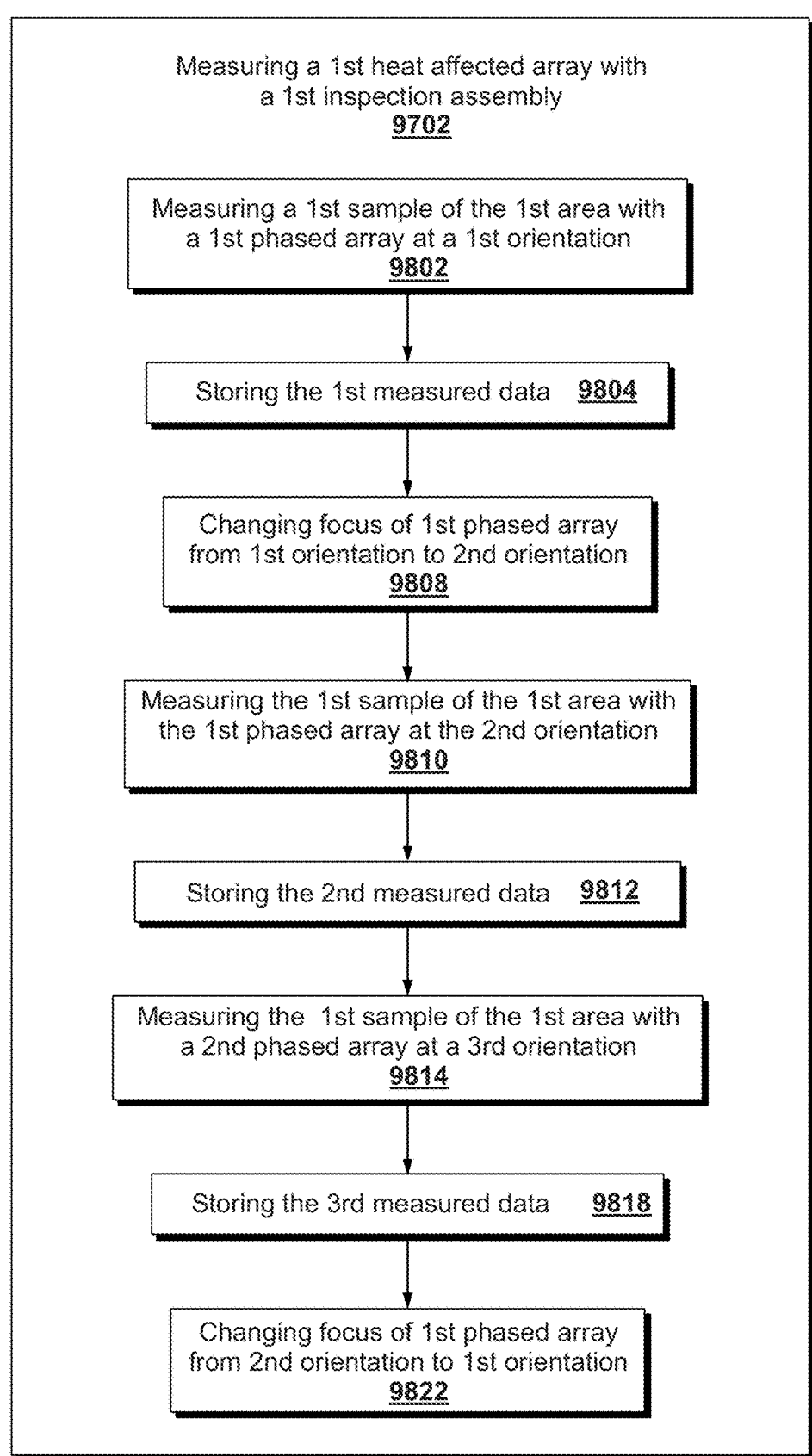

Measuring a 1st heat affected array with
a 1st inspection assembly
9702

Measuring a 1st sample of the 1st area with
a 1st phased array at a 1st orientation
9802

Storing the 1st measured data   9804

Changing focus of 1st phased array
from 1st orientation to 2nd orientation
9808

Measuring the 1st sample of the 1st area with
the 1st phased array at the 2nd orientation
9810

Storing the 2nd measured data   9812

Measuring the  1st sample of the 1st area with
a 2nd phased array at a 3rd orientation
9814

Storing the 3rd measured data   9818

Changing focus of 1st phased array
from 2nd orientation to 1st orientation
9822

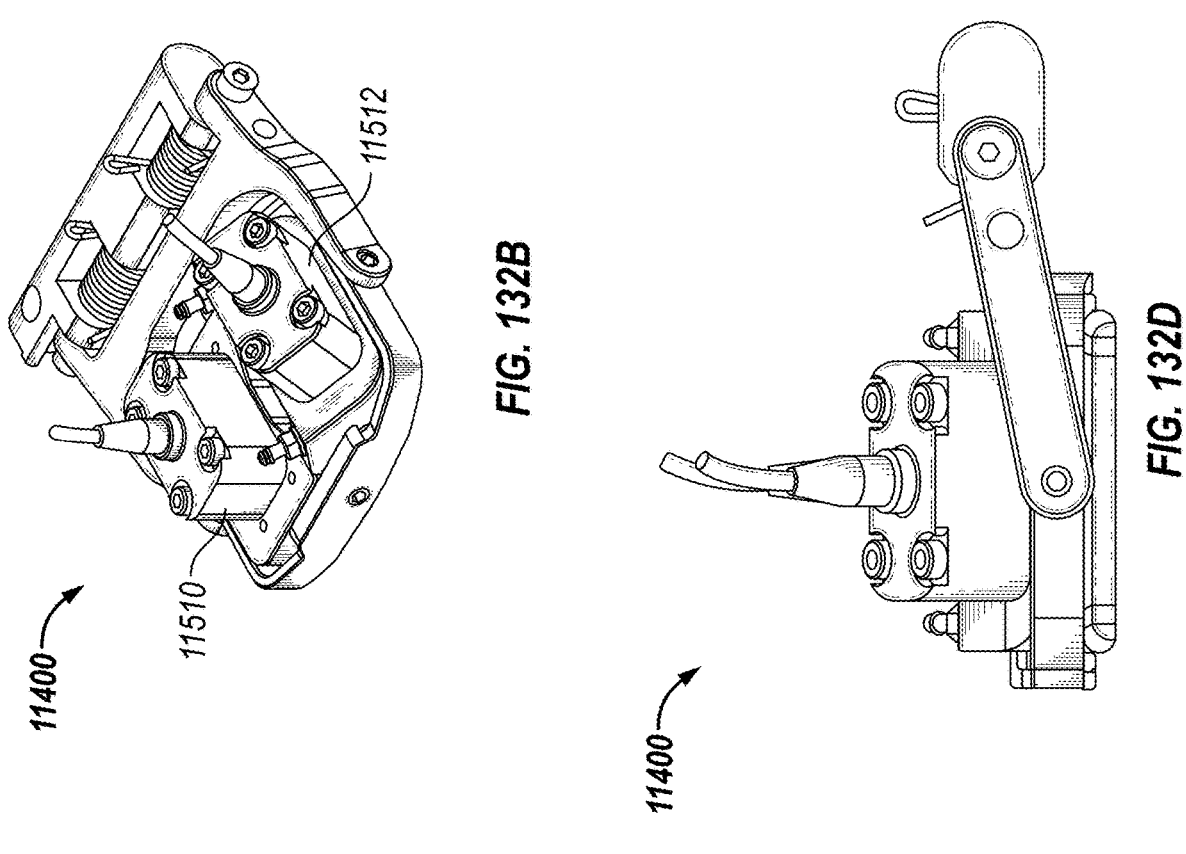
*FIG. 132B*
*FIG. 132D*
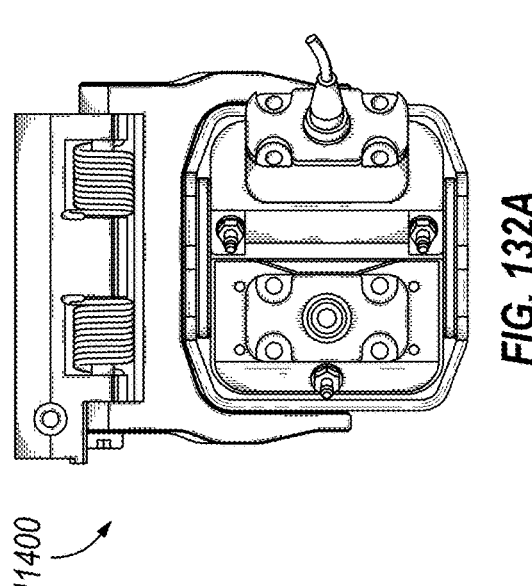
*FIG. 132A*
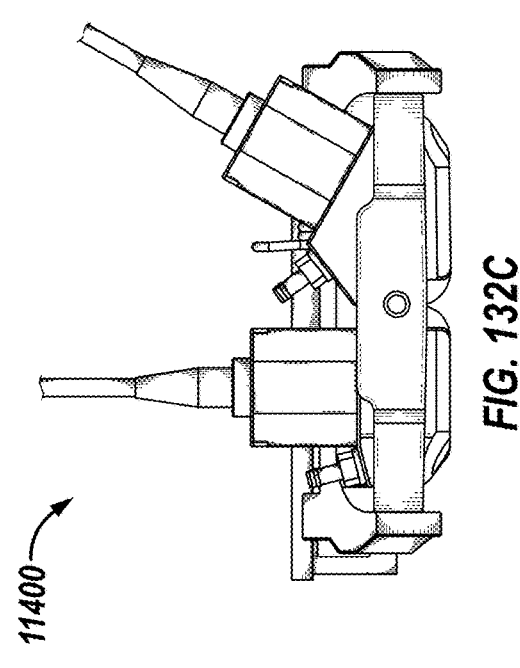
*FIG. 132C*

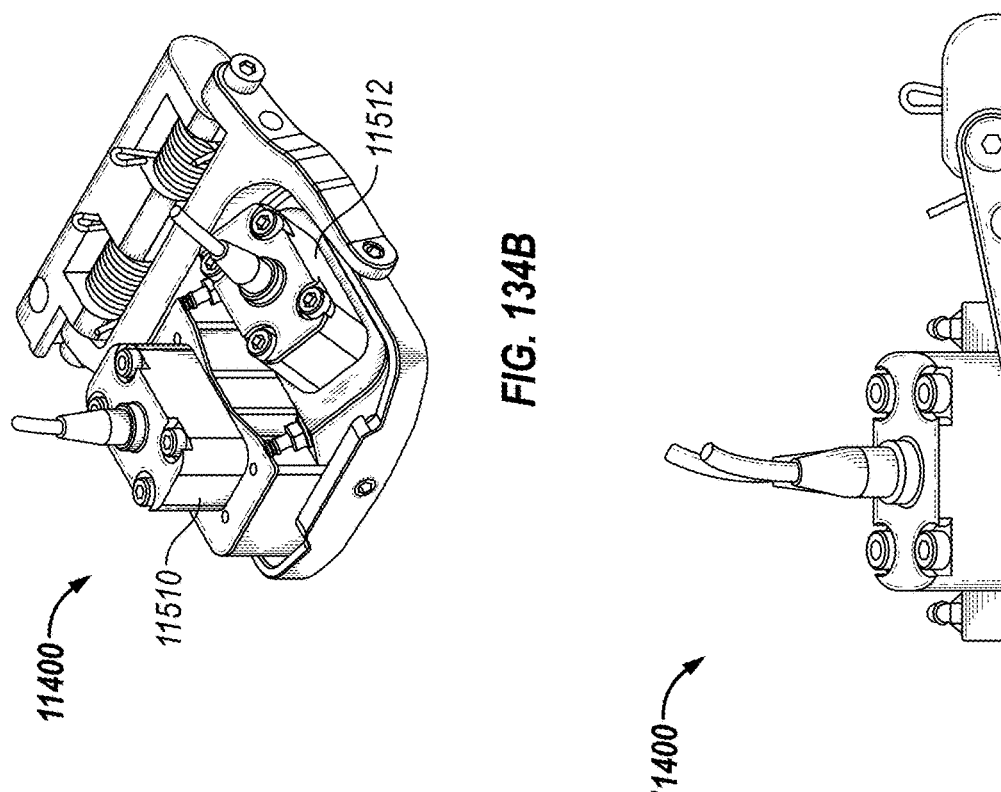
*FIG. 134B*
11400
11510
11512
*FIG. 134D*
11400
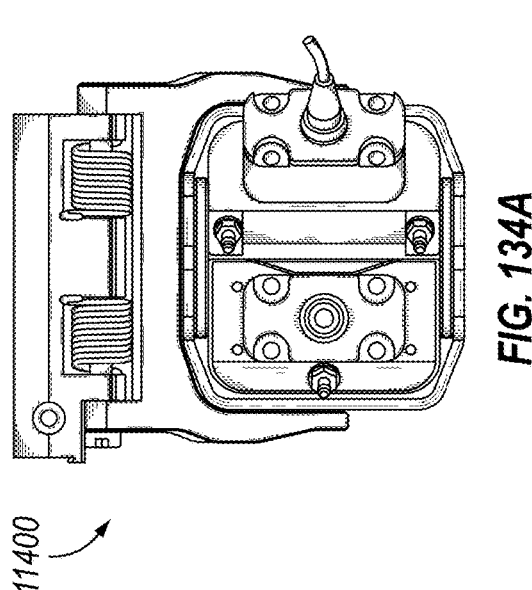
*FIG. 134A*
11400
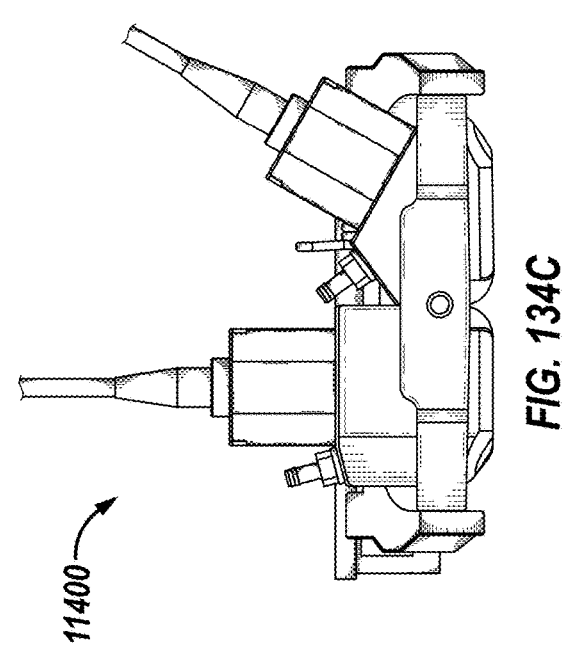
*FIG. 134C*
11400

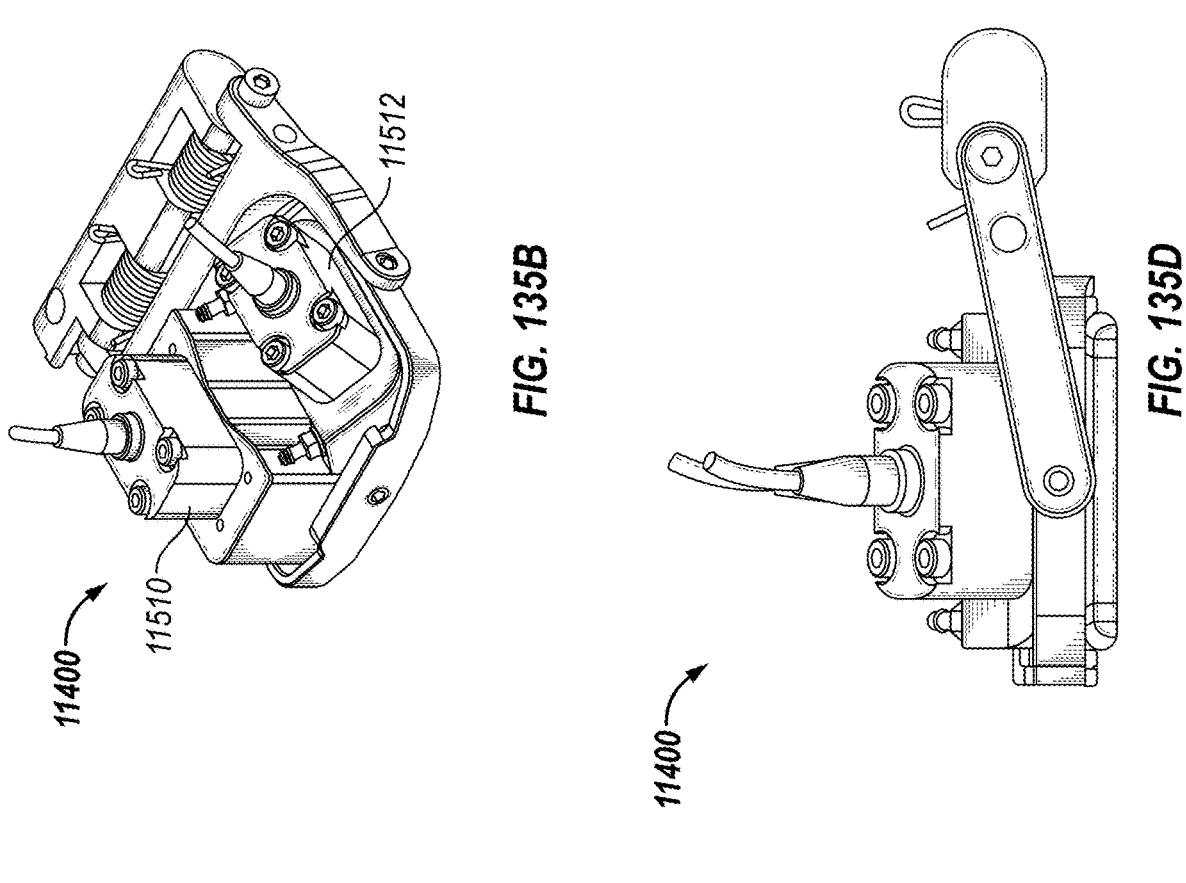
FIG. 135B
FIG. 135A
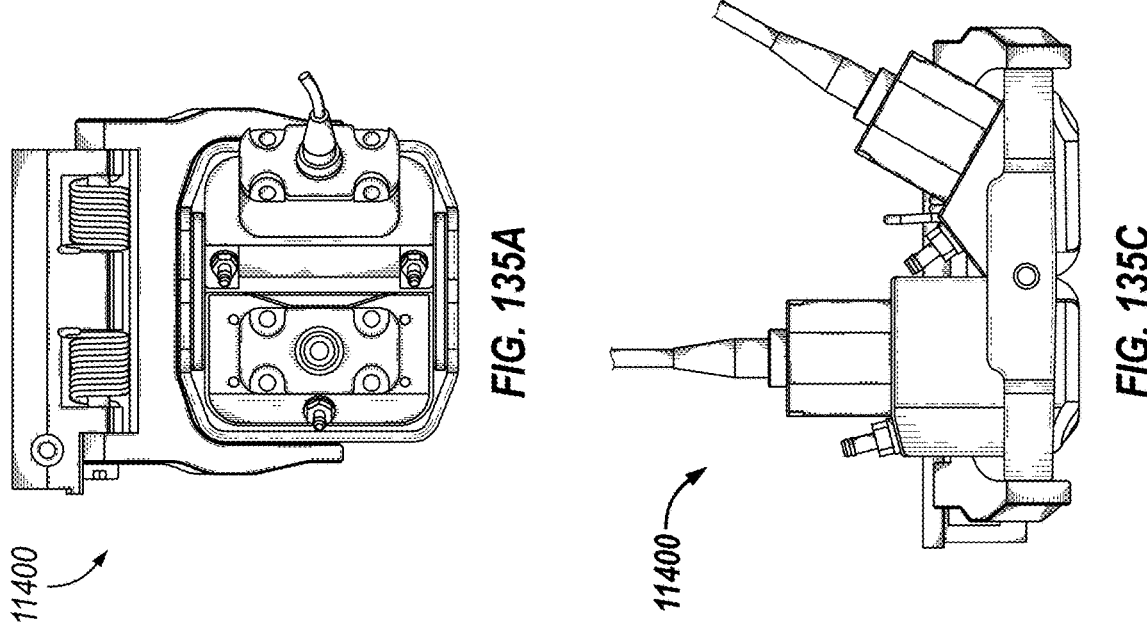
FIG. 135D
FIG. 135C

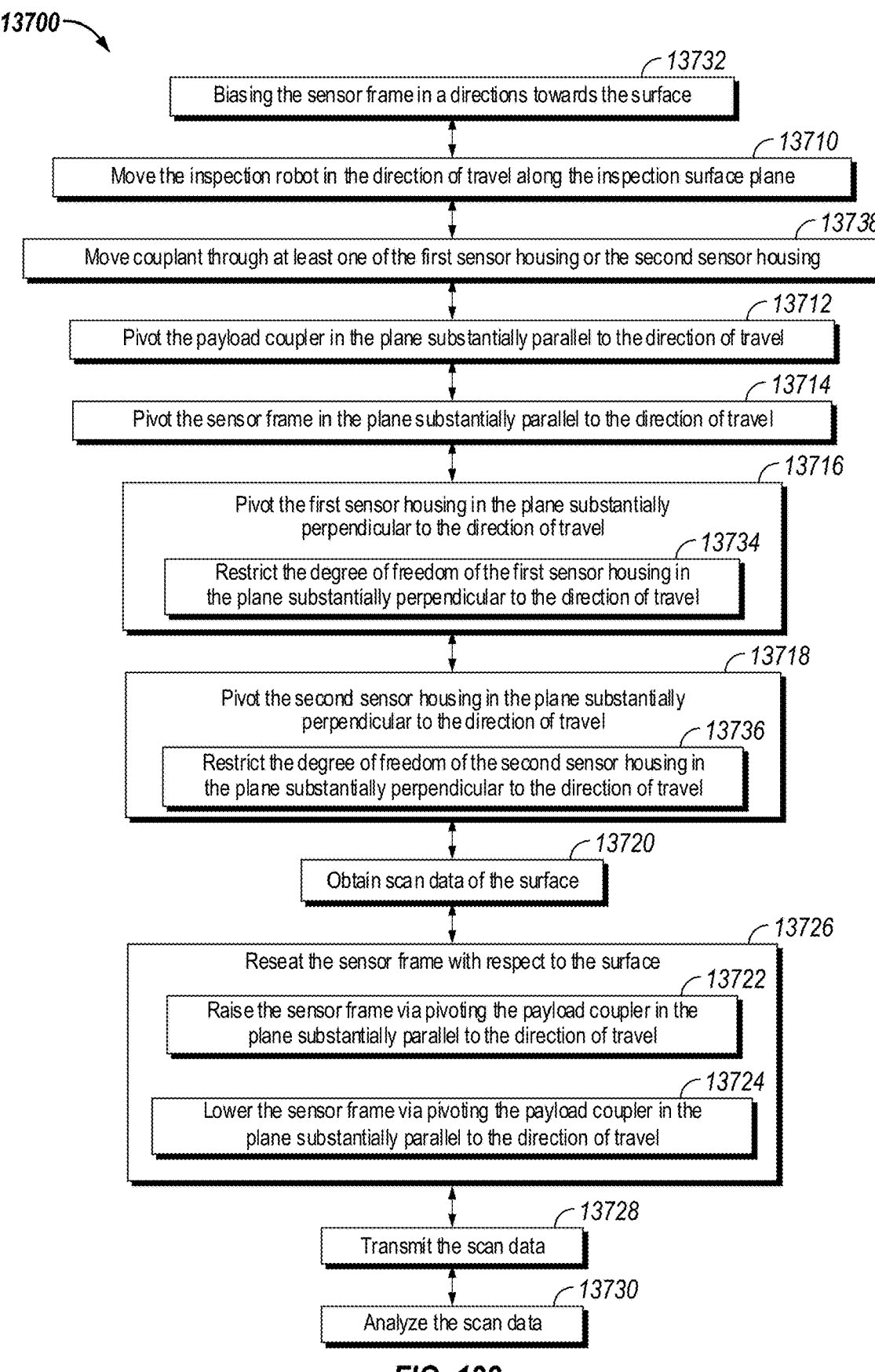

*13700*

*13732*
Biasing the sensor frame in a directions towards the surface

*13710*
Move the inspection robot in the direction of travel along the inspection surface plane

*13738*
Move couplant through at least one of the first sensor housing or the second sensor housing

*13712*
Pivot the payload coupler in the plane substantially parallel to the direction of travel

*13714*
Pivot the sensor frame in the plane substantially parallel to the direction of travel

*13716*
Pivot the first sensor housing in the plane substantially perpendicular to the direction of travel

*13734*
Restrict the degree of freedom of the first sensor housing in the plane substantially perpendicular to the direction of travel

*13718*
Pivot the second sensor housing in the plane substantially perpendicular to the direction of travel

*13736*
Restrict the degree of freedom of the second sensor housing in the plane substantially perpendicular to the direction of travel

*13720*
Obtain scan data of the surface

*13726*
Reseat the sensor frame with respect to the surface

*13722*
Raise the sensor frame via pivoting the payload coupler in the plane substantially parallel to the direction of travel

*13724*
Lower the sensor frame via pivoting the payload coupler in the plane substantially parallel to the direction of travel

*13728*
Transmit the scan data

*13730*
Analyze the scan data

*FIG. 138*

ROBOTIC SYSTEMS FOR ULTRASONIC SURFACE INSPECTION USING SHAPED ELEMENTS

CROSS-REFERENCE TO RELATED APPLICATIONS

This application is a continuation of, and claims priority to, PCT Patent Application Serial No. PCT/US2023/077835, filed on Oct. 26, 2023, published on May 2, 2024, as International Publication No. WO 2024/092081, and entitled "ROBOTIC SYSTEMS FOR ULTRASONIC SURFACE INSPECTION USING SHAPED ELEMENTS".

PCT Patent Application Serial No. PCT/US2023/077835 claims the benefit of priority to U.S. Provisional Patent Application Ser. No. 63/419,624 (GROB-0013-P01), filed Oct. 26, 2022, and titled "ROBOTIC SYSTEMS FOR ULTRASONIC SURFACE INSPECTION USING SHAPED ELEMENTS".

PCT Patent Application Serial No. PCT/US2023/077835 is a continuation-in-part of U.S. patent application Ser. No. 17/726,336 (GROB-0008-U01), filed Apr. 21, 2022, titled "SYSTEMS, METHODS, AND APPARATUS FOR ULTRA-SONIC INSPECTION OF A SURFACE", and published on Oct. 27, 2022, as U.S. Publication US20220341886A1.

U.S. patent application Ser. No. 17/726,336 (GROB-0008-U01) claims the benefit of priority to U.S. Provisional Patent Application Ser. No. 63/178,497 (GROB-0008-P01), filed Apr. 22, 2021, and titled "MULTI-PHASED UT INSPECTION", and U.S. Provisional Patent Application Ser. No. 63/254,833 (GROB-0008-P02), filed Oct. 12, 2021, and titled "WET H2S SERVICE AND A NEW TOOL FOR INSPECTING DAMAGE."

All of the foregoing listed patent documents are incorporated herein by reference in their entirety for all purposes.

BACKGROUND

The present disclosure relates to robotic inspection and treatment of industrial surfaces.

SUMMARY

Previously known inspection and treatment systems for industrial surfaces suffer from a number of drawbacks. Industrial surfaces are often required to be inspected to determine whether a pipe wall, tank surface, or other industrial surface feature has suffered from corrosion, degradation, loss of a coating, damage, wall thinning or wear, or other undesirable aspects. Industrial surfaces are often present within a hazardous location—for example in an environment with heavy operating equipment, operating at high temperatures, in a confined environment, at a high elevation, in the presence of high voltage electricity, in the presence of toxic or noxious gases, in the presence of corrosive liquids, and/or in the presence of operating equipment that is dangerous to personnel. Accordingly, presently known systems require that a system be shutdown, that a system be operated at a reduced capacity, that stringent safety procedures be followed (e.g., lockout/tagout, confined space entry procedures, harnessing, etc.), and/or that personnel are exposed to hazards even if proper procedures are followed. Additionally, the inconvenience, hazards, and/or confined spaces of personnel entry into inspection areas can result in inspections that are incomplete, of low resolution, that lack systematic coverage of the inspected area, and/or that are prone to human error and judgement in determining whether an area has been properly inspected.

Previously known inspection systems for industrial surfaces further have difficulty in detecting corrosion or damage of certain types, for example cracks or corrosion that have a parallel orientation to a sensing direction.

Accordingly, an embodiment of the current disclosure provides for a payload for an inspection robot that inspects a surface, wherein the payload provides for various degrees of freedom for sensors that inspect the surface. The payload includes a payload coupler, a sensor frame, a first sensor housing, and a second sensor housing. The payload coupler pivotally couples to the inspection robot to pivot in a plane substantially parallel to a direction of travel of the inspection robot along an inspection surface plane defined, at least in part, by the surface. The sensor frame is pivotally coupled to the payload coupler to pivot in the plane substantially parallel to the direction of travel. The first sensor housing includes a first phased array ultra-sonic (UT) sensor aligned with the direction of travel; and the first sensor housing is pivotally coupled to the sensor frame to pivot in a plane substantially perpendicular to the direction of travel. The second sensor housing includes a second phased array UT sensor aligned with the direction of travel; and the second sensor housing is pivotally coupled to the sensor frame to pivot in the plane substantially perpendicular to the direction of travel.

Another embodiment of the current disclosure provides for a method of inspecting a surface with an inspection robot, wherein a payload of the inspection robot provides for various degrees of freedom for sensors that inspect the surface. The method includes: moving the inspection robot in a direction of travel along an inspection surface plane defined, at least in part, by the surface; pivoting a payload coupler, pivotally coupled to the inspection robot, in a plane substantially parallel to the direction of travel; and pivoting a sensor frame, pivotally coupled to the payload coupler, in a plane substantially parallel to the direction of travel. The method further includes pivoting a first sensor housing, pivotally coupled to the sensor frame, in a plane substantially perpendicular to the direction of travel, the first sensor housing comprising a first phased array ultra-sonic (UT) sensor aligned with the direction of travel; and pivoting a second sensor housing, pivotally coupled to the sensor frame, in the plane substantially perpendicular to the direction of travel, the second sensor housing comprising a second phased array UT sensor aligned with the direction of travel. The method further includes obtaining scan data of the surface via the first phased array UT sensor and the second phased array UT sensor; and transmitting the scan data.

Yet another embodiment of the current disclosure provides for a payload for an inspection robot that inspect a surface. The payload includes: a first sensor housing; a second sensor housing; and means for providing each of the first sensor housing and the second sensor housing with three degrees of pivotal freedom while the inspection robot travels on the surface. The first sensor housing includes a first phased array UT sensor aligned with a direction of travel of the inspection robot along an inspection surface plane defined, at least in part, by the surface. The second sensor housing includes a second phased array UT sensor aligned with the direction of travel.

Yet still another embodiment of the current disclosure provides for a differential pivoting mechanism for a payload for an inspection robot that inspects a surface. The differential pivoting mechanism includes: a first rotational pivot joint; a second rotational pivot joint; and a differential pivot joint. The first rotational pivot joint pivotally couples to a first sensor housing to pivot the first sensor housing in a first degree of freedom in a plane substantially perpendicular to a direction of travel of the inspection robot along an inspection surface plane defined, at least in part, by the surface; and the first sensor housing includes a first phased array ultrasonic (UT) sensor aligned with the direction of travel. The second rotational pivot joint pivotally couples to a second sensor housing to pivot the second sensor housing in the first degree of freedom in the plane substantially perpendicular to the direction of travel; and the first sensor housing comprising a second phased array UT sensor aligned with the direction of travel. The differential pivot joint pivotally couples to a sensor frame of the inspection robot to pivot the first sensor housing with the second sensor housing in a second degree of freedom in the plane substantially perpendicular to the direction of travel.

BRIEF DESCRIPTION OF THE FIGURES

FIG. 42 depicts components of a tether, in accordance with an embodiment of the current disclosure.

FIG. 70 is a schematic depiction of an inspection robot with multiple payloads on an inspection surface, in accordance with an embodiment of the current disclosure.

FIG. 71 is a schematic depiction of a first view of example inspection angles, in accordance with an embodiment of the current disclosure.

FIG. 72 is a schematic depiction of a second view of example inspection angles, in accordance with an embodiment of the current disclosure.

FIG. 73 is a schematic depiction of a third view of example inspection angles, in accordance with an embodiment of the current disclosure.

FIG. 98 is a flowchart illustrating an example step in a process for inspecting a weld, in accordance with an embodiment of the current disclosure.

FIG. 124 is a perspective view of the differential pivoting mechanism of FIGS. 123A-C, in accordance with embodiments of the current disclosure.

Figure 114:
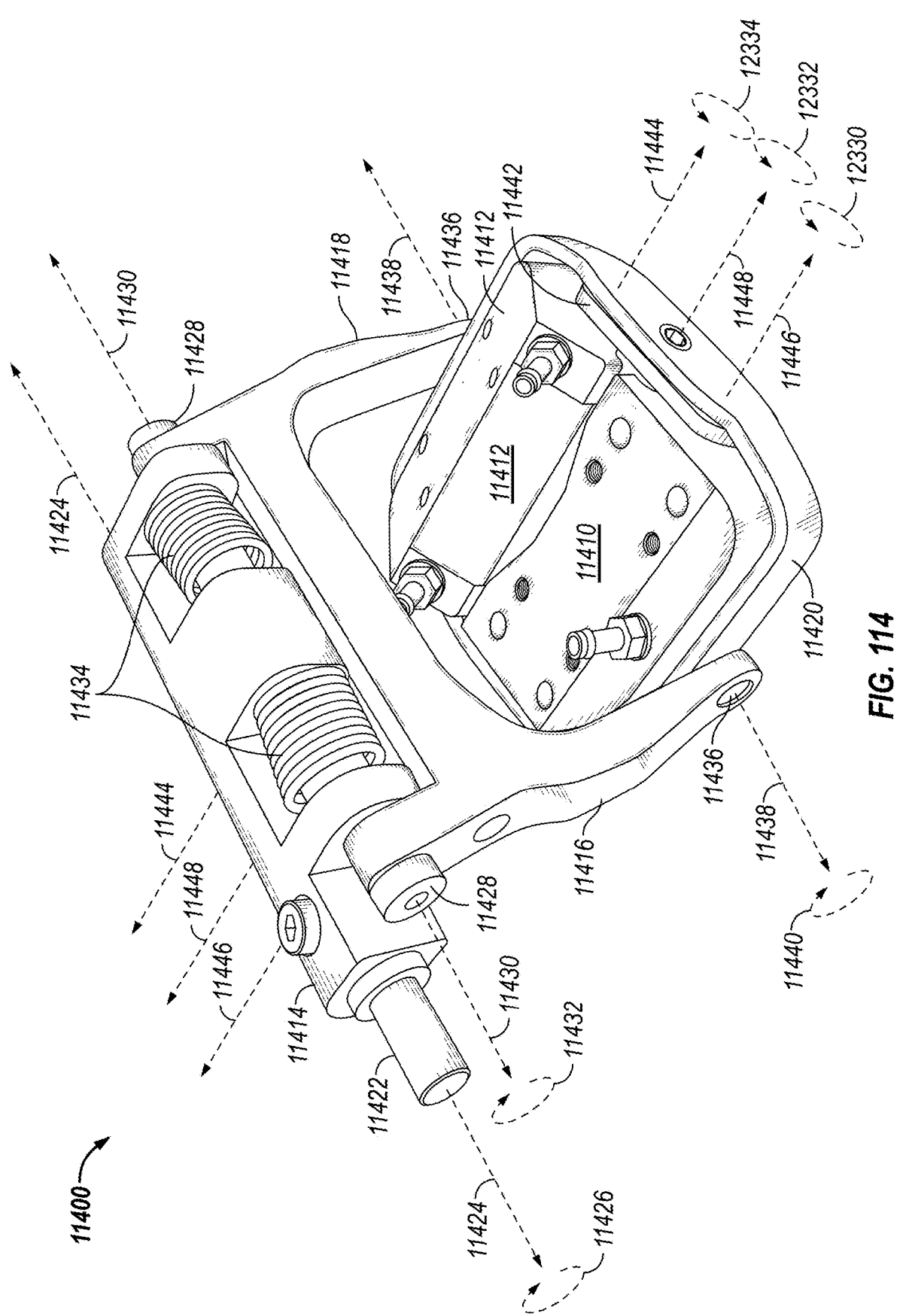
FIG. 114 is a perspective view of an example payload for an inspection robot, in accordance with embodiments of the current disclosure.
Figure 125A:
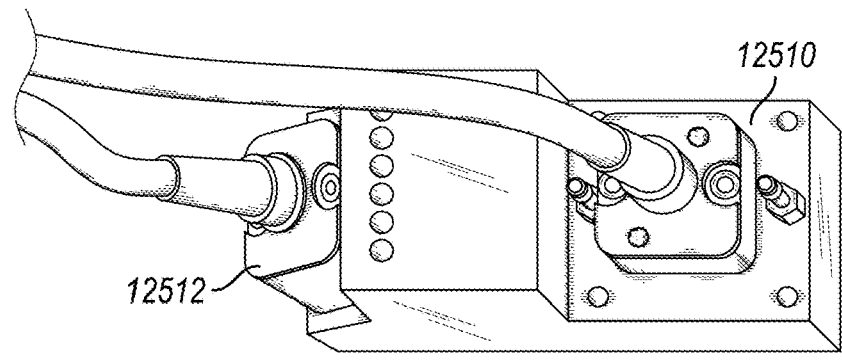
Figure 125B:
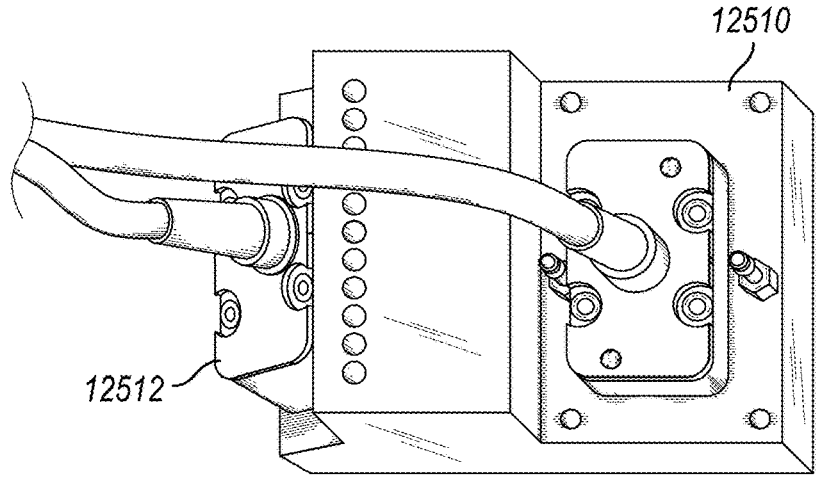
Figure 125C:
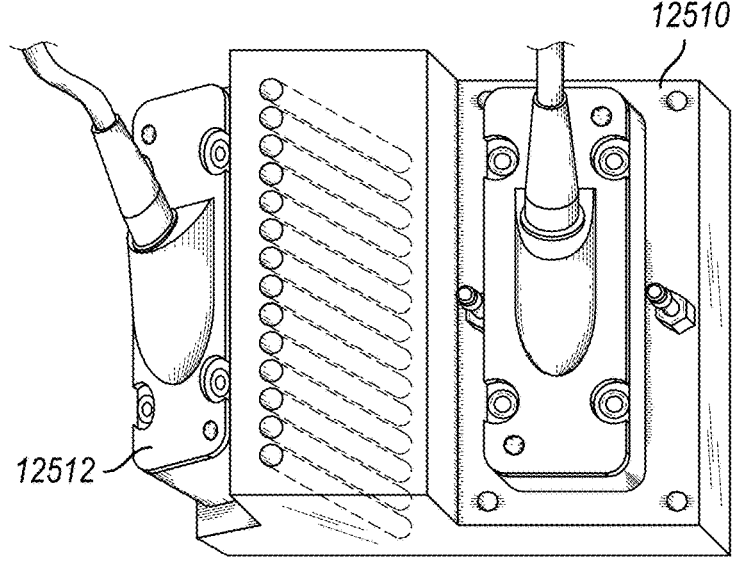

FIG. 125A-C depict various sensor types for use in the payload of FIG. 114, in accordance with embodiments of the current disclosure.

Figure 126:
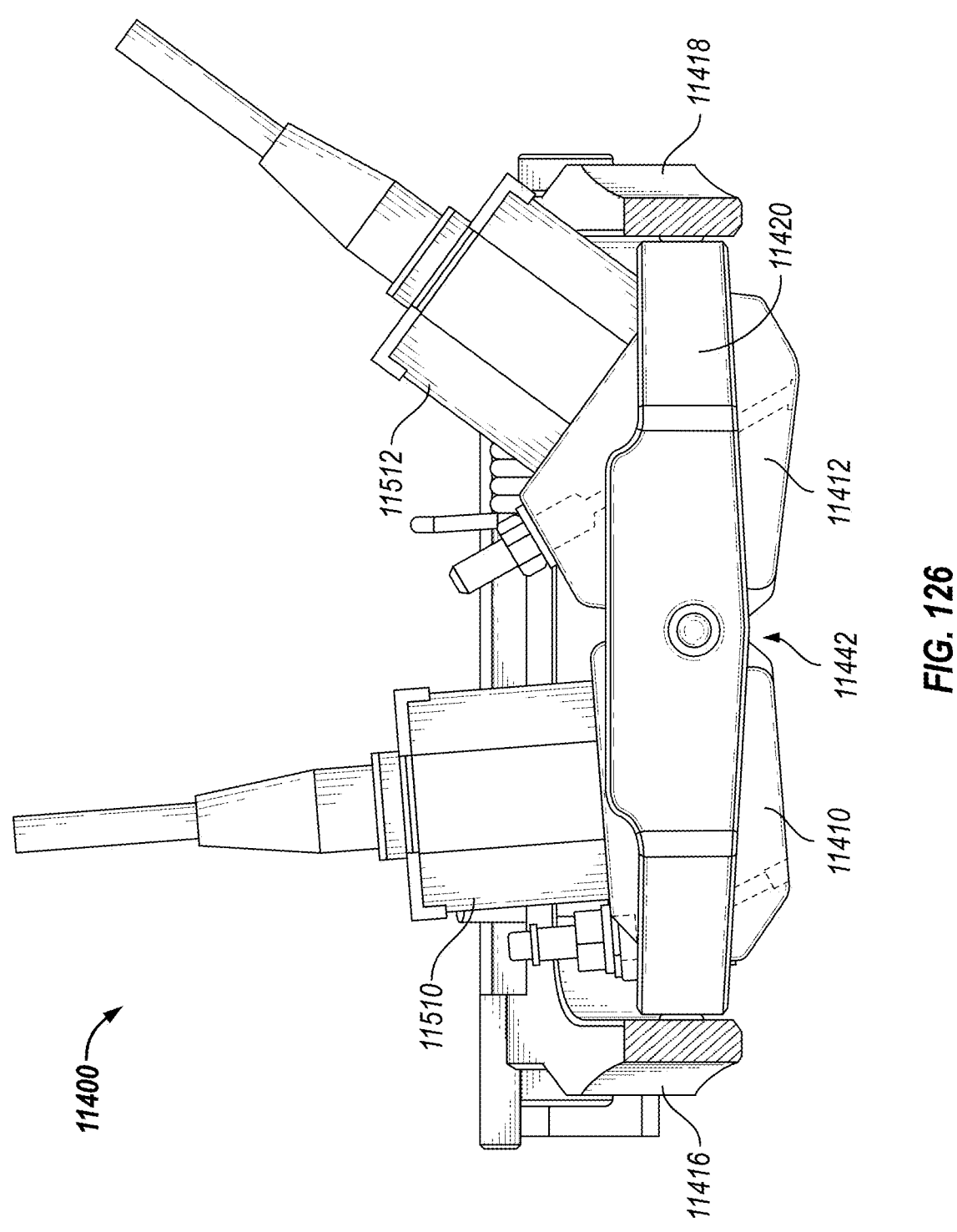

FIG. 126 is a font face view of an example payload, in accordance with embodiments of the current disclosure.

Figure 127:
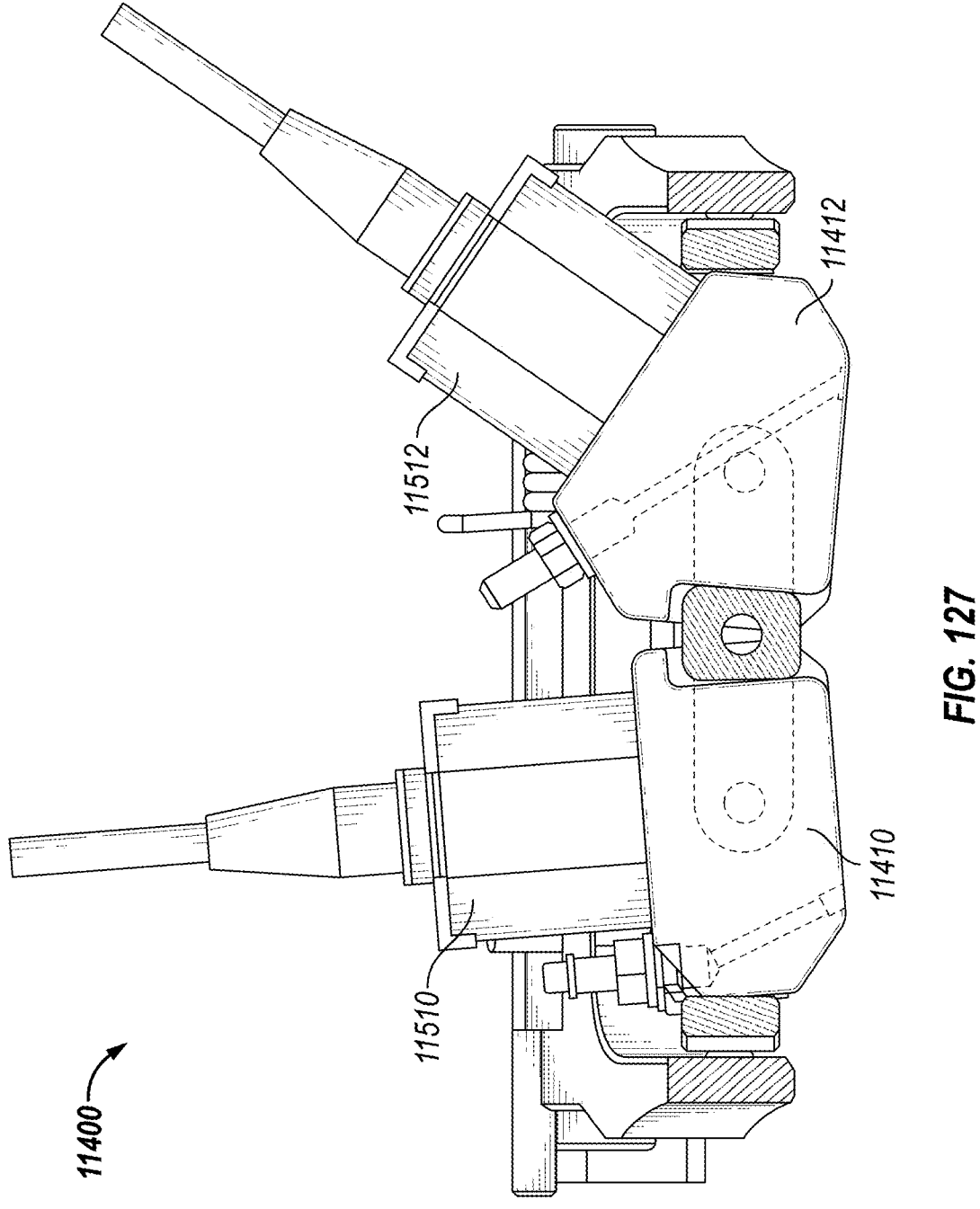

FIG. 127 is a front face view of the example payload of FIG. 126 wherein a portion of the sled has been shown with transparency to show the differential pivoting mechanism, in accordance with embodiments of the current disclosure.

Figure 128:
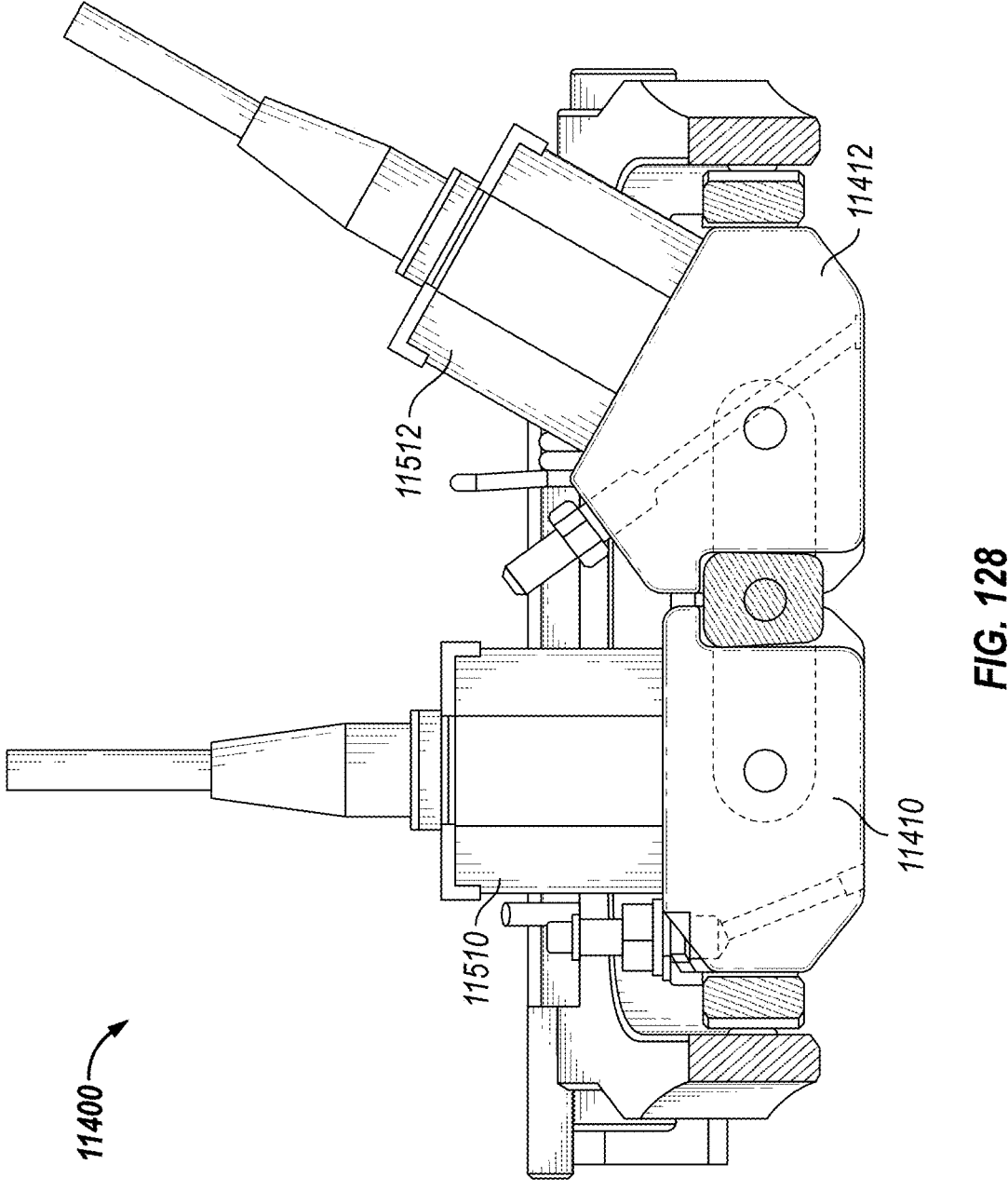

FIG. 128 is another front face view of the example payload of FIG. 126 wherein a portion of the sled has been shown with transparency to show the differential pivoting mechanism, in accordance with embodiments of the current disclosure.

Figure 129:
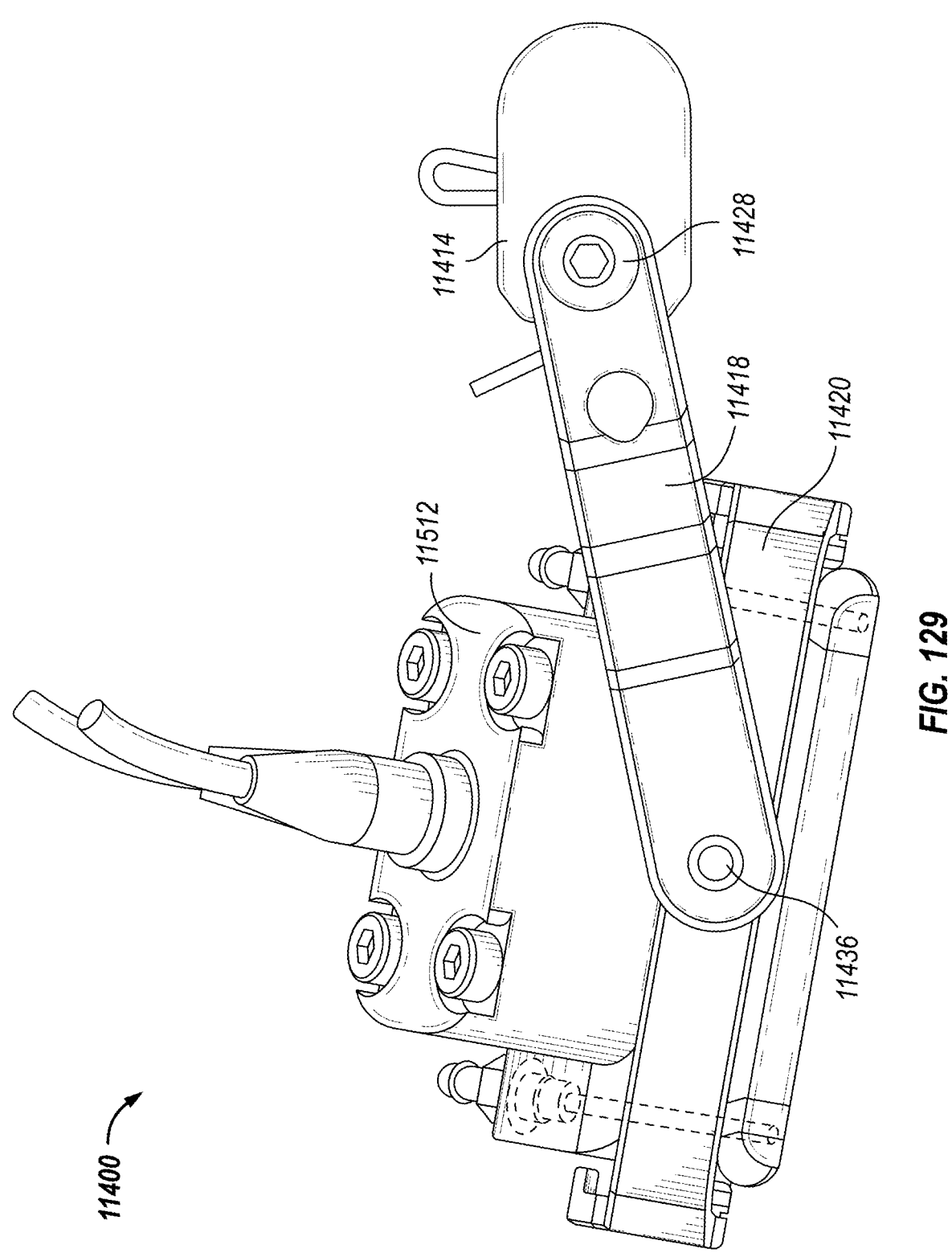

FIG. 129 is a perspective side view of the example payload of FIG. 126, in accordance with embodiments of the current disclosure.

Figure 130:
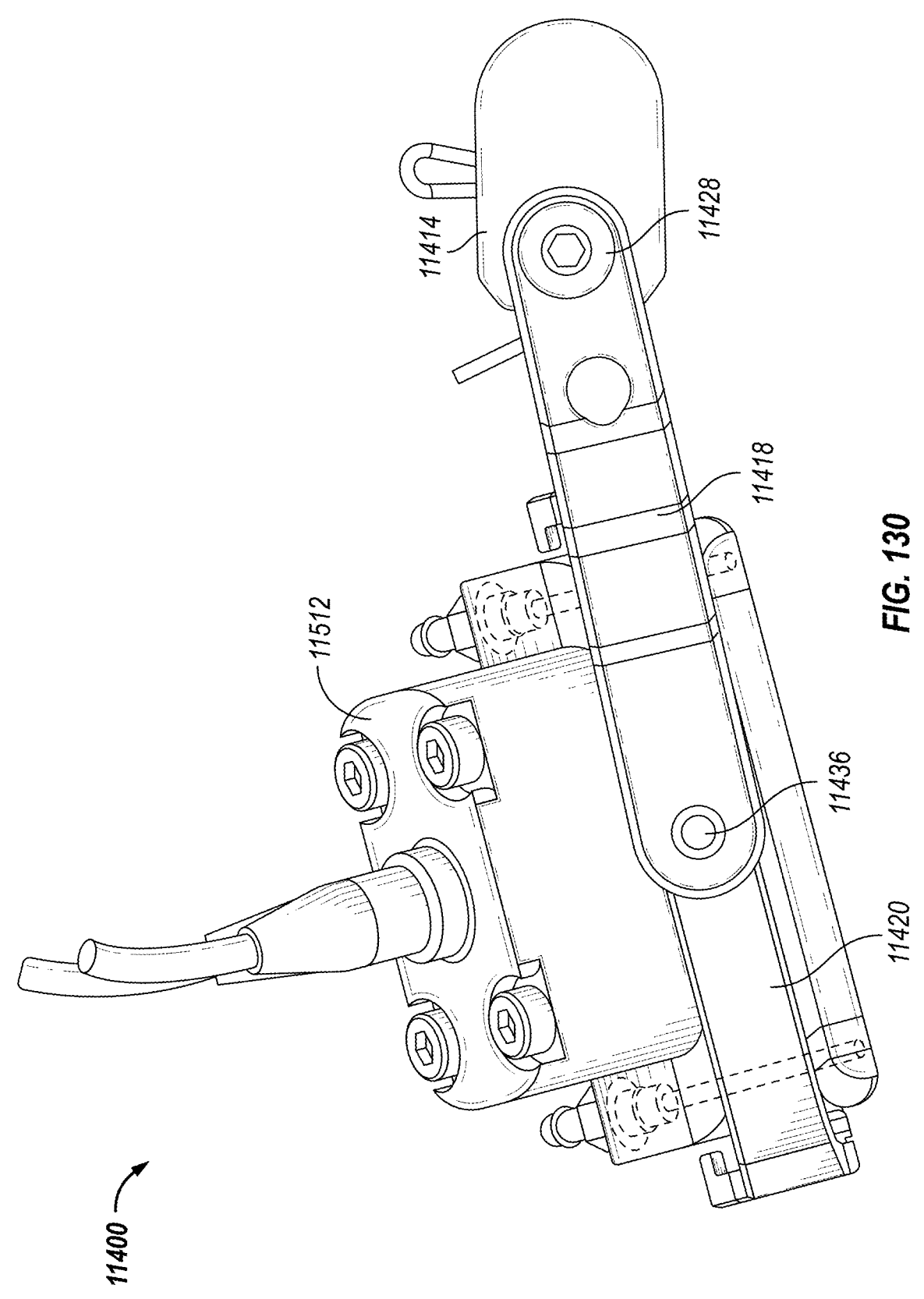

FIG. 130 is another perspective side view of the example payload of FIG. 126, in accordance with embodiments of the current disclosure.

Figure 131B:
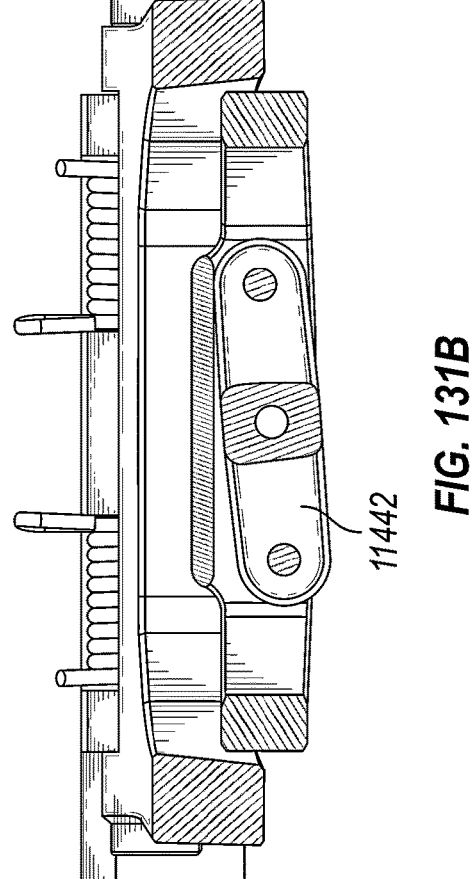
Figure 131A:
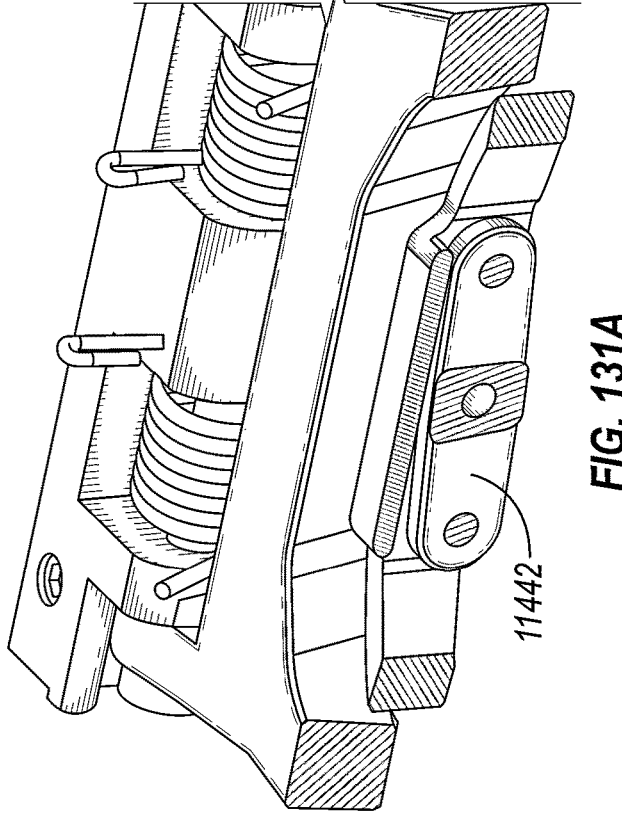
Figure 133B:
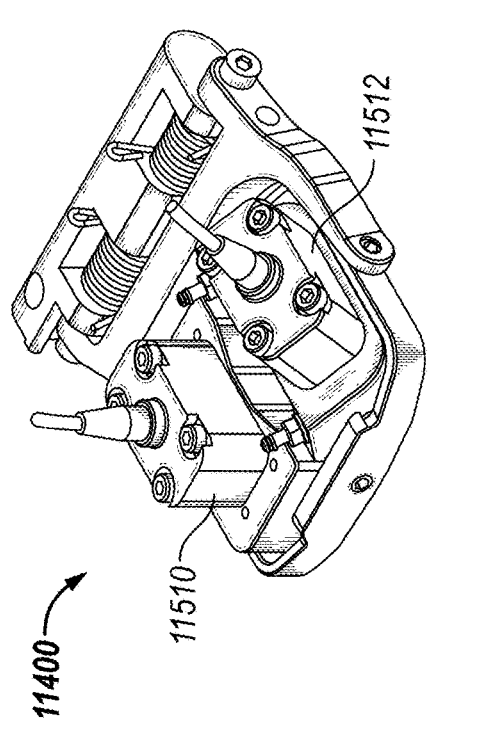
Figure 133D:
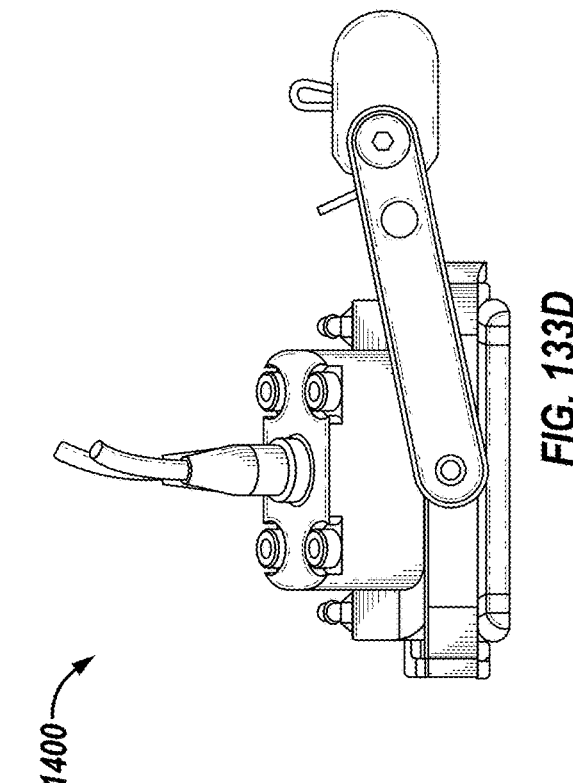
Figure 133A:
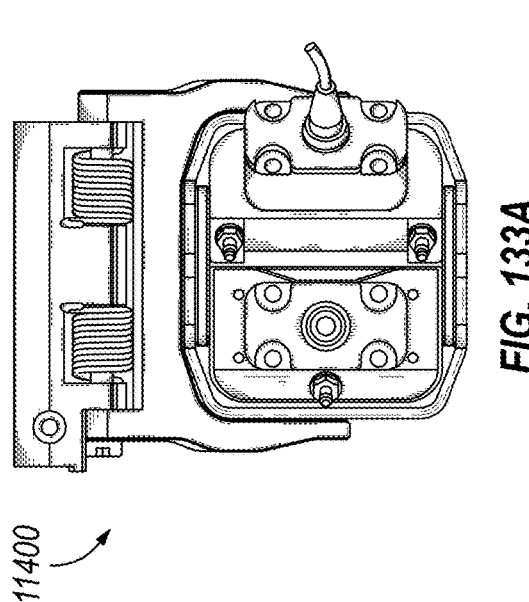
Figure 133C:
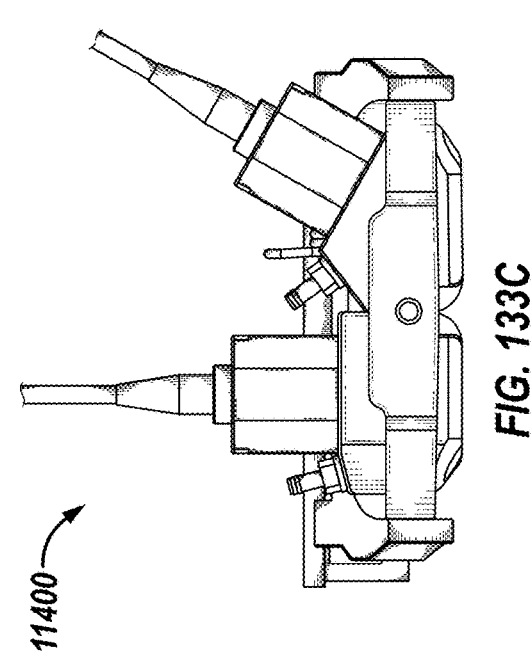

FIGS. 131A-B depict an example differential pivoting mechanism, in accordance with embodiments of the current disclosure.

FIGS. 132A-D depict an example payload having a 0.75" vertical sensor, in accordance with embodiments of the current disclosure.

FIGS. 133A-D depict an example payload having a 1.0" vertical sensor, in accordance with embodiments of the current disclosure.

FIGS. 134A-D depict an example payload having a 1.25" vertical sensor, in accordance with embodiments of the current disclosure.

FIGS. 135A-D depict an example payload having a 1.5" vertical sensor, in accordance with embodiments of the current disclosure.

FIGS. 136A-D depict couplant flow for an example payload, in accordance with embodiments of the current disclosure.

Figure 137:
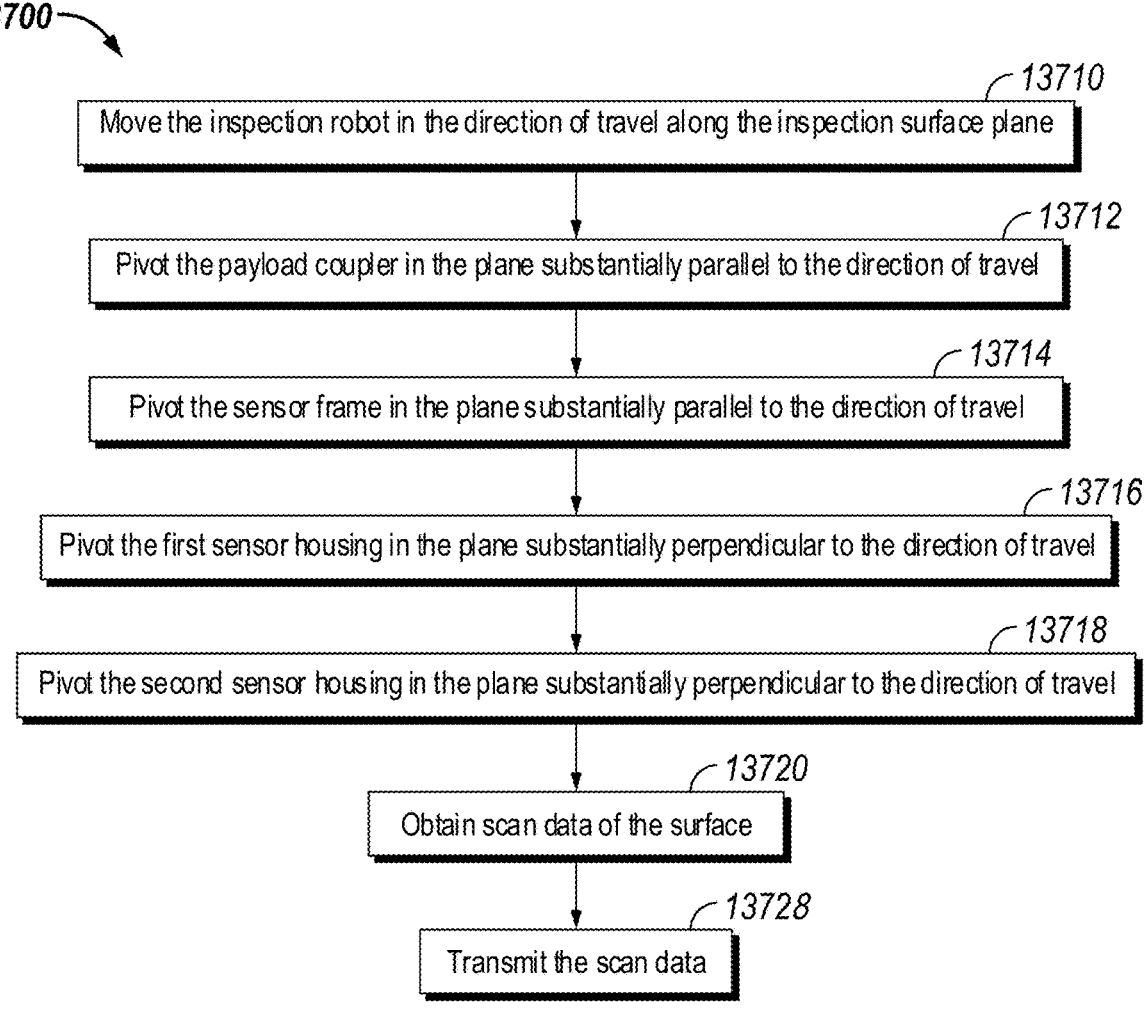

FIG. 137 is a flowchart for a method of inspecting a surface with an inspection robot, in accordance with an embodiment of the current disclosure.

FIG. 138 is another flowchart depicting certain further aspects of the method of FIG. 137, in accordance with embodiments of the current disclosure.

Use of "front", "top", "bottom", "side", etc., in the description of the drawings is for descriptive purposes only and should not be construed as limiting the orientation of the depicted object.

DETAILED DESCRIPTION

The present disclosure relates to a system developed for traversing, climbing, or otherwise traveling over walls (curved or flat), or other industrial surfaces. Industrial surfaces, as described herein, include any tank, pipe, housing, or other surface utilized in an industrial environment, including at least heating and cooling pipes, conveyance pipes or conduits, and tanks, reactors, mixers, or containers. In certain embodiments, an industrial surface is ferromagnetic, for example including iron, steel, nickel, cobalt, and alloys thereof. In certain embodiments, an industrial surface is not ferromagnetic.

Certain descriptions herein include operations to inspect a surface, an inspection robot or inspection device, or other descriptions in the context of performing an inspection. Inspections, as utilized herein, should be understood broadly. Without limiting any other disclosures or embodiments herein, inspection operations herein include operating one or more sensors in relation to an inspected surface, electromagnetic radiation inspection of a surface (e.g., operating a camera) whether in the visible spectrum or otherwise (e.g., infrared, UV, X-Ray, gamma ray, etc.), high-resolution inspection of the surface itself (e.g., a laser profiler, caliper, etc.), performing a repair operation on a surface, performing a cleaning operation on a surface, and/or marking a surface for a later operation (e.g., for further inspection, for repair, and/or for later analysis). Inspection operations include operations for a payload carrying a sensor or an array of sensors (e.g. on sensor sleds) for measuring characteristics of a surface being traversed such as thickness of the surface, curvature of the surface, ultrasound (or ultra-sonic) measurements to test the integrity of the surface and/or the thickness of the material forming the surface, heat transfer, heat profile/mapping, profiles or mapping any other parameters, the presence of rust or other corrosion, surface defects or pitting, the presence of organic matter or mineral deposits on the surface, weld quality and the like. Sensors may include magnetic induction sensors, acoustic sensors, laser sensors, LIDAR, a variety of image sensors, and the like. The inspection sled may carry a sensor for measuring characteristics near the surface being traversed such as emission sensors to test for gas leaks, air quality monitoring, radioactivity, the presence of liquids, electro-magnetic interference, visual data of the surface being traversed such as uniformity, reflectance, status of coatings such as epoxy coatings, wall thickness values or patterns, wear patterns, and the like. The term inspection sled may indicate one or more tools for repairing, welding, cleaning, applying a treatment or coating the surface being treated. Treatments and coatings may include rust proofing, scaling, painting, application of a coating, and the like. Cleaning and repairing may include removing debris, scaling leaks, patching cracks, and the like. The term inspection sled, sensor sled, and sled may be used interchangeably throughout the present disclosure.

In certain embodiments, for clarity of description, a sensor is described in certain contexts throughout the present disclosure, but it is understood explicitly that one or more tools for repairing, cleaning, and/or applying a treatment or coating to the surface being treated are likewise contemplated herein wherever a sensor is referenced. In certain embodiments, where a sensor provides a detected value (e.g., inspection data or the like), a sensor rather than a tool may be contemplated, and/or a tool providing a feedback value (e.g., application pressure, application amount, nozzle open time, orientation, etc.) may be contemplated as a sensor in such contexts.

Inspections are conducted with a robotic system 100 (e.g., an inspection robot, a robotic vehicle, etc.) which may utilize sensor sleds 1 and a sled array system 2 which enables accurate, self-aligning, and self-stabilizing contact with a surface (not shown) while also overcoming physical obstacles and maneuvering at varying or constant speeds. In certain embodiments, mobile contact of the robotic system 100 with the surface includes a magnetic wheel 3. In certain embodiments, a sled array system 2 is referenced herein as a payload 2—wherein a payload 2 is an arrangement of sleds 1 with sensor mounted thereon, and wherein, in certain embodiments, an entire payload 2 can be changed out as a unit. The utilization of payloads 2, in certain embodiments, allows for a pre-configured sensor array that provides for rapid re-configuration by swapping out the entire payload 2. In certain embodiments, sleds 1 and/or specific sensors on sleds 1, are changeable within a payload 2 to reconfigure the sensor array.

An example sensor sled 1 includes, without limitation, one or more sensors mounted thereon such that the sensor(s) is operationally couplable to an inspection surface in contact with a bottom surface of the corresponding one of the sleds. For example, the sled 1 may include a chamber or mounting structure, with a hole at the bottom of the sled 1 such that the sensor can maintain line-of-sight and/or acoustic coupling with the inspection surface. The sled 1 as described throughout the present disclosure is mounted on and/or operationally coupled to the inspection robot 100 such that the sensor maintains a specified alignment to the inspection surface 500—for example a perpendicular arrangement to the inspection surface, or any other specified angle. In certain embodiments, a sensor mounted on a sled 1 may have a line-of-sight or other detecting arrangement to the inspection surface that is not through the sled 1—for example a sensor may be mounted at a front or rear of a sled 1, mounted on top of a sled 1 (e.g., having a view of the inspection surface that is forward, behind, to a side, and/or oblique to the sled 1). It will be seen that, regardless of the sensing orientation of the sensor to the inspection surface, maintenance of the sled 1 orientation to the inspection surface will support more consistent detection of the inspection surface by the sensor, and/or sensed values (e.g., inspection data) that is more consistently comparable over the inspection surface and/or that has a meaningful position relationship compared to position information determined for the sled 1 or inspection robot 100. In certain embodiments, a sensor may be mounted on the inspection robot 100 and/or a payload 2—for example a camera mounted on the inspection robot 100.

The present disclosure allows for gathering of structural information from a physical structure. Example physical structures include industrial structures such as boilers, pipe-lines, tanks, ferromagnetic structures, and other structures. An example inspection robot 100 is configured for climbing the outside of tube walls.

As described in greater detail below, in certain embodiments, the disclosure provides a system that is capable of integrating input from sensors and sensing technology that may be placed on a robotic vehicle. The robotic vehicle is capable of multi-directional movement on a variety of surfaces, including flat walls, curved surfaces, ceilings, and/or floors (e.g., a tank bottom, a storage tank floor, and/or a recovery boiler floor). The ability of the robotic vehicle to operate in this way provides unique access especially to traditionally inaccessible or dangerous places, thus permitting the robotic vehicle to gather information about the structure it is climbing on.

Figure 1:
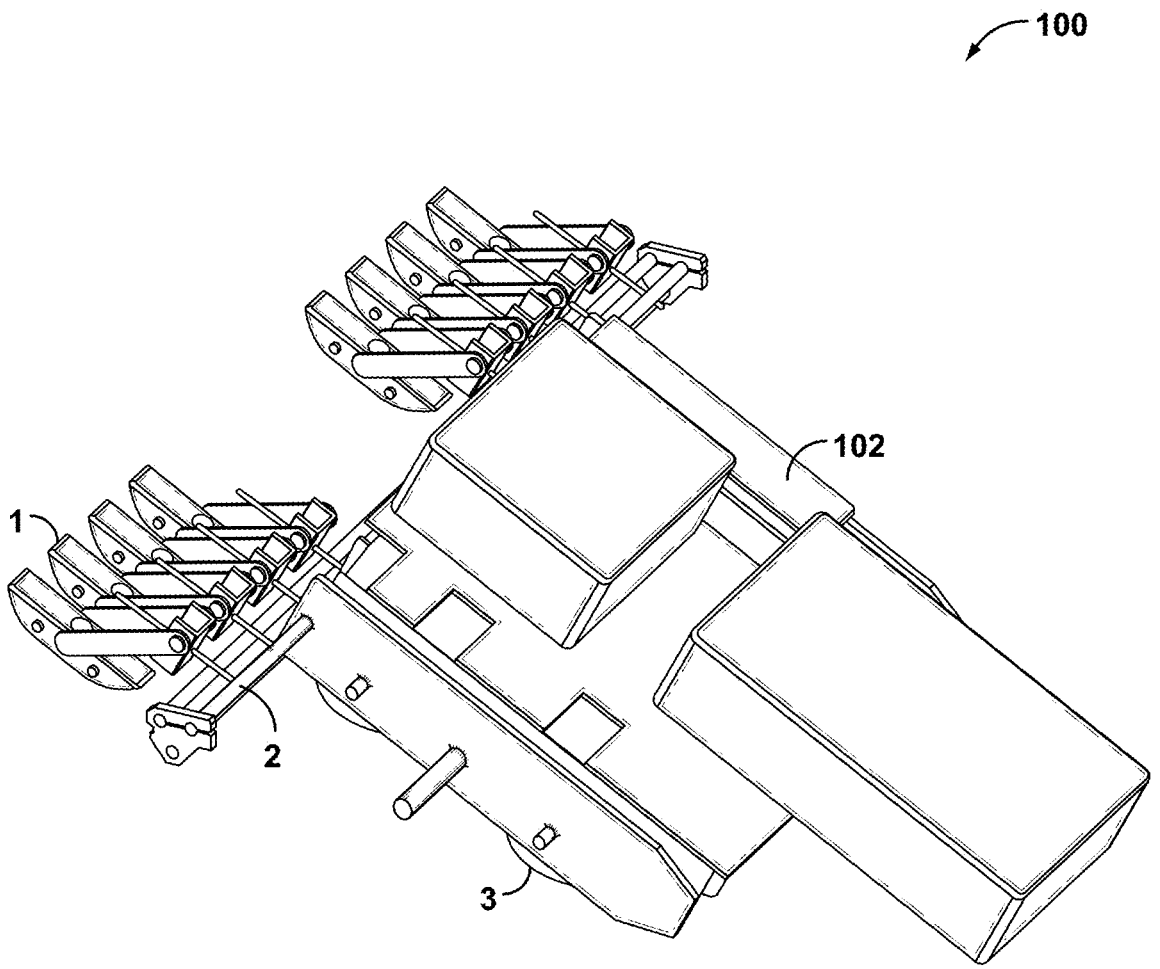
FIG. 1 is a schematic depiction of an inspection robot, in accordance with an embodiment of the current disclosure.
Figure 51:
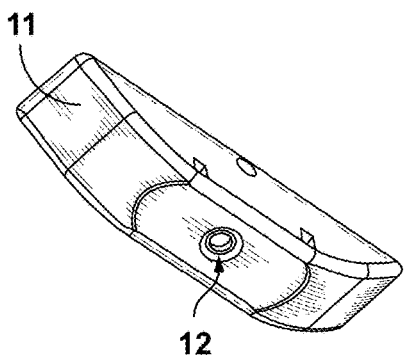
FIG. 51 is a schematic view of a sled consistent with certain embodiments of the present disclosure.

The robotic system 100 (e.g., an inspection robot, a robotic vehicle, and/or supporting devices such as external computing devices, couplant or fluid reservoirs and delivery systems, etc.) in FIG. 1 includes the sled 1 mounted on a payload 2 to provide for an array of sensors having selectable contact (e.g., orientation, down force, sensor spacing from the surface, etc.) with an inspected surface. The payload 2 includes mounting posts mounted to a main body or housing 102 of the robotic system 100. The payload 2 thereby provides a convenient mounting position for a number of sleds 1, allowing for multiple sensors to be positioned for inspection in a single traverse of the inspected surface. The number and distance of the sleds 1 on the payload 2 are readily adjustable—for example by sliding the sled mounts on the payload 2 to adjust spacing. Referencing FIG. 51, an example sled 1 has an aperture 12, for example to provide for couplant communication (e.g., an acoustically and/or optically continuous path of couplant) between the sensor mounted on the sled 1 and a surface to be inspected, to provide for line-of-sight availability between the sensor and the surface, or the like.

Figure 52:
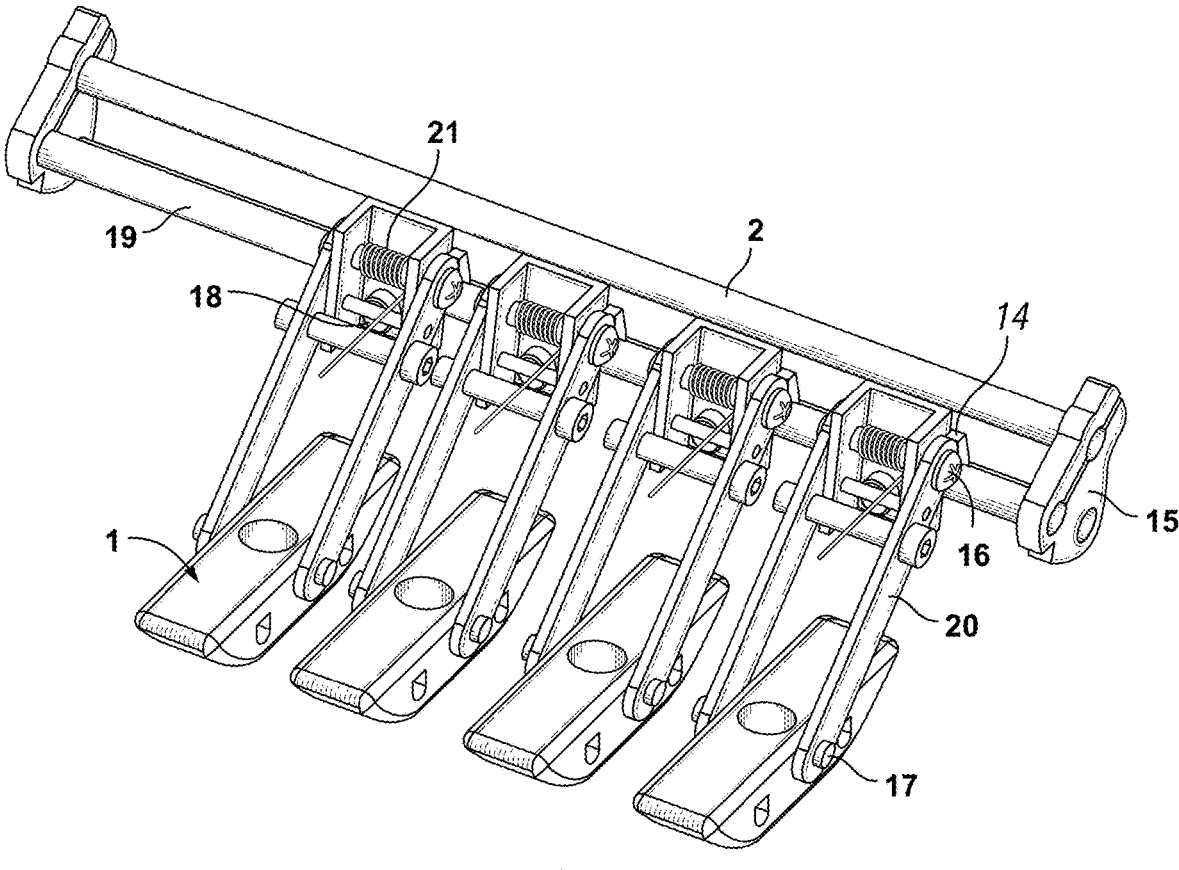
FIG. 52 is a schematic depiction of a payload consistent with certain embodiments of the present disclosure.

Referencing FIG. 52, an example robotic system 100 includes the sled 1 held by an arm 20 that is connected to the payload 2 (e.g., a sensor array or sensor suite). An example system includes the sled 1 coupled to the arm 20 at a pivot point 17, allowing the sensor sled to rotate and/or tilt. On top of the arm 20, an example payload 2 includes a biasing member (e.g., a torsion spring 21) with another pivot point 16, which provides for a selectable down—force of the arm 20 to the surface being inspected, and for an additional degree of freedom in sled 1 movement to ensure the sled 1 orients in a desired manner to the surface. In certain embodiments, down—force provides for at least a partial seal between the sensor sled 1 and surface to reduce or control couplant loss (e.g., where couplant loss is an amount of couplant consumed that is beyond what is required for operations), control distance between the sensor and the surface, and/or to ensure orientation of the sensor relative to the surface. Additionally or alternatively, the arm 20 can lift in the presence of an obstacle, while traversing between surfaces, or the like, and return to the desired position after the maneuver is completed. In certain embodiments, an additional pivot 18 couples the arm 20 to the payload 2, allowing for an additional rolling motion. In certain embodiments, pivots 16, 17, 18 provide for three degrees of freedom on arm 20 motion, allowing the arm 20 to be responsive to almost any obstacle or surface shape for inspection operations. In certain embodiments, various features of the inspection robot 100, including one or more pivots 16, 17, 18, co-operate to provide self-alignment of the sled 1 (and thus, the sensor mounted on the sled) to the surface. In certain embodiments, the sled 1 self-aligns to a curved surface and/or to a surface having variability in the surface shape.

In certain embodiments, the system is also able to collect information at multiple locations at once. This may be accomplished through the use of a sled array system. Modular in design, the sled array system allows for mounting sensor mounts, like the sleds, in fixed positions to ensure thorough coverage over varying contours. Furthermore, the sled array system allows for adjustment in spacing between sensors, adjustments of sled angle, and traveling over obstacles. In certain embodiments, the sled array system was designed to allow for multiplicity, allowing sensors to be added to or removed from the design, including changes in the type, quantity, and/or physical sensing arrangement of sensors. The sensor sleds that may be employed within the context of the present invention may house different sensors for diverse modalities useful for inspection of a structure. These sensor sleds are able to stabilize, align, travel over obstacles, and control, reduce, or optimize couplant delivery which allows for improved sensor feedback, reduced couplant loss, reduced post-inspection clean-up, reduced downtime due to sensor re-runs or bad data, and/or faster return to service for inspected equipment.

Figure 4:
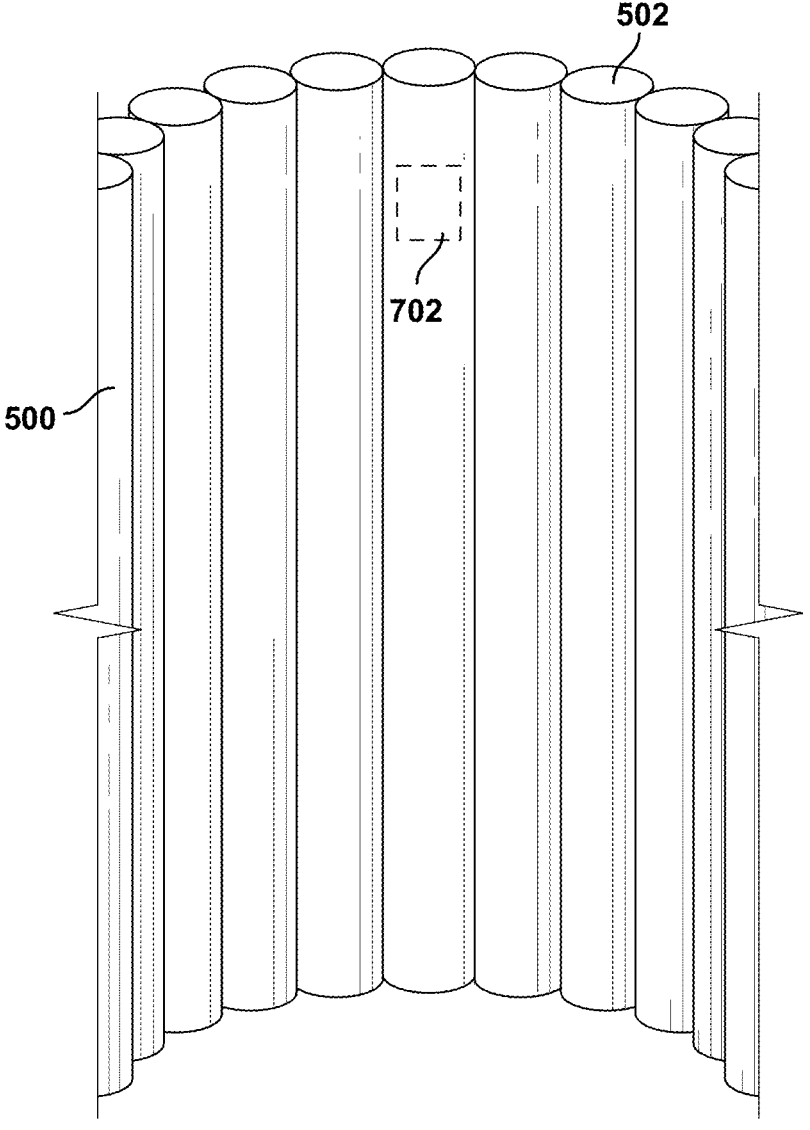
FIG. 4 is a schematic depiction of a location on an inspection surface, in accordance with an embodiment of the current disclosure.
Figure 5:
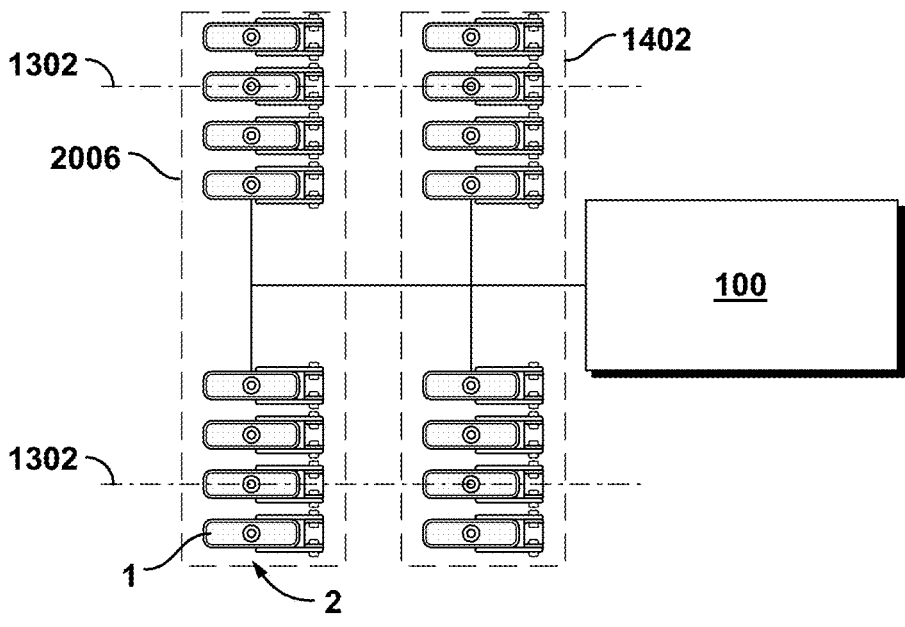
FIG. 5 is a schematic diagram of a payload arrangement, in accordance with an embodiment of the current disclosure.

There may be advantages to maintaining a sled with associated sensors or tools in contact and/or in a fixed orientation relative to the surface being traversed even when that surface is contoured, includes physical features, obstacles, and the like. In embodiments, there may be sled assemblies which are self-aligning to accommodate variabilities in the surface being traversed (e.g., an inspection surface) while maintaining the bottom surface of the sled (and/or a sensor or tool, e.g. where the sensor or tool protrudes through or is flush with a bottom surface of the sled) in contact with the inspection surface and the sensor or tool in a fixed orientation relative to the inspection surface. In an embodiment, as shown in FIG. 5 there may be a number of payloads 2, each payload 2 including a sled 1 positioned between a pair of sled arms 20, with each side exterior of the sled 1 attached to one end of each of the sled arms 20 at a pivot point 17 so that the sled 1 is able to rotate around an axis that would run between the pivot points 17 on each side of the sled 1. As described throughout the present disclosure, the payload 2 may include one or more inspection sleds 1 being pushed ahead of the payload 2, pulled behind the payload 2, or both. The other end of each sled arm 20 is attached to an inspection sled mount 14 with a pivot connection 16 which allows the sled arms to rotate around an axis running through the inspection sled mount 14 between the two pivot connections 16. Accordingly, each pair of sled arms 20 can raise or lower independently from other sled arms 20, and with the corresponding sled 1. The inspection sled mount 14 attaches to the payload 2, for example by mounting on payload shaft 19. The inspection sled mount 14 may connect to the payload shaft 19 with a pivot 18 connection which allows the sled 1 and corresponding arms 20 to rotate from side to side in an arc around a perpendicular to the payload shaft 19. Together the up and down and side to side arc, where present, allow two degrees of rotational freedom to the sled arms. Pivot 18 connection is illustrated as a gimbal mount in the example of FIG. 4, although any type of connection providing a rotational degree of freedom for movement is contemplated herein, as well as embodiments that do not include a rotational degree of freedom for movement. The gimbal mount 18 allows the sled 1 and associated arms 20 to rotate to accommodate side to side variability in the surface being traversed or obstacles on one side of the sled 1. The pivot points 17 between the sled arms 20 and the sled 1 allow the sled 1 to rotate (e.g., tilt in the direction of movement of the inspection robot 100) to conform to the surface being traversed and accommodate to variations or obstacles in the surface being traversed. Pivot point 17, together with the rotational freedom of the arms, provides the sled three degrees of rotational freedom relative to the inspection surface. The ability to conform to the surface being traversed facilitated the maintenance of a perpendicular interface between the sensor and the surface allowing for improved interaction between the sled 1 and the inspection surface. Improved interaction may include ensuring that the sensor is operationally couplable to the inspection surface.

Within the inspection sled mount 14 there may be a biasing member (e.g., torsion spring 21) which provides a down force to the sled 1 and corresponding arms 20. In the example, the down force is selectable by changing the torsion spring, and/or by adjusting the configuration of the torsion spring (e.g., confining or rotating the torsion spring to increase or decrease the down force). Analogous operations or structures to adjust the down force for other biasing members (e.g., a cylindrical spring, actuator for active down force control, etc.) are contemplated herein.

In certain embodiments, the inspection robot 100 includes a tether (not shown) to provide power, couplant or other fluids, and/or communication links to the inspection robot 100. It has been demonstrated that a tether to support at least 200 vertical feet of climbing can be created, capable of couplant delivery to multiple ultra-sonic sensors, sufficient power for the robot, and sufficient communication for real-time processing at a computing device remote from the robot. Certain aspects of the disclosure herein, such as but not limited to utilizing couplant conservation features such as sled downforce configurations, the acoustic cone, and water as a couplant, support an extended length of tether. In certain embodiments, multiple ultra-sonic sensors can be provided with sufficient couplant through a ⅛" couplant delivery line, and/or through a ¼" couplant delivery line to the inspection robot 100, with ⅛" final delivery lines to individual sensors. While the inspection robot 100 is described as receiving power, couplant, and communications through a tether, any or all of these, or other aspects utilized by the inspection robot 100 (e.g., paint, marking fluid, cleaning fluid, repair solutions, etc.) may be provided through a tether or provided in situ on the inspection robot 100. For example, the inspection robot 100 may utilize batteries, a fuel cell, and/or capacitors to provide power; a couplant reservoir and/or other fluid reservoir on the robot to provide fluids utilized during inspection operations, and/or wireless communication of any type for communications, and/or store data in a memory location on the robot for utilization after an inspection operation or a portion of an inspection operation.

In certain embodiments, maintaining sleds 1 (and sensors or tools mounted thereupon) in contact and/or selectively oriented (e.g., perpendicular) to a surface being traversed provides for: reduced noise, reduced lost-data periods, fewer false positives, and/or improved quality of sensing; and/or improved efficacy of tools associated with the sled (less time to complete a repair, cleaning, or marking operation; lower utilization of associated fluids therewith; improved confidence of a successful repair, cleaning, or marking operation, etc.). In certain embodiments, maintaining sleds 1 in contacts and/or selectively oriented to the surface being traversed provides for reduced losses of couplant during inspection operations.

In certain embodiments, the combination of the pivot points 16, 17, 18) and torsion spring 21 act together to position the sled 1 perpendicular to the surface being traversed. The biasing force of the spring 21 may act to extend the sled arms 20 downward and away from the payload shaft 19 and inspection sled mount 14, pushing the sled 1 toward the inspection surface. The torsion spring 21 may be passive, applying a constant downward pressure, or the torsion spring 21 or other biasing member may be active, allowing the downward pressure to be varied. In an illustrative and non-limiting example, an active torsion spring 21 might be responsive to a command to relax the spring tension, reducing downward pressure and/or to actively pull the sled 1 up, when the sled 1 encounters an obstacle, allowing the sled 1 to move over the obstacle more easily. The active torsion spring 21 may then be responsive to a command to restore tension, increasing downward pressure once the obstacle is cleared to maintain the close contact between the sled 1 and the surface. The use of an active spring may enable changing the angle of a sensor or tool relative to the surface being traversed during a traverse. Design considerations with respect to the surfaces being inspected may be used to design the active control system. If the spring 21 is designed to fail closed, the result would be similar to a passive spring and the sled 1 would be pushed toward the surface being inspected. If the spring 21 is designed to fail open, the result would be increased obstacle clearance capabilities. In embodiments, spring 21 may be a combination of passive and active biasing members.

The downward pressure applied by the torsion spring 21 may be supplemented by a spring within the sled 1 further pushing a sensor or tool toward the surface. The downward pressure may be supplemented by one or more magnets in/on the sled 1 pulling the sled 1 toward the surface being traversed. The one or more magnets may be passive magnets that are constantly pulling the sled 1 toward the surface being traversed, facilitating a constant distance between the sled 1 and the surface. The one or magnets may be active magnets where the magnet field strength is controlled based on sensed orientation and/or distance of the sled 1 relative to the inspection surface. In an illustrative and non-limiting example, as the sled 1 lifts up from the surface to clear an obstacle and it starts to roll, the strength of the magnet may be increased to correct the orientation of the sled 1 and draw it back toward the surface.

The connection between each sled 1 and the sled arms 20 may constitute a simple pin or other quick release connect/disconnect attachment. The quick release connection at the pivot points 17 may facilitate attaching and detaching sleds 1 enabling a user to easily change the type of inspection sled attached, swapping sensors, types of sensors, tools, and the like.

Figure 8:
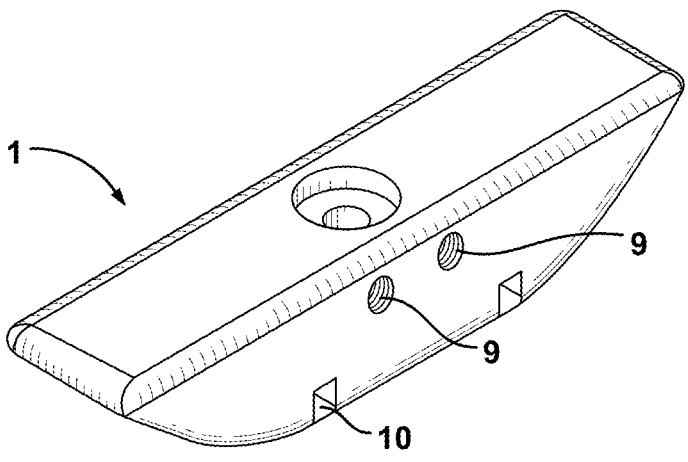
FIG. 8 is a schematic perspective view of a sled, in accordance with an embodiment of the current disclosure.

In embodiments, as depicted in FIG. 8, there may be multiple attachment or pivot point accommodations 9 available on the sled 1 for connecting the sled arms 20. The location of the pivot point accommodations 9 on the sled 1 may be selected to accommodate conflicting goals such as sled 1 stability and clearance of surface obstacles. Positioning the pivot point accommodations 9 behind the center of sled in the longitudinal direction of travel may facilitate clearing obstacles on the surface being traversed. Positioning the pivot point accommodation 9 forward of the center may make it more difficult for the sled 1 to invert or flip to a position where it cannot return to a proper inspection operation position. It may be desirable to alter the connection location of the sled arms 20 to the pivot point accommodations 9 (thereby defining the pivot point 17) depending on the direction of travel. The location of the pivot points 17 on the sled 1 may be selected to accommodate conflicting goals such as sensor positioning relative to the surface and avoiding excessive wear on the bottom of the sled. In certain embodiments, where multiple pivot point accommodations 9 are available, pivot point 17 selection can occur before an inspection operation, and/or be selectable during an inspection operation (e.g., arms 20 having an actuator to engage a selected one of the pivot points 9, such as extending pegs or other actuated elements, thereby selecting the pivot point 17).

Figure 9:
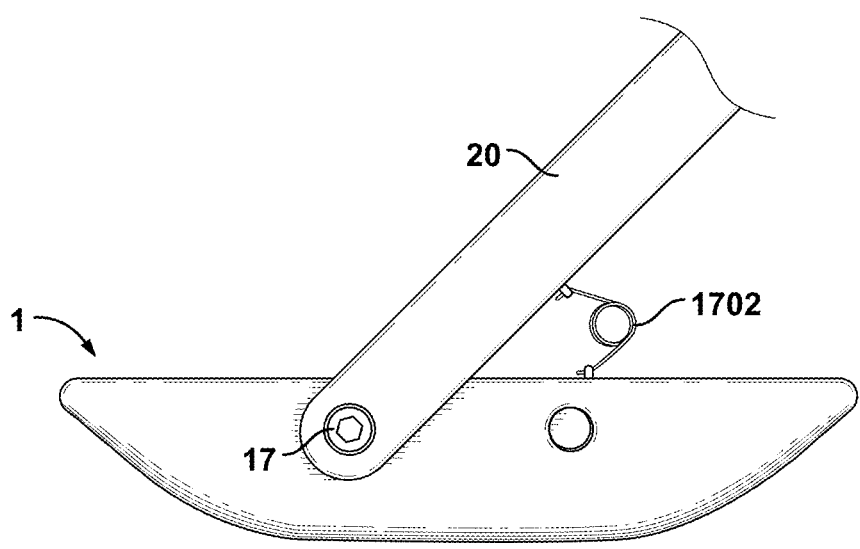
FIG. 9 is a schematic side view of a sled, in accordance with an embodiment of the current disclosure.

In embodiments, the degree of rotation allowed by the pivot points 17 may be adjustable. This may be done using mechanical means such as a physical pin or lock. In embodiments, as shown in FIG. 9, the connection between the sled 1 and the sled arms 20 may include a spring 1702 that biases the pivot points 17 to tend to pivot in one direction or another. The spring 1702 may be passive, with the selection of the spring based on the desired strength of the bias, and the installation of the spring 1702 may be such as to preferentially push the front or the back of the sled 1 down. In embodiments, the spring 1702 may be active and the strength and preferential pivot may be varied based on direction of travel, presence of obstacles, desired pivoting responsiveness of the sled 1 to the presence of an obstacle or variation in the inspection surface, and the like. In certain embodiments, opposing springs or biasing members may be utilized to bias the sled 1 back to a selected position (e.g., neutral/flat on the surface, tilted forward, tilted rearward, etc.). Where the sled 1 is biased in a given direction (e.g., forward or rearward), the sled 1 may nevertheless operate in a neutral position during inspection operations, for example due to the down force from the arm 20 on the sled 1.

Figure 110:
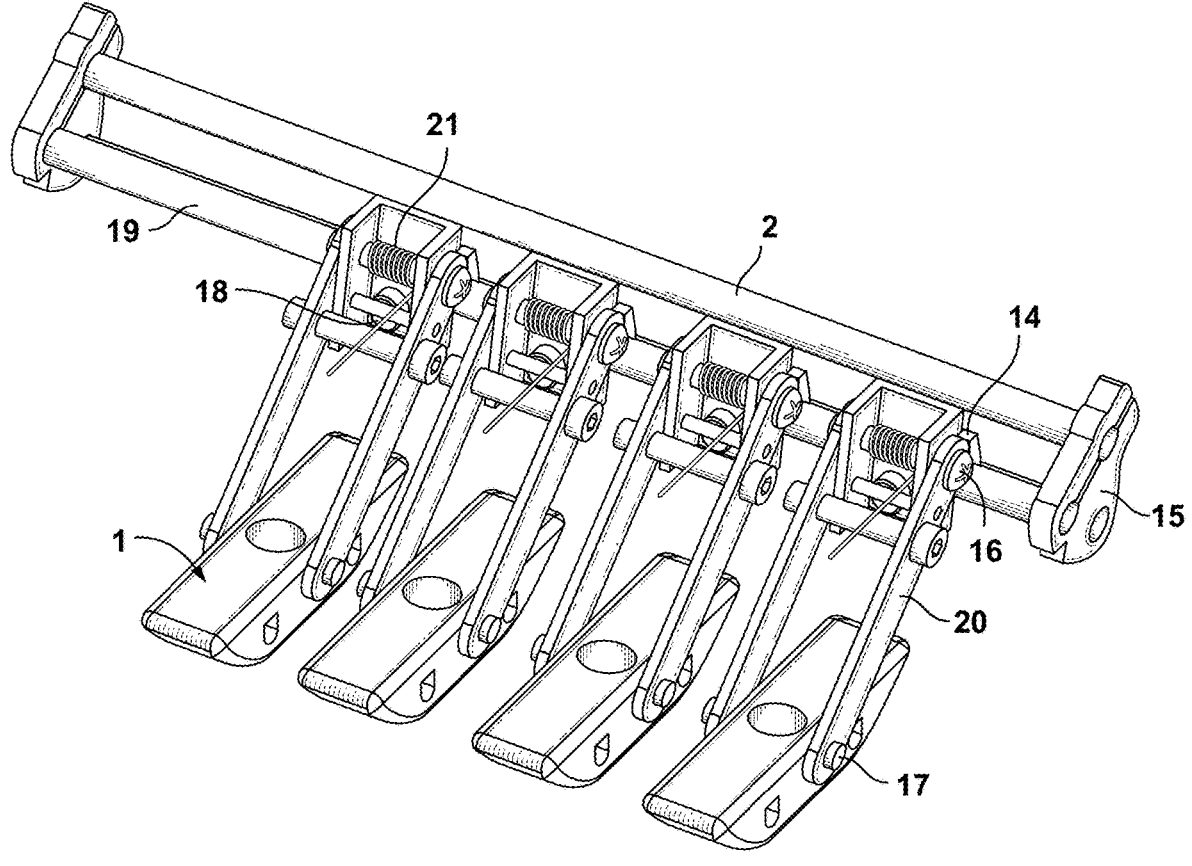
FIG. 110 is a perspective view of a payload, in accordance with an embodiment of the current disclosure.

In the example of FIG. 110, the two pivot points 17 provide additional clearance for the sled 1 to clear obstacles. In certain embodiments, springs 21 may be selectively locked—for example before inspection operations and/or actively controlled during inspection operations. Additionally or alternatively, selection of pivot position, spring force and/or case of pivoting at each pivot may be selectively controlled—for example before inspection operations and/or actively controlled during inspection operations (e.g., using a controller). The utilization of springs 21 is a non-limiting example of simultaneous multiple pivot points, and leaf springs, electromagnets, torsion springs, or other flexible pivot enabling structures are contemplated herein. The spring tension or pivot control may be selected based on the uniformity of the surface to be traversed. The spring tension may be varied between the front and rear pivot points depending on the direction of travel of the sled 1. In an illustrative and non-limiting example, the rear spring (relative to the direction of travel) might be locked and the front spring active when traveling forward to better enable obstacle accommodation. When direction of travel is reversed, the active and locked springs 21 may be reversed such that what was the rear spring 21 may now be active and what was the front spring 21 may now be locked, again to accommodate obstacles encountered in the new direction of travel.

Figure 10:
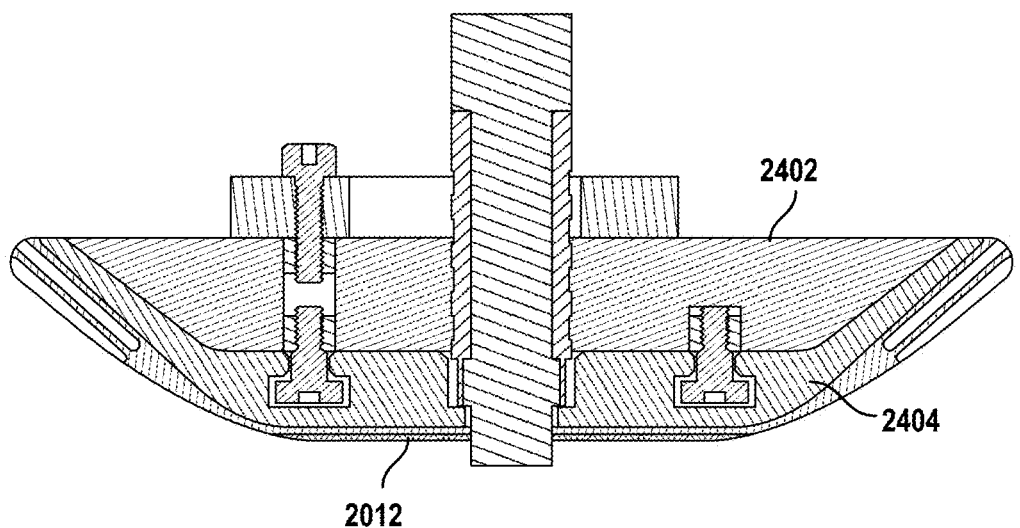
FIG. 10 is a schematic cutaway side view of a sled, in accordance with an embodiment of the current disclosure.
Figure 11:
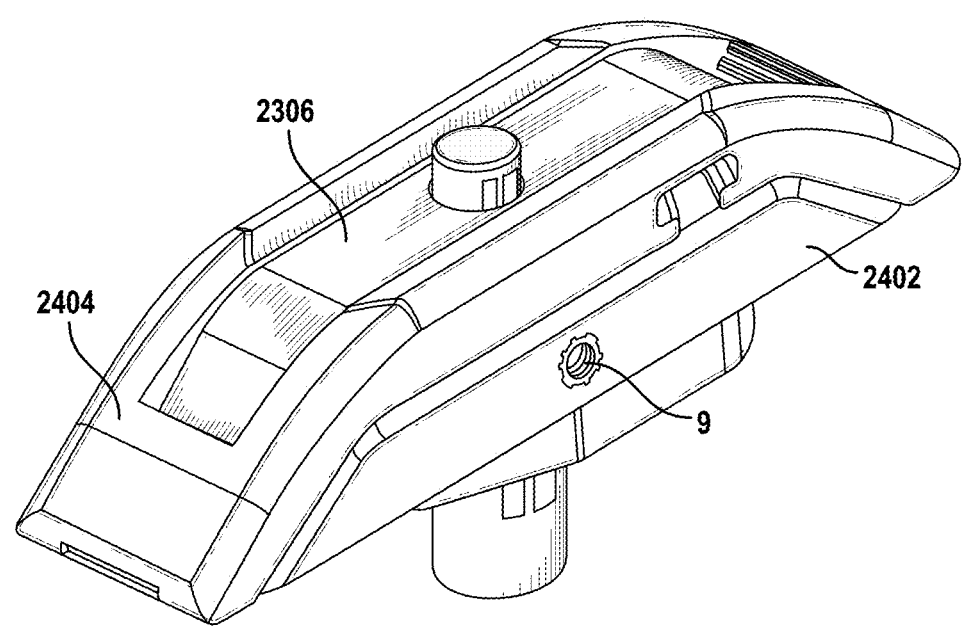
FIG. 11 is a schematic bottom view of a sled, in accordance with an embodiment of the current disclosure.
Figure 12:
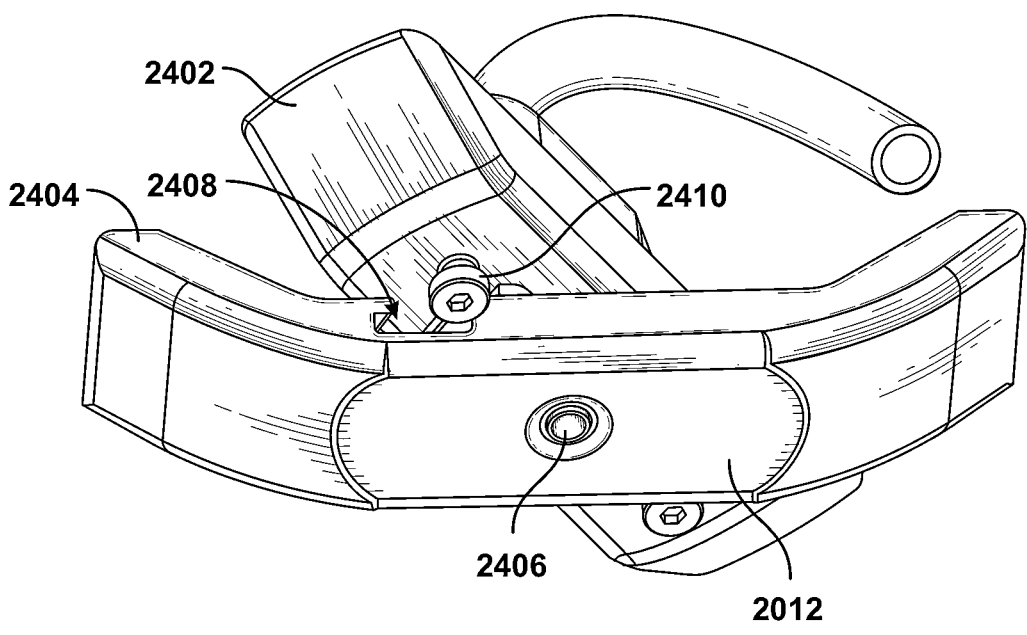
FIG. 12 is a schematic view of a sled having separable top and bottom portions, in accordance with an embodiment of the current disclosure.

In embodiments, as shown in FIG. 10-12, an example sled 1 includes an upper portion 2402 and a replaceable lower portion 2404 having a bottom surface. In some embodiments, the replaceable lower portion 2404 may be designed to allow the bottom surface and shape to be changed to accommodate the specific surface to be traversed without having to disturb or change the upper portion 2402. Accordingly, where sensors or tools engage the upper portion 2402, the replaceable lower portion 2404 can be rapidly changed out to configure the sled 1 to the inspection surface, without disturbing sensor connections and/or coupling to the arms 20. The replaceable lower portion 2404 may additionally or alternatively be configured to accommodate a sacrificial layer 2012, including potentially with a recess 2306. An example sled 1 includes a replaceable lower portion 2404 designed to be easily replaced by lining up the upper portion 2402 and the replaceable lower portion 2404 at a pivot point 2406, and then rotating the pieces to align the two portions. In certain embodiments, the sensor, installation sleeve, cone tip, or other portion protruding through aperture 12 (FIG. 51) forms the pivot point 2406. One or more slots 2408 and key 2410 interfaces or the like may hold the two portions together.

The ability to quickly swap the replaceable lower portion 2404 may facilitate changing the bottom surface of the sled 1 to improve or optimize the bottom surface of the sled 1 for the surface to be traversed. The lower portion may be selected based on bottom surface shape, ramp angle, or ramp total height value. The lower portion may be selected from a multiplicity of pre-configured replaceable lower portions in response to observed parameters of the inspection surface after arrival to an inspection site. Additionally or alternatively, the replaceable lower portion 2404 may include a simple composition, such as a wholly integrated part of a single material, and/or may be manufactured on-site (e.g., in a 3-D printing operation) such as for a replacement part and/or in response to observed parameters of the inspection surface after arrival to an inspection site. Improvement and/or optimization may include: providing a low friction material as the bottom surface to facilitate the sled 1 gliding over the surface being traversed, having a hardened bottom surface of the sled 1 if the surface to be traversed is abrasive, producing the replaceable lower portion 2404 as a wear material or low-cost replacement part, and the like. The replacement lower portion 2404 may allow for quick replacement of the bottom surface when there is wear or damage on the bottom surface of the sled 1. Additionally or alternatively, a user may alter a shape/curvature of the bottom of the sled, a slope or length of a ramp, the number of ramps, and the like. This may allow a user to swap out the replaceable lower portion 2404 of an individual sled 1 to change a sensor to a similar sensor having a different sensitivity or range, to change the type of sensor, manipulate a distance between the sensor and the inspection surface, replace a failed sensor, and the like. This may allow a user to swap out the replaceable lower portion 2404 of an individual sled 1 depending upon the surface curvature of the inspection surface, and/or to swap out the replaceable lower portion 2404 of an individual sled 1 to change between various sensors and/or tools.

Figure 13:
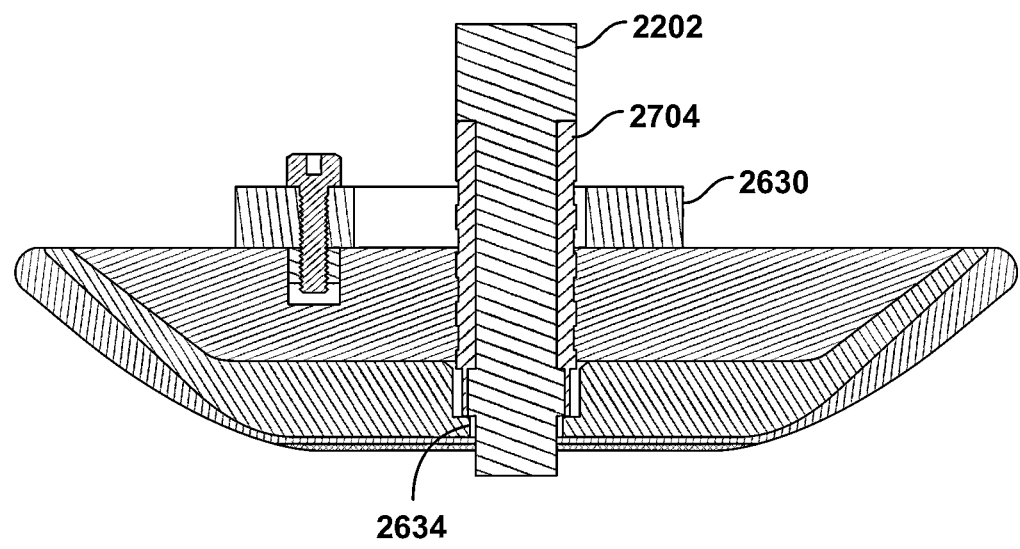
FIG. 13 is a schematic cutaway side view of a sled, in accordance with an embodiment of the current disclosure.
Figure 14:
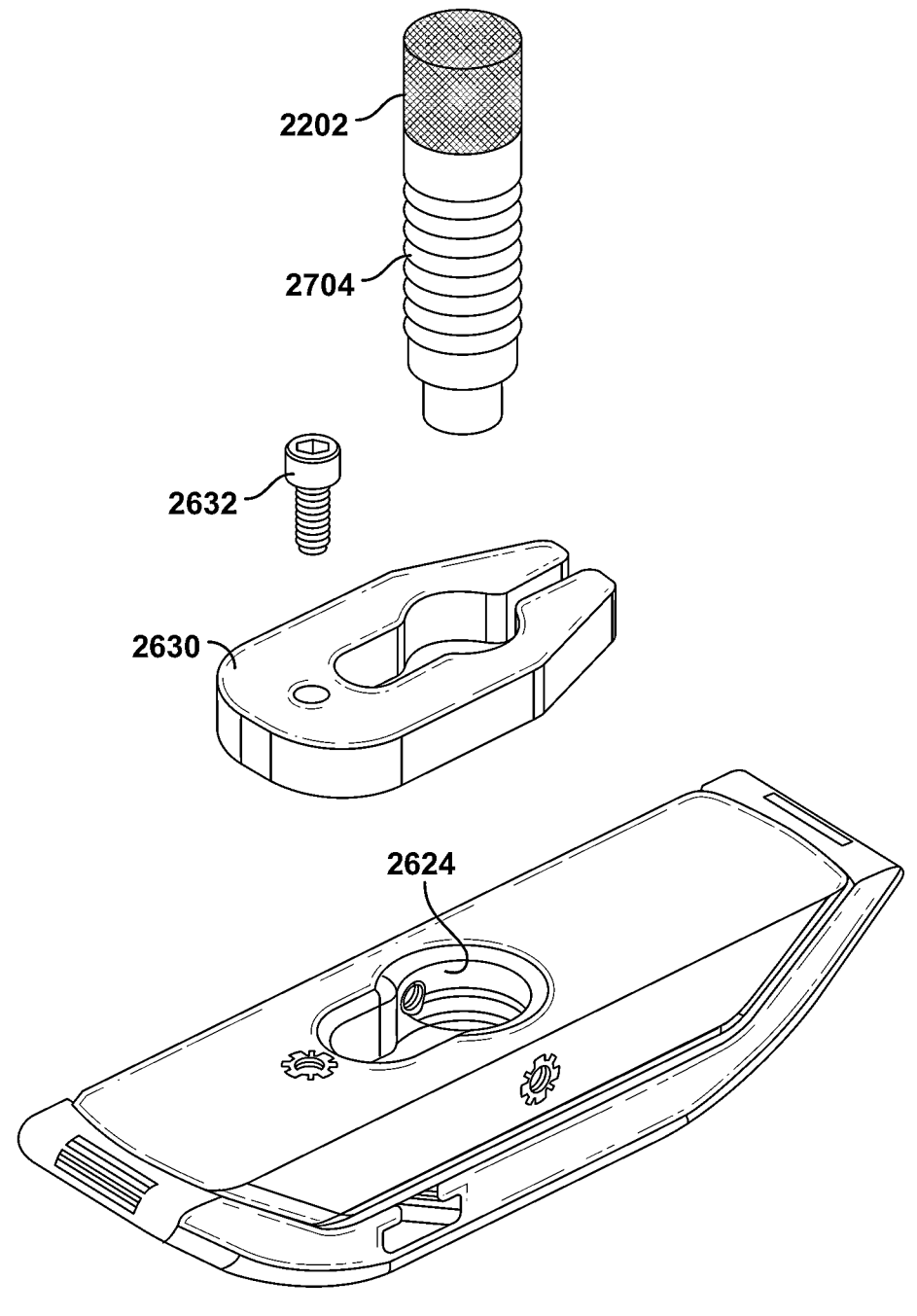
FIG. 14 is a schematic exploded view of a sled with a sensor, in accordance with an embodiment of the current disclosure.
Figure 15:
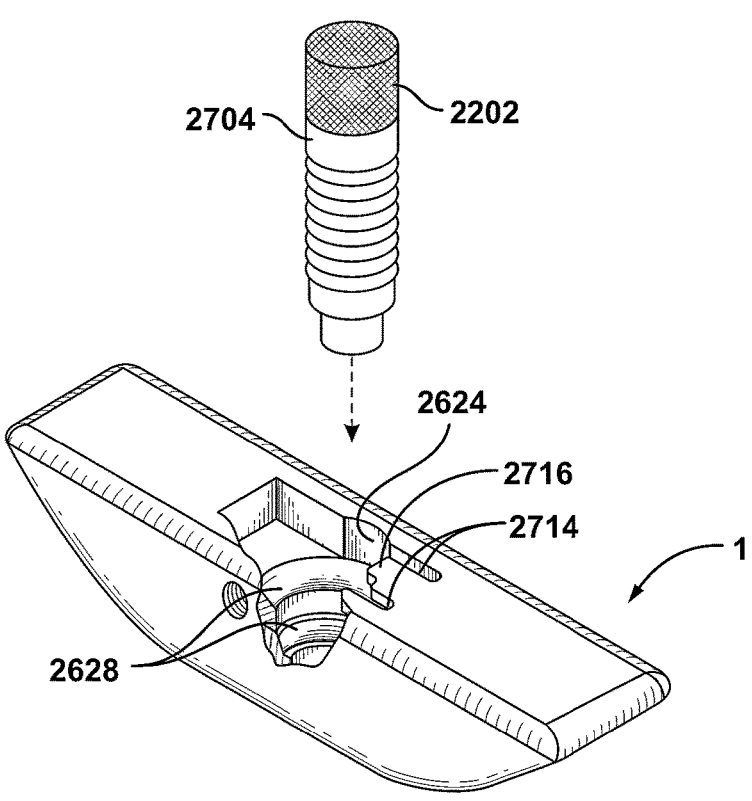
FIG. 15 is a schematic, partially exploded, partially cutaway view of a sled with a sensor, in accordance with an embodiment of the current disclosure.

In embodiments, as shown in FIGS. 13-15, a sled 1 may have a chamber 2624 sized to accommodate a sensor 2202, and/or into which a sensor 2202 may be inserted. The chamber 2624 may have chamfers 2628 on at least one side of the chamber to facilitate case of insertion and proper alignment of the sensor 2202 in the chamber 2624. An example sled 1 includes a holding clamp 2630 that accommodates the sensor 2202 to pass therethrough, and is attached to the sled 1 by a mechanical device 2632 such as a screw or the like. An example sled 1 includes stops 2634 at the bottom of the chamber 2624, for example to ensure a fixed distance between the sensor 2202 and bottom surface of the sled and/or the inspection surface, and/or to ensure a specific orientation of the sensor 2202 to the bottom surface of the sled and/or the inspection surface.

Referencing FIG. 15, an example sled 1 includes a sensor installation sleeve 2704, which may be positioned, at least partially, within the chamber. The example sensor installation sleeve 2704 may be formed from a compliant material such as neoprene, rubber, an elastomeric material, and the like, and in certain embodiments may be an insert into a chamber 2624, a wrapper material on the sensor 2202, and/or formed by the substrate of the sled 1 itself (e.g., by selecting the size and shape of the chamber 2624 and the material of the sled 1 at least in the area of the chamber 2624). An example sensor installation sleeve 2704 includes an opening 2 sized to receive a sensor 2202 and/or a tool (e.g., marking, cleaning, repair, and/or spray tool). In the example of FIG. 15, the sensor installation sleeve 2704 flexes to accommodate the sensor 2202 as the sensor 2202 is inserted. Additionally or alternatively, a sensor installation sleeve 2704 may include a material wrapping the sensor 2202 and slightly oversized for the chamber 2624, where the sensor installation sleeve compresses through the hole into the chamber 2624, and expands slightly when released, thereby securing the sensor 2202 into the sled 1. In the example of FIG. 15, an installation tab 2716 is formed by relief slots 2714. The installation tab 2716 flexes to engage the sensor 2202, easing the change of the sensor 2202 while securing the sensor 2202 in the correct position once inserted into the sled 1.

It can be seen that a variety of sensor and tool types and sizes may be swapped in and out of a single sled 1 using the same sensor installation sleeve 2704. The opening of the chamber 2624 may include the chamfers 2628 to facilitate insertion, release, and positioning of the sensor 2202, and/or the installation tab 2716 to provide additional compliance to facilitate insertion, release, and positioning of the sensor 2202 and/or to accommodate varying sizes of sensors 2202. Throughout the present disclosure, a sensor 2202 includes any hardware of interest for inserting or coupling to a sled 1, including at least: a sensor, a sensor housing or engagement structure, a tool (e.g., a sprayer, marker, fluid jet, etc.), and/or a tool housing or engagement structure.

Figure 16:
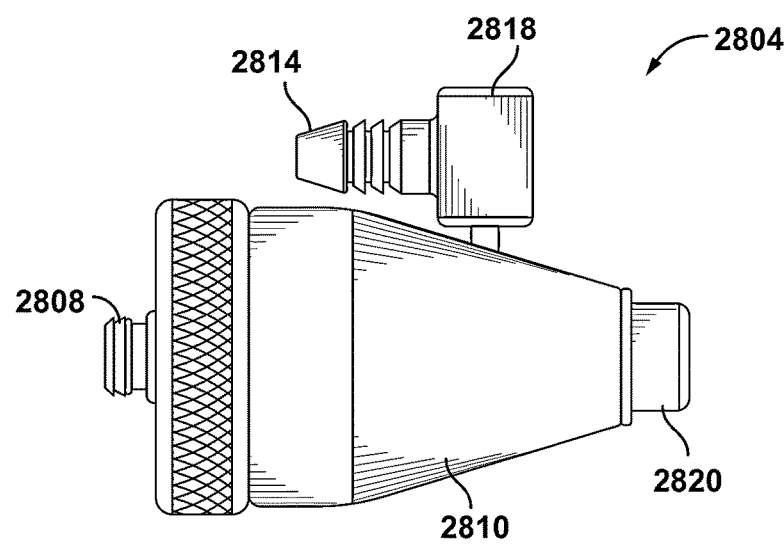
FIG. 16 is a schematic depiction of an acoustic cone, in accordance with an embodiment of the current disclosure.

Referencing FIG. 16, an acoustic cone 2804 is depicted. The acoustic cone 2804 includes a sensor interface 2808, for example to couple an acoustic sensor with the acoustic cone 2804. The example acoustic cone 2804 includes a couplant interface 2814, with a fluid chamber 2818 coupling the couplant interface 2814 to the cone fluid chamber 2810. In certain embodiments, the cone tip 2820 of the acoustic cone 2804 is kept in contact with the inspection surface, and/or kept at a predetermined distance from the inspection surface while the acoustic sensor is mounted at the opposite end of the acoustic cone 2804 (e.g., at sensor interface 2808). The cone tip 2820 may define a couplant exit opening between the couplant chamber and the inspection surface. The couplant exit opening may be flush with the bottom surface or extend through the bottom of the sled. Accordingly, a delay line (e.g., acoustic or vibration coupling of a fixed effective length) between the sensor and the inspection surface is kept at a predetermined distance throughout inspection operations. Additionally, the acoustic cone 2804 couples to the sled 1 in a predetermined arrangement, allowing for replacement of the sensor, and/or swapping of a sled 1 without having to recalibrate acoustic and/or ultra-sonic measurements. The volume between the sensor and the inspection surface is maintained with couplant, providing a consistent delay line between the sensor and the inspection surface. Example and non-limiting couplant fluids include alcohol, a dye penetrant, an oil-based liquid, an ultra-sonic gel, or the like. An example couplant fluid includes particle sizes not greater than $\frac{1}{16}$ of an inch. In certain embodiments, the couplant is filtered before delivery to the sled 1. In certain embodiments, the couplant includes water, which is low cost, low viscosity, easy to pump and compatible with a variety of pump types, and may provide lower resistance to the movement of the inspection sled over the surface than gels. In certain embodiments, water may be an undesirable couplant, and any type of couplant fluid may be provided.

An example acoustic cone 2804 provides a number of features to prevent or remove air bubbles in the cone fluid chamber 2810. An example acoustic cone 2804 includes entry of the fluid chamber 2818 into a vertically upper portion of the cone fluid chamber 2810 (e.g., as the inspection robot 100 is positioned on the inspection surface, and/or in an intended orientation of the inspection robot 100 on the inspection surface, which may toward the front of the robot where the robot is ascending vertically), which tends to drive air bubbles out of the cone fluid chamber 2810. In certain embodiments, the utilization of the acoustic cone 2804, and the ability to minimize sensor coupling and de-coupling events (e.g., a sled can be swapped out without coupling or decoupling the sensor from the cone) contributes to a reduction in leaks and air bubble formation. In certain embodiments, a controller periodically and/or in response to detection of a potential air bubble (e.g., due to an anomalous sensor reading) commands a de-bubbling operation, for example increasing a flow rate of couplant through the acoustic cone 2804. In certain embodiments, the arrangements described throughout the present disclosure provide for sufficient couplant delivery to be in the range of 0.06 to 0.08 gallons per minute using a $\frac{1}{8}$" fluid delivery line to the acoustic cone 2804. In certain embodiments, nominal couplant flow and pressure is sufficient to prevent the formation of air bubbles in the acoustic cone 2804.

Figure 17:
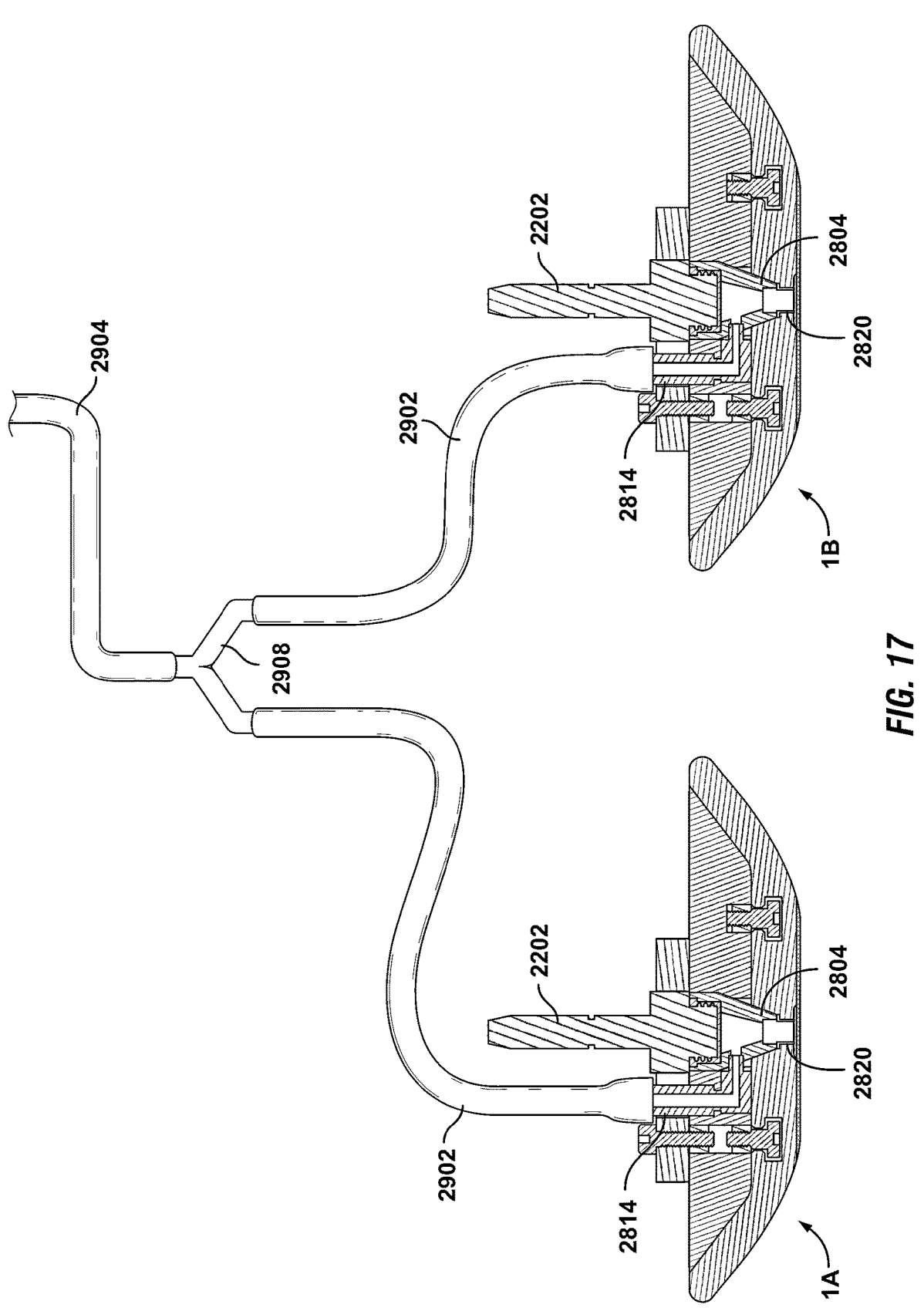
FIG. 17 is a schematic view of couplant lines to a number of sleds, in accordance with an embodiment of the current disclosure.

As shown in FIG. 17, individual tubing 2902 may be connected to each couplant interface 2814. In some embodiments, the individual tubing 2902 may be connected directly to a sled 1A, 1B rather than the individual tubing 2902, for example with sled 1A, 1B plumbing permanently coupled to the couplant interface 2814. Two or more individual tubing 2902 sections may then be joined together in a tubing junction 2908 with a single tube 2904 leaving the junction. In this way, a number of individual tubes 2902 may be reduced to a single tube 2904 that may be easily connected/disconnected from the source of the couplant. In certain embodiments, an entire payload 2 may include a single couplant interface, for example to the inspection robot 100. The inspection robot 100 may include a couplant reservoir and/or a delivery pump thereupon, and/or the inspection robot 100 may be connected to an external couplant source. In certain embodiments, an entire payload 2 can be changed out with a single couplant interface change, and without any of the cone couplant interfaces and/or sensor couplant interface being disconnected. In certain embodiments, the integration of the sensor 2202, acoustic cone 2804, and cone tip 2820 is designed to maintain a constant distance between the surface being measured and the acoustic sensor 2202. The constant distance facilitates in the interpretation of the data recorded by the acoustic sensor 2202. In certain embodiments, the distance between the surface being measured and the acoustic sensor 2202 may be described as the "delay line."

Certain embodiments include an apparatus for providing acoustic coupling between a carriage (or sled) mounted sensor and an inspection surface. Example and non-limiting structures to provide acoustic coupling between a carriage mounted sensor and an inspection surface include an acoustic (e.g., an ultra-sonic) sensor mounted on a sled 1, the sled 1 mounted on a payload 2, and the payload 2 coupled to an inspection robot. An example apparatus further includes providing the sled 1 with a number of degrees of freedom of motion, such that the sled 1 can maintain a selected orientation with the inspection surface-including a perpendicular orientation and/or a selected angle of orientation. Additionally or alternatively, the sled 1 is configured to track the surface, for example utilizing a shaped bottom of the sled 1 to match a shape of the inspection surface or a portion of the inspection surface, and/or the sled 1 having an orientation such that, when the bottom surface of the sled 1 is positioned against the inspection surface, the sensor maintains a selected angle with respect to the inspection surface.

Certain additional embodiments of an apparatus for providing acoustic coupling between a carriage mounted sensor and an inspection surface include utilization of a fixed-distance structure that ensures a consistent distance between the sensor and the inspection surface. For example, the sensor may be mounted on a cone, wherein an end of the cone touches the inspection surface and/or is maintained in a fixed position relative to the inspection surface, and the sensor mounted on the cone thereby is provided at a fixed distance from the inspection surface. In certain embodiments, the sensor may be mounted on the cone, and the cone mounted on the sled 1, such that a change-out of the sled 1 can be performed to change out the sensor, without engaging or disengaging the sensor from the cone. In certain embodiments, the cone may be configured such that couplant provided to the cone results in a filled couplant chamber between a transducer of the sensor and the inspection surface. In certain additional embodiments, a couplant entry position for the cone is provided at a vertically upper position of the cone, between the cone tip portion and the sensor mounting end, in an orientation of the inspection robot as it is positioned on the surface, such that couplant flow through the cone tends to prevent bubble formation in the acoustic path between the sensor and the inspection surface. In certain further embodiments, the couplant flow to the cone is adjustable, and is capable, for example, to be increased in response to a determination that a bubble may have formed within the cone and/or within the acoustic path between the sensor and the inspection surface. In certain embodiments, the sled 1 is capable of being lifted, for example with an actuator that lifts an arm 20, and/or that lifts a payload 2, such that a free fluid path for couplant and attendant bubbles to exit the cone and/or the acoustic path is provided. In certain embodiments, operations to eliminate bubbles in the cone and/or acoustic path are performed periodically, episodically (e.g., after a given inspection distance is completed, at the beginning of an inspection run, after an inspection robot pauses for any reason, etc.), and/or in response to an active determination that a bubble may be present in the cone and/or the acoustic path.

An example apparatus provides for low or reduced fluid loss of couplant during inspection operations. Example and non-limiting structures to provide for low or reduced fluid loss include providing for a limited flow path of couplant out of the inspection robot system—for example utilizing a cone having a smaller exit couplant cross-sectional area than a cross-sectional area of a couplant chamber within the cone. In certain embodiments, an apparatus for low or reduced fluid loss of couplant includes structures to provide for a selected down force on a sled 1 which the sensor is mounted on, on an arm 20 carrying a sled 1 which the sensor is mounted on, and/or on a payload 2 which the sled 1 is mounted on. Additionally or alternatively, an apparatus providing for low or reduced fluid loss of couplant includes a selected down force on a cone providing for couplant connectivity between the sensor and the inspection surface—for example, a leaf spring or other biasing member within the sled 1 providing for a selected down force directly to the cone. In certain embodiments, low or reduced fluid loss includes providing for an overall fluid flow of between 0.12 to 0.16 gallons per minute to the inspection robot to support at least 10 ultra-sonic sensors. In certain embodiments, low or reduced fluid loss includes providing for an overall fluid flow of less than 50 feet per minute, less than 100 feet per minute, and less than 200 feet per minute fluid velocity in a tubing line feeding couplant to the inspection robot. In certain embodiments, low or reduced fluid loss includes providing sufficient couplant through a ¼" tubing line to feed couplant to at least 6, at least 8, at least 10, at least 12, or at least 16 ultra-sonic sensors to a vertical height of at least 25 feet, at least 50 feet, at least 100 feet, at least 150 feet, or at least 200 feet. An example apparatus includes a ¼" feed line to the inspection robot and/or to the payload 2, and a ⅛" feed line to individual sleds 1 and/or sensors (or acoustic cones associated with the sensors). In certain embodiments, larger and/or smaller diameter feed and individual fluid lines are provided.

Referencing FIG. 52, an example payload 2 includes selectable spacing between sleds 1, for example to provide selectable sensor spacing. In certain embodiments, spacing between the sensors may be adjusted using a lockable translational degree of freedom such as a set screw allowing for the rapid adjustment of spacing. Additionally or alternatively, any coupling mechanism between the arm 20 and the payload 2 is contemplated herein. In certain embodiments, a worm gear or other actuator allows for the adjustment of sensor spacing by a controller and/or in real time during operations of the robotic system 100. In certain embodiments, the payload 2 includes a payload shaft 19 whereupon sleds 1 are mounted (e.g., via the arms 20). In these embodiments, the sled mounts 14 are mounted on a payload shaft 19. The example of FIG. 52 includes a shaft cap 15 providing structural support to a number of shafts of the payload 2. In the example of FIG. 4, two shafts are utilized to mount the payload 2 onto the housing 102, and one payload shaft 19 is utilized to mount the arms 20 onto the payload 2. The arrangement utilizing a payload 2 is a non-limiting example, that allows multiple sensors and sleds 1 to be configured in a particular arrangement, and rapidly changed out as a group (e.g., swapping out a first payload and set of sensors for a second payload and set of sensors, thereby changing an entire sensor arrangement in a single operation). However, in certain embodiments one or more of the payload 2, arms 20, and/or sleds 1 may be fixedly coupled to the respective mounting features, and numerous benefits of the present disclosure are nevertheless achieved in such embodiments.

In certain embodiments, a robotic system 100 allows for any one or more of the following adjustments: spacing between sensors (perpendicular to the direction of inspection motion, and/or axially along the direction of the inspection motion); adjustments of an angle of the sensor to an outer diameter of a tube or pipe; momentary or longer term displacement to traverse obstacles; provision of an arbitrary number and positioning of sensors; etc.

An example inspection robot 100 may utilize downforce capabilities for sensor sleds 1, such as to control proximity and lateral stabilization of sensors. For instance, an embedded magnet (not shown) positioned within the sled 1 may provide passive downforce that increases stabilization for sensor alignment. In another example, magnetic downforce may be provided through a combination of a passive permanent magnet and an active electromagnet, providing a default minimum magnetic downforce, but with further increases available through the active electromagnet. In embodiments, the electromagnet may be controlled by a circuit where the downforce is set by the operator, controlled by an on-board processor, controlled by a remote processor (e.g., through wireless communications), and the like, where processor control may utilize sensor data measurements to determine the downforce setting. In embodiments, downforce may be provided through suction force, spring force, and the like. In certain embodiments, downforce may be provided by a biasing member, such as a torsion spring or leaf spring, with active or passive control of the downforce—for example positioning a tension or confinement of the spring to control the downforce. In certain embodiments, the magnet, biasing member, or other downforce adjusting member may adjust the downforce on the entire sled 1, on an entire payload 2, and/or just on the sensor (e.g., the sensor has some flexibility to move within the sled 1, and the downforce adjustment acts on the sensor directly).

Figure 2:
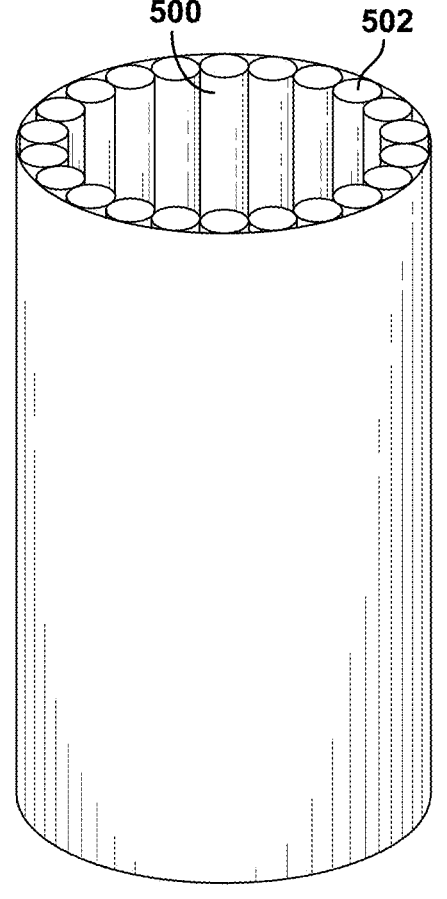
FIG. 2 is a schematic depiction of an inspection surface, in accordance with an embodiment of the current disclosure.

Referencing FIG. 2, an example system includes a number of pipes 502—for example vertically arranged pipes such as steam pipes in a power plant, pipes in a cooling tower, exhaust or effluent gas pipes, or the like. The pipes 502 in FIG. 2 are arranged to create a tower having a circular cross-section for case of description. In certain embodiments, periodic inspection of the pipes is utilized to ensure that pipe degradation is within limits, to ensure proper operation of the system, to determine maintenance and repair schedules, and/or to comply with policies or regulations. In the example of FIG. 2, an inspection surface 500 includes the inner portion of the tower, whereby an inspection robot 100 traverses the pipes 502 (e.g., vertically, inspecting one or more pipes on each vertical run). An example inspection robot 100 includes configurable payloads 2, and may include ultra-sonic sensors (e.g., to determine wall thickness and/or pipe integrity), magnetic sensors (e.g., to determine the presence and/or thickness of a coating on a pipe), cameras (e.g., to provide for visual inspection, including in EM ranges outside of the visual range, temperatures, etc.), composition sensors (e.g., gas chromatography in the area near the pipe, spectral sensing to detect leaks or anomalous operation, etc.), temperature sensing, pressure sensing (ambient and/or specific pressures), vibration sensing, density sensing, etc. The type of sensing performed by the inspection robot 100 is not limiting to the present disclosure except where specific features are described in relation to specific sensing challenges and opportunities for those sensed parameters as will be understood to one of skill in the art having the benefit of the disclosures herein.

Figure 3:
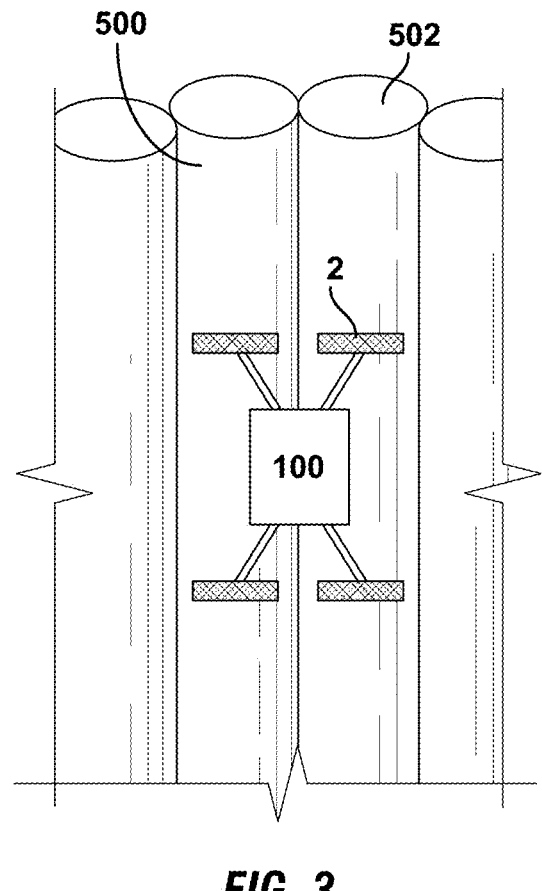
FIG. 3 is a schematic depiction of an inspection robot positioned on an inspection surface, in accordance with an embodiment of the current disclosure.

In certain embodiments, the inspection robot 100 has alternatively or additionally, payload(s) 2 configured to provide for marking of aspects of the inspection surface 500 (e.g., a paint sprayer, an invisible or UV ink sprayer, and/or a virtual marking device configured to mark the inspection surface 500 in a memory location of a computing device but not physically), to repair a portion of the inspection surface 500 (e.g., apply a coating, provide a welding operation, apply a temperature treatment, install a patch, etc.), and/or to provide for a cleaning operation. Referencing FIG. 3, an example inspection robot 100 is depicted in position on the inspection surface 500 at a location. In the example, the inspection robot 100 traverses vertically and is positioned between two pipes 502, with payloads 2 configured to clean, sense, treat, and/or mark two adjacent pipes 502 in a single inspection run. The inspection robot 100 in the example includes two payloads 2 at the "front" (ahead of the robot housing in the movement direction) and two payloads 2 at the "rear" (behind the robot housing in the movement direction). The inspection robot 100 may include any arrangement of payloads 2, including just one or more payloads in front or behind, just one or more payloads off to cither or both sides, and combinations of these. Additionally or alternatively, the inspection robot 100 may be positioned on a single pipe, and/or may traverse between positions during an inspection operation, for example to inspect selected areas of the inspection surface 500 and/or to traverse obstacles which may be present.

In certain embodiments, a "front" payload 2 includes sensors configured to determine properties of the inspection surface, and a "rear" payload 2 includes a responsive payload, such as an enhanced sensor, a cleaning device such as a sprayer, scrubber, and/or scraper, a marking device, and/or a repair device. The front-back arrangement of payloads 2 provides for adjustments, cleaning, repair, and/or marking of the inspection surface 500 in a single run—for example where an anomaly, gouge, weld line, area for repair, previously repaired area, past inspection area, etc., is sensed by the front payload 2, the anomaly can be marked, cleaned, repaired, etc. without requiring an additional run of the inspection robot 100 or a later visit by repair personnel. In another example, a first calibration of sensors for the front payload may be determined to be incorrect (e.g., a front ultra-sonic sensor calibrated for a particular coating thickness present on the pipes 502) and a rear sensor can include an adjusted calibration to account for the detected aspect (e.g., the rear sensor calibrated for the observed thickness of the coating). In another example, certain enhanced sensing operations may be expensive, time consuming, consume more resources (e.g., a gamma ray source, an alternate coupling such as a non-water or oil-based acoustic coupler, require a high energy usage, require greater processing resources, and/or incur usage charges to an inspection client for any reason) and the inspection robot 100 can thereby only utilize the enhanced sensing operations selectively and in response to observed conditions.

Referencing FIG. 4, a location 702 on the inspection surface 500 is identified for illustration. In certain embodiments, the inspection robot 100 includes a controller having a number of circuits structured to functionally execute operations of the controller. The controller may be a single device (e.g., a computing device present on the inspection robot 100, a computing device in communication with the inspection robot 100 during operations and/or post-processing information communicated after inspection operations, etc.) and/or a combination of devices, such as a portion of the controller positioned on the inspection robot 100, a portion of the controller positioned on a computing device in communication with the inspection robot 100, a portion of the controller positioned on a handheld device (not shown) of an inspection operator, and/or a portion of the controller or control module 4924 (FIG. 18) positioned on a computing device networked with one or more of the preceding devices. Additionally or alternatively, aspects of the controller or control module 4924 may be included on one or more logic circuits, embedded controllers, hardware configured to perform certain aspects of the controller operations, one or more sensors, actuators, network communication infrastructure (including wired connections, wireless connections, routers, switches, hubs, transmitters, and/or receivers), and/or a tether between the inspection robot 100 and another computing device. The described aspects of the example controller are non-limiting examples, and any configuration of inspection the robot 100 and devices in communication with the inspection robot 100 to perform all or selected ones of operations of the controller are contemplated herein as aspects of an example controller.

An example controller includes an inspection data circuit that interprets inspection data—for example sensed information from sensors mounted on the payload and determining aspects of the inspection surface 500, the status, deployment, and/or control of marking devices, cleaning devices, and/or repair devices, and/or post-processed information from any of these such as a wall thickness determined from ultra-sonic data, temperature information determined from imaging data, and the like. The example controller further includes a robot positioning circuit that interprets position data. An example robot positioning circuit determines position data by any available method, including at least triangulating (or other positioning methods) from a number of available wireless devices (e.g., routers available in the area of the inspection surface 500, intentionally positioned transmitters/transceivers, etc.), a distance of travel measurement (e.g., a wheel rotation counter which may be mechanical, electro-magnetic, visual, etc.; a barometric pressure measurement; direct visual determinations such as radar, Lidar, or the like), a reference measurement (e.g., determined from distance to one or more reference points); a time-based measurement (e.g., based upon time and travel speed); and/or a dead reckoning measurement such as integration of detection movements. In the example of FIG. 2, a position measurement may include a height determination combined with an azimuthal angle measurement and/or a pipe number value such that the inspection surface 500 location is defined thereby. Any coordinate system and/or position description system is contemplated herein. In certain embodiments, the controller includes a processed data circuit that combines the inspection data with the position data to determine position-based inspection data. The operations of the processed data circuit may be performed at any time—for example during operations of the inspection robot 100 such that inspection data is stored with position data, during a post-processing operation which may be completed separately from the inspection robot 100, and/or which may be performed after the inspection is completed, and/or which may be commenced while the inspection is being performed. In certain embodiments, the linking of the position data with the inspection data may be performed if the linked position-inspection data is requested—for example upon a request by a client for an inspection map. In certain embodiments, portions of the inspection data are linked to the position data at a first time, and other portions of the inspection data are linked to the position data at a later time and/or in response to post-processing operations, an inspection map request, or other subsequent event.

The example controller further includes an inspection visualization circuit that determines the inspection map in response to the inspection data and the position data, for example using post-processed information from the processed data circuit. In a further example, the inspection visualization circuit determines the inspection map in response to an inspection visualization request, for example from a client computing device. In the example, the client computing device may be communicatively coupled to the controller over the internet, a network, through the operations of a web application, and the like. In certain embodiments, the client computing device securely logs in to control access to the inspection map, and the inspection visualization circuit may prevent access to the inspection map, and/or provide only portions of the inspection map, depending upon the successful login from the client computing device, the authorizations for a given user of the client computing device, and the like.

In embodiments, the robotic vehicle may incorporate a number of sensors distributed across a number of sensor sleds 1, such as with a single sensor mounted on a single sensor sled 1, a number of sensors mounted on a single sensor sled 1, a number of sensor sleds 1 arranged in a linear configuration perpendicular to the direction of motion (e.g., side-to-side across the robotic vehicle), arranged in a linear configuration along the direction of motion (e.g., multiple sensors on a sensor sled 1 or multiple sensor sleds 1 arranged to cover the same surface location one after the other as the robotic vehicle travels). Additionally or alternatively, a number of sensors may be arranged in a two-dimensional surface area, such as by providing sensor coverage in a distributed manner horizontally and/or vertically (e.g., in the direction of travel), including offset sensor positions (e.g., reference FIG. 6). In certain embodiments, the utilization of payloads 2 with sensor sleds mounted thereon enables rapid configuration of sensor placement as desired, sleds 1 on a given payload 2 can be further adjusted, and/or sensor(s) on a given sled can be changed or configured as desired.

In certain embodiments, two payloads 2 side-by-side allow for a wide horizontal coverage of sensing for a given travel of the inspection robot 100—for example as depicted in FIG. 1. In certain embodiments, a payload 2 is coupled to the inspection robot 100 with a pin or other quick-disconnect arrangement, allowing for the payload 2 to be removed, to be reconfigured separately from the inspection robot 100, and/or to be replaced with another payload 2 configured in a desired manner. The payload 2 may additionally have a couplant connection to the inspection robot 100 (e.g., reference FIG. 17—where a single couplant connection provides coupling connectivity to all sleds 1A and 1B) and/or an electrical connection to the inspection robot 100. Each sled may include a couplant connection conduit where the couplant connection conduit is coupled to a payload couplant connection at the upstream end and is coupled to the couplant entry of the cone at the downstream end. Multiple payload couplant connections on a single payload may be coupled together to form a single couplant connection between the payload and the inspection robot. The single couplant connection per payload facilitates the changing of the payload without having to connect/disconnect the couplant line connections at each sled. The couplant connection conduit between the payload couplant connection and the couplant entry of the cone facilitates connecting/disconnecting a sled from a payload without having to connect/disconnect the couplant connection conduit from the couplant entry of the cone. The couplant and/or electrical connections may include power for the sensors as required, and/or communication coupling (e.g., a datalink or network connection). Additionally or alternatively, sensors may communicate wirelessly to the inspection robot 100 or to another computing device, and/or sensors may store data in a memory associated with the sensor, sled 1, or payload 2, which may be downloaded at a later time. Any other connection type required for a payload 2, such as compressed air, paint, cleaning solutions, repair spray solutions, or the like, may similarly be coupled from the payload 2 to the inspection robot 100.

The horizontal configuration of sleds 1 (and sensors) is selectable to achieve the desired inspection coverage. For example, sleds 1 may be positioned to provide a sled running on each of a selected number of pipes of an inspection surface, positioned such that several sleds 1 combine on a single pipe of an inspection surface (e.g., providing greater radial inspection resolution for the pipe), and/or at selected horizontal distances from each other (e.g., to provide 1 inch resolution, 2 inch resolution, 3 inch resolution, etc.). In certain embodiments, the degrees of freedom of the sensor sleds 1 (e.g., from pivots 16, 17, 18) allow for distributed sleds 1 to maintain contact and orientation with complex surfaces.

In certain embodiments, sleds 1 are articulable to a desired horizontal position. For example, quick disconnects may be provided (pins, claims, set screws, etc.) that allow for the sliding of a sled 1 to any desired location on a payload 2, allowing for any desired horizontal positioning of the sleds 1 on the payload 2. Additionally or alternatively, sleds 1 may be movable horizontally during inspection operations. For example, a worm gear or other actuator may be coupled to the sled 1 and operable (e.g., by a controller) to position the sled 1 at a desired horizontal location. In certain embodiments, only certain ones of the sleds 1 are moveable during inspection operations—for example outer sleds 1 for maneuvering past obstacles. In certain embodiments, all of the sleds 1 are moveable during inspection operations—for example to support arbitrary inspection resolution (e.g., horizontal resolution, and/or vertical resolution), to configure the inspection trajectory of the inspection surface, or for any other reason. In certain embodiments, the payload 2 is horizontally moveable before or during inspection operations. In certain embodiments, an operator or a controller configures the payload 2 and/or sled 1 horizontal positions before inspection operations (e.g., before or between inspection runs). In certain embodiments, an operator or a controller configures the payload 2 and/or sled 1 horizontal positions during inspection operations. In certain embodiments, an operator can configure the payload 2 and/or sled 1 horizontal positions remotely, for example communicating through a tether or wirelessly to the inspection robot.

The vertical configuration of sleds 1 is selectable to achieve the desired inspection coverage (e.g., horizontal resolution, vertical resolution, and/or redundancy). For example, referencing FIG. 5, multiple payloads 2 are positioned on a front side of the inspection robot 100, with forward or front payloads 2006 and rear payloads 1402. In certain embodiments, a payload 2 may include a front payload 2006 and a rear payload 1402 in a single hardware device (e.g., with a single mounting position to the inspection robot 100), and/or may be independent payloads 2 (e.g., with a bracket extending from the inspection robot 100 past the rear payload 1402 for mounting the front payloads 2006). In the example of FIG. 5, the rear payload 1402 and front payload 2006 include sleds 1 mounted thereupon which are in vertical alignment 1302—for example a given sled 1 of the rear payload 1402 traverses the same inspection position (or horizontal lane) of a corresponding sled 1 of the front payload 2006. The utilization of aligned payloads 2 provides for a number of capabilities for the inspection robot 100, including at least: redundancy of sensing values (e.g., to develop higher confidence in a sensed value); the utilization of more than one sensing calibration for the sensors (e.g., a front sensor utilizes a first calibration set, and a rear sensor utilizes a second calibration set); the adjustment of sensing operations for a rear sensor relative to a forward sensor (e.g., based on the front sensed parameter, a rear sensor can operate at an adjusted range, resolution, sampling rate, or calibration); the utilization of a rear sensor in response to a front sensor detected value (e.g., a rear sensor may be a high cost sensor-cither high power, high computing/processing requirements, an expensive sensor to operate, etc.) where the utilization of the rear sensor can be conserved until a front sensor indicates that a value of interest is detected; the operation of a repair, marking, cleaning, or other capability rear payload 1402 that is responsive to the detected values of the front payload 2006; and/or for improved vertical resolution of the sensed values (e.g., if the sensor has a given resolution of detection in the vertical direction, the front and rear payloads can be operated out of phase to provide for improved vertical resolution).

Figure 6:
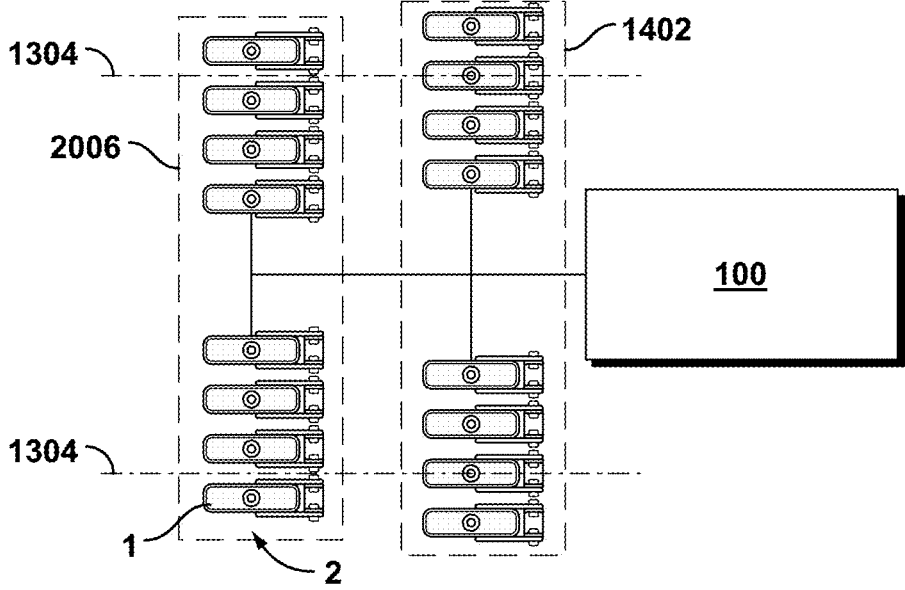
FIG. 6 is another schematic diagram of a payload arrangement, in accordance with an embodiment of the current disclosure.

In another example, referencing FIG. 6, multiple payloads 2 are positioned on the front of the inspection robot 100, with sleds 1 mounted on the front payload 2006 and rear payload 1402 that are not aligned (e.g., lane 1304 is not shared between sleds of the front payload 2006 and rear payload 1402). The utilization of not aligned payloads 2 allows for improved resolution in the horizontal direction for a given number of sleds 1 mounted on each payload 2. In certain embodiments, not aligned payloads may be utilized where the hardware space on a payload 2 is not sufficient to conveniently provide a sufficient number or spacing of sleds 1 to achieve the desired horizontal coverage. In certain embodiments, not aligned payloads may be utilized to limit the number of sleds 1 on a given payload 2, for example to provide for a reduced flow rate of couplant through a given payload-inspection robot connection, to provide for a reduced load on an electrical coupling (e.g., power supply and/or network communication load) between a given payload and the inspection robot. While the examples of FIGS. 5 and 6 depict aligned or not aligned sleds for convenience of illustration, a given inspection robot 100 may be configured with both aligned and not aligned sleds 1, for example to reduce mechanical loads, improve inspection robot balance, in response to inspection surface constraints, or the like.

It can be seen that sensors may be modularly configured on the robotic vehicle to collect data on specific locations across the surface of travel (e.g., on a top surface of an object, on the side of an object, between objects, and the like), repeat collection of data on the same surface location (e.g., two sensors serially collecting data from the same location, either with the same sensor type or different sensor types), provide predictive sensing from a first sensor to determine if a second sensor should take data on the same location at a second time during a single run of the robotic vehicle (e.g., an ultra-sonic sensor mounted on a leading sensor sled taking data on a location determines that a gamma-ray measurement should be taken for the same location by a sensor mounted on a trailing sensor sled configured to travel over the same location as the leading sensor), provide redundant sensor measurements from a plurality of sensors located in leading and trailing locations (e.g., located on the same or different sensor sleds to repeat sensor data collection), and the like.

In certain embodiments, the robotic vehicle includes sensor sleds with one sensor and sensor sleds with a plurality of sensors. A number of sensors arranged on a single sensor sled may be arranged with the same sensor type across the direction of robotic vehicle travel (e.g., perpendicular to the direction of travel, or "horizontal") to increase coverage of that sensor type (e.g., to cover different surfaces of an object, such as two sides of a pipe), arranged with the same sensor type along the direction of robotic vehicle travel (e.g., parallel to the direction of travel, or "vertical") to provide redundant coverage of that sensor type over the same location (e.g., to ensure data coverage, to enable statistical analysis based on multiple measurements over the same location), arranged with a different sensor type across the direction of robotic vehicle travel to capture a diversity of sensor data in side-by-side locations along the direction of robotic vehicle travel (e.g., providing both ultra-sonic and conductivity measurements at side-by-side locations), arranged with a different sensor type along the direction of robotic vehicle travel to provide predictive sensing from a leading sensor to a trailing sensor (e.g., running a trailing gamma-ray sensor measurement only if a leading ultra-sonic sensor measurement indicates the need to do so), combinations of any of these, and the like. The modularity of the robotic vehicle may permit exchanging sensor sleds with the same sensor configuration (e.g., replacement due to wear or failure), different sensor configurations (e.g., adapting the sensor arrangement for different surface applications), and the like.

Providing for multiple simultaneous sensor measurements over a surface area, whether for taking data from the same sensor type or from different sensor types, provides the ability to maximize the collection of sensor data in a single run of the robotic vehicle. If the surface over which the robotic vehicle was moving were perfectly flat, the sensor sled could cover a substantial surface with an array of sensors. However, the surface over which the robotic vehicle travels may be highly irregular, and have obstacles over which the sensor sleds must adjust, and so the preferred embodiment for the sensor sled is relatively small with a highly flexible orientation, as described herein, where a plurality of sensor sleds is arranged to cover an area along the direction of robotic vehicle travel. Sensors may be distributed amongst the sensor sleds as described for individual sensor sleds (e.g., single sensor per sensor sled, multiple sensors per sensor sled (arranged as described herein)), where total coverage is achieved through a plurality of sensor sleds mounted to the robotic vehicle. One such embodiment, as introduced herein, such as depicted in FIG. 1, comprises a plurality of sensor sleds arranged linearly across the direction of robotic vehicle travel, where the plurality of sensor sleds is capable of individually adjusting to the irregular surface as the robotic vehicle travels. Further, each sensor sled may be positioned to accommodate regular characteristics in the surface (e.g., positioning sensor sleds to ride along a selected portion of a pipe aligned along the direction of travel), to provide for multiple detections of a pipe or tube from a number of radial positions, sensor sleds may be shaped to accommodate the shape of regular characteristics in the surface (e.g., rounded surface of a pipe), and the like. In this way, the sensor sled arrangement may accommodate both the regular characteristics in the surface (e.g., a series of features along the direction of travel) and irregular characteristics along the surface (e.g., obstacles that the sensor sleds flexibly mitigate during travel along the surface).

Although FIG. 1 depicts a linear arrangement of sensor sleds with the same extension (e.g., the same connector arm length), another example arrangement may include sensor sleds with different extensions, such as where some sensor sleds are arranged to be positioned further out, mounted on longer connection arms. This arrangement may have the advantage of allowing a greater density of sensors across the configuration, such as where a more leading sensor sled could be positioned linearly along the configuration between two more trailing sensor sleds such that sensors are provided greater linear coverage than would be possible with all the sensor sleds positioned side-by-side. This configuration may also allow improved mechanical accommodation between the springs and connectors that may be associated with connections of sensor sleds to the arms and connection assembly (e.g., allowing greater individual movement of sensor sleds without the sensor sleds making physical contact with one another).

Figure 7:
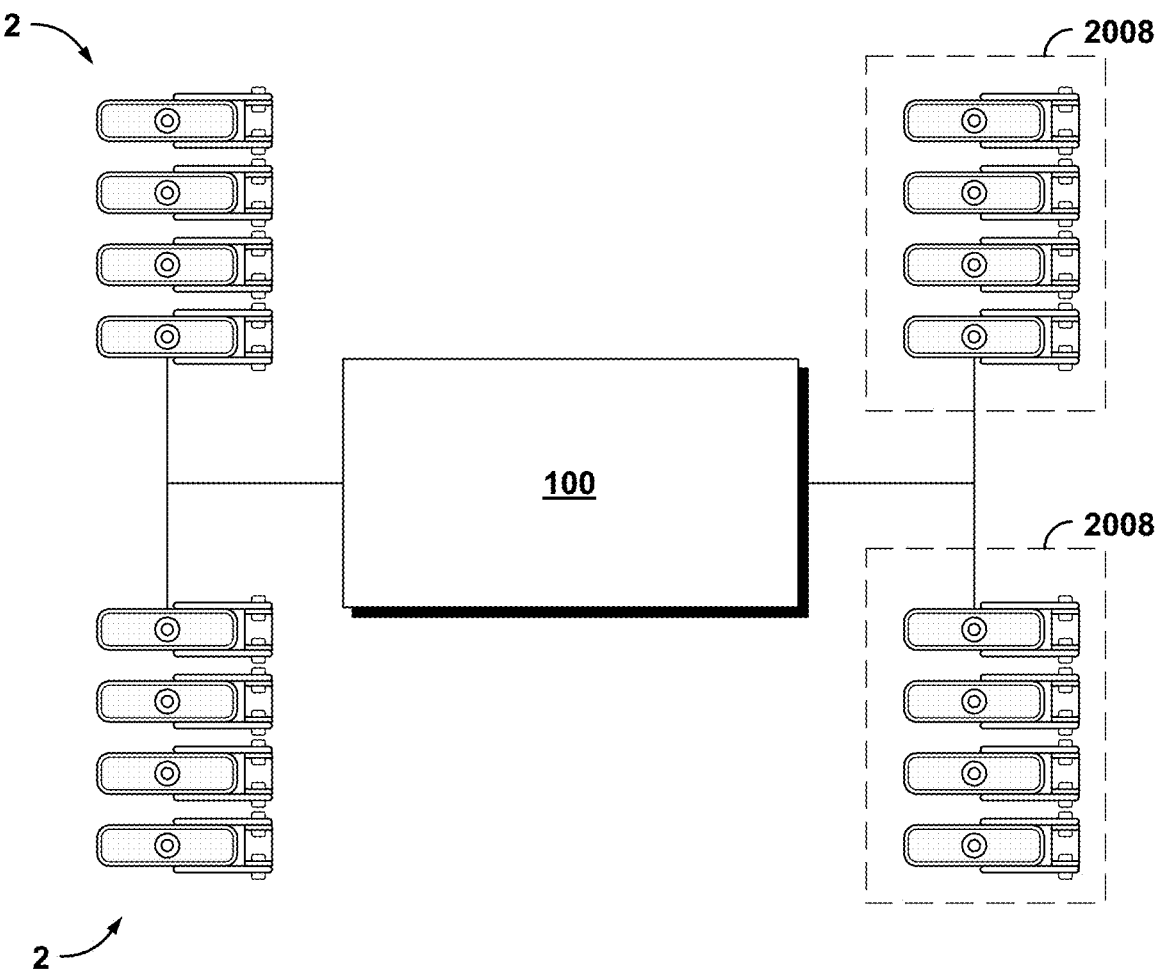
FIG. 7 is another schematic diagram of a payload arrangement, in accordance with an embodiment of the current disclosure.

Referring to FIG. 5, an example configuration of sensor sleds includes the forward sensor sled array (the front payload 2006) ahead of the rear sensor sled array (rear payload 1402), such as where each utilizes a sensor sled connector assembly for mounting the payloads. Again, although FIG. 5 depicts the sensor sleds arranged on the sensor sled connector assembly with equal length arms, different length arms may be utilized to position, for instance, sensor sleds of rear payload 1402 in intermediate positions between rear sensor sleds of rear payload 1402 and forward sensor sleds of the front payload 2006. As was the case with the arrangement of a plurality of sensors on a single sensor sled to accommodate different coverage options (e.g., maximizing coverage, predictive capabilities, redundancy, and the like), the extended area configuration of sensors in this multiple sensor sled array arrangement allows similar functionality. For instance, a sensor sled positioned in a lateral position on the front payload 2006 may provide redundant or predictive functionality for another sensor sled positioned in the same lateral position on the rear payload 1402. In the case of a predictive functionality, the greater travel distance afforded by the separation between a sensor sled mounted on the second front payload 2006 array and a sensor mounted on the rear payload 1402 array may provide for additional processing time for determining, for instance, whether the sensor in the trailing sensor sled should be activated. For example, the leading sensor collects sensor data and sends that data to a processing function (e.g., wired communication to on-board or external processing, wireless communication to external processing), the processor takes a period of time to determine if the trailing sensor should be activated, and after the determination is made, activates the trailing sensor. The separation of the two sensors, divided by the rate of travel of the robotic vehicle, determines the time available for processing. The greater the distance, the greater the processing time allowed. Referring to FIG. 7, in another example, distance is increased further by utilizing a trailing payload 2008, thus increasing the distance and processing time further. Additionally or alternatively, the hardware arrangement of FIG. 7 may provide for more convenient integration of the trailing payload 2008 rather than having multiple payloads 1402, 2006 in front of the inspection robot 100. In certain embodiments, certain operations of a payload 2 may be easier or more desirable to perform on a trailing side of the inspection robot 100—such as spraying of painting, marking, or repair fluids, to avoid the inspection robot 100 having to be exposed to such fluids as a remaining mist, by gravity flow, and/or having to drive through the painted, cleaned, or repaired area. In certain embodiments, an inspection robot 100 may additionally or alternatively include both multiple payloads 1402, 2006 in front of the inspection robot (e.g., as depicted in FIGS. 5 and 6) and/or one or more trailing payloads (e.g., as depicted in FIG. 7).

In another example, the trailing payload 2008 (e.g., sensor sled array) may provide a greater distance for functions that would benefit the system by being isolated from the sensors in the forward end of the robotic vehicle. For instance, the robotic vehicle may provide for a marking device (e.g., visible marker, UV marker, and the like) to mark the surface when a condition alert is detected (e.g., detecting corrosion or erosion in a pipe at a level exceeding a predefined threshold, and marking the pipe with visible paint).

Embodiments with multiple sensor sled connector assemblies provide configurations and area distribution of sensors that may enable greater flexibility in sensor data taking and processing, including alignment of same-type sensor sleds allowing for repeated measurements (e.g., the same sensor used in a leading sensor sled as in a trailing sensor sled, such as for redundancy or verification in data taking when leading and trailing sleds are co-aligned), alignment of different-type sensor sleds for multiple different sensor measurements of the same path (e.g., increase the number of sensor types taking data, have the lead sensor provide data to the processor to determine whether to activate the trailing sensor (e.g., ultra-sonic/gamma-ray, and the like)), off-set alignment of same-type sensor sleds for increased coverage when leading and trailing sleds are off-set from one another with respect to travel path, off-set alignment of different-type sensor sleds for trailing sensor sleds to measure surfaces that have not been disturbed by leading sensor sleds (e.g., when the leading sensor sled is using a couplant), and the like.

The modular design of the robotic vehicle may provide for a system flexible to different applications and surfaces (e.g., customizing the robot and modules of the robot ahead of time based on the application, and/or during an inspection operation), and to changing operational conditions (e.g., flexibility to changes in surface configurations and conditions, replacement for failures, reconfiguration based on sensed conditions), such as being able to change out sensors, sleds, assemblies of sleds, number of sled arrays, and the like.

Throughout the present description, certain orientation parameters are described as "horizontal," "perpendicular," and/or "across" the direction of travel of the inspection robot, and/or described as "vertical," "parallel," and/or in line with the direction of travel of the inspection robot. It is specifically contemplated herein that the inspection robot may be travelling vertically, horizontally, at oblique angles, and/or on curves relative to a ground-based absolute coordinate system. Accordingly, except where the context otherwise requires, any reference to the direction of travel of the inspection robot is understood to include any orientation of the robot-such as an inspection robot traveling horizontally on a floor may have a "vertical" direction for purposes of understanding sled distribution that is in a "horizontal" absolute direction. Additionally, the "vertical" direction of the inspection robot may be a function of time during inspection operations and/or position on an inspection surface—for example as an inspection robot traverses over a curved surface. In certain embodiments, where gravitational considerations or other context based aspects may indicate-vertical indicates an absolute coordinate system vertical—for example in certain embodiments where couplant flow into a cone is utilized to manage bubble formation in the cone. In certain embodiments, a trajectory through the inspection surface of a given sled may be referenced as a "horizontal inspection lane"—for example, the track that the sled takes traversing through the inspection surface.

Certain embodiments include an apparatus for acoustic inspection of an inspection surface with arbitrary resolution. Arbitrary resolution, as utilized herein, includes resolution of features in geometric space with a selected resolution—for example resolution of features (e.g., cracks, wall thickness, anomalies, etc.) at a selected spacing in horizontal space (e.g., perpendicular to a travel direction of an inspection robot) and/or vertical space (e.g., in a travel direction of an inspection robot). While resolution is described in terms of the travel motion of an inspection robot, resolution may instead be considered in any coordinate system, such as cylindrical or spherical coordinates, and/or along axes unrelated to the motion of an inspection robot. It will be understood that the configurations of an inspection robot and operations described in the present disclosure can support arbitrary resolution in any coordinate system, with the inspection robot providing sufficient resolution as operated, in view of the target coordinate system. Accordingly, for example, where inspection resolution of 6-inches is desired in a target coordinate system that is diagonal to the travel direction of the inspection robot, the inspection robot and related operations described throughout the present disclosure can support whatever resolution is required (whether greater than 6-inches, less than 6-inches, or variable resolution depending upon the location over the inspection surface) to facilitate the 6-inch resolution of the target coordinate system. It can be seen that an inspection robot and/or related operations capable of achieving an arbitrary resolution in the coordinates of the movement of the inspection robot can likewise achieve arbitrary resolution in any coordinate system for the mapping of the inspection surface. For clarity of description, apparatus, and operations to support an arbitrary resolution are described in view of the coordinate system of the movement of an inspection robot.

An example apparatus to support acoustic inspection of an inspection surface includes an inspection robot having a payload and a number of sleds mounted thereon, with the sleds each having at least one acoustic sensor mounted thereon. Accordingly, the inspection robot is capable of simultaneously determining acoustic parameters at a range of positions horizontally. Sleds may be positioned horizontally at a selected spacing, including providing a number of sleds to provide sensors positioned radially around several positions on a pipe or other surface feature of the inspection surface. In certain embodiments, vertical resolution is supported according to the sampling rate of the sensors, and/or the movement speed of the inspection robot. Additionally or alternatively, the inspection robot may have vertically displaced payloads, having an additional number of sleds mounted thereon, with the sleds each having at least one acoustic sensor mounted thereon. The utilization of additional vertically displaced payloads can provide additional resolution, either in the horizontal direction (e.g., where sleds of the vertically displaced payload(s) are offset from sleds in the first payload(s)) and/or in the vertical direction (e.g., where sensors on sleds of the vertically displaced payload(s) are sampling such that sensed parameters are vertically offset from sensors on sleds of the first payload(s)). Accordingly, it can be seen that, even where physical limitations of sled spacing, numbers of sensors supported by a given payload, or other considerations limit horizontal resolution for a given payload, horizontal resolution can be enhanced through the utilization of additional vertically displaced payloads. In certain embodiments, an inspection robot can perform another inspection run over a same area of the inspection surface, for example with sleds tracking in an offset line from a first run, with positioning information to ensure that both horizontal and/or vertical sensed parameters are offset from the first run.

Accordingly, an apparatus is provided that achieves significant resolution improvements, horizontally and/or vertically, over previously known systems. Additionally or alternatively, an inspection robot performs inspection operations at distinct locations on a descent operation than on an ascent operation, providing for additional resolution improvements without increasing a number of run operations required to perform the inspection (e.g., where an inspection robot ascends an inspection surface, and descends the inspection surface as a normal part of completing the inspection run). In certain embodiments, an apparatus is configured to perform multiple run operations to achieve the selected resolution. It can be seen that the greater the number of inspection runs required to achieve a given spatial resolution, the longer the down time for the system (e.g., an industrial system) being inspected (where a shutdown of the system is required to perform the inspection), the longer the operating time and greater the cost of the inspection, and/or the greater chance that a failure occurs during the inspection. Accordingly, even where multiple inspection runs are required, a reduction in the number of the inspection runs is beneficial.

In certain embodiments, an inspection robot includes a low fluid loss couplant system, enhancing the number of sensors that are supportable in a given inspection run, thereby enhancing available sensing resolution. In certain embodiments, an inspection robot includes individual down force support for sleds and/or sensors, providing for reduced fluid loss, reduced off-nominal sensing operations, and/or increasing the available number of sensors supportable on a payload, thereby enhancing available sensing resolution. In certain embodiments, an inspection robot includes a single couplant connection for a payload, and/or a single couplant connection for the inspection robot, thereby enhancing reliability and providing for a greater number of sensors on a payload and/or on the inspection robot that are available for inspections under commercially reasonable operations (e.g., configurable for inspection operations with reasonable reliability, checking for leaks, expected to operate without problems over the course of inspection operations, and/or do not require a high level of skill or expensive test equipment to ensure proper operation). In certain embodiments, an inspection robot includes acoustic sensors coupled to acoustic cones, enhancing robust detection operations (e.g., a high percentage of valid sensing data, case of acoustic coupling of a sensor to an inspection surface, etc.), reducing couplant fluid losses, and/or casing integration of sensors with sleds, thereby supporting an increased number of sensors per payload and/or inspection robot, and enhancing available sensing resolution. In certain embodiments, an inspection robot includes utilizing water as a couplant, thereby reducing fluid pumping losses, reducing risks due to minor leaks within a multiple plumbing line system to support multiple sensors, and/or reducing the impact (environmental, hazard, clean-up, etc.) of performing multiple inspection runs and/or performing an inspection operation with a multiplicity of acoustic sensors operating.

Example and non-limiting configuration adjustments include changing of sensing parameters such as cut-off times to observe peak values for ultra-sonic processing, adjustments of rationality values for ultra-sonic processing, enabling of trailing sensors or additional trailing sensors (e.g., X-ray, gamma ray, high resolution camera operations, etc.), adjustment of a sensor sampling rate (e.g., faster or slower), adjustment of fault cut-off values (e.g., increase or decrease fault cutoff values), adjustment of any transducer configurable properties (e.g., voltage, waveform, gain, filtering operations, and/or return detection algorithm), and/or adjustment of a sensor range or resolution value (e.g., increase a range in response to a lead sensing value being saturated or near a range limit, decrease a range in response to a lead sensing value being within a specified range window, and/or increase or decrease a resolution of the trailing sensor). In certain embodiments, a configuration adjustment to adjust a sampling rate of a trailing sensor includes by changing a movement speed of an inspection robot. It can be seen that the knowledge gained from the lead inspection data can be utilized to adjust the trailing sensor plan which can result more reliable data (e.g., where calibration assumptions appear to be off-nominal for the real inspection surface), the saving of one or more inspection runs (e.g., reconfiguring the sensing plan in real-time to complete a successful sensing run during inspection operations), improved operations for a subsequent portion of a sensing run (e.g., a first inspection run of the inspection surface improves the remaining inspection runs, even if the vertical track of the first inspection run must be repeated), and/or efficient utilization of expensive sensing operations by utilizing such operations only when the lead inspection data indicates such operations are useful or required. The example controller includes a sensor operation circuit that adjusts parameters of the trailing sensor in response to the configuration adjustment, and the inspection data circuit interpreting trailing inspection data, wherein the trailing sensors are responsive to the adjusted parameters by the sensor operation circuit.

An example apparatus is disclosed to perform an inspection of an industrial surface. Many industrial surfaces are provided in hazardous locations, including without limitation where heavy or dangerous mechanical equipment operates, in the presence of high temperature environments, in the presence of vertical hazards, in the presence of corrosive chemicals, in the presence of high pressure vessels or lines, in the presence of high voltage electrical conduits, equipment connected to and/or positioned in the vicinity of an electrical power connection, in the presence of high noise, in the presence of confined spaces, and/or with any other personnel risk feature present. Accordingly, inspection operations often include a shutdown of related equipment, and/or specific procedures to mitigate fall hazards, confined space operations, lockout-tagout procedures, or the like. In certain embodiments, the utilization of an inspection robot allows for an inspection without a shutdown of the related equipment. In certain embodiments, the utilization of an inspection robot allows for a shutdown with a reduced number of related procedures that would be required if personnel were to perform the inspection. In certain embodiments, the utilization of an inspection robot provides for a partial shutdown to mitigate some factors that may affect the inspection operations and/or put the inspection robot at risk, but allows for other operations to continue. For example, it may be acceptable to position the inspection robot in the presence of high pressure or high voltage components, but operations that generate high temperatures may be shut down.

In certain embodiments, the utilization of an inspection robot provides additional capabilities for operation. For example, an inspection robot having positional sensing within an industrial environment can request shutdown of only certain aspects of the industrial system that are related to the current position of the inspection robot, allowing for partial operations as the inspection is performed. In another example, the inspection robot may have sensing capability, such as temperature sensing, where the inspection robot can opportunistically inspect aspects of the industrial system that are available for inspection, while avoiding other aspects or coming back to inspect those aspects when operational conditions allow for the inspection. Additionally, in certain embodiments, it is acceptable to risk the industrial robot (e.g., where shutting down operations exceed the cost of the loss of the industrial robot) to perform an inspection that has a likelihood of success, where such risks would not be acceptable for personnel. In certain embodiments, a partial shutdown of a system has lower cost than a full shutdown, and/or can allow the system to be kept in a condition where restart time, startup operations, etc. are at a lower cost or reduced time relative to a full shutdown. In certain embodiments, the enhanced cost, time, and risk of performing additional operations beyond mere shutdown, such as compliance with procedures that would be required if personnel were to perform the inspection, can be significant.

Figure 18:
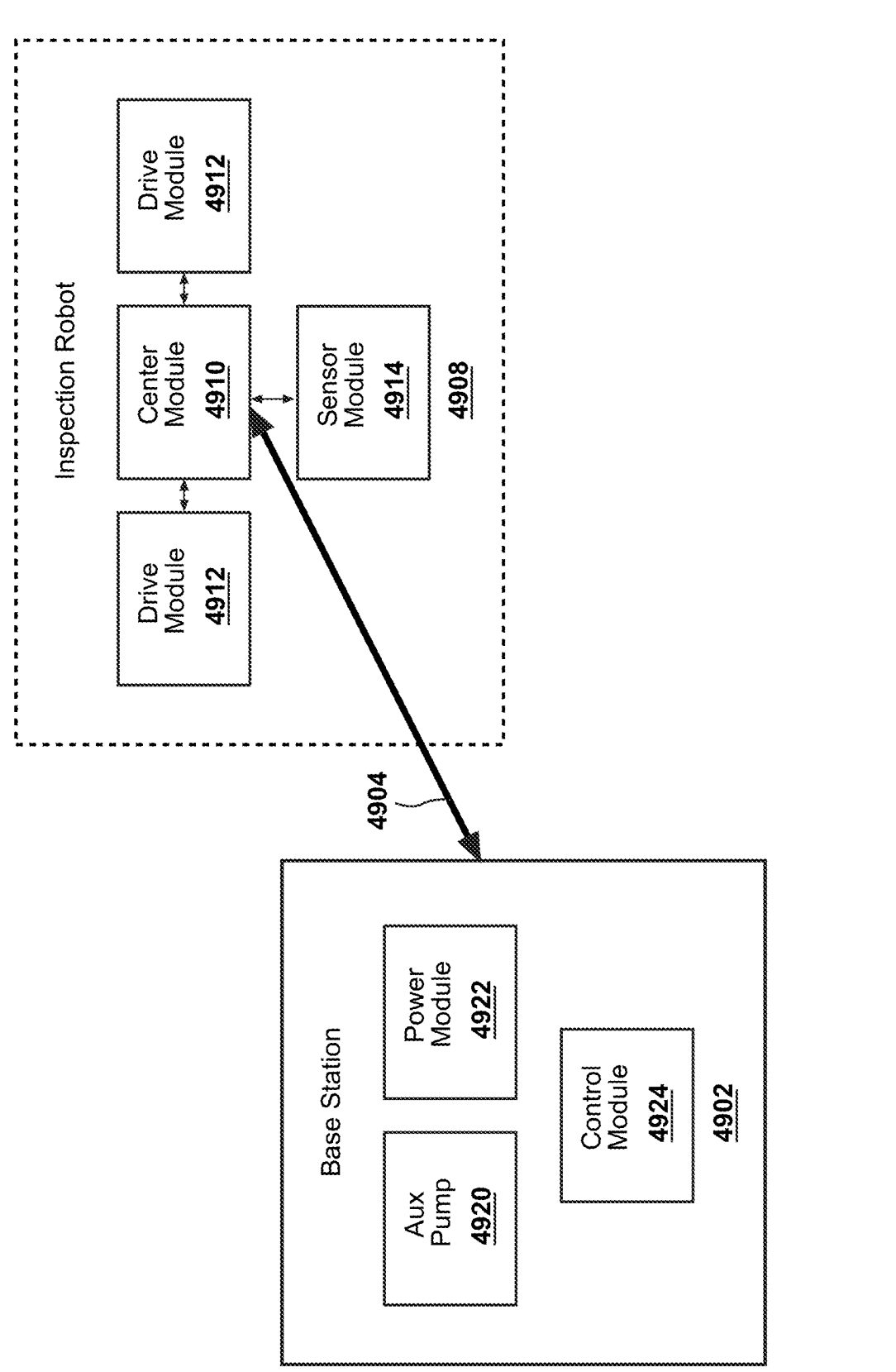
FIG. 18 depicts a schematic of an example system including a base station and an inspection robot, in accordance with an embodiment of the current disclosure.

As shown in FIG. 18, a system may comprise a base station 4902 connected by a tether 4904 to a center module 4910 of a robot 4908 used to traverse an industrial surface. The tether 4904 may be a conduit for power, fluids, control, and data communications between the base station 4902 and the robot 4908. The robot 4908 may include a center module 4910 connected to one or more drive modules 4912 which enable the robot 4908 to move along an industrial surface. The center module 4910 may be coupled to one or more sensor modules 4914 for measuring an industrial surface—for example, the sensor modules 4914 may be positioned on a drive module 4912, on the payload, in the center body housing, and/or aspects of a sensor module 4914 may be distributed among these. An example embodiment includes the sensor modules 4914 each positioned on an associated drive module 4912, and electrically coupled to the center module 4910 for power, communications, and and/or control. The base station 4902 may include an auxiliary pump 4920, a control module 4924 and a power module 4922. The example robot 4908 may be an inspection robot, which may include any one or more of the following features: inspection sensors, cleaning tools, and/or repair tools. In certain embodiments, it will be understood that an inspection robot 4908 is configured to perform only cleaning and/or repair operations, and/or may be configured for sensing, inspection, cleaning, and/or repair operations at different operating times (e.g., performing one type of operation at a first operating time, and performing another type of operation at a second operating time), and/or may be configured to perform more than one of these operations in a single run or traversal of an industrial surface (e.g., the "inspection surface"). The modules 4910, 4912, 4914, 4922, 4924 are configured to functionally execute operations described throughout the present disclosure, and may include any one or more hardware aspects as described herein, such as sensors, actuators, circuits, drive wheels, motors, housings, payload configurations, and the like.

Figure 19:
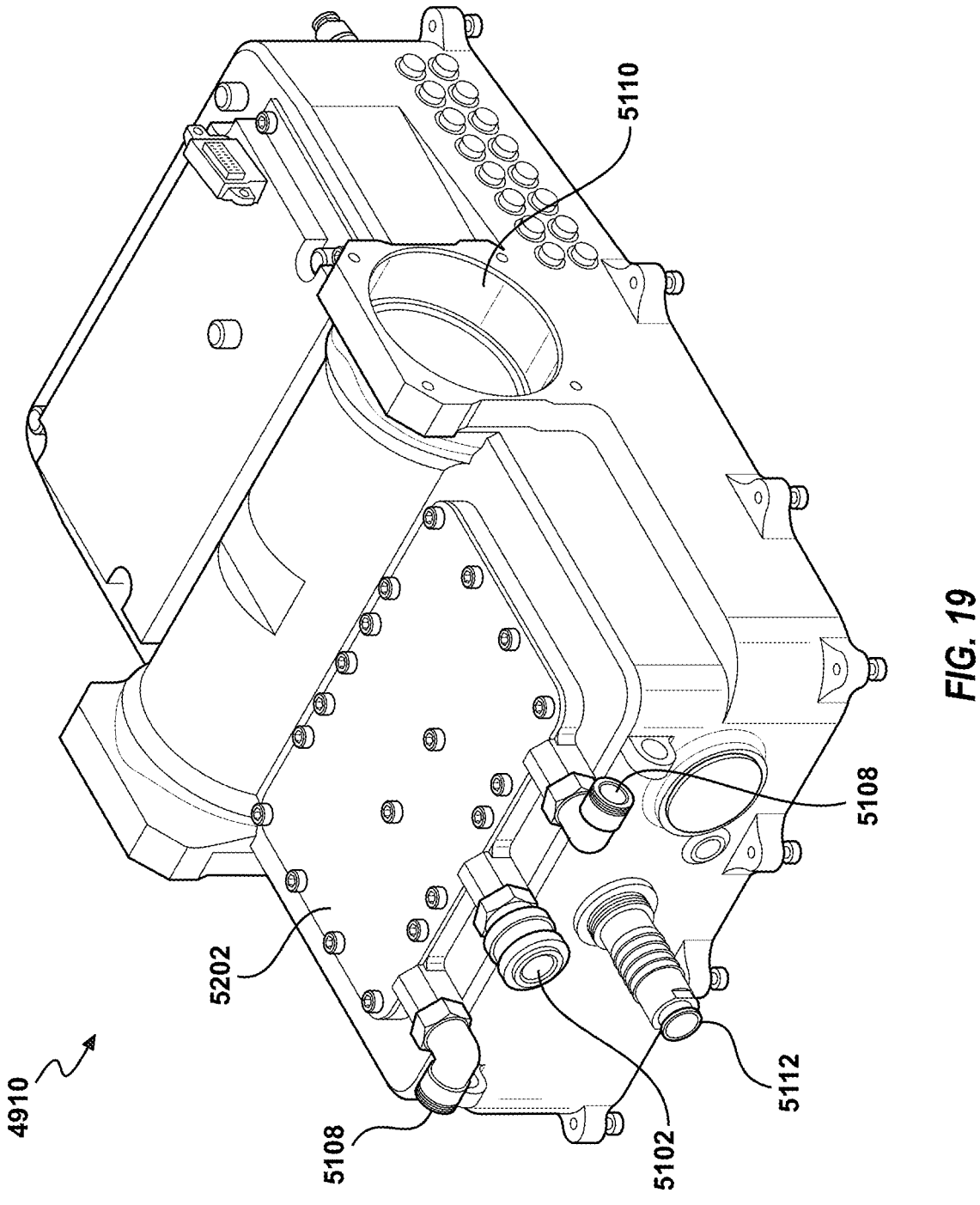
FIG. 19 depicts an example bottom surface of the center module, in accordance with an embodiment of the current disclosure.

Referring to FIGS. 19, the bottom surface of the center module 4910 may include a cold plate 5202 to disperse heat built up by electronics in the center module 4910. Couplant transferred from the base station 4902 using the tether 4904 may be received at the couplant inlet 5102 where it then flows through a manifold (internal to the center module and in contact with the cold plate) where the couplant may transfer excess heat away from the center module 4910. The manifold may also split the water into multiple streams for output through two or more couplant outlets 5108. The utilization of the cold plate 5202 and heat transfer to couplant passing through the center body as a part of operations of the inspection robot provides for greater capability and reliability of the inspection robot by providing for improved heat rejection for heat generating components (e.g., power electronics and circuits), while adding minimal weight to the robot and tether.

The strength of magnets in the drive wheels may be such that each wheel is capable of supporting the weight of the robot even if the other wheels lose contact with the surface. In certain embodiments, the wheels on the stability module may be magnetic, helping the stability module engage or "snap" into place upon receiving downward pressure from the gas spring or actuator. In certain embodiments, the stability module limits the rearward rotation of the inspection robot, for example if the front wheels of the inspection robot encounter a non-magnetic or dirty surface and lose contact. In certain embodiments, a stability module can return the front wheels to the inspection surface (e.g., by actuating and rotating the front of the inspection robot again toward the surface, which may be combined with backing the inspection robot onto a location of the inspection surface where the front wheels will again encounter a magnetic surface).

Figure 20:
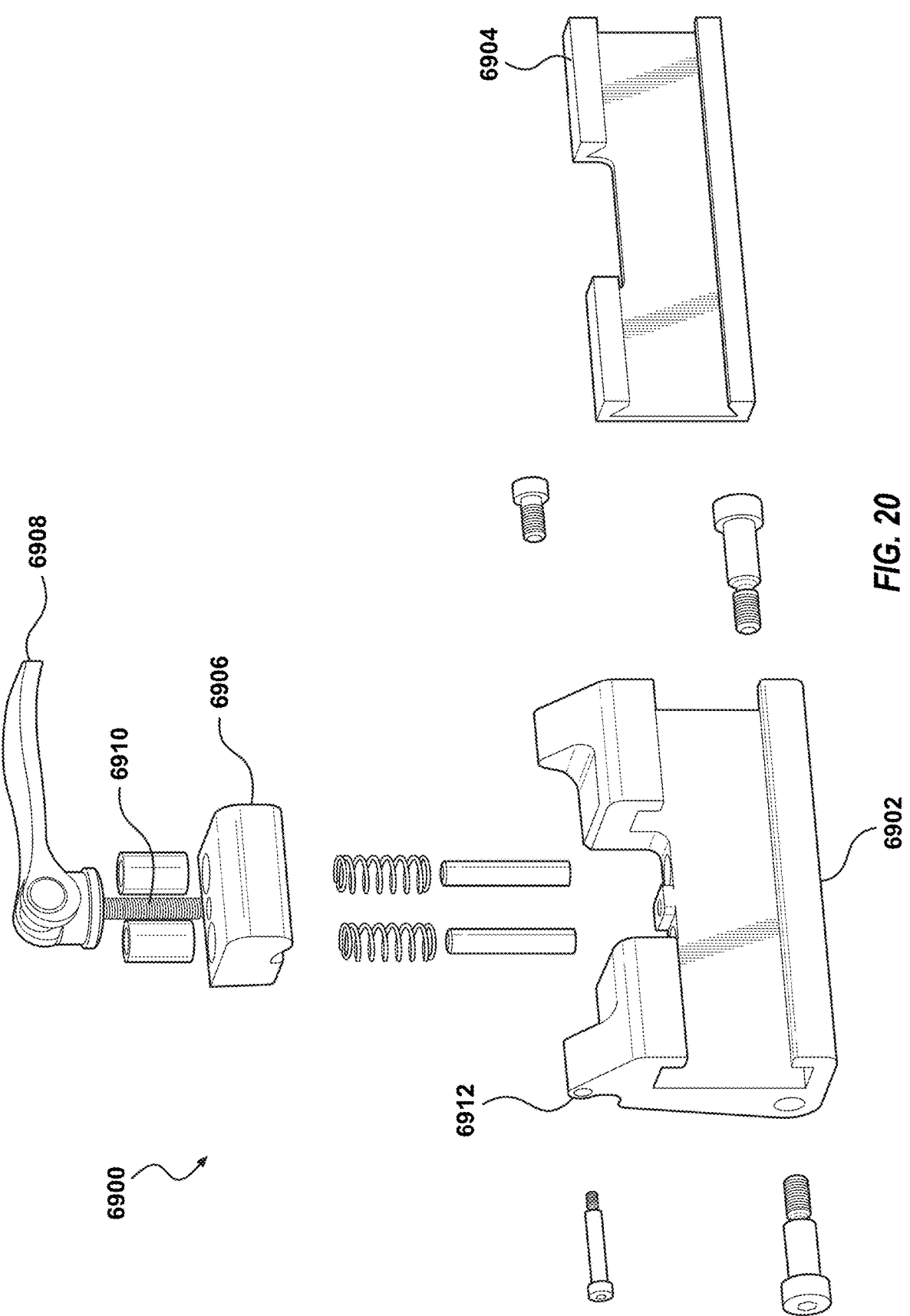
FIG. 20 depicts an exploded view of a dovetail payload rail mount assembly, in accordance with an embodiment of the current disclosure.
Figure 21:
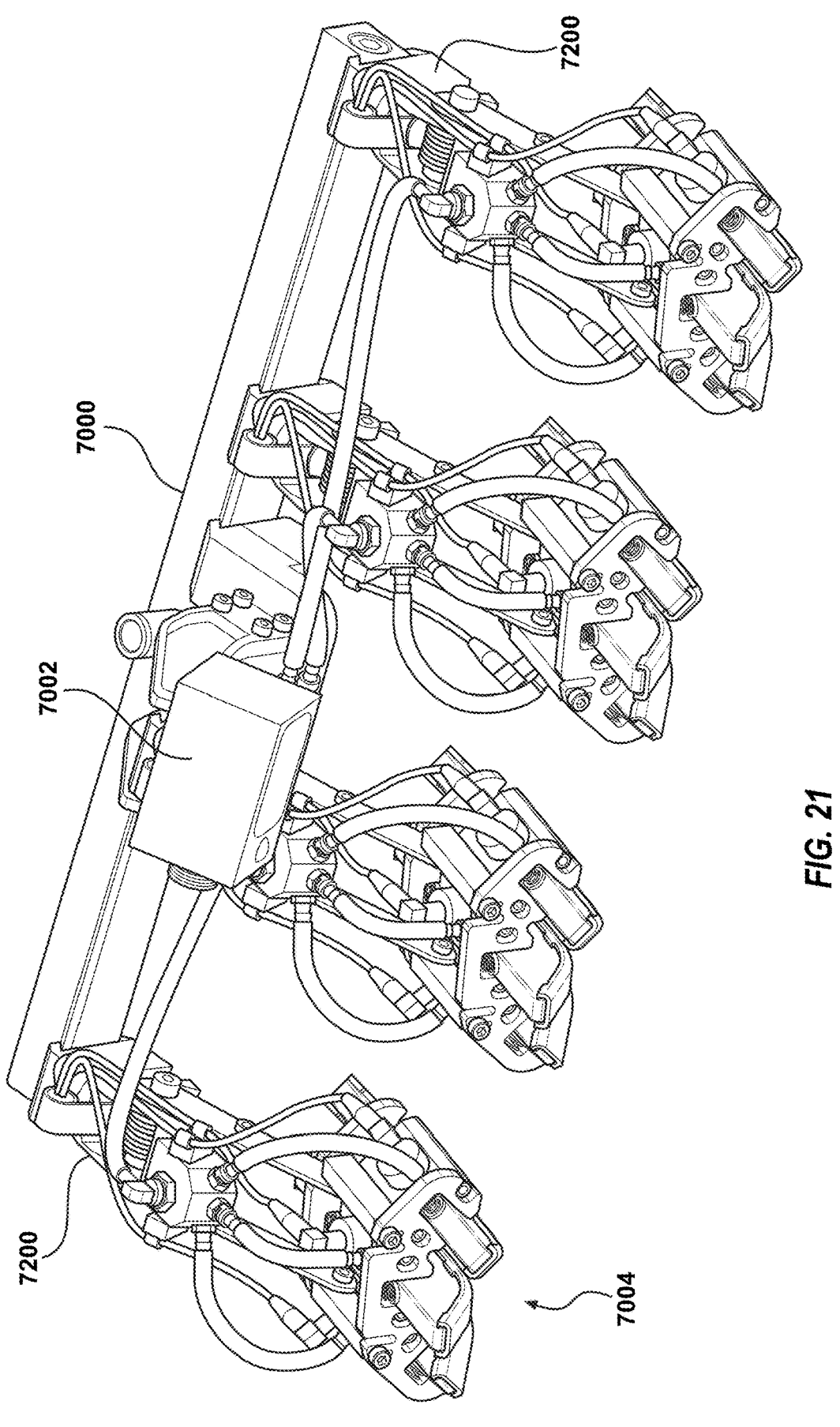
FIG. 21 depicts a payload with sensor carriages and an inspection camera, in accordance with an embodiment of the current disclosure.

Referring to FIG. 20, a drive module (and/or the center body) may include one or more payload mount assemblies 6900. The payload mount assembly 6900 may include a rail mounting block 6902 with a wear resistant sleeve 6904 and a rail actuator connector 6912. Once a rail of the payload is slid into position, a dovetail clamping block 6906 may be screwed down with a thumbscrew 6910 to hold the rail in place with a cam-lock clamping handle 6908. The wear resistant sleeve 6904 may be made of Polyoxymethylene (POM), a low friction, strong, high stiffness material such as Delrin, Celecon, Ramtal, Duracon, and the like. The wear resistant sleeve 6904 allows the sensor to easily slide laterally within the rail mounting block 6902. The geometry of the dovetail clamping block 6906 limits lateral movement of the rail once it is clamped in place. However, when unclamped, it is easy to slide the rail off to change the rail. In another embodiment, the rail mounting block may allow for open jawed, full rail coupling allowing the rail to be rapidly attached and detached without the need for sliding into position.

Figure 22:
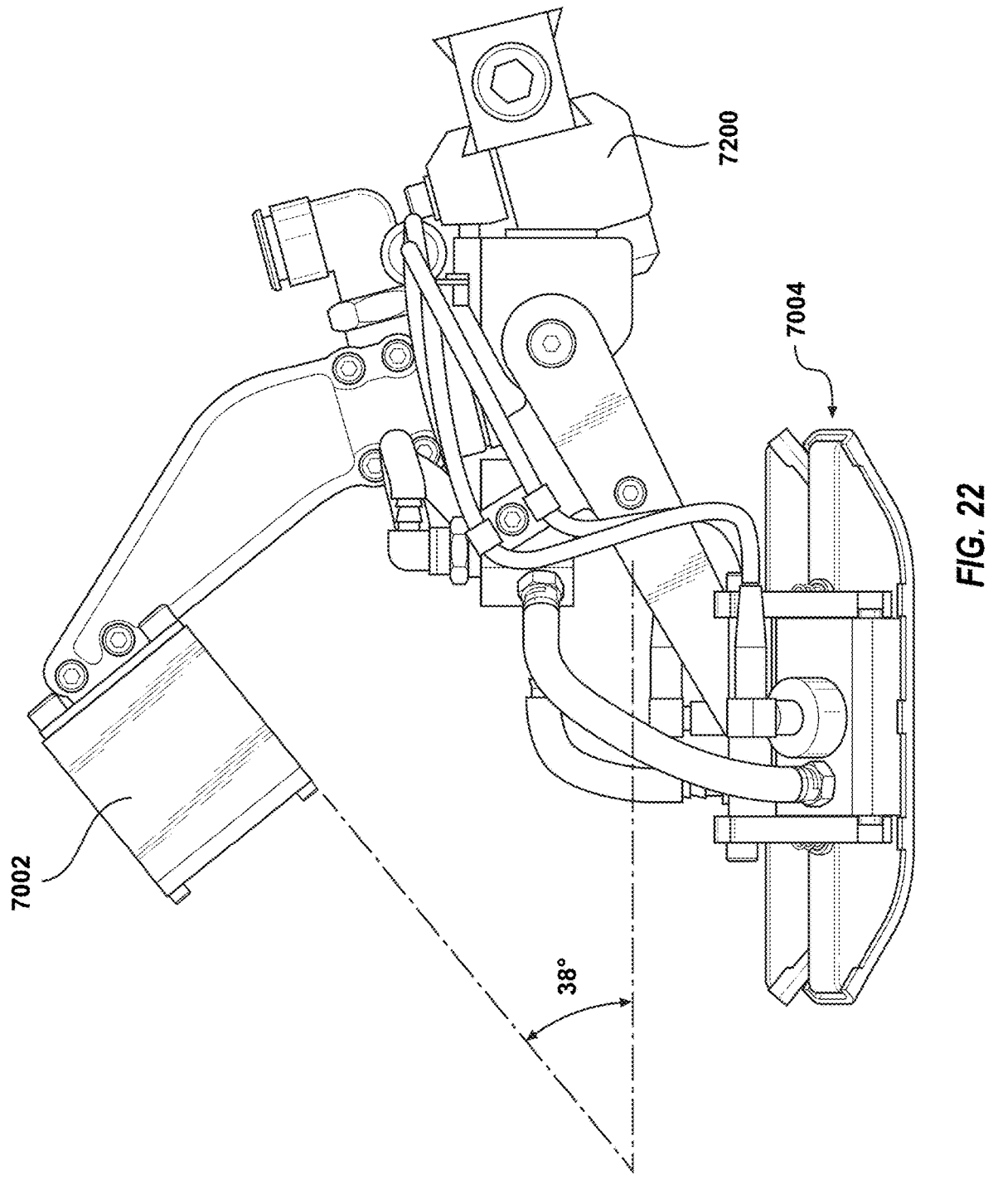
FIG. 22 depicts an example side view of a payload and inspection camera, in accordance with an embodiment of the current disclosure.
Figures 23, 24:
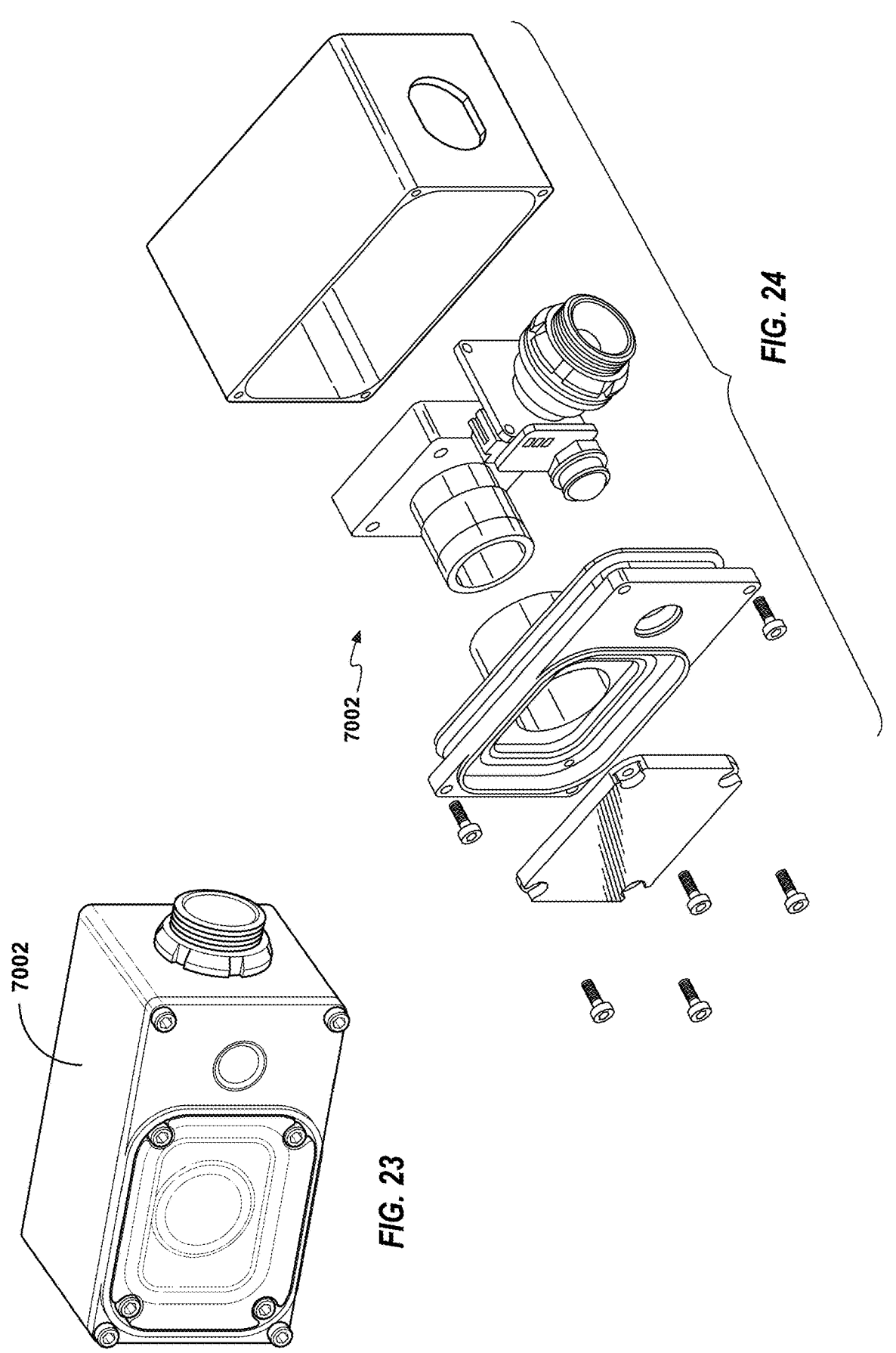
FIGS. 23-24 depict details of an example inspection camera, in accordance with an embodiment of the current disclosure.

Referring to FIGS. 21-24, an example of a rail 7000 is seen with a plurality of sensor carriages 7004 attached and an inspection camera 7002 attached. As shown in FIG. 22, the inspection camera 7002 may be aimed downward (e.g., at 38 degrees) such that it captures an image of the inspection surface that can be coordinated with sensor measurements. The inspection video captured may be synchronized with the sensor data and/or with the video captured by the navigation cameras on the center module. The inspection camera 7002 may have a wide field of view such that the image captured spans the width of the payload and the surface measured by all of the sensor carriages 7004 on the rail 7000.

The length of the rail may be designed to according to the width of sensor coverage to be provided in a single pass of the inspection robot, the size and number of sensor carriages, the total weight limit of the inspection robot, the communication capability of the inspection robot with the base station (or other communicated device), the deliverability of couplant to the inspection robot, the physical constraints (weight, deflection, etc.) of the rail and/or the clamping block, and/or any other relevant criteria. A rail may include one or more sensor carriage clamps 7200 having joints with several degrees of freedom for movement to allow the robot to continue even if one or more sensor carriages encounter unsurmountable obstacles (e.g., the entire payload can be raised, the sensor carriage can articulate vertically and raise over the obstacle, and/or the sensor carriage can rotate and traverse around the obstacle).

The rail actuator connector 6912 may be connected to a rail (payload) actuator which is able to provide a configurable down—force on the rail 7000 and the attached sensor carriages 7004 to assure contact and/or desired engagement angle with the inspection surface. The payload actuator may facilitate engaging and disengaging the rail 7000 (and associated sensor carriages 7004) from the inspection surface to facilitate obstacle avoidance, angle transitions, engagement angle, and the like. Rail actuators may operate independently of one another. Thus, rail engagement angle may vary between drive modules on either side of the center module, between front and back rails on the same drive module, and the like.

Figure 26:
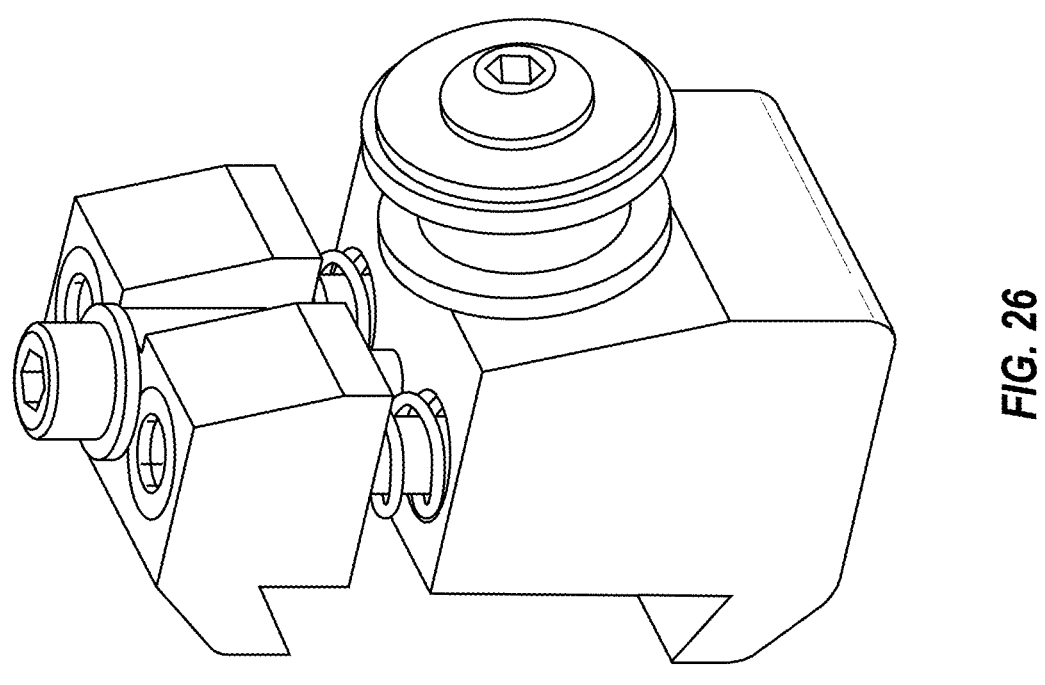
FIGS. 25-26 depict clamped and un-clamped views of a sensor clamp, in accordance with an embodiment of the current disclosure.
Figure 25:
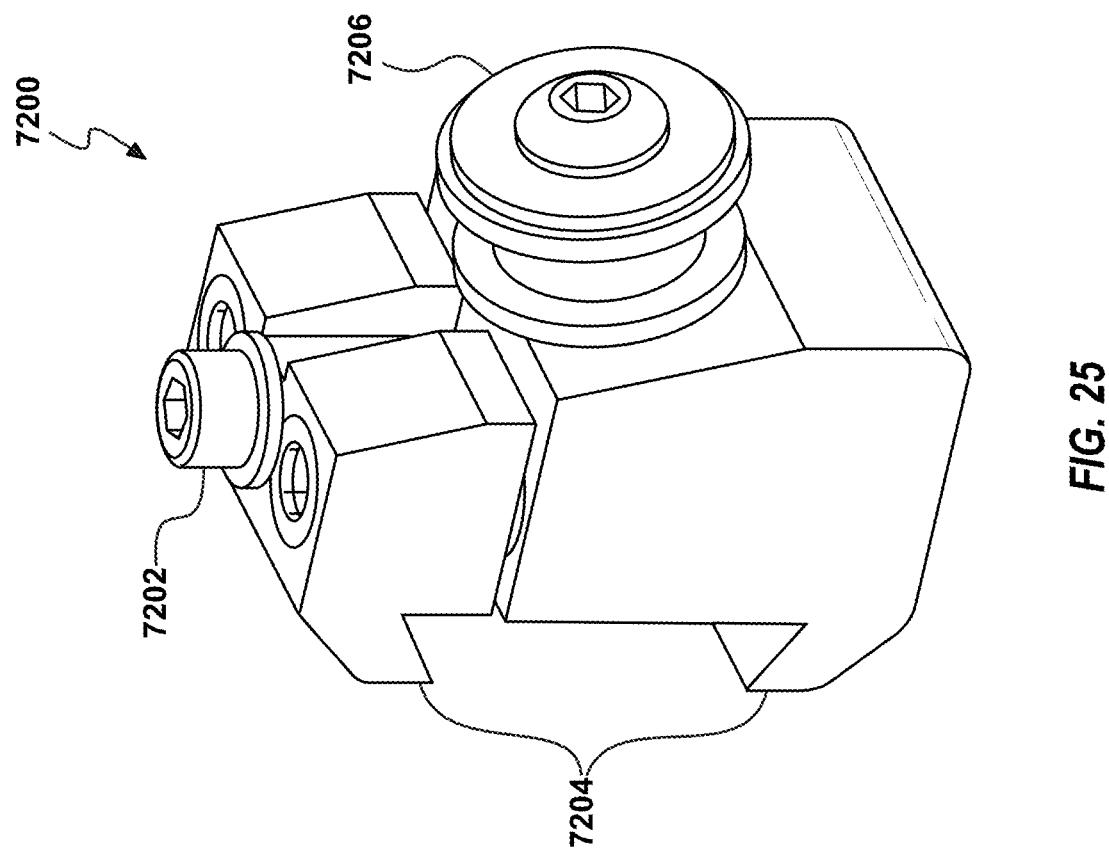
Figure 27:
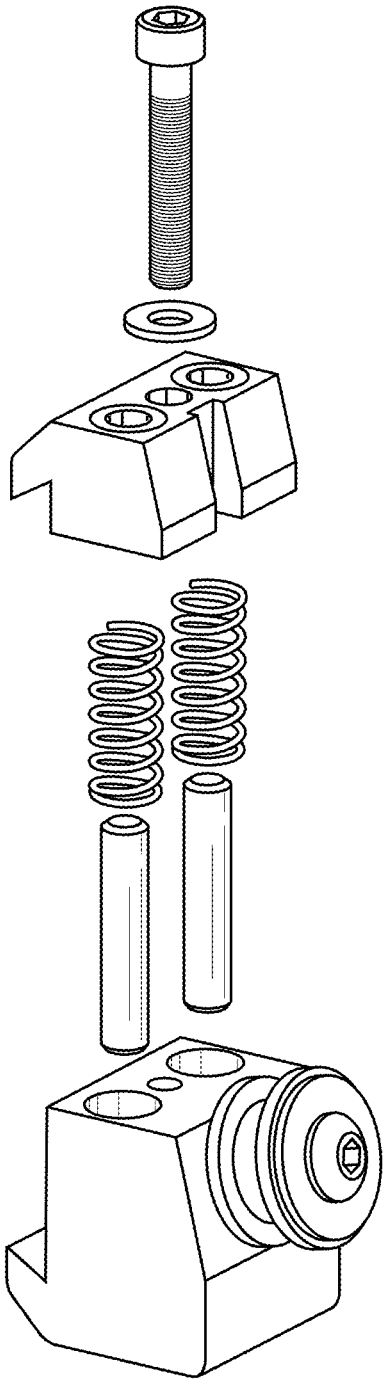
FIG. 27 depicts an exploded view of a sensor carriage clamp, in accordance with an embodiment of the current disclosure.

Referring to FIGS. 25-27, a sensor carriage clamp 7200 may allow sensor carriages 7004 to be easily added individually to the rail (payload) 7000 without disturbing other sensor carriages 7004. A simple sensor set screw 7202 tightens the sensor clamp edges 7204 of the sensor carriage clamp 7200 over the rail. In the example of FIGS. 25-27, a sled carriage mount 7206 provides a rotational degree of freedom for movement.

Figure 28:
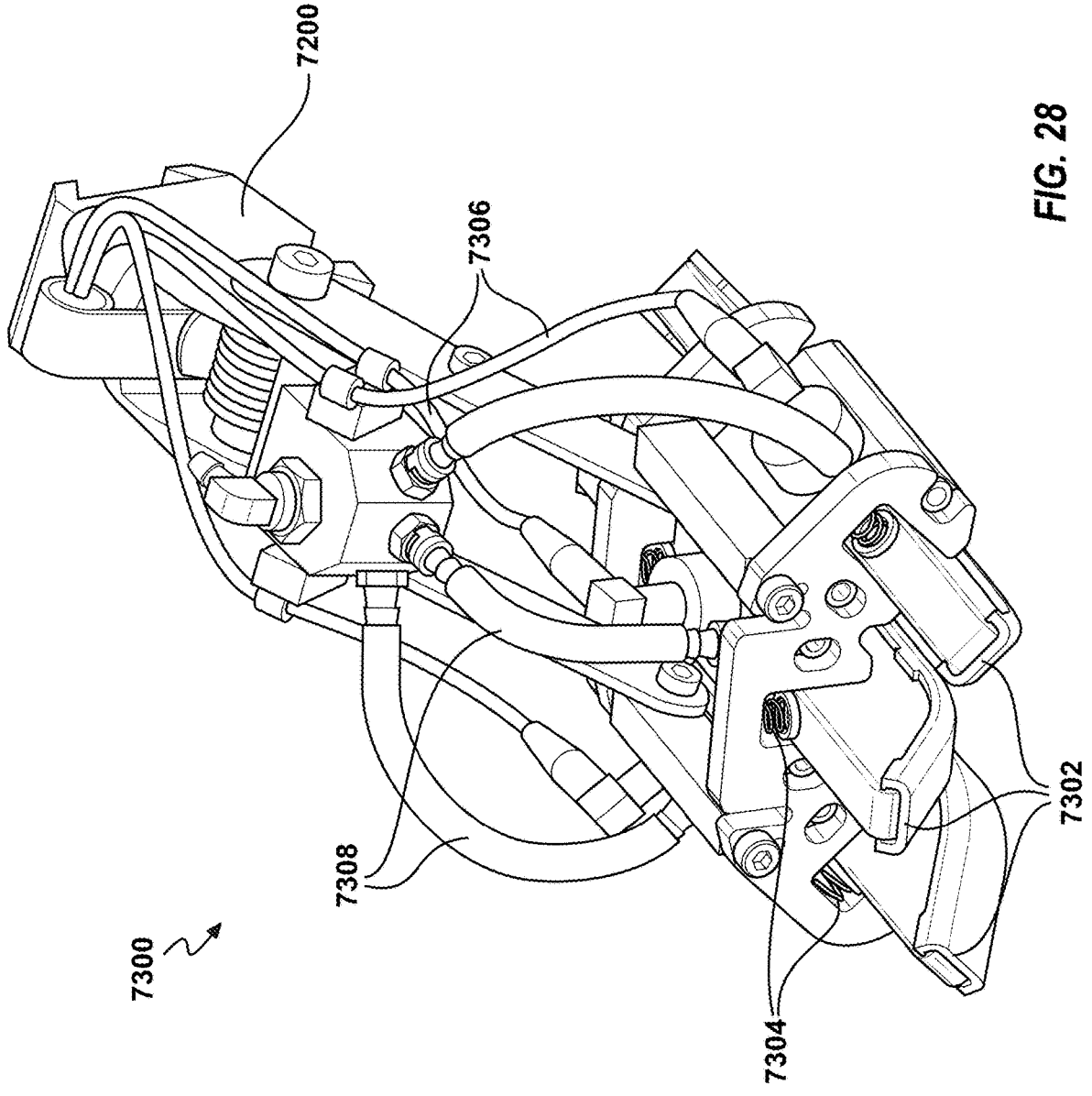
FIG. 28 depicts a sensor carriage having a multi-sensor sled assembly, in accordance with an embodiment of the current disclosure.

FIG. 28 depicts a multi-sensor sled carriage 7004, 7300. The embodiment of FIG. 28 depicts multiple sleds arranged on a sled carriage, but any features of a sled, sled arm, and/or payload described throughout the present disclosure may otherwise be present in addition to, or as alternatives to, one or more features of the multi-sensor sled carriage 7004, 7300. The multi-sensor sled carriage 7300 may include a multiple sled assembly, each sensor sled 7302 having a sled spring 7304 at the front and back (relative to direction of travel) to enable the sensor sled 7302 to tilt or move in and out to accommodate the contour of the inspection surface, traverse obstacles, and the like. The multi-sensor sled carriage 7300 may include multiple communication conduits (or power/data connectors) 7306, one running to each sensor sled 7302, to power the sensor and transfer acquired data back to the robot. Depending on the sensor type, the multi-sensor sled carriage 7300 may include multiple couplant lines 7308 providing couplant to each sensor sled 7302 requiring couplant.

Figure 29:
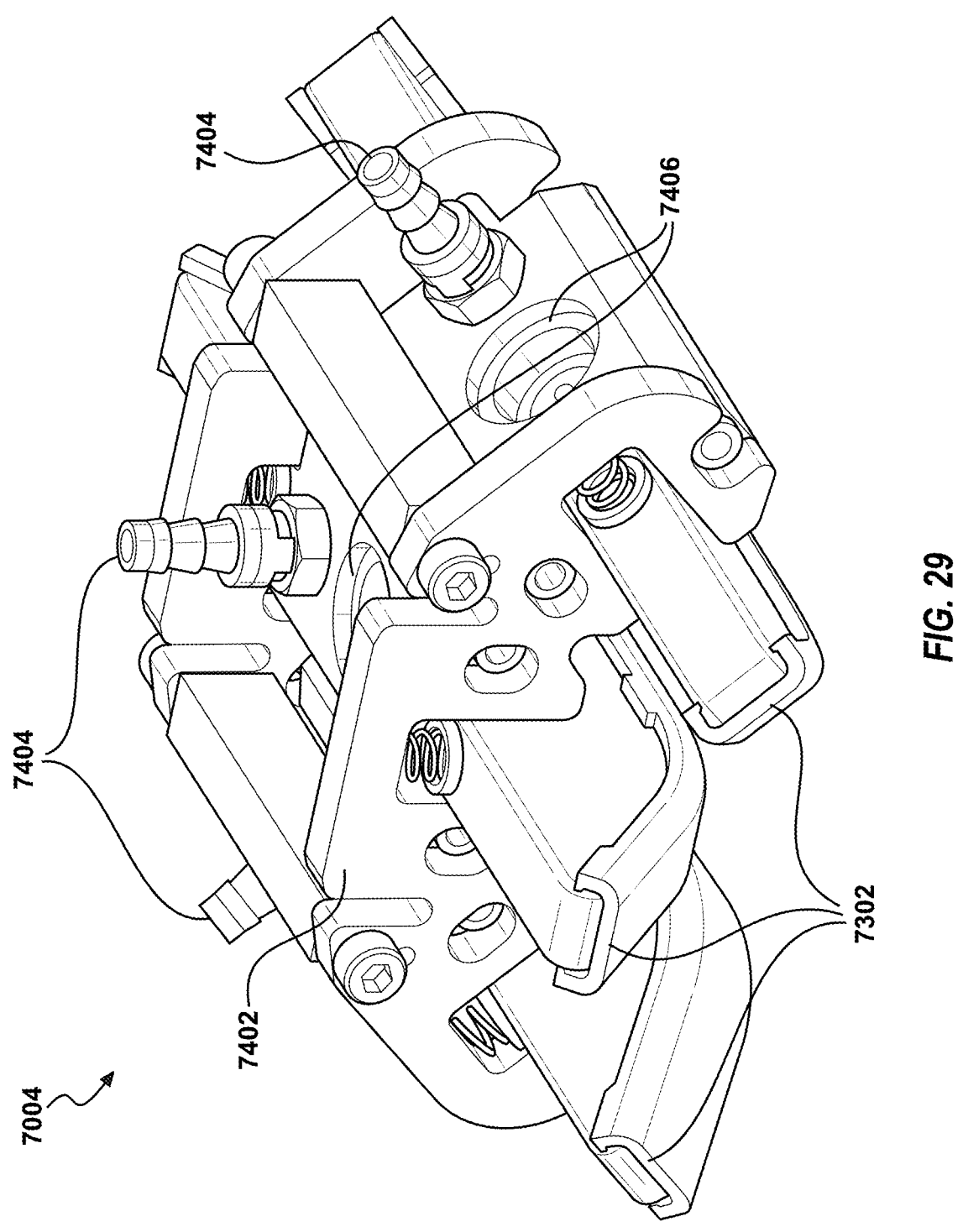
FIGS. 29-30 depict views of two different sized multi-sensor sled assemblies, in accordance with an embodiment of the current disclosure.
Figure 30:
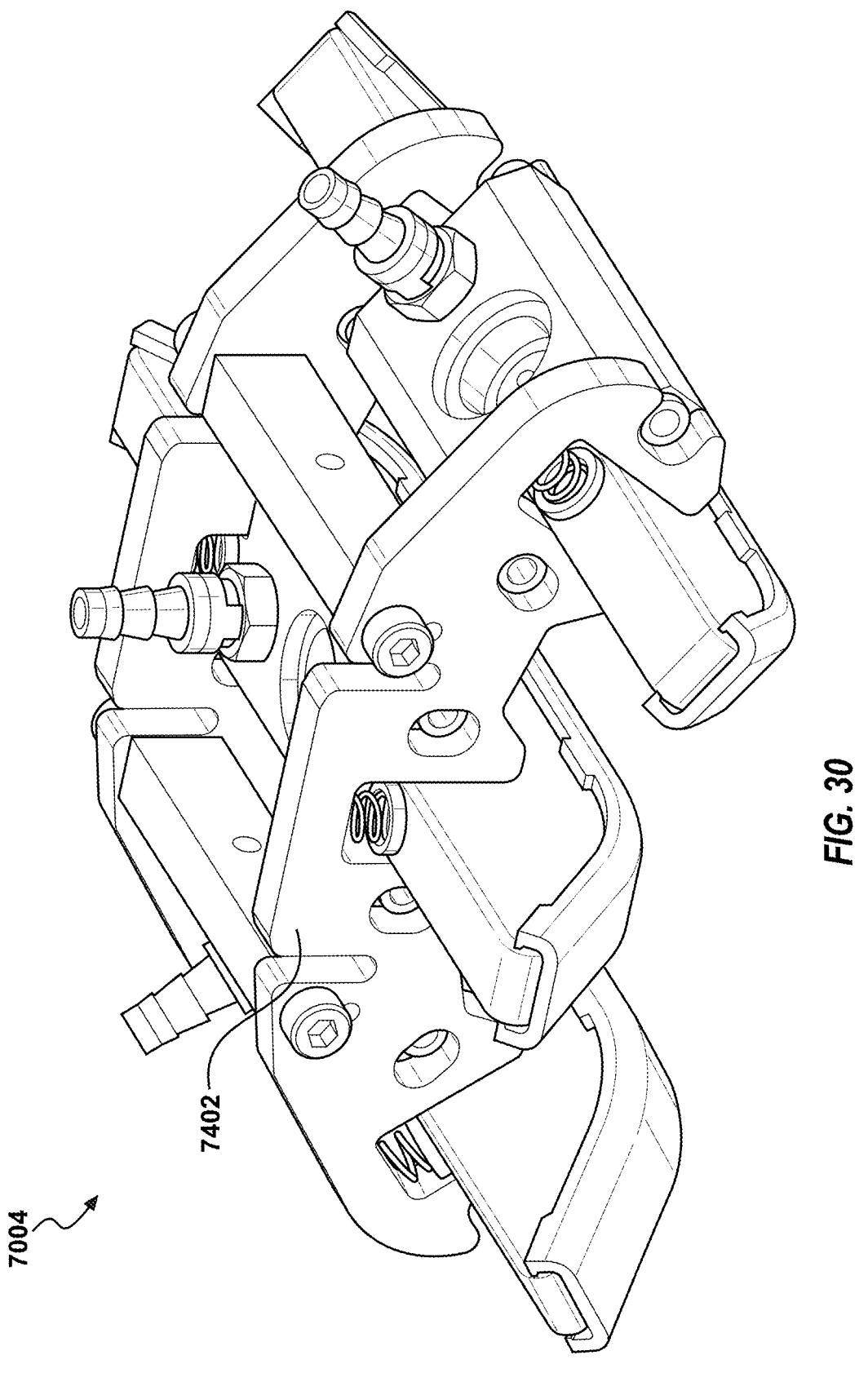
Figure 31:
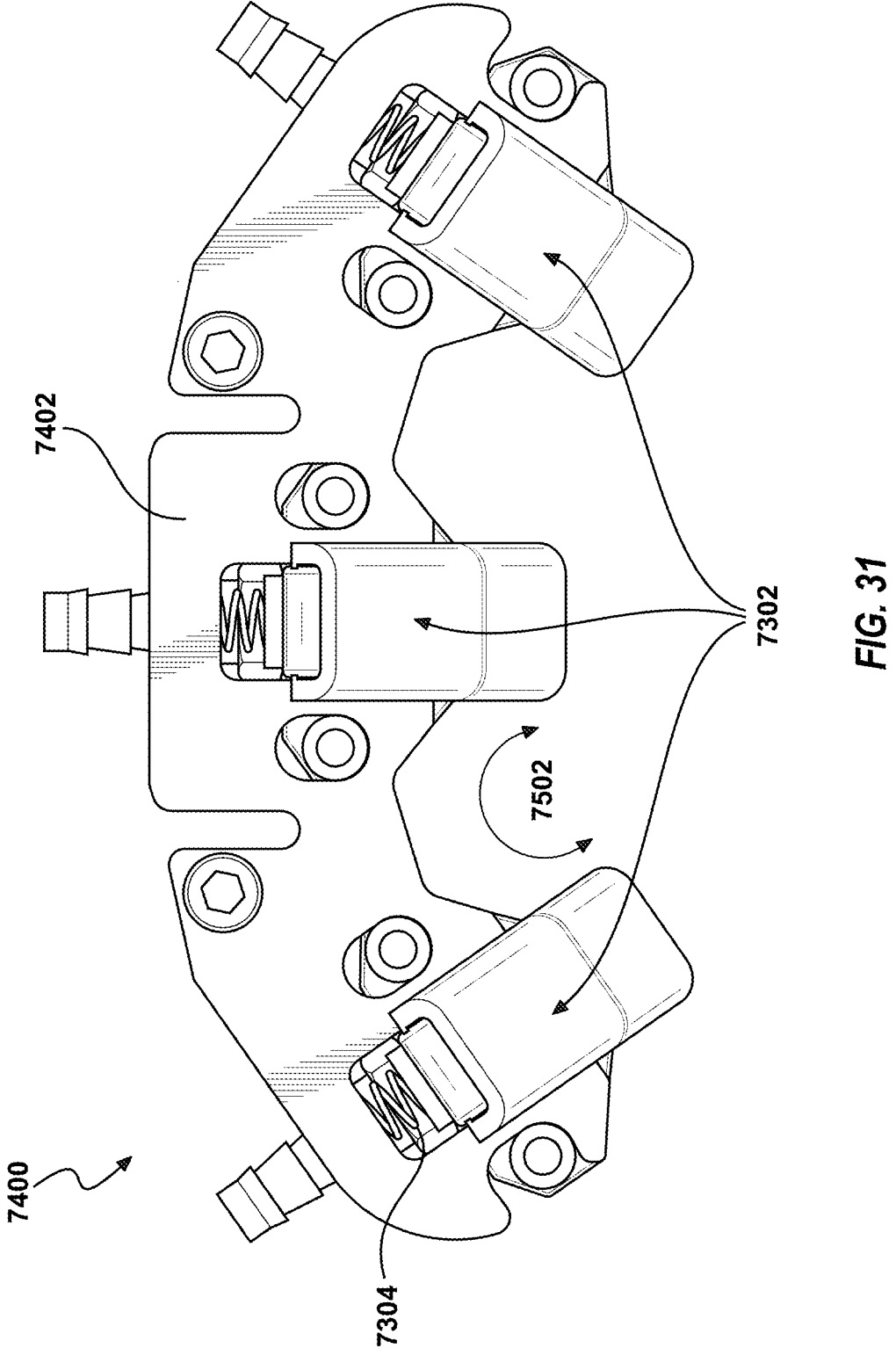
FIG. 31 depicts a front view of a multi-sensor sled assembly, in accordance with an embodiment of the current disclosure.
Figure 32:
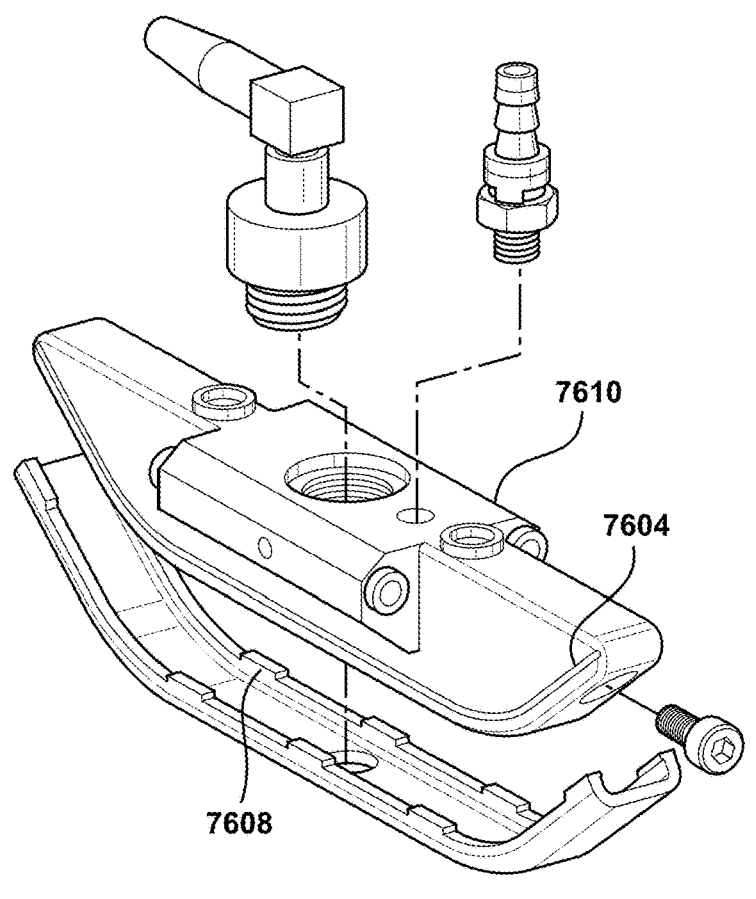
FIG. 32 depicts a perspective view looking down on an exploded view of a sensor housing, in accordance with an embodiment of the current disclosure.
Figure 33:
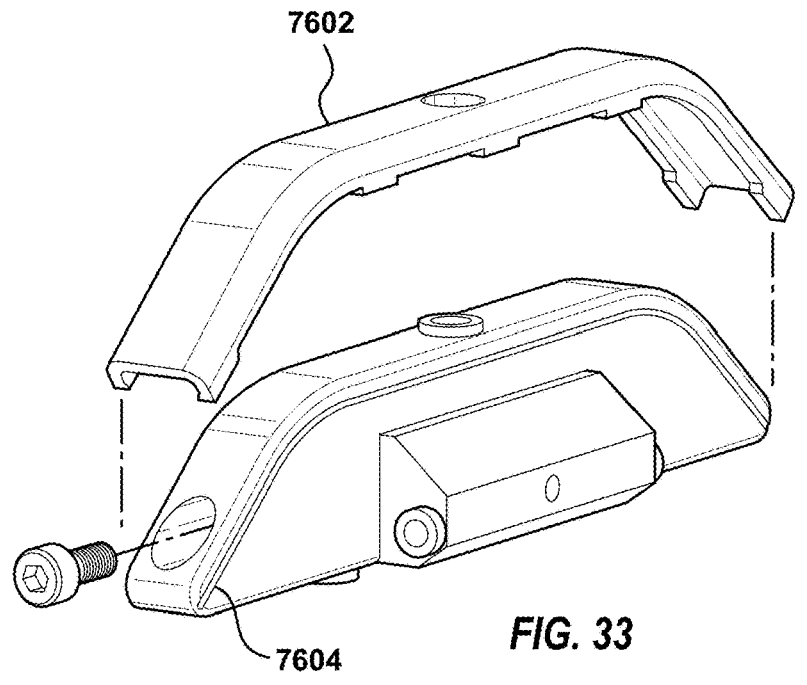
FIG. 33 depicts a perspective view looking up on an exploded view of the bottom of a sensor housing, in accordance with an embodiment of the current disclosure.
Figure 35:
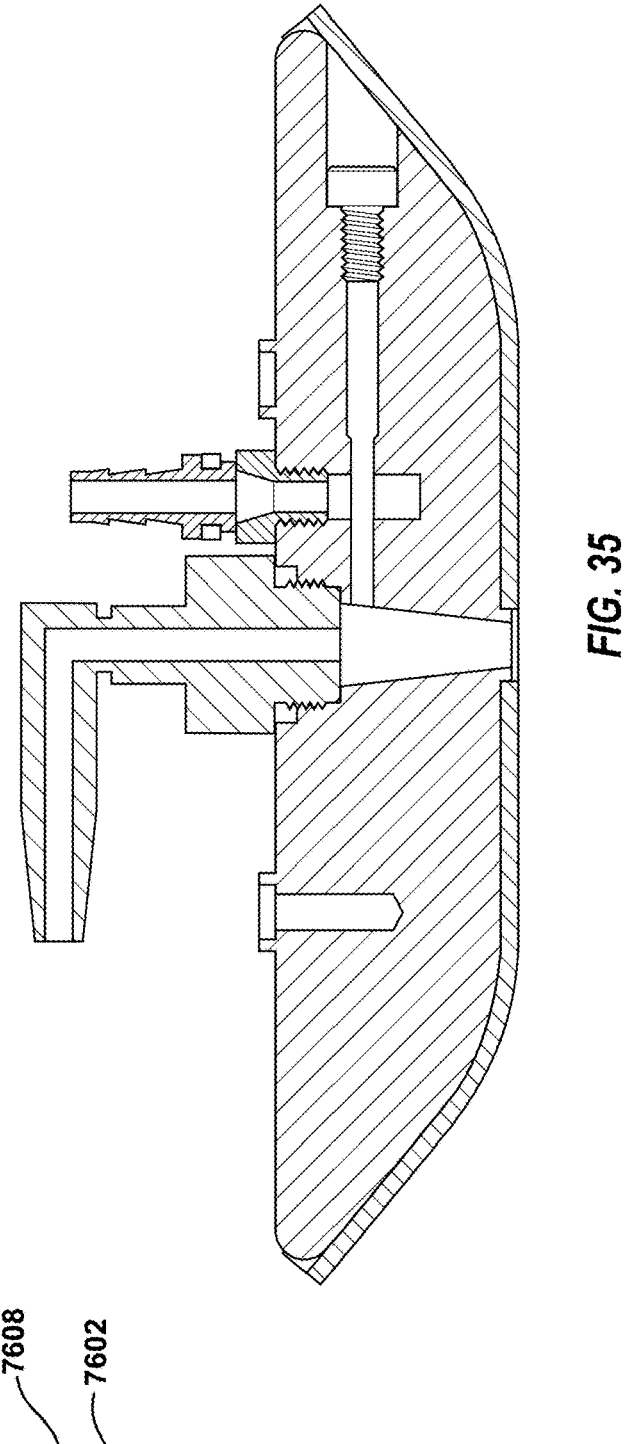
FIG. 35 depicts a side view cross-section of a sensor housing, in accordance with an embodiment of the current disclosure.
Figure 34:
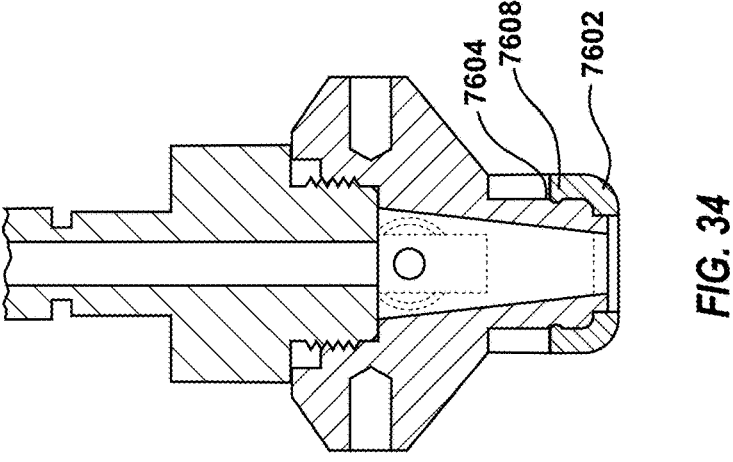
FIG. 34 depicts a front view cross-section of a sensor housing and surface contact relative to an inspection surface, in accordance with an embodiment of the current disclosure.

Referring to FIGS. 29-31, in a top perspective depiction, two multiple-sensor sled assemblies 7400 of different widths are shown, as indicated by the width label 7402. A multiple sled assembly may include multiple sensor sleds 7302 which may rotate 7502 toward or away from one another. Acoustic sleds may include a couplant port 7404 for receiving couplant from the robot. Each sled may have a sensor opening 7406 to accommodate a sensor and engage a power/data connector 7306. A multiple-sensor sled assembly width may be selected to accommodate the inspection surface to be traversed such as pipe outer diameter, anticipated obstacle size, desired inspection resolution, a desired number of contact points (e.g., three contact points ensuring self-alignment of the sled carriage and sleds), and the like.

Figure 36:
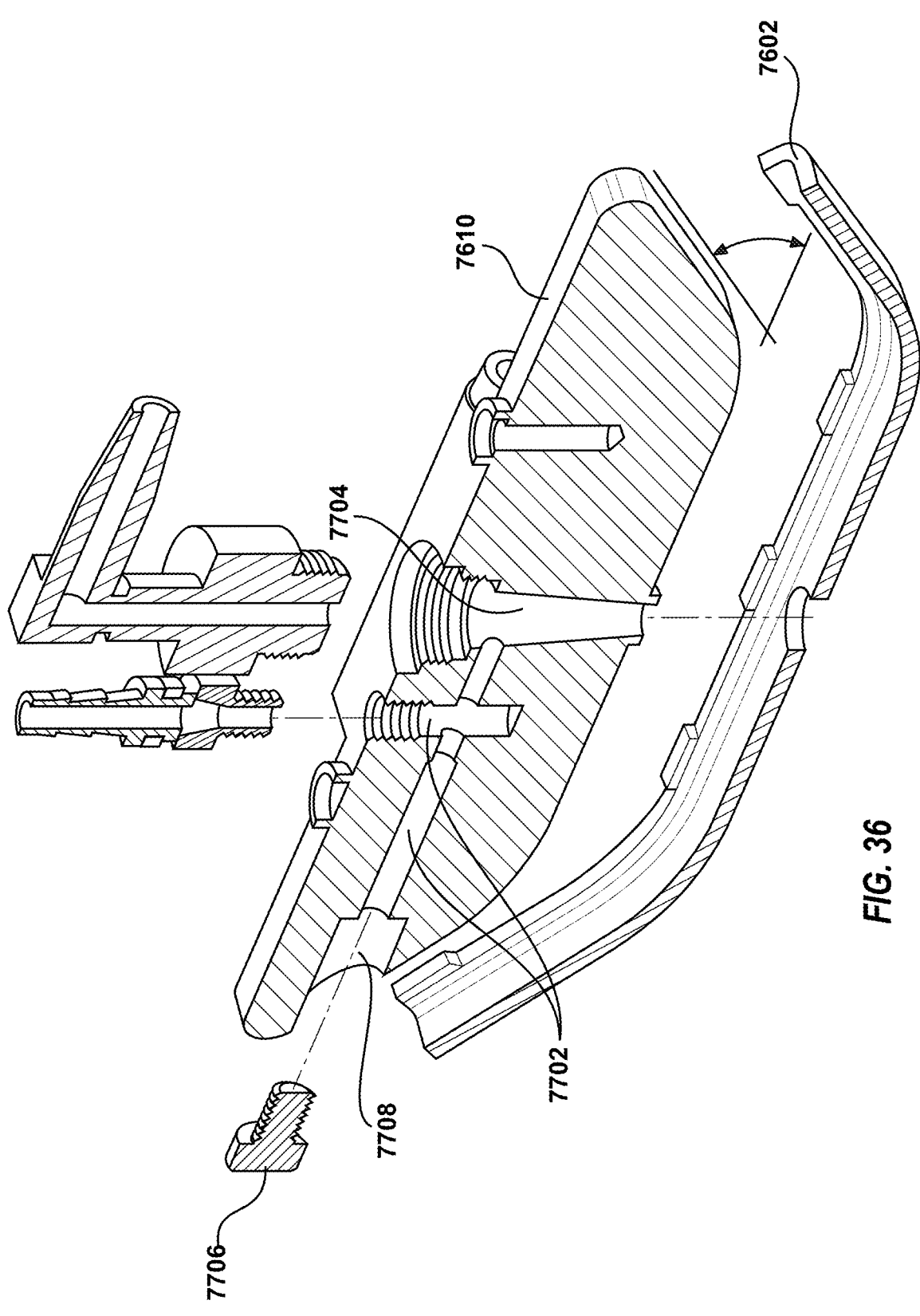
FIG. 36 depicts an exploded view of a cross-section of a sensor housing, in accordance with an embodiment of the current disclosure.
Figure 37:
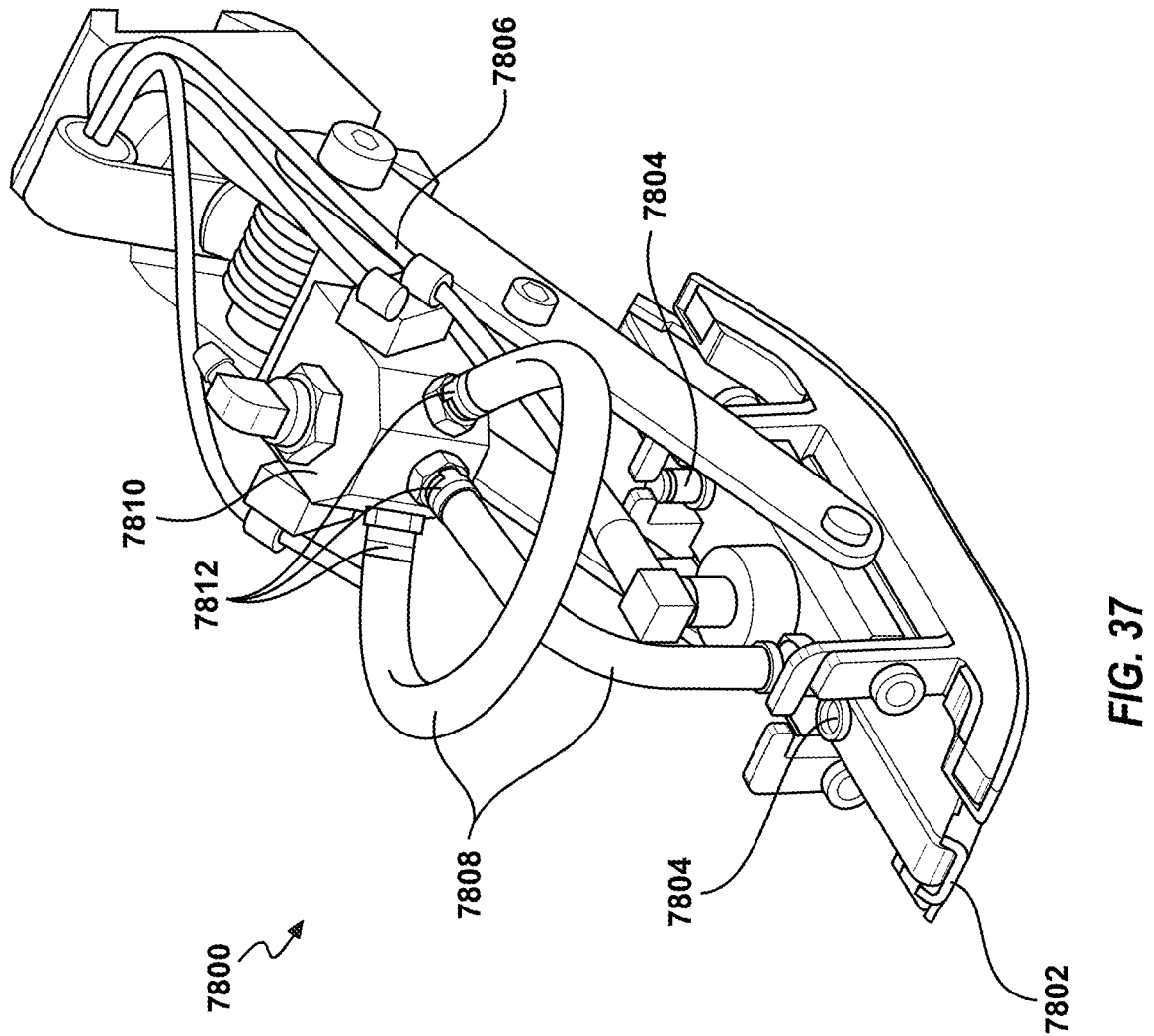
FIG. 37 depicts a sensor carriage with a universal single-sensor sled assembly, in accordance with an embodiment of the current disclosure.

Referring to FIGS. 32-35, a sled may include a sensor housing 7610 having a groove 7604. A replaceable engagement surface 7602 may include one or more hooks 7608 which interact with the groove 7604 to snap the replaceable engagement surface 7602 to the sensor housing 7610. The sensor housing 7610, a cross section of which is shown in FIG. 36, may be a single machined part which may include an integral couplant channel 7702, in some embodiments this is a water line, and an integrated cone assembly 7704 to allow couplant to flow from the couplant line 7308 down to the inspection surface. There may be a couplant plug 7706 to prevent the couplant from flowing out of a machining hole 7708 rather than down through the integrated cone assembly 7704 to the inspection surface. The front and back surface of the sled may be angled at approximately 40° to provide the ability of the sled to surmount obstacles on the navigation surface. If the angle is too shallow, the size of obstacle the sled is able to surmount is small. If the angle is too steep, the sled may be more prone to jamming into obstacles rather than surmounting the obstacles. The angle may be selected according to the size and type of obstacles that will be encountered, the available contingencies for obstacle traversal (degrees of freedom and amount of motion available, actuators available, alternate routes available, etc.), and/or the desired inspection coverage and availability to avoid obstacles.

In addition to structural integrity and machinability, the material used for the sensor housing 7610 may be selected based on acoustical characteristics (such as absorbing rather than scattering acoustic signals, harmonics, and the like), hydrophobic properties (waterproof), and the ability to act as an electrical insulator to eliminate a connection between the sensor housing and the chassis ground, and the like such that the sensor housing may be suitable for a variety of sensors including EMI sensors. A PEI plastic such as ULTEM® 1000 (unreinforced amorphous thermoplastic polyetherimide) may be used for the sensor housing 7610.

In embodiments, a sensor carriage may comprise a universal single sled sensor assembly 7800 as shown in FIGS. 37-40. The universal single sled sensor assembly 7800 may include a single sensor housing 7802 having sled springs at the front and back (relative to direction of travel) to enable the single sled sensor assembly 7800 to tilt or move in and out to accommodate the contour of the inspection surface, traverse obstacles, and the like. The universal single sled sensor assembly 7800 may have a power/data connector 7806 to power the sensor and transfer acquired data back to the robot. The universal single sled sensor assembly 7800 may include multiple couplant lines 7808 attached to a multi-port sled couplant distributor 7810. Unused couplant ports 7812 may be connected to one another to simply reroute couplant back into a couplant system.

Figure 38:
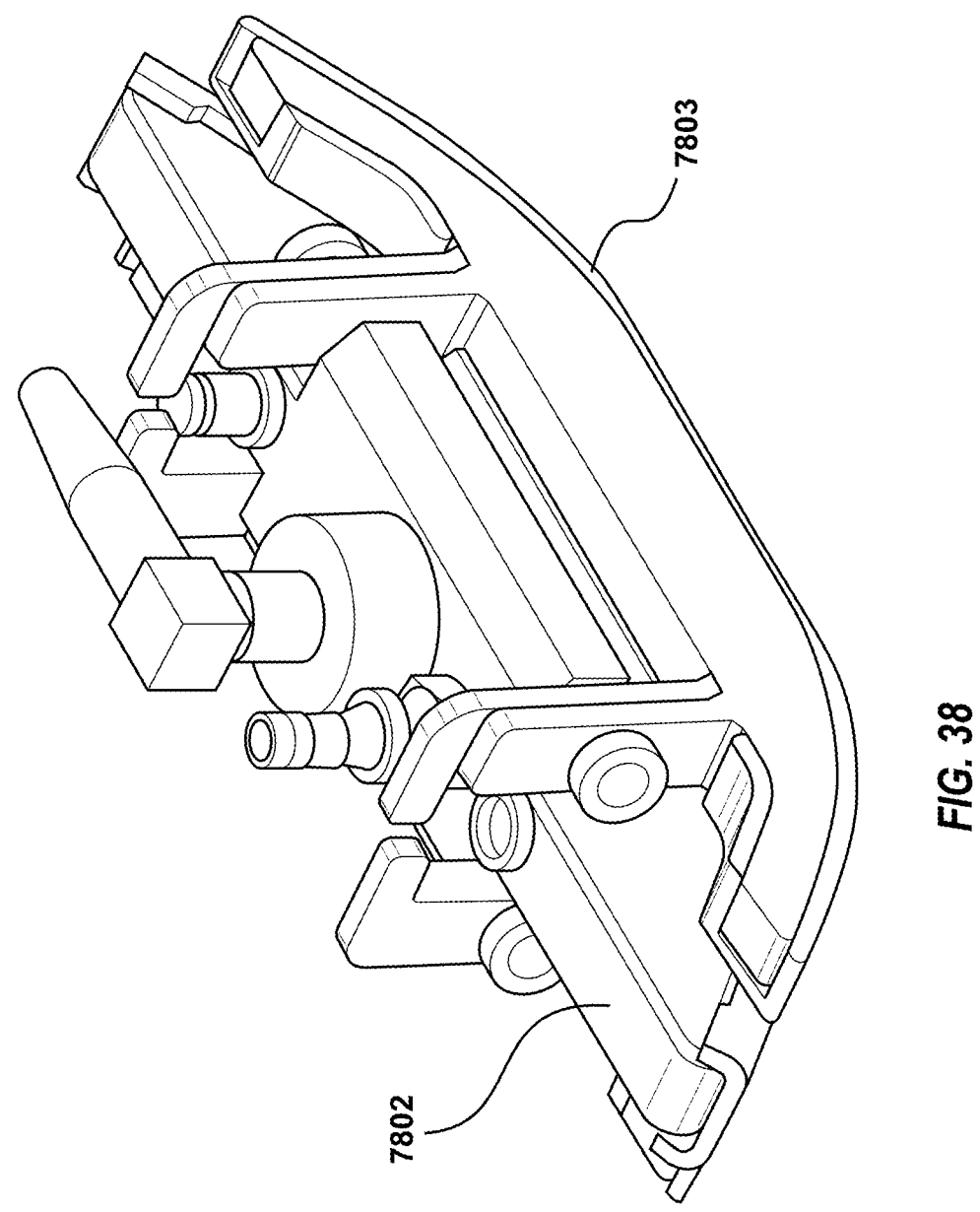
FIG. 38 depicts a universal single-sensor sled assembly that may be utilized with a single-sensor sled or a multi-sensor sled assembly, in accordance with an embodiment of the current disclosure.
Figure 40:
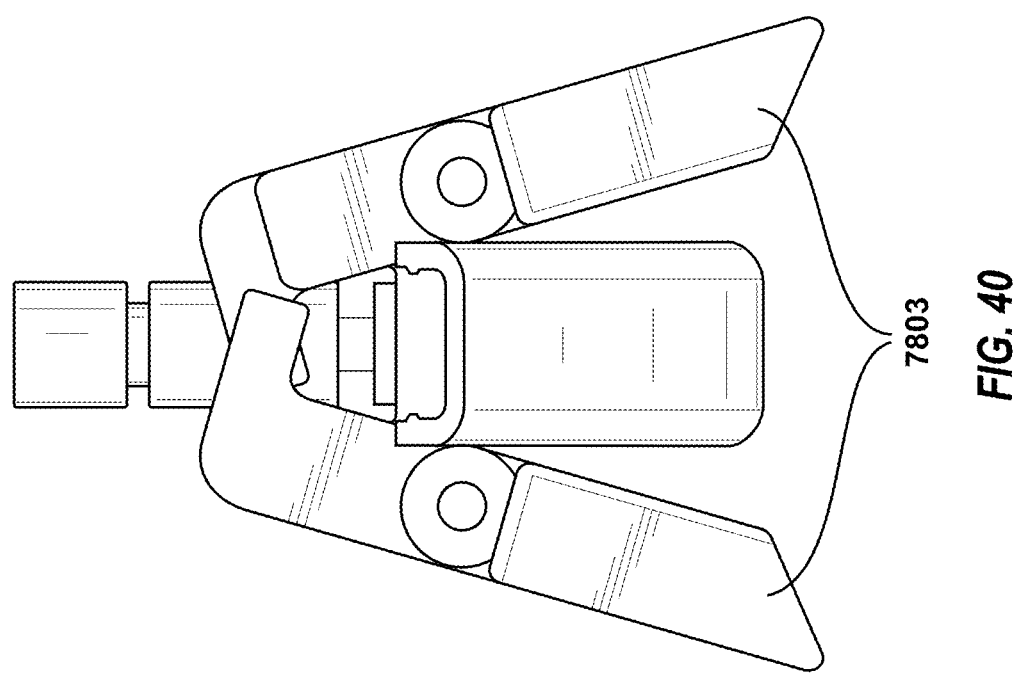
FIGS. 39 and 40 depict bottom views of a single sensor sled assembly with stability wings extended and contracted, in accordance with an embodiment of the current disclosure.
Figure 39:
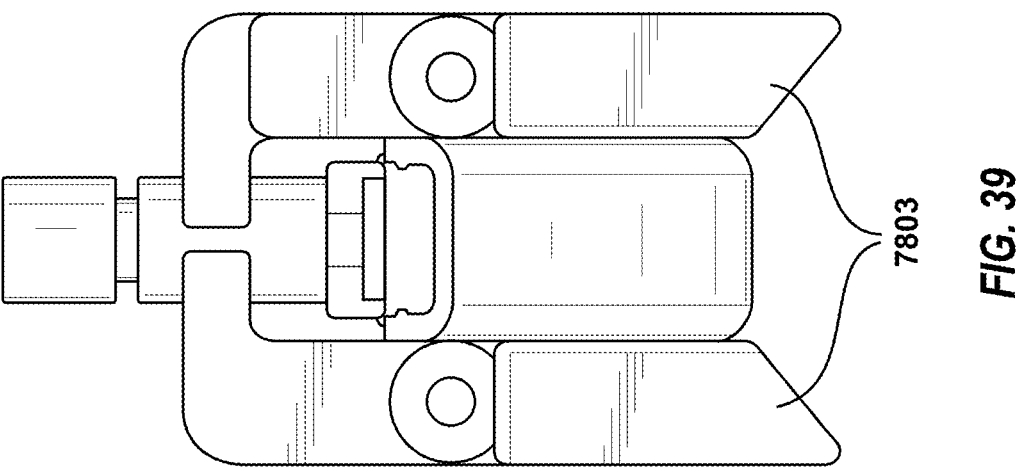

Referring to FIG. 38, a universal single-sensor assembly may include extendable stability "wings" 7803 located on either side of the sensor housing 7802 which may be expanded or contracted (See FIGS. 39-40) depending on the inspection surface. In an illustrative and non-limiting example, the stability "wings" may be expanded to accommodate an inspection surface such as a pipe with a larger outer dimension. The stability "wings" together with the sensor housing 7802 provide three points of contact between the universal single sled assembly 7800 and the inspection surface, thereby improving the stability of the universal single sled assembly 7800. In certain embodiments, the stability wings also provide rapid access to the replaceable/wearable contact surface for rapid changes and/or repair of a sled contact surface.

In embodiments, identification of a sensor and its location on a rail and relative to the center module may be made in real-time during a pre-processing/calibration process immediately prior to an inspection run, and/or during an inspection run (e.g., by stopping the inspection robot and performing a calibration). Identification may be based on a sensor ID provided by an individual sensor, visual inspection by the operator or by image processing of video feeds from navigation and inspection cameras, and user input include including specifying the location on the robot and where it is plugged in. In certain embodiments, identification may be automated, for example by powering each sensor separately and determining which sensor is providing a signal.

In embodiments, the difference in the configuration between the first and second payloads may be a difference between a first directional force applied on the first payload, e.g., a downward force applied by a first biasing member of the first payload to at least one inspection sensor of the first payload, and a second directional force applied on the second payload, e.g., a downward force, distinct from the first downward force, applied by a second biasing member of the second payload to at least one inspection sensor of the second payload. In embodiments, the distinction between the first and the second directional forces may be one of a magnitude, angle, and/or direction. The angle may be relative to the inspection surface. For example, in embodiments, the second payload may have a stronger downward biasing force than the first payload. In such embodiments, an operator of the inspection robot may attempt to use the first payload to inspect the inspection surface only to discover that the sensors of the first payload are having difficulty coupling to the inspection surface. The operator may then recall the inspection robot and swap out the first payload for the second payload to employ the stronger downward biasing force to couple the sensors of the second payload to the inspection surface.

In embodiments, the difference in the configuration between the first and second payloads may be a difference in a first spacing between at least two arms of the first payload and a spacing between at least two arms of the second payload.

In embodiments, the difference in the configuration between the first and second payloads may be a difference in spacing defined at least in part on a difference in a first number of inspection sensors on a sled of the first payload and a second number of inspection sensors on a sled of the second payload.

In embodiments, the distinction between the first inspection characteristic and the second inspection characteristic include at least one of a sensor interface, a sled ramp slope, a sled ramp height, a sled pivot location, an arm pivot location, a sled pivot range of motion, an arm pivot range of motion, a sled pivot orientation, an arm pivot orientation, a sled width, a sled bottom surface configuration, a couplant chamber configuration, a couplant chamber side, a couplant chamber routing, or a couplant chamber orientation.

In embodiments, the distinction between the first inspection characteristic and the second inspection characteristic is of biasing member type. For example, the first payload may have an active biasing member and the second payload may have a passive biasing member or vice versa. In such embodiments, the active biasing member may be motively coupled to an actuator, wherein a motive force of the actuator includes an electromagnetic force, a pneumatic force, or a hydraulic force. In embodiments, the passive biasing member may include a spring or a permanent magnet.

In embodiments, the distinction between the first inspection characteristic and the second inspection characteristic may be a side of the inspection robot chassis which the first payload is operative to be disposed and a side of the inspection robot chassis which the second payload is operative to be disposed. For example, the chassis may have a first payload interface on a first side and a second payload interface on a second side opposite the first side, wherein first payload may be operative to mount/couple to the first payload interface and lead the chassis and the second payload may be operative to mount/couple to the second payload interface and trail the chassis or vice versa.

Figure 49:
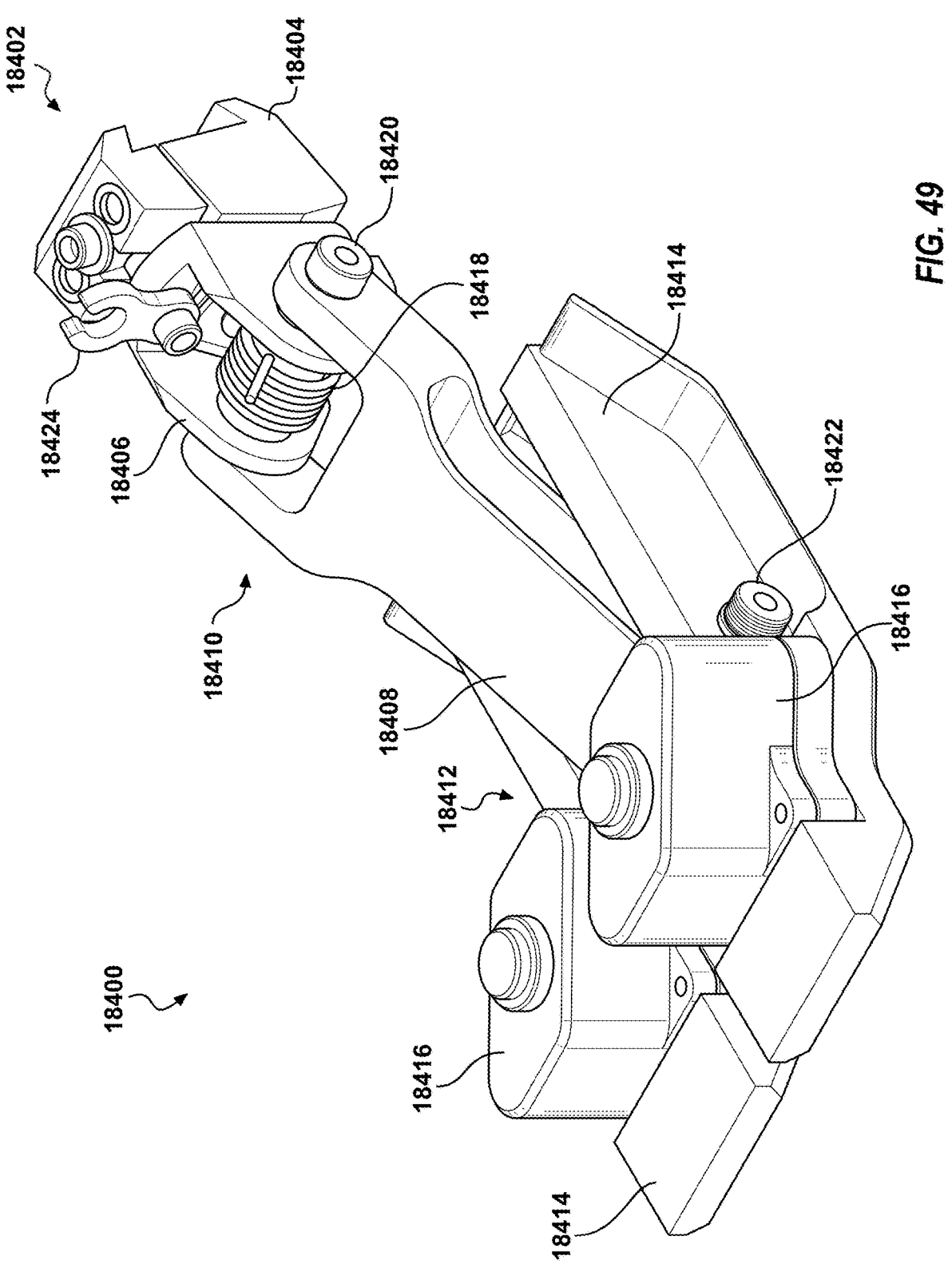
FIG. 49 depicts a payload for an inspection robot, in accordance with an embodiment of the current disclosure.

In an embodiment, and referring to FIG. 49, a payload 18400 for an inspection robot for inspecting an inspection surface may include a payload coupler 18402 having a first portion 18404 and a second portion 18406, the first portion 18404 selectively couplable to a chassis of the inspection robot; an arm 18408 having a first end 18410 and a second end 18412, the first end 18410 coupled to the second portion 18406 of the payload coupler 18402; one or more sleds 18414 mounted to the second end 18412 of the arm 18408; and at least two inspection sensors 18416, wherein each of the at least two inspection sensors 18416 are mounted to a corresponding sled 18414 of the one or more sleds, and operationally couplable to the inspection surface; wherein the second portion 18406 of the payload coupler 18402 may be moveable in relation to the first portion 18404. The second portion 18406 of the payload coupler may include a line manager 18424 for restraining coupler lines.

The term selectively couplable (and similar terms) as utilized herein should be understood broadly. Without limitation to any other aspect or description of the present disclosure, selectively couplable describes a selected association between objects. For example, an interface of object 1 may be so configured as to couple with an interface of object 2 but not with the interface of other objects. An example of selective coupling includes a power cord designed to couple to certain models of a particular brand of computer, while not being able to couple with other models of the same brand of computer. In certain embodiments, selectively couplable includes coupling under selected circumstances and/or operating conditions, and/or includes de-coupling under selected circumstances and/or operating conditions.

In an embodiment, the second portion 18406 of the payload coupler 18402 may be rotatable with respect to the first portion 18404. In an embodiment, the first end of the arm 18408 may be moveable in relation to the second portion 18406 of the payload coupler 18402. In an embodiment, the first end 18410 of the arm 18408 may rotate in relation to the second portion 18406 of the payload coupler 18402. In an embodiment, the first portion of the payload coupler is rotatable with respect to a first axis, and wherein the first end of the arm is rotatable in a second axis distinct from the first axis.

In an embodiment, the one or more sleds 18414 may be rotatable in relation to the second end 18412 of the arm 18408. The payload may further include at least two sleds 18414, and wherein the at least two sleds 18414 may be rotatable as a group in relation to the first end of the arm 18408 at the pivot 18420. The payload may further include a downward biasing force device 18418 structured to selectively apply a downward force to the at least two inspection sensors 18416 with respect to the inspection surface. In embodiments, the weight position of the biasing force device 18418 may be set at design time or run time. In some embodiments, weight positions may only include a first position or a second position, or positions in between (a few, a lot, or continuous). In embodiments, the downward biasing force device 18418 may be disposed on the second portion 18406 of the payload coupler 18402. The downward biasing force device 18418 may be one or more of a weight, a spring, an electromagnet, a permanent magnet, or an actuator. The downward biasing force device 18418 may include a weight moveable between a first position applying a first downward force and a second position applying a second downward force. The downward biasing force device 18418 may include a spring, and a biasing force adjustor moveable between a first position applying a first downward force and a second position applying a second downward force. In embodiments, the force of the biasing force device 18418 may be set at design time or run time. In embodiments, the force of the biasing force device 18418 may be available only at a first position/second position, or positions in between (a few, a lot, or continuous). For example, setting the force may involve compressing a spring or increasing a tension, such as in a relevant direction based on spring type. In another example, setting the force may involve changing out a spring to one having different properties, such as at design time. In embodiments, the spring may include at least one of a torsion spring, a tension spring, a compression spring, or a disc spring. The payload 18400 may further include an inspection sensor position actuator structured to adjust a position of the at least two inspection sensors 18416 with respect to the inspection surface. The payload may further include at least two inspection sensors 18416, wherein the payload coupler 18402 may be moveable with respect to the chassis of the inspection robot and the inspection sensor position actuator may be coupled to the chassis, wherein the inspection sensor position actuator in a first position moves the payload coupler 18402 to a corresponding first coupler position, thereby moving the at least two sensors 18416 to a corresponding first sensor position, and wherein the inspection sensor position actuator in a second position moves the payload coupler 18402 to a corresponding second coupler position, thereby moving the at least two inspection sensors 18416 to a corresponding second sensor position. In some embodiments, the inspection sensor position actuator may be coupled to a drive module. In some embodiments, a payload position may include a down force selection (e.g., actuator moves to touch sensors down, further movement may be applying force and may not correspond to fully matching geometric movement of the payload coupler). In embodiments, the inspection sensor position actuator may be structured to rotate the payload coupler 18402 between the first coupler position and the second coupler position. The actuator may be structured to horizontally translate the payload coupler 18402 between the first coupler position and the second coupler position.

The term fluidly communicate (and similar terms) as utilized herein should be understood broadly. Without limitation to any other aspect or description of the present disclosure, fluid communication describes a movement of a fluid, a gas, or a liquid, between two points. In some examples, the movement of the fluid between the two points can be one of multiple ways the two points are connected, or may be the only way they are connected. For example, a device may supply air bubbles into a liquid in one instance, and in another instance the device may also supply electricity from a battery via the same device to electrochemically activate the liquid.

The payload may further include at least two sensor couplant channels, each of the at least two portions of sensor couplant channels, e.g., 5403, 4309 (FIG. 54), fluidly coupled to the payload couplant interface at a first end, and fluidly coupled to a couplant chamber, e.g., a cone fluid chamber 2810 (FIG. 16), for a corresponding one of the at least two inspection sensors 18416 at a second end. In an embodiment, the arm 18408 defines at least a portion of each of the at least two portions of sensor couplant channel 5403, 5409, that is, the at least two sensor couplant channels share some of their length in the arm portion before branching out. The payload 18400 may further include a communication conduit structured to provide electrical communication between a chassis control interface (connector) 5118 and a payload control interface e.g., interface 18422, and wherein each of the at least two inspection sensors 18416 may be communicatively coupled to the payload control interface 18422. The communication conduit may include at least two sensor control channels, each of the at least two sensor control channels communicatively coupled to the payload control interface at a first end, and communicatively coupled to a corresponding one of the at least two inspection sensors 18416 at a second end. The arm 18408 may define at least a portion of each of the at least two sensor control channels.

The term universal conduit (and similar terms) as utilized herein should be understood broadly. Without limitation to any other aspect or description of the present disclosure, a universal conduit describes a conduit capable of providing multiple other conduits or connectors, such as fluid, electricity, communications, or the like. In certain embodiments, a universal conduit includes a conduit at least capable to provide an electrical connection and a fluid connection. In certain embodiments, a universal conduit includes a conduit at least capable to provide an electrical connection and a communication connection.

The term mechanically couple (and similar terms) as utilized herein should be understood broadly. Without limitation to any other aspect or description of the present disclosure, mechanically coupling describes connecting objects using a mechanical interface, such as joints, fasteners, snap fit joints, hook and loop, zipper, screw, rivet, or the like.

Figure 41:
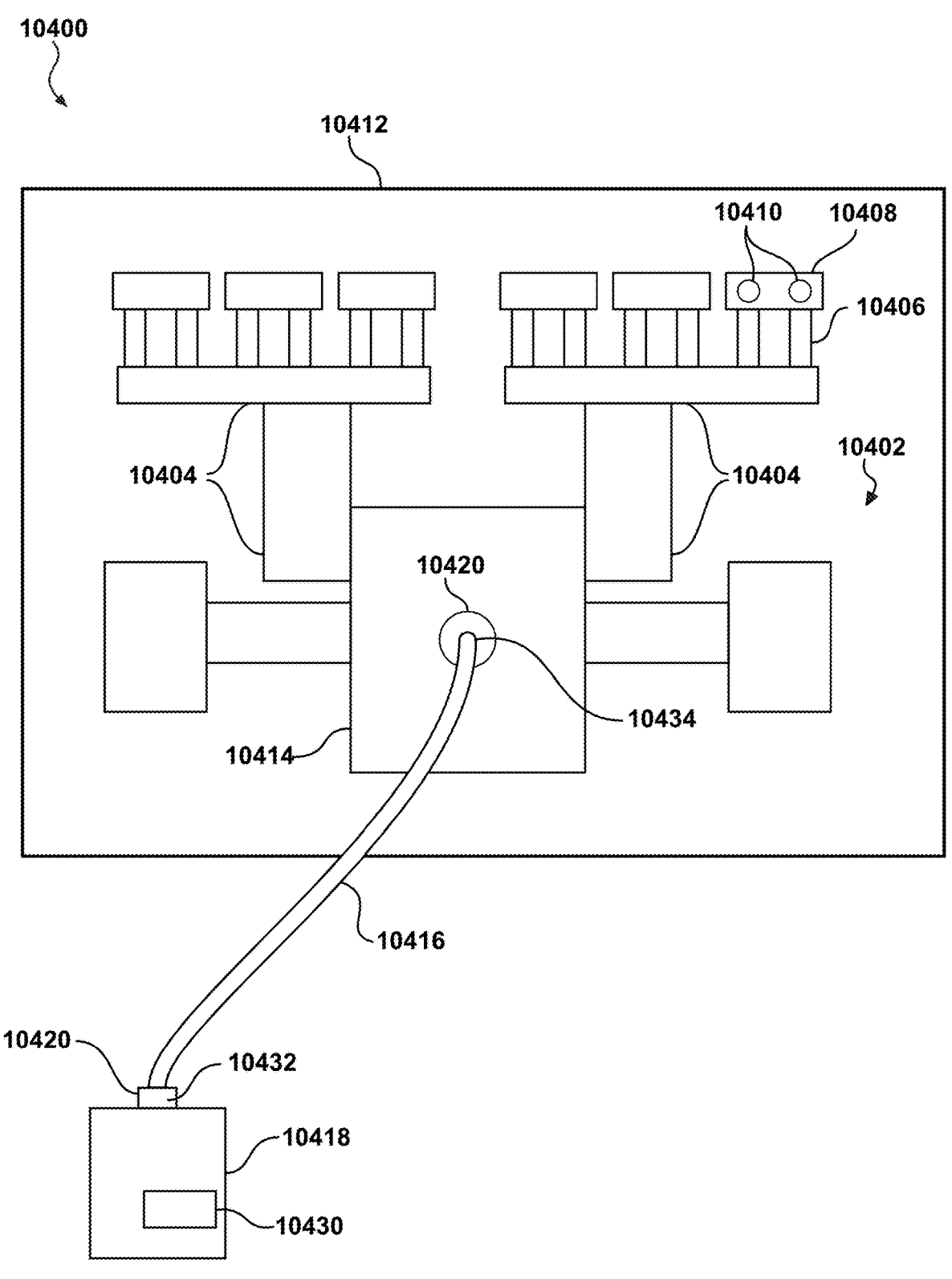
FIG. 41 depicts an embodiment of an inspection robot with a tether, in accordance with an embodiment of the current disclosure.

In an embodiment, and referring to FIGS. 41-42, a system 10400 may include an inspection robot 10402 comprising a chassis or center module 10414, a payload 10404; at least one arm 10406, wherein each arm 10406 is pivotally mounted to a payload 10404; at least two sleds 10408, wherein each sled 10408 is mounted to the at least one arm 10406; a plurality of inspection sensors 10410, each of the inspection sensors 10410 coupled to one of the sleds 10408 such that each sensor is operationally couplable to an inspection surface 10412, wherein the at least one arm is horizontally moveable relative to a corresponding payload 10404; and a tether 10416 including an electrical power conduit 10506 operative to provide electrical power; and a working fluid conduit 10504 operative to provide a working fluid. In an embodiment, the working fluid may be a couplant and the working fluid conduit 10504 may be structured to fluidly communicate with at least one sled 10408 to provide for couplant communication via the couplant between an inspection sensor 10410 mounted to the at least one sled 10408 and the inspection surface 10412. In an embodiment, the couplant provides acoustic communication between the inspection sensor and the inspection surface. In an embodiment, the couplant does not perform work (W). In an embodiment, the working fluid conduit 10504 has an inner diameter 10512 of about one eighth of an inch. In an embodiment, the tether 10502 may have an approximate length selected from a list consisting of: 4 feet, 6 feet, 10 feet, 15 feet, 24 feet, 30 feet, 34 feet, 100 feet, 150 feet, 200 feet, or longer than 200 feet. In an embodiment, the working fluid may be at least one of: a paint; a cleaning solution; and a repair solution. In certain embodiments, the working fluid additionally or alternatively is utilized to cool electronic components of the inspection robot, for example by being passed through a cooling plate in thermal communication with the electronic components to be cooled. In certain embodiments, the working fluid is utilized as a cooling fluid in addition to performing other functions for the inspection robot (e.g., utilized as a couplant for sensors). In certain embodiments, a portion of the working fluid may be recycled to the base station and/or purged (e.g., released from the inspection robot and/or payload), allowing for a greater flow rate of the cooling fluid through the cooling plate than is required for other functions in the system such as providing sensor coupling.

It should be understood that any operational fluid of the inspection robot 10402 may be a working fluid. The tether 10416 may further include a couplant conduit 10510 operative to provide a couplant. The system 10400 may further include a base station 10418, wherein the tether 10416 couples the inspection robot 10402 to the base station 10418. In an embodiment, the base station 10418 may include a controller 10430; and a lower power output electrically coupled to each of the electrical power conduit 10506 and the controller 10430, wherein the controller 10430 may be structured to determine whether the inspection robot 10402 is connected to the tether 10416 in response to an electrical output of the lower power output. In embodiments, the electrical output may be at least 18 Volts DC. In an embodiment, the controller 10430 may be further structured to determine whether an overcurrent condition exists on the tether 10416 based on an electrical output of the lower power output. The tether 10502 may further include a communication conduit 10508 operative to provide a communication link, wherein the communication conduit 10508 comprises an optical fiber or a metal wire. Since fiber is lighter than metal for communication lines, the tether 10502 can be longer for vertical climbs because it weighs less. A body of the tether 10502 may include at least one of: a strain relief 10420; a heat resistant jacketing 10514; a wear resistant outer layer 10516; and electromagnetic shielding 10518. In embodiments, the tether 10502 may include similar wear materials. In embodiments, the sizing of the conduits 10504, 10506, 10508, 10510 may be based on power requirements, couplant flow rate, recycle flow rate, or the like.

In an embodiment, and referring to FIG. 41 and FIG. 42, a tether 10502 for connecting an inspection robot 10402 to a base station 10418 may include an electrical power conduit 10506 comprising an electrically conductive material; a working fluid conduit 10504 defining a working fluid passage therethrough; a base station interface 10432 positioned at a first end of the tether 10416, the base station interface operable to couple the tether 10416 to a base station 10418; a robot interface 10434 positioned at a second end of the tether, the robot interface operable to couple the tether 10416 to the inspection robot 10402; a strain relief 10420; a wear resistant outer layer 10516; and electromagnetic shielding 10518. The tether may further include a communication conduit 10508, wherein the communication conduit 10508 may include an optical fiber or a metal wire. The electrical power conduit 10506 may further include a communication conduit 10508. In an embodiment, the working fluid conduit 10504 may have an inner diameter 10512 of about one eighth of an inch.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

Figure 43:
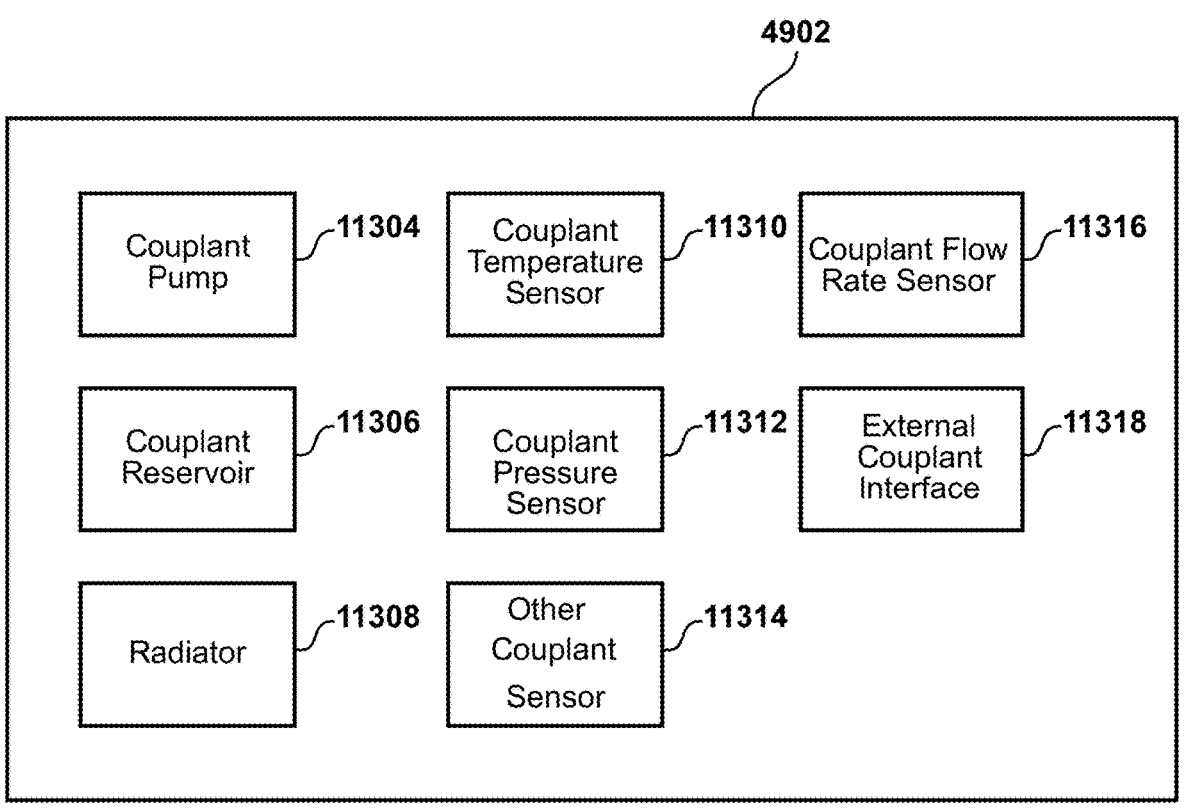
FIG. 43 is a schematic diagram of a base station for a system for managing couplant for an inspection robot, in accordance with an embodiment of the current disclosure.

As shown in FIG. 43, the example system may include a base station 4902 (e.g., reference also FIG. 18) and/or a tether (e.g., reference FIG. 41, tether 10416). In embodiments, the system may also include the inspection robot 100 to include one or more payloads 2, one or more output couplant interfaces 11602 (FIG. 46) disposed on a chassis of the inspection robot 100, and/one or more sensors 2202.

The tether may include a high-voltage power line, and/or a proximity line. As explained herein, the tether may couple the inspection robot 100 to the base station 4902 for the provision of electrical power, couplant, data communications and/or other services from the base station 4902 (or other devices in communication with the base station 4902) to the inspection robot 100. As shown in FIG. 42, the tether may include multiple conduits for transporting electrical power, communications, couplant and/or other services.

Figure 44:
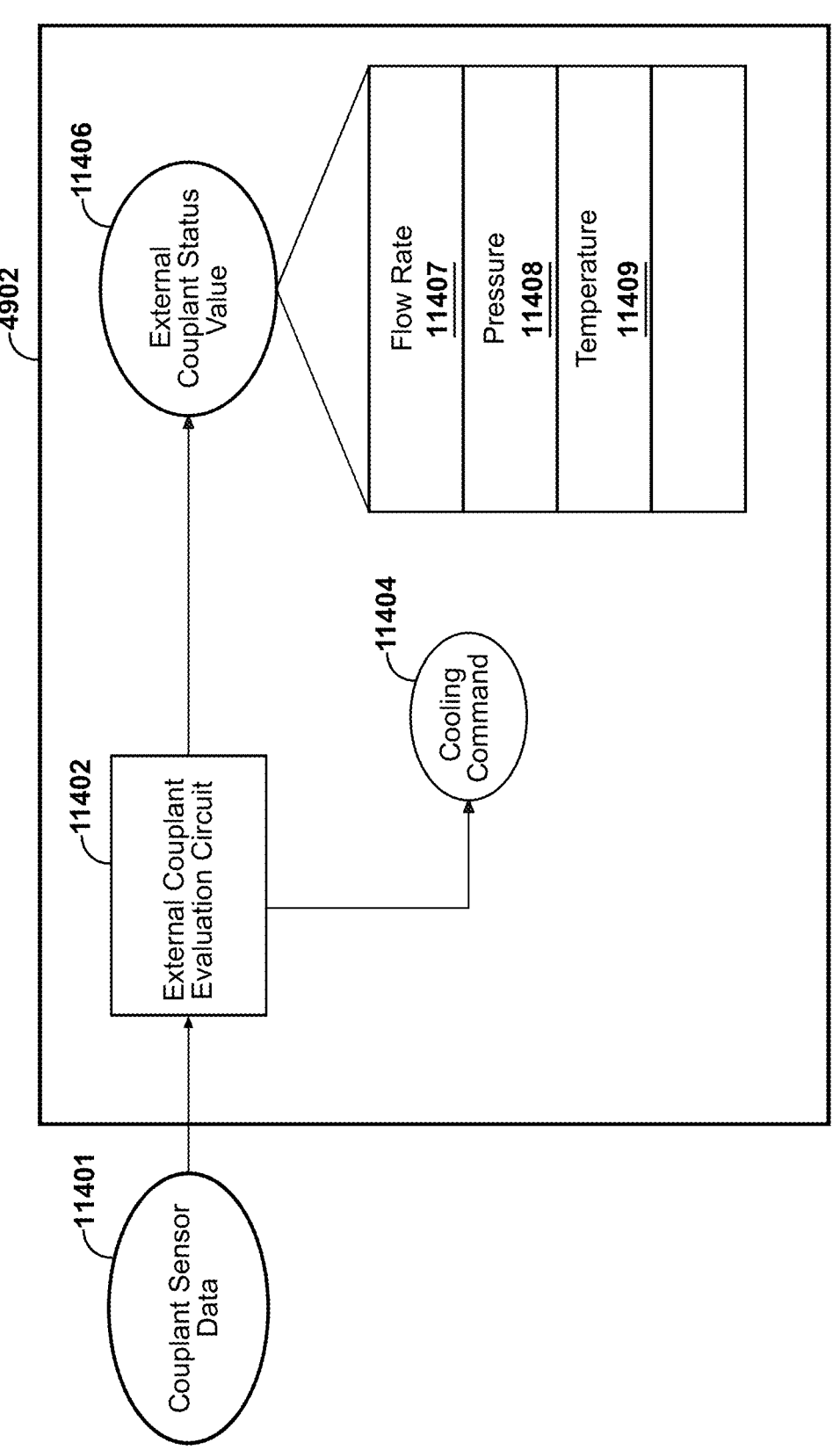
FIG. 44 is another schematic diagram of a base station for a system for managing couplant for an inspection robot, in accordance with an embodiment of the current disclosure.

The example base station 4902 may include a couplant pump 11304, a couplant reservoir 11306, a radiator 11308, a couplant temperature sensor 11310, a couplant pressure sensor 11312, a couplant flow rate sensor 11316, other couplant sensor 11314, and/or an external couplant interface 11318. As shown in FIG. 44, embodiments of the base station 4902 may also include a number of circuits configured to functionally perform operations of the base station 4902 as described herein. For example, the base station 4902 may include an external couplant evaluation circuit 11402 (FIG. 44). The example base station 4902 may additionally or alternatively include aspects of any other base station, controller, circuit, and/or similar device as described throughout the present disclosure. Aspects of example circuits may be embodied as one or more computing devices, computer-readable instructions configured to perform one or more operations of a circuit upon execution by a processor, one or more sensors, one or more actuators, and/or communications infrastructure (e.g., routers, servers, network infrastructure, or the like). Further details of the operations of certain circuits associated with the base station 4902 are set forth, without limitation, in the portion of the disclosure referencing FIGS. 43-47 and 48.

The example base station 4902 is depicted schematically in FIGS. 43 and 44 as a single device for clarity of description, but the base station 4902 may be a single device, a distributed device, and/or may include portions at least partially positioned with other devices in the system (e.g., on the inspection robot 100). In certain embodiments, the base station 4902 may be at least partially positioned on a computing device associated with an operator of the inspection robot (not shown), such as a local computer at a facility including the inspection surface 500, a laptop, and/or a mobile device. In certain embodiments, the base station 4902 may alternatively or additionally be at least partially positioned on a computing device that is remote to the inspection operations, such as on a web-based computing device, a cloud computing device, a communicatively coupled device, or the like.

Accordingly, as illustrated in FIGS. 43 and 44, the external couplant interface 11318 may receive external couplant from an external source, e.g., a water spigot. The external couplant evaluation circuit 11402 may interpret couplant sensor data 11401 and determine an external couplant status value 11406 which may be representative of a characteristic of the couplant at the external couplant interface 11318. The characteristic may be a flow rate 11407, a temperature 11409, a pressure 11408, and/or any other measurable property of the couplant. The characteristic may be sensed by one or more of the couplant temperature sensor 11310, couplant pressure sensor 11312, couplant flow rate sensor 11316 and/or other couplant sensors 11314 suitable for measuring other characteristics of the external couplant.

In embodiments, the couplant pump 11304 may pump the couplant from the external couplant interface 11318 through the couplant line of the tether in response to the external couplant status value 11406. The couplant pump 11304 may be adjusted to control pressure and/or flow rate of the couplant. For example, the external couplant evaluation circuit 11402 may have a target set of couplant parameters, e.g., temperature, pressure, flow rate, etc., that the couplant evaluation circuit 11402 may attempt to condition the external couplant towards prior to transferring the external couplant to the tether for transport to the inspection robot 100.

In embodiments, the radiator 11308 may thermally couple at least a portion of the couplant prior to the tether to an ambient environment. The radiator 11308 may include one or more coils and/or plates through which the couplant flows. In embodiments, the radiator 11308 may be a counter flow radiator where a working fluid is moved in the reverse direction of the flow of the couplant and absorbs thermal energy from the couplant.

In embodiments, the external couplant evaluation circuit 11402 may determine a temperature of the external couplant and provide a cooling command 11404 in response to the temperature of the external couplant. In such embodiments, the radiator 11308 may be responsive to the cooling command 11404. For example, if the external couplant evaluation circuit 11402 determines that the temperature of external couplant is too high, the cooling command 11404 may facilitate cooling of the couplant via the radiator. As will be understood, some embodiments may include a heating element to heat the couplant in the event that the external couplant evaluation circuit 11402 determines that a temperature of the external couplant is too cold to effectively couple the sensors 2202 to the inspection surface 500.

Figure 45:
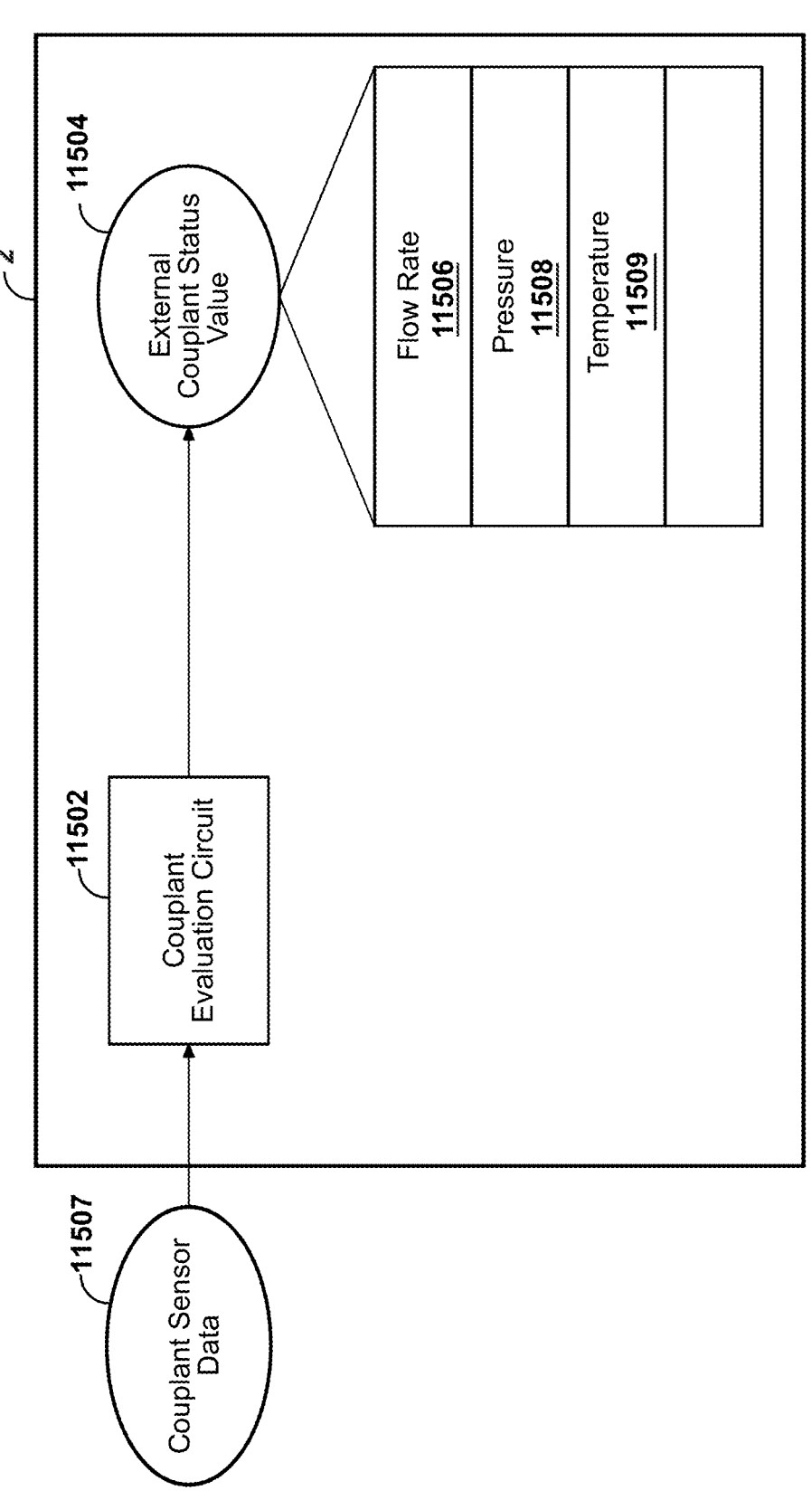
FIG. 45 is a schematic diagram of a payload for a system for managing couplant for an inspection robot, in accordance with an embodiment of the current disclosure.

As shown in FIG. 45, in embodiments, at least one of the inspection payloads 2 includes a couplant evaluation circuit 11502 that provides a couplant status value 11504. The couplant status value 11504 may include a characteristic of the couplant, e.g., a flow rate 11506, a pressure 11508, a temperature 11509 and/or other characteristics suitable for managing couplant within the payload 2. The couplant status value 11504 may be based at least in part on couplant sensor data 11507 interpreted by the couplant evaluation circuit 11502.

Figure 46:
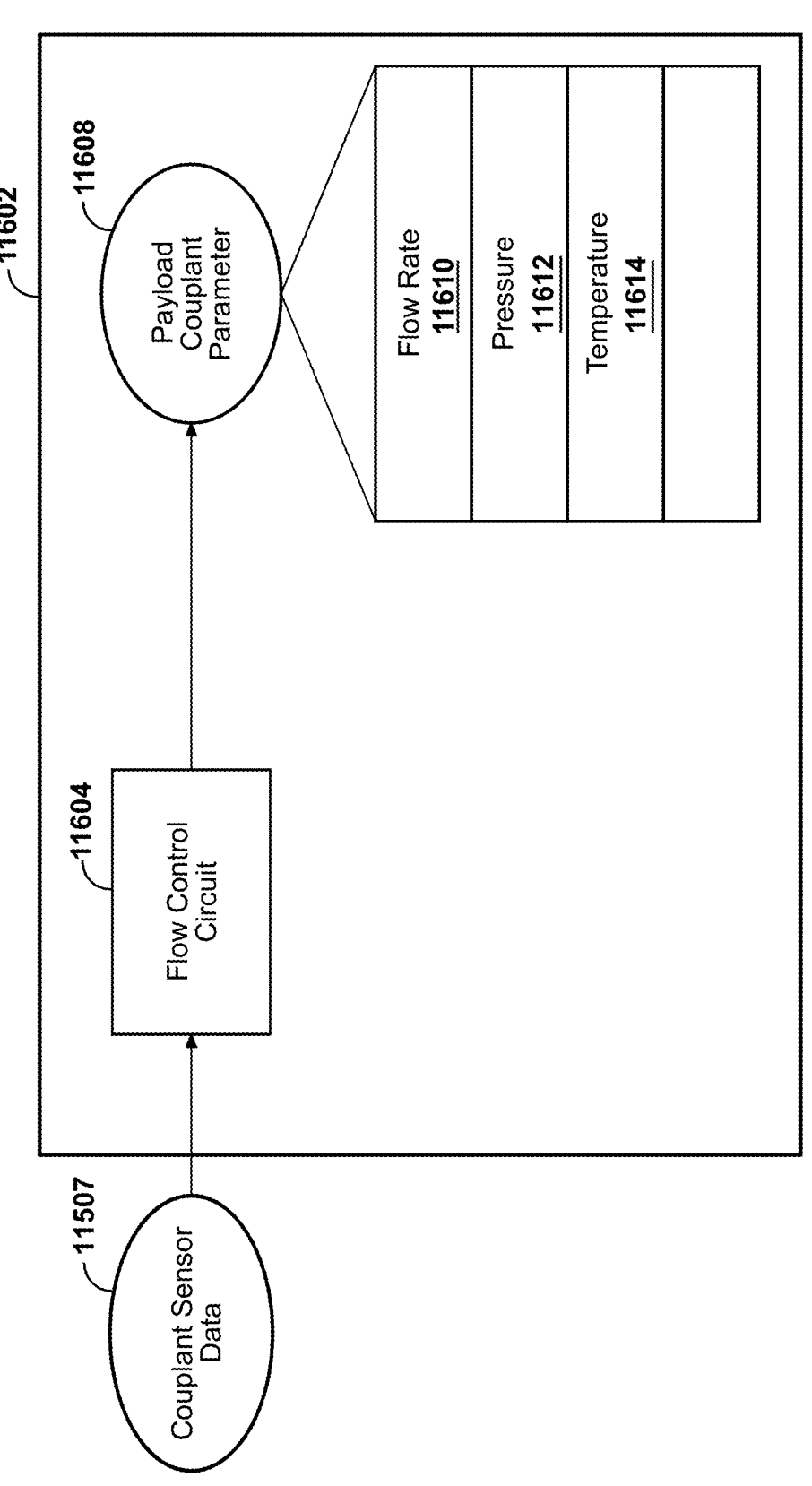
FIG. 46 is a schematic diagram of an output couplant interface for a system for managing couplant for an inspection robot, in accordance with an embodiment of the current disclosure.

Moving to FIG. 46, each output couplant interface 11602 may include a flow control circuit 11604 structured to control a payload couplant parameter 11608 of the couplant flowing to each of the at least one inspection payloads 2. The payload couplant parameter 11608 may be determined in response to the couplant status value 11504 for a corresponding payload 2. In embodiments, the payload couplant parameter 11608 may be a characteristic of the couplant flowing to a payload 2, e.g., a pressure 11612, flow rate 11610, temperature 11614 and/or any other characteristic suitable for managing the couplant to the payloads 2.

Figure 47:
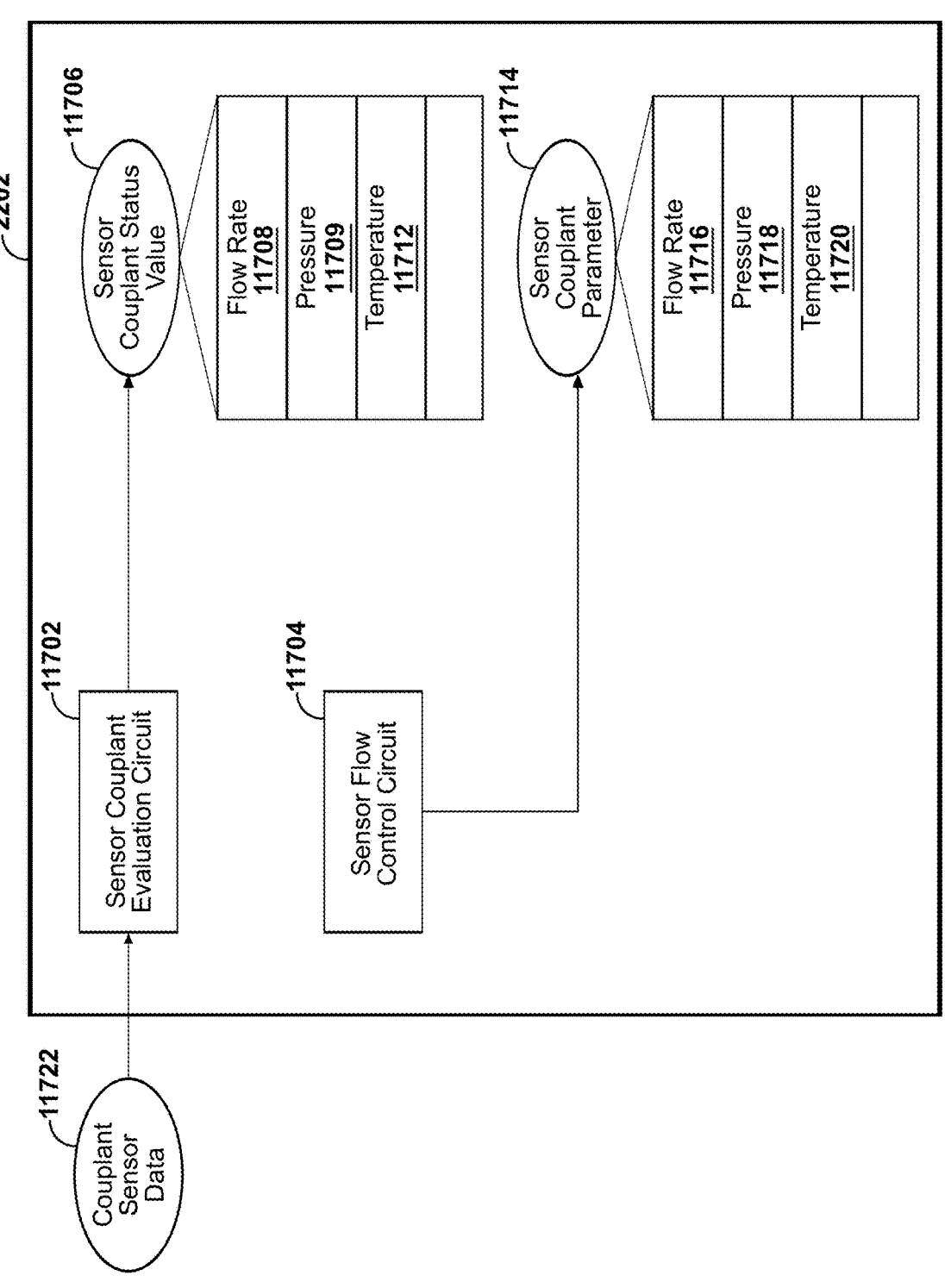
FIG. 47 is a schematic diagram of an acoustic sensor for a system for managing couplant for an inspection robot, in accordance with an embodiment of the current disclosure.

Turning to FIG. 47, in embodiments, each of the plurality of acoustic sensors 2202 may include a sensor couplant evaluation circuit 11702 that provides a sensor couplant status value 11706. In embodiments, the sensor couplant status value 11706 may include a characteristic of the couplant, e.g., flow rate 11708, pressure 11709, temperature 11712 and/or any other characteristic suitable for managing flow of the couplant. The sensor couplant status value 11706 may be based at least in part on a couplant sensor data 11722 interpreted by the sensor couplant evaluation circuit 11702. The couplant sensor data 11722 may include a characteristic of the couplant flowing to the sensor 2202 from the payload 2, e.g., pressure, flow rate, temperature and/or any other characteristic suitable for managing the couplant to the payloads 2.

In embodiments, each of the plurality of acoustic sensors 2202 may include a sensor flow control circuit 11704 operative to control a sensor couplant parameter 11714 of the couplant flowing to a corresponding one of the plurality of acoustic sensors 2202. The sensor couplant parameter 11714 may include a characteristic of the couplant, e.g., flow rate 11716, pressure 11718, temperature 11720 and/or any other characteristic suitable for managing flow of the couplant. In embodiments, the sensor flow control circuit 11704 may control the sensor couplant parameter 11714 in response to the sensor couplant status value 11706 for the corresponding acoustic sensor 2202.

Accordingly, in operation according to certain embodiments, external couplant is received from an external couplant source at the external couplant interface 11318 of the base station 4902. The base station 4902 may then condition the couplant, e.g., control temperature, pressure and/or flow rate, and pump the couplant to the chassis of the inspection robot 100 via the tether. The couplant may then be received by a reservoir and/or a manifold on the chassis of the inspection robot 100 where it may be further conditioned and distributed to the payloads 2 via the output couplant interfaces 11602. Each payload 2 may then receive and further condition the couplant before distributing the couplant to the sensors 2202. The sensors 2202, in turn, may further condition the couplant prior to introducing the couplant into the coupling chamber. As will be appreciated, conditioning the couplant at multiple points along its path from the couplant source to the coupling chamber provides for greater control over the couplant. Further, having multiple conditioning points for the couplant provides for the ability to tailor the couplant to the needs of individual payloads 2 and/or sensors 2202, which in turn, may provide for improved efficiency in the quality of acquired data by the sensors 2202. For example, a first payload 2 of the inspection robot 100 may be positioned over a portion of the inspection surface that is bumpier than another portion which a second payload 2 of the inspection robot 100 may be positioned over. Accordingly, embodiments of the system for managing couplant, as described herein, may increase the flow rate of couplant to the first payload independently of the flow rate to the second payload. As will be understood, other types of couplant characteristics may be controlled independently across the payloads 2 and/or across the sensor 2202.

Figure 48:
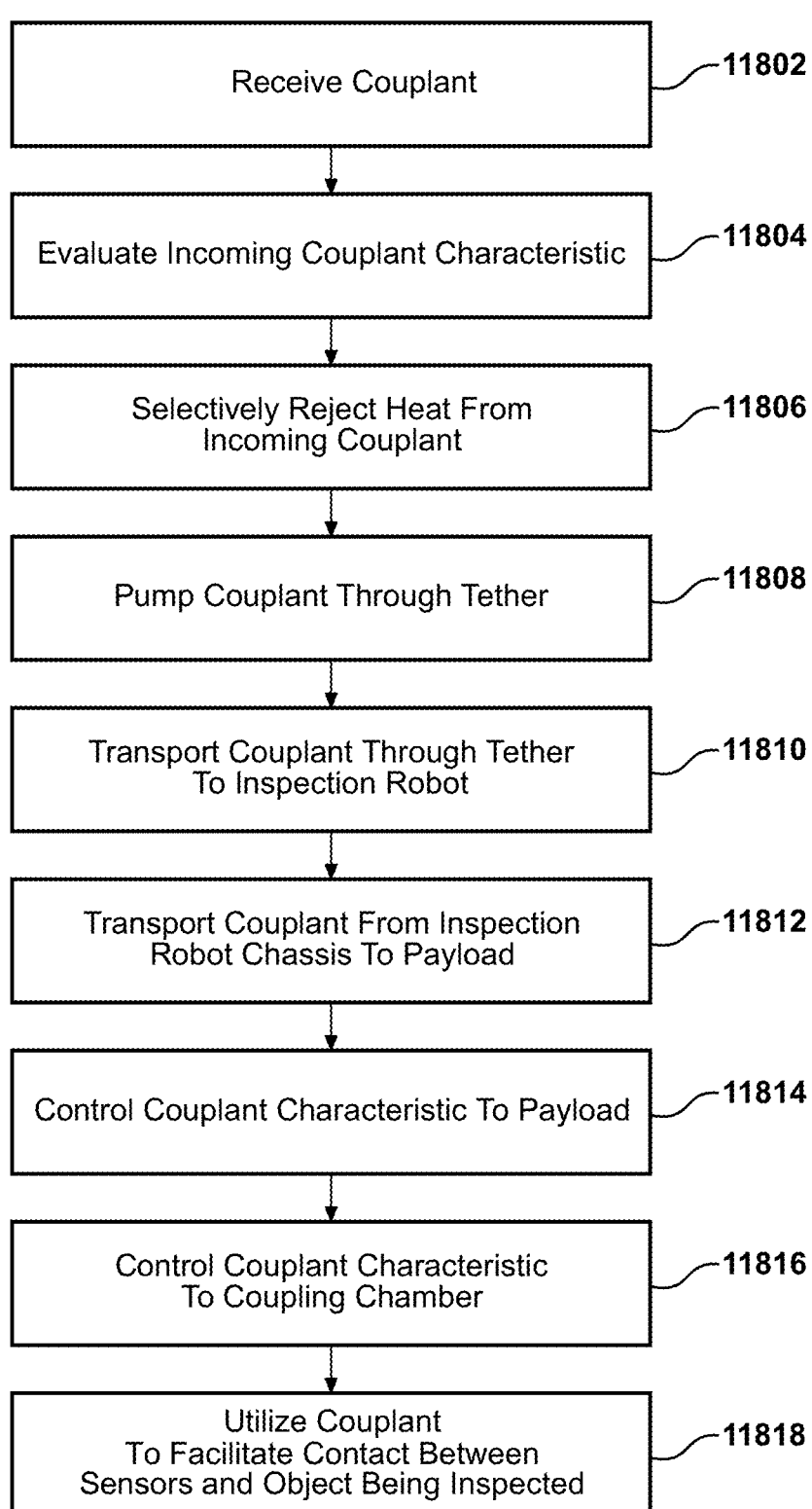
FIG. 48 is a flow chart depicting a method for managing couplant for an inspection robot, in accordance with an embodiment of the current disclosure.

Illustrated in FIG. 48 is a method for managing couplant for an inspection robot 100. The method may include receiving couplant 11802, transporting 11810 the couplant to the inspection robot 100 and utilizing 11818 the couplant to facilitate contact between an acoustic sensor 2202 of a payload 2 and a corresponding object, e.g., inspection surface 500, being inspected by the inspection robot 100. In embodiments, the method may include evaluating 11804 an incoming couplant characteristic, e.g., a pressure, a flow rate, a temperature, and/or other characteristics suitable for managing the couplant. In embodiments, the method may further include selective rejecting heat 11806 from the received couplant before the transporting the couplant through the tether to the inspection robot 100. In embodiments, the method may include pumping 11808 the couplant through the tether and/or transporting 11810 the couplant through the tether to the inspection robot 100. The method may further include transporting 11812 the couplant from the chassis of the inspection robot 100 to one or more payload 2. In embodiments, the method may further include controlling 11814 a couplant characteristic to the payload 2. The couplant characteristic controlled to the payload 2 may be a pressure, temperature, flow rate and/or other characteristic suitable for managing the couplant. In embodiments, the method may further include controlling 11816 a couplant characteristic to a coupling chamber positioned between the acoustic sensor and the corresponding object. The couplant characteristic controller to the coupling chamber may be a pressure, temperature, flow rate and/or other characteristic suitable for managing the couplant. In embodiments, the method may further include utilizing 11818 couplant to facilitate contact between sensors and object being inspected.

As will be appreciated, embodiments of the modular drive assemblies disclosed herein may provide for the ability to quickly swap out wheel configurations for the inspection robot. For example, a first modular drive assembly having wheels with a first shape corresponding to a first portion of an inspection surface (or the surface as a whole) may be switched out with another modular drive assembly having wheels with a shape corresponding to a second portion of the inspection surface (or a second inspection surface). For example, a first modular drive assembly may be used to inspect a first pipe having a first curvature and a second modular drive assembly may be used to inspect a second pipe having a second curvature.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

In certain embodiments, the robot configuration controller interprets a user inspection request value, for example from the user interface, and determines the inspection description value in response to the user inspection request value. For example, one or more users may provide inspection request values, such as an inspection type value (e.g., type of data to be taken, result types to be detected such as wall thickness, coating conformity, damage types, etc.), an inspection resolution value (e.g., a distance between inspection positions on the inspection surface, a position map for inspection positions, a largest un-inspected distance allowable, etc.), an inspected condition value (e.g., pass/fail criteria, categories of information to be labeled for the inspection surface, etc.), an inspection ancillary capability value (e.g., capability to repair, mark, and/or clean the surface, capability to provide a couplant flow rate, capability to manage a given temperature, capability to perform operations given a power source description, etc.), an inspection constraint value (e.g., a maximum time for the inspection, a defined time range for the inspection, a distance between an available base station location and the inspection surface, a couplant source amount or delivery rate constraint, etc.), an inspection sensor distribution description (e.g., a horizontal distance between sensors, a maximum horizontal extent corresponding to the inspection surface, etc.), an ancillary component description (e.g., a component that should be made available on the inspection robot, a description of a supporting component such as a power connector type, a couplant connector type, a facility network description, etc.), an inspection surface vertical extent description (e.g., a height of one or more portions of the inspection surface), a couplant management component description (e.g., a composition, temperature, pressure, etc. of a couplant supply to be utilized by the inspection robot during inspection operations), and/or a base station capability description (e.g., a size and/or position available for a base station, coupling parameters for a power source and/or couplant source, relationship between a base station position and power source and/or couplant source positions, network type and/or availability, etc.).

Example and non-limiting user inspection request values include an inspection type value, an inspection resolution value, an inspected condition value, and/or an inspection constraint value. Example and non-limiting inspection robot configuration description(s) include one or more of an inspection sensor type description (e.g., sensed values; sensor capabilities such as range, sensing resolution, sampling rates, accuracy values, precision values, temperature compatibility, etc.; and/or a sensor model number, part number, or other identifying description), an inspection sensor number description (e.g., a total number of sensors, a number of sensors per payload, a number of sensors per arm, a number of sensors per sled, etc.), an inspection sensor distribution description (e.g., horizontal distribution; vertical distribution; spacing variations; and/or combinations of these with sensor type, such as a differential lead/trailing sensor type or capability), an ancillary component description (e.g., a repair component, marking component, and/or cleaning component, including capabilities and/or constraints applicable for the ancillary component), a couplant management component description (e.g., pressure and/or pressure rise capability, reservoir capability, composition compatibility, heat rejection capability, etc.), and/or a base station capability description (e.g., computing power capability, power conversion capability, power storage and/or provision capability, network or other communication capability, etc.).

A trajectory, as used herein, indicates a progression, sequence, and/or scheduled development of a related parameter over time, operating conditions, spatial positions, or the like. A trajectory may be a defined function (e.g., corresponding values of parameter A that are to be utilized for corresponding values of parameter B), an indicated direction (e.g., pursuing a target value, minimizing, maximizing, increasing, decreasing, etc.), and/or a state of an operating system (e.g., lifted, on or off, enabled or disabled, etc.). In certain embodiments, a trajectory indicates activation or actuation of a value over time, activation or actuation of a value over a prescribed group of operating conditions, activation or actuation of a value over a prescribed spatial region (e.g., a number of inspection surfaces, positions and/or regions of a specific inspection surface, and/or a number of facilities), and/or activation or actuation of a value over a number of events (e.g., scheduled by event type, event occurrence frequency, over a number of inspection operations, etc.). In certain embodiments, a trajectory indicates sensing a parameter, operating a sensor, displaying inspection data and/or visualization based on inspection data, over any of the related parameters (operating conditions, spatial regions, etc.) listed foregoing. The examples of a trajectory set forth with regard to the presently described embodiments are applicable to any embodiments of the present disclosure, and any other descriptions of a trajectory set forth elsewhere in the present disclosure are applicable to the presently described embodiments.

A response, as used herein, and without limitation to any other aspect of the present disclosure, includes an adjustment to at least one of: an inspection configuration for the inspection robot while on the surface (e.g., a change to sensor operations; couplant operations; robot traversal commands and/or pathing; payload configurations; and/or down force configuration for a payload, sled, sensor, etc.); a change to display operations of the inspection data; a change to inspection data processing operations, including determining raw sensor data, minimal processing operations, and/or processed data values (e.g., wall thickness, coating thickness, categorical descriptions, etc.); an inspection configuration for the inspection robot performed with the inspection robot removed from the inspection surface (e.g., changed wheel configurations, changed drive module configurations; adjusted and/or swapped payloads; changes to sensor configurations (e.g., switching out sensors and/or sensor positions); changes to hardware controllers (e.g., switching a hardware controller, changing firmware and/or calibrations for a hardware controller, etc.); and/or changing a tether coupled to the inspection robot. The described responses are non-limiting examples, and any other adjustments, changes, updates, or responses set forth throughout the present disclosure are contemplated herein for potential rapid response operations. Certain responses are described as performed while the inspection robot is on the inspection surface and other responses are described as performed with the inspection robot removed from the inspection surface, although any given response may be performed in the other condition, and the availability of a given response as on-surface or off-surface may further depend upon the features and configuration of a particular inspection robot, as set forth in the multiple embodiments described throughout the present disclosure. Additionally, or alternatively, certain responses may be available only during certain operating conditions while the inspection robot is on the inspection surface, for example when the inspection robot is in a location physically accessible to an operator, and/or when the inspection robot can pause physical movement and/or inspection operations such as data collection. One of skill in the art, having the benefit of the present disclosure and information ordinarily available when contemplating a particular system and/or inspection robot, can readily determine response operations available for the particular system and/or inspection robot.

A response that is rapid, as used herein, and without limitation to any other aspect of the present disclosure, includes a response capable of being performed in a time relevant to the considered downstream utilization of the response. For example, a response that can be performed during the inspection operation, and/or before the completion of the inspection operation, may be considered a rapid response in certain embodiments, allowing for the completion of the inspection operation utilizing the benefit of the rapid response. Certain further example rapid response times include: a response that can be performed at the location of the inspection surface (e.g., without requiring the inspection robot be returned to a service or dispatching facility for reconfiguration); a response that can be performed during a period of time wherein a downstream customer (e.g., an owner or operator of a facility including the inspection surface; an operator of the inspection robot performing the inspection operations; and/or a user related to the operator of the inspection robot, such as a supporting operator, supervisor, data verifier, etc.) of the inspection data is reviewing the inspection data and/or a visualization corresponding to the inspection data; and/or a response that can be performed within a specified period of time (e.g., before a second inspection operation of a second inspection surface at a same facility including both the inspection surface and the second inspection surface; within a specified calendar period such as a day, three days, a week, etc.). An example rapid response includes a response that can be performed within a specified time related to interactions between an entity related to the operator of the inspection robot and an entity related to a downstream customer. For example, the specified time may be a time related to an invoicing period for the inspection operation, a warranty period for the inspection operation, a review period for the inspection operation, and or a correction period for the inspection operation. Any one or more of the specified times related to interactions between the entities may be defined by contractual terms related to the inspection operation, industry standard practices related to the inspection operation, an understanding developed between the entities related to the inspection operation, and/or the ongoing conduct of the entities for a number inspection operations related to the inspection operation, where the number of inspection operations may be inspection operations for related facilities, related inspection surfaces, and/or previous inspection operations for the inspection surface. One of skill in the art, having the benefit of the disclosure herein and information ordinarily available when contemplating a particular system and/or inspection robot, can readily determine response operations and response time periods that are rapid responses for the purposes of the particular system.

Certain considerations for determining whether a response is a rapid response include, without limitation, one or more of: The purpose of the inspection operation, how the downstream customer will utilize the inspection data from the inspection operation, and/or time periods related to the utilization of the inspection data; entity interaction information such as time periods wherein inspection data can be updated, corrected, improved, and/or enhanced and still meet contractual obligations, customer expectations, and/or industry standard obligations related to the inspection data; source information related to the response, such as whether the response addresses an additional request for the inspection operation after the initial inspection operation was performed, whether the response addresses initial requirements for the inspection operation that were available before the inspection operation was commenced, whether the response addresses unexpected aspects of the inspection surface and/or facility that were found during the inspection operations, whether the response addresses an issue that is attributable to the downstream customer and/or facility owner or operator, such as: inspection surface has a different configuration than was indicated at the time the inspection operation was requested; the facility owner or operator has provided inspection conditions that are different than planned conditions, such as couplant availability, couplant composition, couplant temperature, distance from an available base station location to the inspection surface, coating composition or thickness related to the inspection surface, vertical extent of the inspection surface, geometry of the inspection surface such as pipe diameters and/or tank geometry, availability of network infrastructure at the facility, availability of position determination support infrastructure at the facility, operating conditions of the inspection surface (e.g., temperature, obstacles, etc.); additional inspected conditions are requested than were indicated at the time of the inspection operation was requested; and/or additional inspection robot capabilities such as marking, repair, and/or cleaning are requested than were indicated at the time the inspection operation was requested.

The example utilizes x-y coverage resolution to illustrate the inspection surface as a two-dimensional surface having a generally horizontal (or perpendicular to the travel direction of the inspection robot) and vertical (or parallel to the travel direction of the inspection robot) component of the two-dimensional surface. However, it is understood that the inspection surface may have a three-dimensional component, such as a region within a tank having a surface curvature with three dimensions, a region having a number of pipes or other features with a depth dimension, or the like. In certain embodiments, the x-y coverage resolution describes the surface of the inspection surface as traversed by the inspection robot, which may be two dimensional, coneeptually two dimensional with aspects have a three dimensional component, and/or three dimensional. The description of horizontal and vertical as related to the direction of travel is a non-limiting example, and the inspection surface may have a first coneeptualization of the surface (e.g., x-y in a direction unrelated to the traversal direction of the inspection robot), where the inspection robot traverses the inspection surface in a second coneeptualization of the surface (e.g., x-y axes oriented in a different manner than the x-y directions of the first coneeptualization), where the operations of the inspection robot such as movement paths and/or sensor inspection locations performed in the second conceptualization are transformed and tracked in the first coneeptualization (e.g., by the inspection map configuration circuit, a controller on the inspection robot, a controller on a base station, etc.) to ensure that the desired inspection coverage from the view of the first coneeptualization are achieved.

Figure 53:
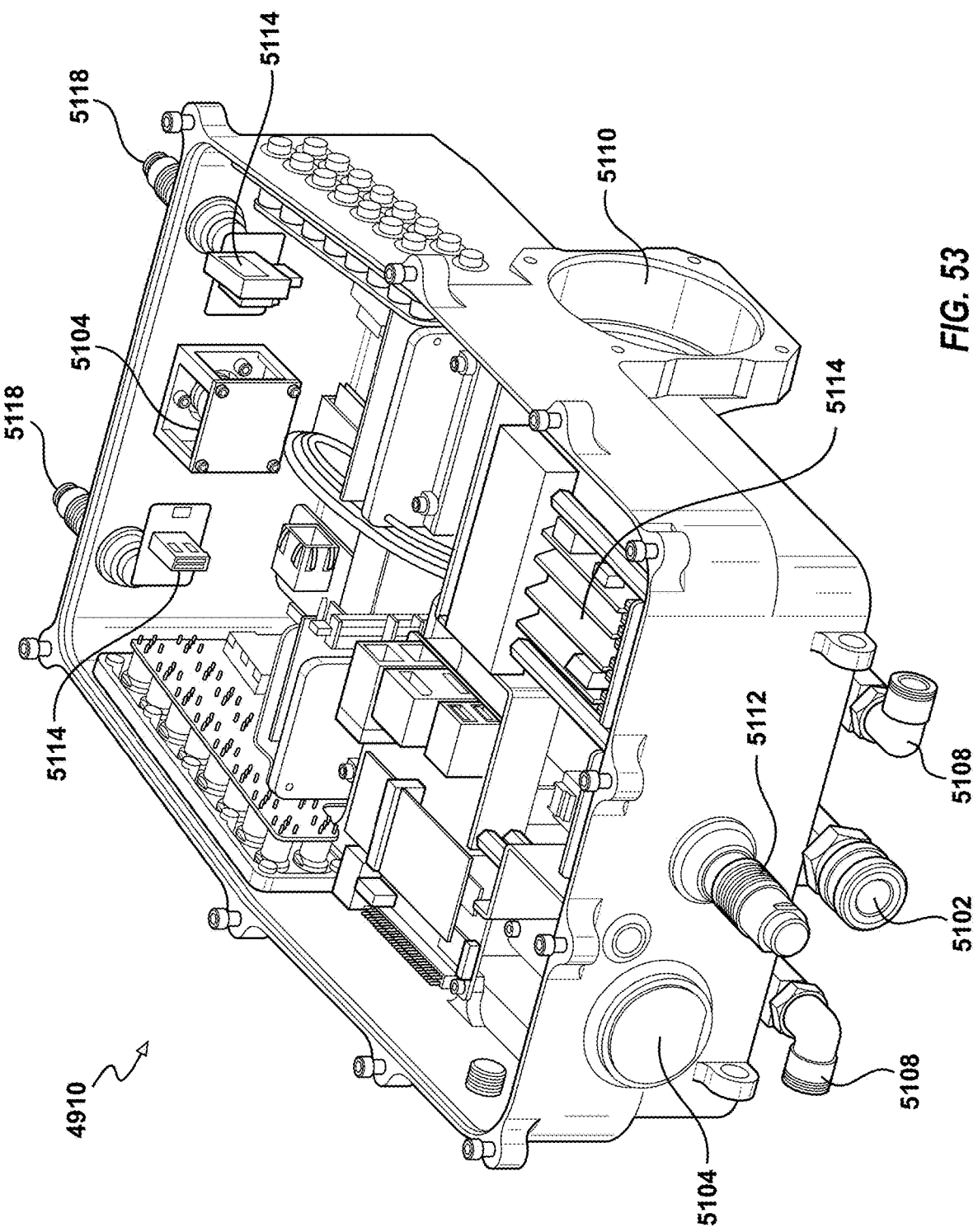
FIG. 53 depicts an internal view of certain components of the center module, in accordance with an embodiment of the current disclosure.

As shown in FIG. 53, the center module 4910 (or center body) of the robot may include a couplant inlet 5102, a data communications/control tether input 5112, forward facing and reverse facing navigation cameras 5104, multiple chassis control interfaces (connectors) 5118, couplant outlets 5108 (e.g., to each payload), and one or more drive module connections 5110 (e.g., one on each side). An example center module 4910 includes a distributed controller design, with low-level and hardware control decision making pushed down to various low level control modules (e.g., 5114, and/or further control modules on the drive modules as described throughout the present disclosure). The utilization of a distributed controller design, facilitates rapid design, rapid upgrades to components, and compatibility with a range of components and associated control modules 5114. For example, the distributed controller design allows the high level controller (e.g., the brain/gateway) to provide communications in a standardized high-level format (e.g., requesting movement rates, sensed parameter values, powering of components, etc.) without utilizing the hardware specific low-level controls and interfaces for each component, allowing independent development of hardware components and associated controls. The use of the low-level control modules may improve development time and enable the base level control module to be component neutral and send commands, leaving the specific implementation up to the low-level control module 5114 associated with a specific camera, sensor, sensor module, actuator, drive module, and the like. The distributed controller design may extend to distributing the local control to the drive module(s) and sensor module(s) as well.

Figure 54:
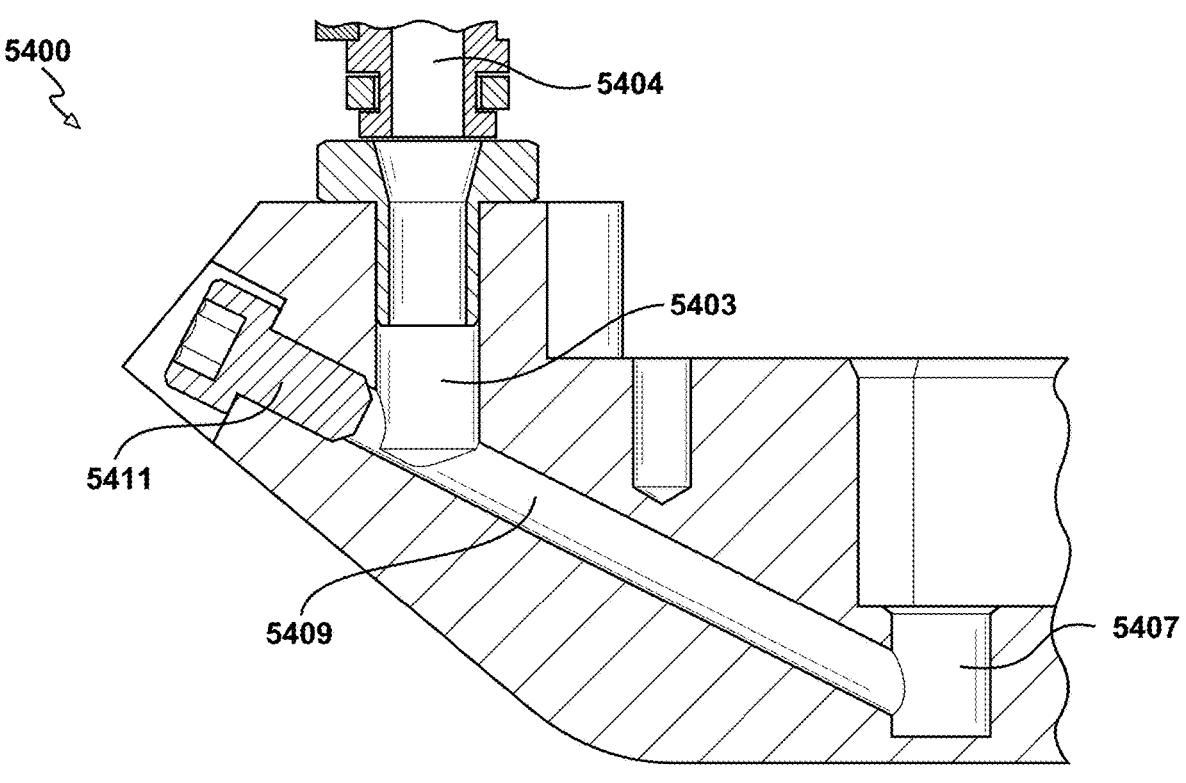
FIG. 54 depicts a side cutaway view of an example couplant routing mechanism for a sled, in accordance with an embodiment of the current disclosure.
Figure 55:
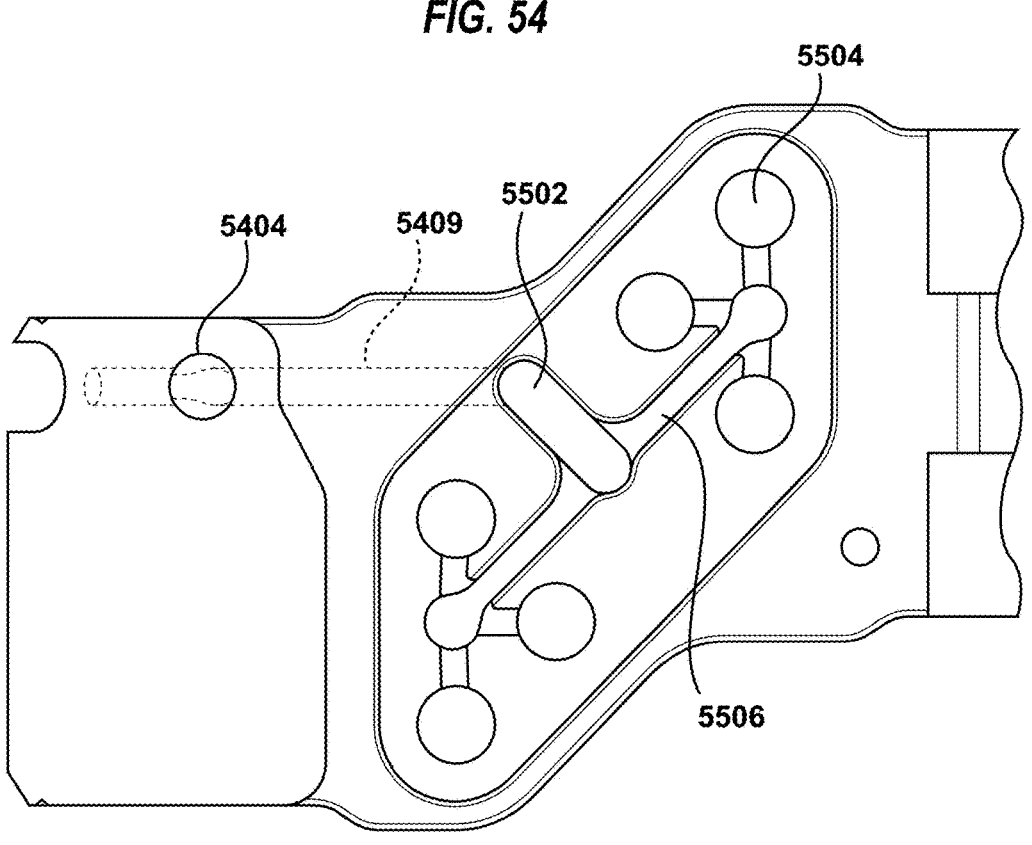
FIG. 55 depicts a partial cutaway bottom view of the example couplant routing mechanism for a sled, in accordance with an embodiment of the current disclosure.

Referencing FIGS. 54-55, example alternate embodiments for sleds, arms, payloads, and sensor interfaces, including sensor mounting and/or sensor electronic coupling, are described herein. The examples of FIGS. 54-55, and/or aspects of the examples of FIGS. 54-55, may be included in embodiments of inspection robots, payloads, arms, sleds, and arrangements of these as described throughout the present disclosure. The examples of FIGS. 54-55 include features that provide for, without limitation, case of integration, simplified coupling, and/or increased options to achieve selected horizontal positioning of sensors, selected horizontal sensor spacing, increased numbers of sensors on a payload and/or inspection robot, and/or increased numbers of sensor types available within a given geometric space for an inspection robot.

Referencing FIG. 54, a side cutaway view 5400 of an example couplant routing mechanism for a sled is depicted. The example of FIG. 54 includes a first portion of couplant channel 5403 that fluidly couples a couplant interface 5404 for the sled to a couplant manifold 5407 of the sled (via the second portion of couplant channel 5409 in the example), providing for a single couplant interface 5404 to provide couplant to a number of sensors coupled to the sled. The example of FIG. 54 includes a couplant seal 5411 to selectively seal the portions of couplant channel 5403, 5409, which may be provided as an access position for a sensor (e.g., to determine an aspect of the couplant in the portions of couplant channel 5403, 5409 such as a temperature, composition, etc.), and/or to allow for a simple fabrication of the sled. For example, the first portion of couplant channel 5403 may be provided by a first drilling or machining operation, and the second portion of couplant channel 5409 may be provided by a second drilling or machining operation, with the resulting opening scaled with the couplant seal 5411. In certain embodiments, for example where the portions of couplant channel 5403, 5409 are formed by an additive manufacturing operation, the portions of couplant channel 5403, 5409 may be formed without the opening, and the couplant seal 5411 may be omitted. The couplant manifold 5407 may be formed by the sled, and/or may be formed by the sled interfacing with a sensor mounting insert.

Referencing FIG. 55, a partial cutaway bottom view of the example couplant routing mechanism for the sled is depicted. The example of FIG. 55 is compatible with an embodiment having a sled lower body portion as partially depicted in FIG. 54, wherein a sled mounting insert is coupled to the sled lower body portion forming the sled having sensors mounted thereon. The example of FIG. 55 includes a sled manifold portion 5502, consistent with the side view depicting the couplant manifold 5407. The sled manifold portion 5502 is fluidly coupled to the portions of couplant channel 5409, 5403, and includes a distributing portion 5506 routing couplant to couplant chamber groups associated with sensors to be mounted on the sled. The sled further includes a sensor opening 5504, which is an opening defined by the manifold configuration. Each sensor opening 5504 may have a sensor mounted to interrogate the inspection surface through the sensor opening 5504, where the manifold configuration defining the opening interacts with the sensor to form a couplant chamber. The couplant chamber, when filled with couplant, provides acoustic coupling between the sensor and the inspection surface, and a resulting distance between the inspection surface and the associated sensor at the respective sensor opening 5504 provides the delay line corresponding to that sensor. Up to 6 sensors may be mounted on a single sled. Additionally, the position of the sensor openings 5504 and can be provided such that each sensor opening 5504 is horizontally displaced (e.g., at a distinct vertical position of FIG. 55 as depicted, where the sled in operation traverses the inspection surface to the left or to the right), and/or has a selected horizontal displacement. Accordingly, an embodiment such as that depicted in FIG. 55 includes multiple sensors on a single sled, having selected horizontal distribution. In certain embodiments, one of the available sensors may not be mounted on the sled, and the corresponding sensor opening 5504 may be sealed, and/or may just be allowed to leak couplant during operations of the inspection robot. In certain embodiments, one or more additional sensors (e.g., a sensor that is not a UT sensor) may be mounted to the sled at one of the sensor openings 5504, and the sensor may operate in the presence of the couplant, be sealed from the manifold, and/or a portion of the manifold may be omitted. For example, an embodiment of FIG. 55 where a leg of the manifold is omitted allows for three mounted UT sensors in a first sensor group, and three mounted sensor of another type in a second sensor group. Additionally or alternatively, a sensor mounting insert, a portion of the manifold, including a leg of the manifold and/or just a single sensor position, allowing for a group of sensors mounted on a sensor mounting insert to have the proper couplant flow configuration in a single operation of coupling the sensor mounting insert to the sled lower body portion.

Figure 50:
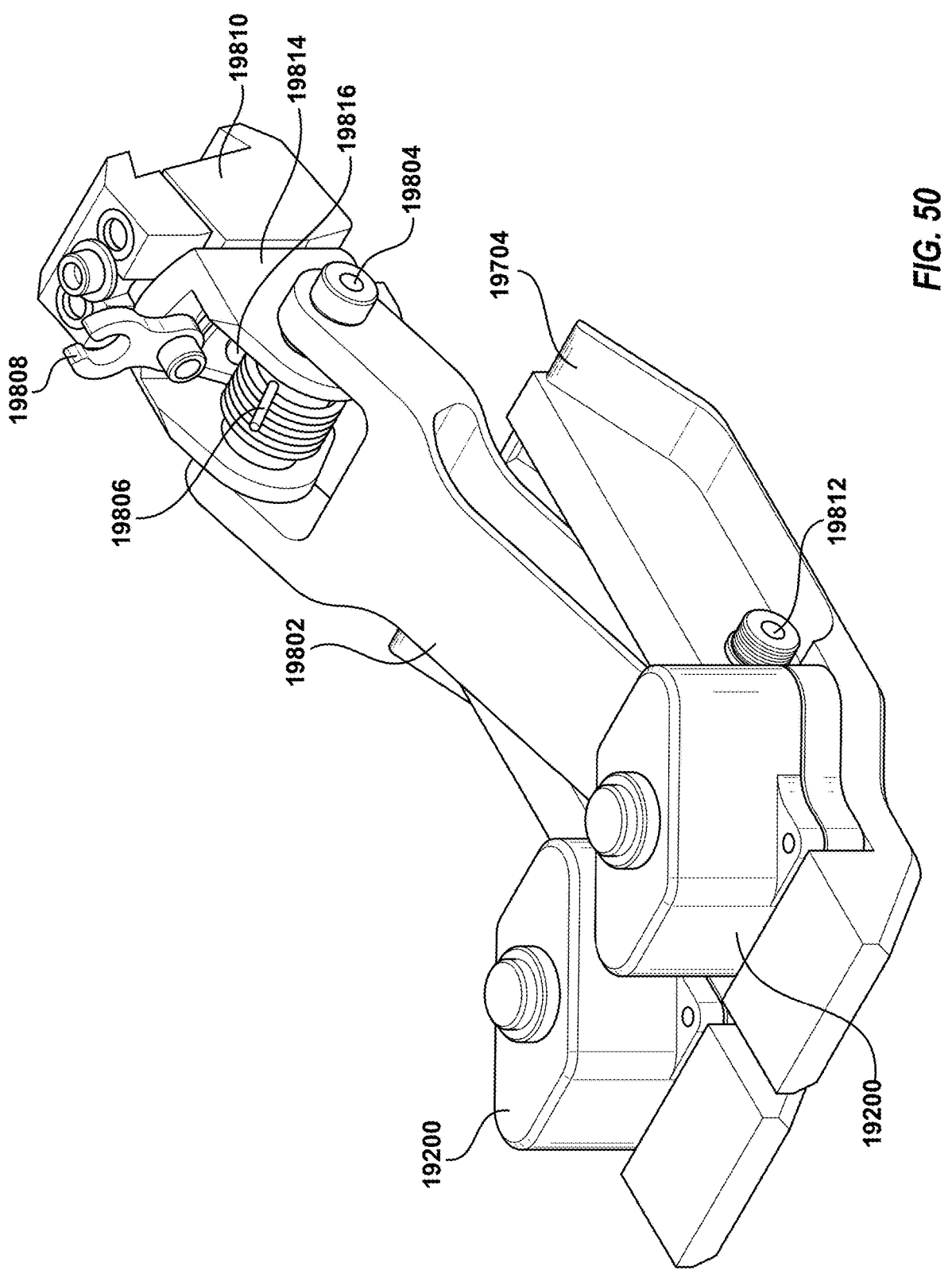
FIG. 50 depicts an example payload having an arm and two sleds mounted thereto, in accordance with an embodiment of the current disclosure.

Referencing FIG. 50, an example payload having an arm and two sleds mounted thereto is depicted. In certain embodiments, the arrangement of FIG. 50 forms a portion of a payload, for example as an arm coupled to a payload at a selected horizontal position. In certain embodiments, the arrangement of FIG. 50 forms a payload, for example coupled at a selected horizontal position to a rail or other coupling feature of an inspection robot chassis, thereby forming a payload having a number of inspection sensors mounted thereon. The example of FIG. 50 includes an arm 19802 coupling the sled to a payload coupling 19810 (and/or chassis coupling 19810). The arm 19802 defines a passage therethrough, wherein a couplant connection may pass through the passage, or may progress above the arm to couple with the sensor lower body portion. The arrangement of FIG. 50 provides multiple degrees of freedom for movement of the sled, any one or more of which may be present in certain embodiments. For example, the pivot coupling 19812 of the arm 19802 to the sled allows for pivoting of the sled relative to the arm 19802, and each sled of the pair of sleds depicted may additionally or alternatively pivot separately or be coupled to pivot together (e.g., pivot coupling 19812 may be a single axle, or separate axles coupled to each sled). The arm coupling 19804 provides for pivoting of the arm 19802 relative to the inspection surface (e.g., raising or lowering), and a second arm coupling 19816 provides for rotation of the arm 19802 (and coupling joint 19814) along a second perpendicular axis relative to arm coupling 19804. Accordingly, couplings 19804, 19816 operate together to in a two-axis gimbal arrangement, allowing for rotation in one axis, and pivoting in the other axis. The selected pivoting and/or rotational degrees of freedom are selectable, and one or more of the pivoting or rotational degrees of freedom may be omitted, limited in available range of motion, and/or be associated with a biasing member that urges the movement in a selected direction and/or urges movement back toward a selected position. In the example of FIG. 50, a biasing spring 19806 urges the pivot coupling 19812 to move the arm 19802 toward the inspection surface, thereby contributing to a selected downforce on the sled. Any one or more of the biasing members may be passive (e.g., having a constant arrangement during inspection operations) and/or active (e.g., having an actuator that adjusts the arrangement, for example changing a force of the urging, changing a direction of the urging, and/or changing the selected position of the urging. The example of FIG. 50 depicts selected ramps 19704 (11 in FIG. 51) defined by the sled, and sensor group housing 19200 elements positioned on each sled and coupling the sensors to the sled and/or the inspection surface. The example of FIG. 50 further includes a coupling line retainer 19808 that provides for routing of couplant lines and/or electrical communication away from rotating, pivoting, or moving elements, and provides for consistent positioning of the couplant lines and/or electrical communication for case of interfacing the arrangement of FIG. 50 with a payload and/or inspection chassis upon which the arrangement is mounted. The example payload coupling 19810 includes a clamp having a moving portion and a stationary portion, and may be operable with a screw, a quick connect element (e.g., a wing nut and/or cam lever arrangement), or the like. The example payload coupling 19810 is a non-limiting arrangement, and the payload/chassis coupling may include any arrangement, including, without limitation, a clamp, a coupling pin, an R-clip (and/or a pin), a quick connect element, or combinations among these elements.

In certain embodiments, an inspection robot and/or payload arrangement may be configured to engage a flat inspection surface. Engagement to a flat inspection surface is a non-limiting example, and other arrangements may include utilizing sled bottom surfaces, overall sled engagement positions, or freedom of relative movement of sleds and/or arms to engage a curved surface, a concave surface, a convex surface, and/or combinations of these (e.g., a number of parallel pipes having undulations, varying pipe diameters, etc.). An inspection robot and/or payload arrangement as set forth herein may be configured to provide a number of inspection sensors distributed horizontally and operationally engaged with the inspection surface, where movement on the inspection surface by the inspection robot moves the inspection sensors along the inspection surface. In certain embodiments, the arrangement is configurable to ensure the inspection sensors remain operationally engaged with a flat inspection surface, with a concave inspection surface, and/or with a convex inspection surface. Additionally, the arrangement is configurable, for example utilizing pivotal and/or rotation arrangements of the arms and/or payloads, to maintain operational contact between the inspection sensors and an inspection surface having a variable curvature. For example, an inspection robot positioned within a large concave surface such as a pipe or a cylindrical tank, where the inspection robot moves through a vertical orientation (from the inspection robot perspective) is not either parallel to or perpendicular to a longitudinal axis of the pipe, will experience a varying concave curvature with respect to the horizontal orientation (from the inspection robot perspective), even where the pipe has a constant curvature (from the perspective of the pipe). In another example, an inspection robot traversing an inspection surface having variable curvature, such as a tank having an ellipsoid geometry, or a cylindrical tank having caps with a distinct curvature relative to the cylindrical body of the tank.

Numerous embodiments described throughout the present disclosure are well suited to successfully execute inspections of inspection surfaces having flat and/or varying curvature geometries. For example, payload arrangements described herein allow for freedom of movement of sensor sleds to maintain operational contact with the inspection surface over the entire inspection surface space. Additionally, control of the inspection robot movement with positional interaction, including tracking inspection surface positions that have been inspected, determining the position of the inspection robot using dead reckoning, encoders, and/or absolute position detection, allows for assurance that the entire inspection surface is inspected according to a plan, and that progression across the surface can be performed without excessive repetition of movement. Additionally, the ability of the inspection robot to determine which positions have been inspected, to utilize transformed conceptualizations of the inspection, and the ability of the inspection robot to reconfigure (e.g., payload arrangements, physical sensor arrangements, down force applied, and/or to raise payloads), enable and/or disable sensors and/or data collection, allows for assurance that the entire inspection surface is inspected without excessive data collection and/or utilization of couplant. Additionally, the ability of the inspection robot to traverse between distinct surface orientations, for example by lifting the payloads and/or utilizing a stability support device, allows the inspection robot to traverse distinct surfaces, such as surfaces within a tank interior, surfaces in a pipe bend, or the like. Additionally, embodiments set forth herein allow for an inspection robot to traverse a pipe or tank interior or exterior in a helical path, allowing for an inspection having a selected inspection resolution of the inspection surface within a single pass (e.g., where representative points are inspected, and/or wherein the helical path is selected such that the horizontal width of the sensors overlaps and/or is acceptably adjacent on subsequent spirals of the helical path).

It can be seen that various embodiments herein provide for an inspection robot capable to inspect a surface such as an interior of a pipe and/or an interior of a tank. Additionally, embodiments of an inspection robot herein are operable at elevated temperatures relative to acceptable temperatures for personnel, and operable in composition environments (e.g., presence of CO2, low oxygen, etc.) that are not acceptable to personnel. Additionally, in certain embodiments, entrance of an inspection robot into certain spaces may be a trivial operation, where entrance of a person into the space may require exposure to risk, and/or require extensive preparation and verification (e.g., lock-out/tag-out procedures, confined space procedures, exposure to height procedures, etc.). Accordingly, embodiments throughout the present disclosure provide for improved cost, safety, capability, and/or completion time of inspections relative to previously known systems or procedures.

Presently available inspection devices for inspection surfaces related to welded and joined metal sections suffer from a number of drawbacks. Ultrasonic testing of weld areas and affected zones (e.g., areas heated by and/or affected by welding operations in the region of the weld) involve the traversal of the sensor head—for example a single UT sensor that is rastered back and forth to inspect a slice of the surface (e.g., a 200 mills, or $\frac{1}{5}$ of an inch), then the sensor is advanced (e.g., about 200 mills again, if full surface inspection coverage is desired), and the operation is repeated until the desired surface coverage is inspected. Presently available devices and processes are therefore slow, expensive, and require significant manual management—for example inspecting and aligning the sensor along the weld area.

Systems, devices, and procedures as set forth herein provide for a number of improvements over previously known systems. Example systems allow for inspection of a significantly greater slice at a time—for example, three times to ten times the inspection area for each rastering slice, and additionally provide for improved inspection operations that are more likely to detect thin features (e.g., small cracks, and/or cracks that are significantly parallel with the rastering direction, which are difficult to detect with a single sensor scan). Additionally, systems herein provide for significantly improved coverage relative the inspection area. Determination of damage, aging, or other failures relative to welds and heat affected areas are difficult, and sensitive to the context of detected features. For example, a bulk crack that is not associated with another feature such as corrosion, damage, hydrogen induced corrosion, and/or that is not in a stress direction may be less likely to propagate and/or cause further degradation or failure. Accordingly, the specific location of cracks, the features and corrosion mechanisms that are closely associated with cracks, and/or the orientation and/or progression over time of a crack are critical to understanding when repair or maintenance may be required, and/or when a failure is imminent. Systems herein provide for improved resolution in the inspection area, and improved diversity of sensor orientation(s) relative to the inspected areas. Further, systems herein provide for improved inspection speeds, and improved operations that provide for greater confidence that the proper area is being inspected, and that allow for greater automation of the inspection operations, providing for adjustment and confirmation of inspection operations without manual inputs, and allowing for inspection of surfaces that may be in dangerous areas (e.g., a high H2S environment), confined spaces, and/or other areas where manual operations are expensive, dangerous, or unavailable (e.g., within a pipe that a person cannot enter, and/or surfaces positioned in locations where a person cannot physically reach).

Previously known weld inspection operations are performed with a high degree of manual inputs, including positioning of sensors, movement of sensors along the weld, and manual verification of inspection positioning with regard to the weld. Additionally, tools for inspecting the weld and inspecting the heat affected area of the weld are separate devices, requiring two separate inspection operations to cover both the weld and the heat affected area.

Systems provided herein are capable to perform a weld inspection simultaneously with a heat affected zone inspection, and additionally are capable to ensure inspection of the proper area, traversal of obstacles, following a contour of a weld (including non-linear contours, intersecting weld areas, etc.) without manual input or interaction, and accordingly without requiring (or greatly reducing exposure) that personnel directly engage confined spaces or other environmental hazards.

Figure 95:
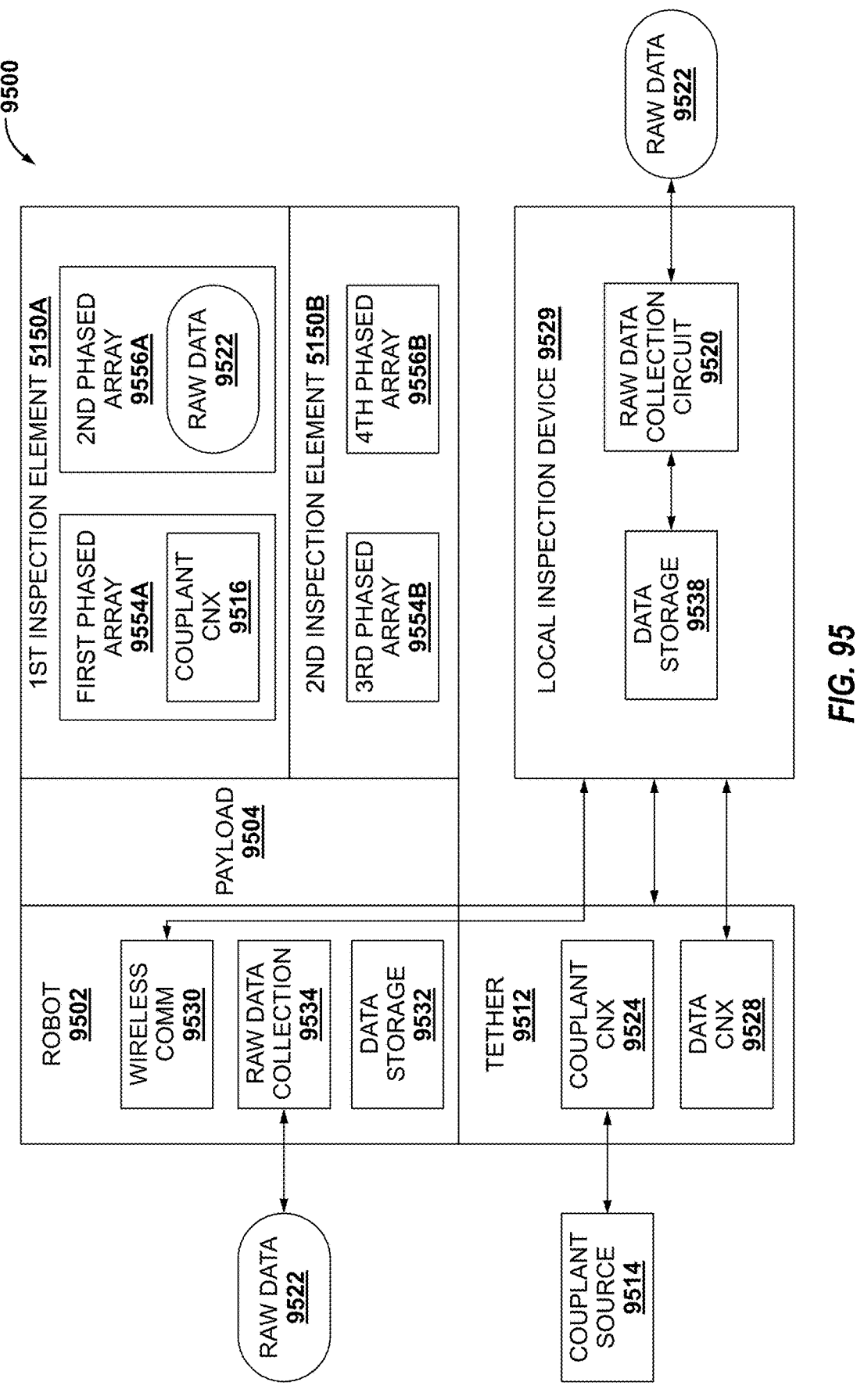
FIG. 95 is a block diagram illustrating an example inspection system, in accordance with an embodiment of the current disclosure.

Referencing FIG. 95, an example system 9500 includes an inspection robot 9502 schematically depicted, having a number of features herein that provide for rapid inspection of an inspection surface in a selected zone. The selected zone may be a heat affected area, for example a region near a weld that may be affected by the heat generated in welding operations, and/or a region near a weld that is to be inspected for damage, wear, or other artefacts generated by the welding operations, that subsequently occur over time in response to changes to the region from the welding operations, and/or a region where degradation of the region may affect the weld. An example heat affected area is about 6 inches on either side of the weld, but the size of the heat affected area may depend upon the material of the weld and/or inspection surface, the welding operations performed (e.g., type of weld, temperature of welding operations, time of welding operations, etc.), environmental conditions (e.g., ambient temperature, ambient environment, etc., during the welding operations and/or in-use of the inspection surface), thickness of the inspection surface material, purpose and/or criticality of the inspection surface, industry standard regions to be treated as the affected region, and/or regulatory requirements for inspection of a region as a heat affected region.

In the example of FIG. 95, an example inspection payload 9504 includes a multi-phased array, for example one or more arrays 9154, 9156 of UT sensors, which may be rastered (e.g., moved back and forth) over a traversal region. The traversal region may be sized sufficiently such that the inspected region covers the heat affected region. The example payload is an inspection assembly 9150 which includes a multi-phased array that is oriented vertically (e.g., in the direction of travel of the inspection robot 100), rather than a typical horizontal arrangement for a multi-phased array. The multi-phased array allows for the inspection robot 9502 to cover a greater extent of the inspection along the direction of travel 9604 (e.g., reference FIG. 96) for each rastering operation, allowing for more rapid inspection of the inspection surface. Although examples elsewhere herein describe UT phased sensor arrays with 64 sensors (channels), for clarity of the present description, however, any number of UT sensors may be provided in the array. An example multi-phased array may include 8 sensors, 16 sensors, 32 sensors, 64 sensors, 128 sensors, and/or any other number of sensors (including numbers of sensors that are NOT a power of 2). An example multi-phased array including 64 sensors can inspect a given surface much more quickly than a single sensor arrangement as previously known, since each rastering operation is inspecting a greater extent of the surface along the direction of travel 9604, and typically with improved resolution within the inspected region. Based on simulation and experience, an embodiment such as depicted in FIGS. 95-96 can readily inspect a surface at least about 5 times faster than previously known systems, while providing for improved inspection operations including a greater resolution, ability to detect cracks that are oriented in unfavorable detection directions, and with an improved determination of proximity to features of interest that can differentiate cracks or defects that are likely to require a response from cracks or defects that can be ignored or have a deferred response.

One challenge presented from a multi-phase array includes capturing a processing a large amount of data that is provided by UT sensors, as well as managing the sensors and inspection operations, for example providing couplant to the array to ensure that sensors are acoustically coupled to the surface, providing power and communications to the sensors and/or rastering actuator, and the like.

In certain embodiments, the inspection robot 9502 may include a camera or other imaging device, for example to allow for remote positioning and/or confirmation of position for the inspection robot 9502 without manual intervention or the user having to be in proximity to the inspection robot 100. Additionally or alternatively, the inspection robot 9502 includes drive control allowing for steering operations, traversal on the inspection surface, and the like. Additionally or alternatively, the inspection robot 9502 includes payload control, for example allowing operations to lift the payload (e.g., to traverse an obstacle), to shift the payload (e.g., extending away from or closer to the inspection robot in the vertical direction, and/or shifting of the payload nominal position in the horizontal direction), and/or additionally allows for adjustment of the region measured in the direction of inspection (also referred to as the traversal region) (e.g., wider, narrower, and/or shifted). Payload control operations may be responsive to the inspection surface (e.g., where the heat affected region varies along the inspection surface, where obstacles are known or planned for, and/or based on detected features from a previous inspection operation—for example an extent of previous damage, confirmation of a repair, etc.), and/or may be based upon observations and/or inspection data determined during the inspection operation—e.g., adjusting the size and/or arrangement of the heat affected area to be inspected based on inspection data.

Figure 96:
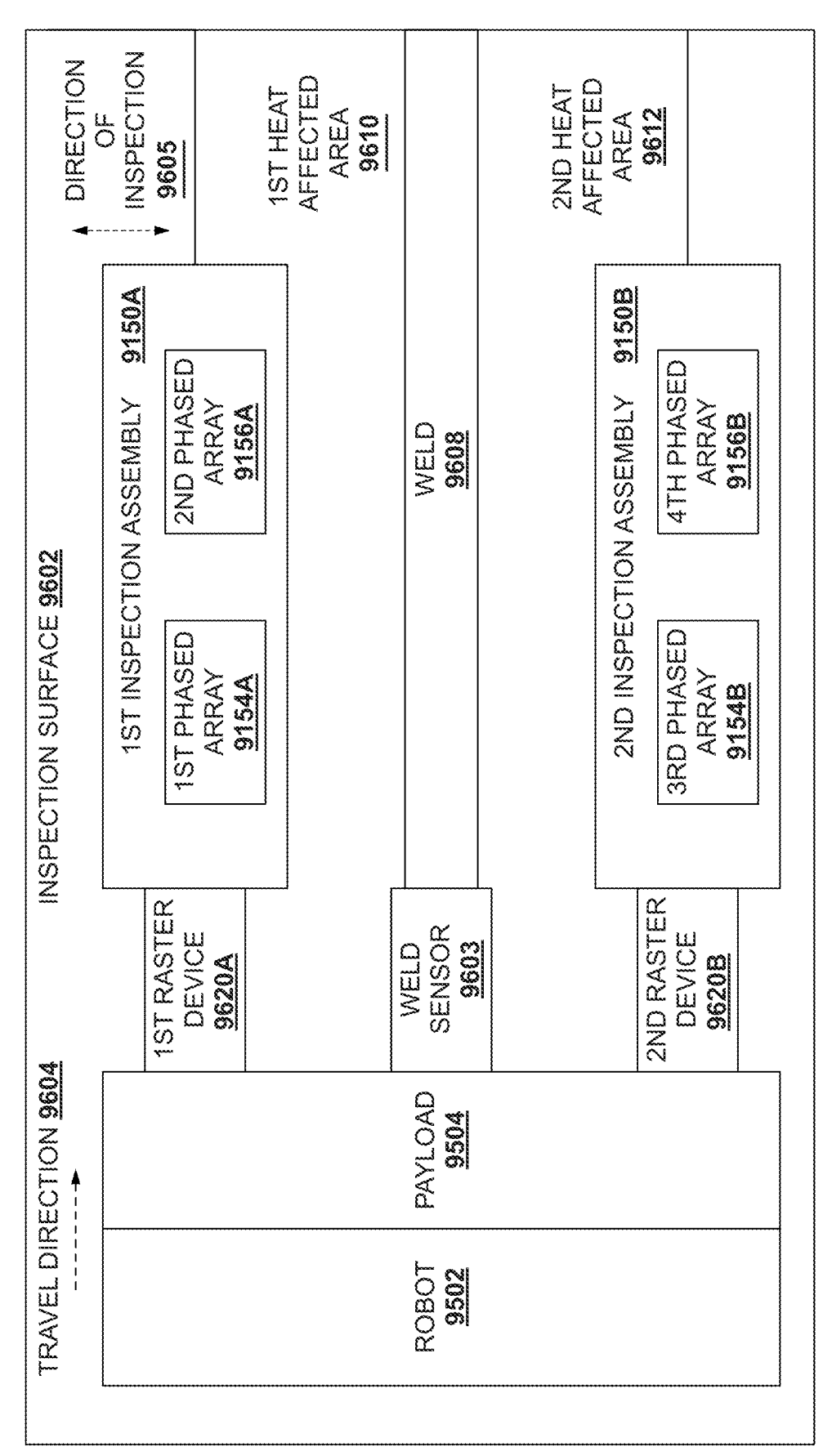
FIG. 96 is a block diagram illustrating an example inspection device on an inspection surface, in accordance with an embodiment of the current disclosure.

Referencing FIG. 96, an example system 9500 including an example inspection robot 9502 capable of inspecting a weld 9608 of an inspection surface 9602, and heat affected zones 9610, 9612 on either side of the weld 9608, in a single pass, is schematically depicted. The example of FIG. 96 schematically depicts the inspection surface 9602 having a weld 9608 (e.g., where physical weld material is positioned) and heat affected zones 9610, 9612 on each side of the weld 9608. The arrangement is an illustrative example. The inspection robot 9502 controls two inspection assemblies 9150A, 9150B for inspecting the heat affected zones 9610, 9612, for example with a first rastering device 9620A rastering a first inspection assembly 9150A through a traversal region covering the first heat affected zone 9610, and a second rastering device 9620B rastering inspection assembly 9150B through a traversal region covering a second heat affected zone 9612. The example inspection robot 9502 includes a weld sensor 9603, for example including a time-of-flight sensor on each side of the weld, to inspect the weld 9608. The example of FIG. 96 is non-limiting, and the arrangement of payloads is provided for clarity of the present description. In certain embodiments, one or all inspection assemblies (or elements) 9150A, 9150B, or weld sensor 9603 may be provided either in front of the inspection robot 9502 or behind the inspection robot 9502. Additionally or alternatively, one or more of the separately depicted inspection assemblies 9150A, 9150B may be provided on a single payload, for example as set forth in applications '391 and/or '701, with separate inspection sleds, shoes, or other coupling features to the payload, and allowing for the appropriate sensor positioning to inspect more than one heat affected region and/or the weld from a single payload.

The example of FIG. 96 depicts a single payload, with associated traversal region, dedicated to each heat affected area. In certain embodiments, a single payload may inspect both heat affected areas, for example with a traversal region that passes over both heat affected areas. In the example, inspection with the single payload may include inspection over the weld area (e.g., either utilizing or disposing of weld area inspection data), lifting the payload to traverse the weld area, or the like. In certain embodiments, more than one payload may be utilized to traverse a heat affected area—for example two separate payloads may inspect the right heat affected area, allowing for either data redundancy (e.g., where the traversal areas overlap), and/or completion of inspection operations with a reduced traversal distance for each of the payloads (e.g., reducing the wait time at each inspection slice for mechanical movement of the payload across the traversal region). In certain embodiments, a combination of payloads may be utilized—for example with payloads inspecting the right side heat affected area that are displaced vertically (e.g., one payload in front of the inspection robot, and a second payload behind the inspection robot, or both payloads provided in front, or both payloads provided behind). The utilization of multiple payloads can be utilized for data redundancy (e.g., both payloads inspect overlapping regions), enhanced operating speed (e.g., one payload inspects "odd" slices and the other payload inspects "even" slices), multiple inspection types, and/or multiple sensor calibrations (e.g., where surface materials, corrosion materials, damage types, etc. are not known with certainty, allowing for sensor calibrations to be varied between payloads to account for unknown parameters of the inspection surface). The description herein utilizing more than one payload may additionally or alternatively be embodied as the mounting of multiple inspection units (e.g., more than one phased array) on a given payload.

Figure 56:
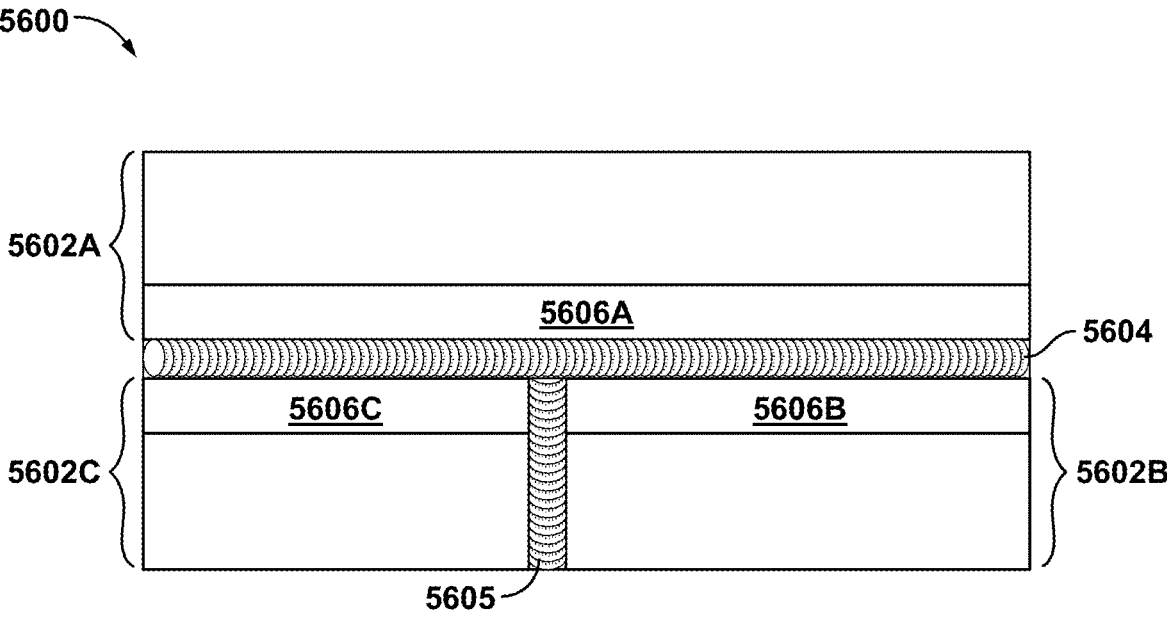
FIG. 56 is a schematic, top-down depiction of welds, and connected pieces, in accordance with an embodiment of the current disclosure.

Referring to FIG. 56, a top down depiction 5600 of welds 5604, 5605, and connected pieces (e.g., plates, pipe walls, etc.) 5602A, 5602B, 5602C are schematically depicted. Portions of plates 5602A, 5602B, 5602C may be affected by the heat applied as part of the welding process. These portions are known as Heat-Affected Zones (HAZ) 5606A, 5606B, 5606C. The extent of potential damage in these areas due to the welding process may be, without limitation, a function of the heat input, welding speed, voltage, and current. There are variations for thin and thick plates. The affected areas may undergo changes in molecular structure (e.g., crystal structure, grain, etc.), induced stress, chemical changes, or the like. The degree of damage in a HAZ 5606A, 5606B, 5606C, may trail off with distance from the weld 5604, 5605 over a distance such as a number of inches from the weld 5604, 5605. The HAZs 5606A, 5606B, 5606C may experience a loss of mechanical integrity due to a variety of heat induced mechanisms set in motion during the welding process. It will be seen in the example of FIG. 56 that inspection of the weld 5604 in a single inspection run of the inspection robot will inspect HAZs 5606A, 5606B, 5606C, and portions of HAZs near the cross-weld 5605 that are in the region of weld 5604. However, in certain embodiments, a different inspection operation may be performed to fully inspect the cross-weld 5605, for example with a direction of travel of the inspection robot along the cross-weld 5605. The size of the HAZ is generally understood by one of skill in the art contemplating a particular system and having the benefit of the present disclosure, and may be based on information provided by a manufacturer of the inspection surface, the welder, an operator of the inspection surface (and/or of the equipment embodying the inspection surface), and/or based on experience of failures, maintenance, fatigue, or the like associated with the inspection surface. In certain embodiments, the size of the HAZ is defined by a regulatory requirement, a policy (e.g., of an operator, manufacturer, and/or other entity associated with the inspection surface or a component thereof), and/or according to standard industry practice—for example a regulatory inspection requirement may define a 3-inch inspection zone around the weld, regardless of the HAZ indicated by the inspection surface material and welding characteristics. The description utilizing the HAZ herein is a non-limiting example, as embodiments herein support inspection of selected region(s) of an inspection surface regardless of the reason for the inspection, or the way that the region to be inspected is selected.

Figure 57:
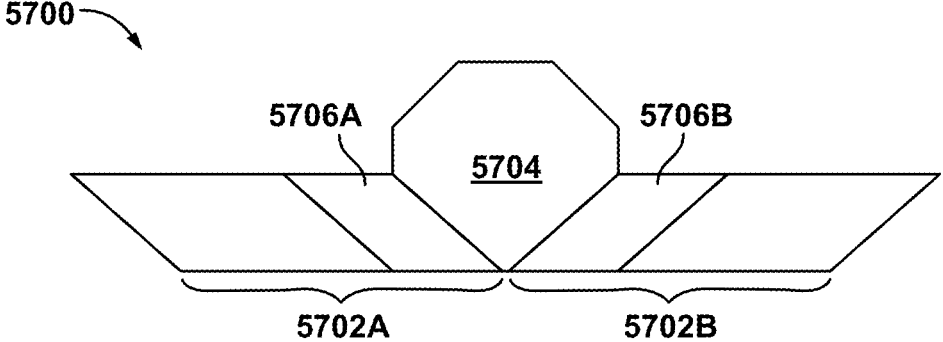
FIG. 57 is a cross-section depiction of a weld and surrounding plates with Heat-Affected Zones on either side of the weld, in accordance with an embodiment of the current disclosure.

Referring to FIG. 57, a cross-section depiction 5700 of a weld 5704 and surrounding plates 5702A, 5702B with Heat-Affected Zones 5706A, 5706B on either side of the weld 5704 is schematically depicted. Current practice in non-destructive testing (NDT) of the weld integrity would involve movement of a sensor system, relative to the length of the weld 5704. The sensor system may include such as a time-of-flight sensor system, eddy current sensor system, phased array UT system, x-ray system, magnetic system, and the like depending on the material and the accessibility of the weld. Additional passes along the length of the weld 5704, one on each side of the weld 5704, are utilized in previously known systems to measure the integrity of the HAZ 5706A, 5706B. A separate sensing system may be required for the measurement of the HAZ 5706A, 5706B as the degradation mechanisms may be different. For example, measurement of weld 5704 integrity may include time of flight (TOF) measurements measuring time of flight for both reflection off of the weld as well as time of flight to a receiver on the other side of the weld. A robotic sensor system may be configured such that, when traveling linearly along a weld line there are one or more TOF sensor systems on either side of the weldment. Ultrasonic energy may be transmitted into the weld and the reflected acoustic energy is measured on the same side of the weld. Ultrasonic energy transmitted into one side of the weld may bounce off of the weld and be measured on the far side of the weld.

Figure 58:
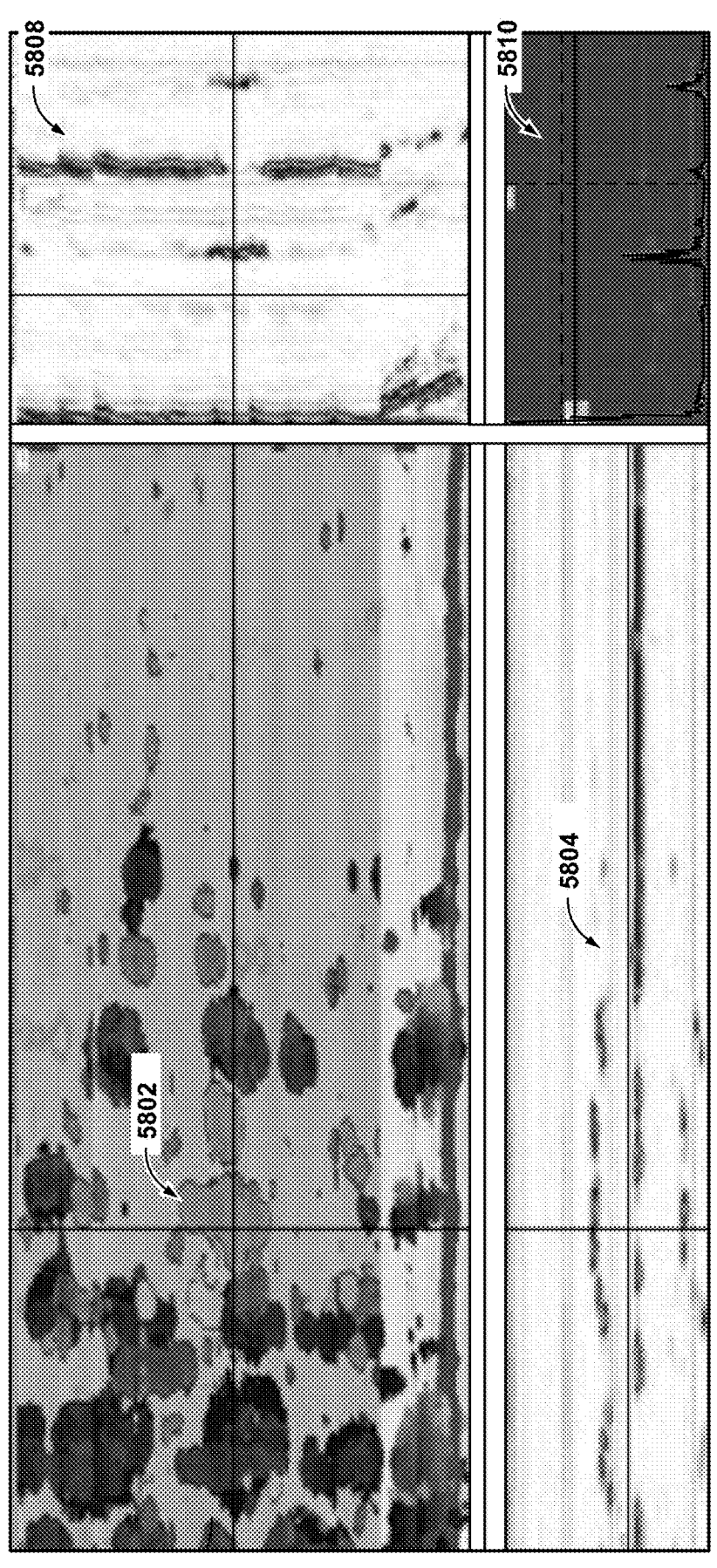
FIG. 58 is an example display output, in accordance with an embodiment of the current disclosure.

Referencing FIG. 58, an example display output is schematically depicted. The example display output may be generated by any systems, procedures, components, or other aspects of the disclosure as set forth herein. The example of FIG. 58 is an illustrative depiction to depict certain aspects of the present disclosure, and is non-limiting. The information determined by an inspection robot performing inspection operations may be of any type, including information such as that depicted in FIG. 58, or any other type of information available in response to inspection operations set forth herein.

The example of FIG. 58 includes a thickness map 5802, depicting thickness of the inspection surface substrate (e.g., tank thickness, pipe wall thickness, etc.) over the inspection area. In the example of FIG. 58, the lower consistent region depicts the weld, which may display thicker or thinner returns, depending upon the weld characteristics and UT processing operations. Data such as that depicted in the thickness map 5802 may be generated using a C-scan, or time-motion scan. In the example of FIG. 58, a first return map 5804 depicts a first return from a back wall of the inspection surface, and displays mid-wall features such as cracking. Returns from the nominal or expected location (e.g., the lower, consistent line to the right side of the return map 5804 in the example of FIG. 58) show areas of the inspection surface where inspection operations do not show mid-wall cracking or degradation. Data such as that depicted in the return map 5804 may be generated using a B-scan, or brightness mode scan. In the example of FIG. 58, an oriented scan map 5808, built from slices of the first return map 5804, is depicted, which depicts the width of features detected in the first return map 5804. For example, the oriented scan may depict the width of cracks or voids detected in the first return map 5804. In the example of FIG. 58, the orientation scan map 5808 may be generated utilizing an S-scan and/or a D-scan. The example of FIG. 58 includes a peak return map 5810, depicted voltage/amplitude returns over time, and may be determined using peak detection algorithms, and/or gates (e.g., time cut-offs and/or windows). Data such as that depicted in the peak return map 5810 may be generated using an A-scan. The selected data and depiction of inspection results are non-limiting examples, and the utilization of A-scan, B-scan, C-scan, D-scan, and/or S-scan terminology is a non-limiting example to illustrate inspection techniques and processing that may be utilized in certain embodiments. The utilization of a phased array and multi-axis inspection provides for numerous processing techniques to perform operations to perform inspection operations on an inspection surface, and any other operations and/or other combinations in whole or part of the illustrative operations may be utilized in addition to, and/or as an alternative to, the operations described. In the example of FIG. 58, the maps 5802, 5804, 5810, 5808 are aligned such that a user accessing the maps 5802, 5804, 5810, 5808 can highlight a region and see all of the maps associated with that region, including alignment markings to make a detailed analysis of degradation mechanisms and/or features of the inspection surface at a selected region. The maps 5802, 5804, 5810, 5808, where utilized, may be displayed in real time (e.g., maps constructed as the inspection operations are performed) and/or accessible after the inspection operations and processing are completed. In certain embodiments, maps 5802, 5804, 5810, 5808 may be displayed during operations (e.g., to an inspection operator), and further be displayed, potentially after post-processing, calibration, etc., to a later user including the inspection operator, a consumer, a regulator, an operator of a system including the weld surface (e.g., an operator of a plant including a pipe that formed the inspection surface), a maintenance person, etc. The maps 5802, 5804, 5810, 5808 as depicted at each stage may be the same or distinct, including updates according to preferences of the user, information sought by the user, updates to calibrations and/or processing operations (e.g., in response to calibrations; matching to known or detected parameters of the inspection surface and/or offset inspection surfaces; and/or in response to or as a part of sensitivity analysis to calibration, modeling, and/or processing features, etc.).

In certain embodiments, inspection operations herein are performed on a weld and/or on a weld affected region of an inspection surface. Weld operations induce stresses and other types of damage onto a surface and related regions. For example, weld operations may introduce thermal gradients, thermal stress, mechanical stress, and/or chemical stress (e.g., oxidation or other reactions occurring during and after weld operations). The presence of the weld may also mechanically affect the inspection surface, for example providing for a transition on the inspection surface between materials and/or contact profile, that may continue to affect the inspection surface apart from and/or in addition to the direct affect induced by welding operations. The width of a weld affected region depends upon the type of material, the type of damage mechanism, the environment during and after welding (e.g., ambient temperature, atmosphere composition, etc.), the temperature and/or heat transfer environment induced during weld operations, the thickness of the substrate material and/or thermal mass of affected regions, the type of welding operations performed, and/or off-nominal operations that may have occurred during the weld operations. The weld affected region (e.g., the extent of the weld affected region away from the weld) may be determined according to operating experience, industry standards, regulatory requirements, policy options (e.g., defined by an operator, owner, customer, regulatory body, or the like associated with the inspection surface), modeling (e.g., modeling of weld operations and/or operating conditions of the component including the inspection surface in view of the weld and/or weld operations), operational history and/or operational specifications of the inspection surface (e.g., an inspection surface operating at a higher pressure, temperature, gradients of these, extremes of these, transients of these, etc., may indicate a larger weld affected region than an inspection surface operating a lower values for these), or the like. An example weld affected region includes the region of the inspection surface that is affected by the weld operation and/or weld presence that may, in view of operating experience, industry history, modeling, estimation, etc., affect the condition of the inspection surface in a manner that may exhibit differential degradation and/or wear relative to other parts of the inspection surface (e.g., portions of the inspection surface that are significantly distant from the weld). An example weld affected region may include a superset of weld affected regions for a group of inspection surfaces—for example a weld inspection region may be determined to be 12 inches from the weld for a group of inspection surfaces, where specific determinations for a particular inspection surface might indicate a smaller region (e.g., 6 inches) but normalization of the weld inspection region for the group of surfaces introduces efficiencies in inspection operations and/or analysis such that a single, larger, weld affected region is utilized for all inspection surfaces in the group. In certain embodiments, a largest weld affected region determined for the group is utilized, but any other weld affected region for the group may be utilized, such as an average, a statistically determined value (e.g., an average plus a set number of standard deviations, a cut-off such as a value that encompasses a sufficient region to cover 95% of the inspection surfaces, etc.). One of skill in the art, having the benefit of the present disclosure and information ordinarily available about a contemplated system and/or inspection surface, can readily determine the weld affected region for a particular embodiment. Without limitation to any other aspect of the present disclosure, certain considerations for determining a weld affected region include: all of the considerations for a weld and inspection surface set forth herein; the likely extent and progression of degradation of the inspection surface over the operating life of the inspection surface; maintenance operations and schedule for the inspection surface; response and availability of maintenance operations to the inspection data; the consequences of failure mechanisms for the inspection surface (e.g., costs of downtime, effect on other parts of a system including the inspection surface, safety considerations, regulatory considerations, availability to respond and/or repair after a failure, etc.); time between inspection operations; availability of other detection mechanisms before failure (e.g., position and availability of the inspection surface to observation, likelihood that other observation mechanisms would detect a failure before occurrence, etc.); and/or the expected service life of the inspection surface. Example weld affected regions extending from about 3 inches to about 24 inches, but may be any value.

Inspection operations herein provide for multi-axis inspection of an inspection surface in a single pass of the inspection apparatus (e.g., a payload including UT sensor phased array(s), positioned and/or operated on the inspection surface using an inspection robot). Systems and procedures set forth herein provide for a high capability of inspection operations (e.g., high capability to identify and characterize degradation, wear, corrosion, deposits, cracks, etc.) that are robust to degradation mechanisms that are difficult to detect with previously known systems—for example cracks that propagate in a direction that previously known systems have difficulty detecting. Example inspection operations herein can determine, without limitation to any other aspect of the present disclosure: crack presence and/or propagation within the inspection surface; detection of features indicating degradation such as bubbles, voids, wall thinning, wall thickening (e.g., due to corrosion and/or deposits), and/or blisters; de-lamination (e.g., of a coating, composite material, etc.); and/or physical damage (e.g., due to impacts, vibration, prior repair operations, etc.). In certain embodiments, for example depending upon the inspection speed, amount of processing desired and/or available, spacing and density of inducing elements of the phased array(s), and/or the availability and/or capability of beam steering and/or beam forming operations as set forth herein for the particular system, features having an extent of down to 0.08 inches (with regard to any axis) are readily detectable for a particular system, while maintaining inspection capability and speed that far exceeds currently available systems. Further, the mixed orientation(s) of the phased array(s) on example systems provide for the ability to detect features in any orientation, including, for example, a crack that is propagated parallel to a rastering direction of a payload, which is a difficult feature to detect for previously known systems.

Further, systems and procedures herein provide for these high capability inspection operations that are more efficient to execute-including the ability to inspect larger areas, perform inspections more quickly, perform inspections with no down-time and/or reduced down-time, and that can be performed in confined spaces, high temperature areas, and/or other areas where previously known systems require manual intervention and consequent risks to personnel and/or high maintenance interactions such as lockout/tagout, confined space, and/or elevated operation procedures. Accordingly, systems and procedures herein provide for an enhanced ability to perform inspections, as well as providing for an ability to perform inspections that would not be performed using previously known systems (e.g., previously known systems introduce prohibitive costs to inspection operations, leading to: mitigation using enhanced service and/or maintenance procedures; acceptance of risk rather than performing inspections; overdesign of components to obviate the need for inspections; reducing the service life of components and/or implementing an increased frequency for component replacement schedules; and/or performing sampling inspections and relying upon the sampling to predict failures in uninspected regions). Further, systems and procedures herein provided for enhanced inspection operations as a part of overall system management, for example: increasing inspection frequency and/or coverage; allowing for increased utilization of preventative aspects of system management instead of risk acceptance in the design; reducing costs otherwise introduced by component overdesign; reducing costs introduced by component replacement schedules; and/or reducing costs introduced by enhanced service and/or maintenance schedules.

In certain embodiments, the capability to operate, support, command, and collect and process data from multiple phased arrays operating on a payload of an inspection robot provides for numerous benefits herein relative to previously known systems. UT phased arrays provide a high rate of data during inspection operations, which data requires both operative processing (e.g., command of phased array elements to execute beam forming and/or beam steering operations, as well as nominal operation to command the inducement operations of the phased arrays even without beam forming and/or beam steering adjustments) and analytical processing (e.g., determining what is indicated by the return data, gating and/or windowing data, performing synthetic steering operations, etc.), provision of couplant to the arrays, positioning operations of the inspection robot, and/or rastering operations of the payload(s) during inspection operations. Additionally, physical support of the inspection robot, positioning of the payloads over relevant regions of the inspection surface during inspection operations, and delivery of power, commands, and couplant to the payload, and receipt of data from the UT phased arrays, provide numerous challenges that are not overcome in previously known systems. In addition to the described systems, components, and procedures herein, any features, systems, components, and/or procedures as set forth in U.S. patent application Ser. No. 16/813,701 entitled "INSPECTION ROBOT" and filed on 9 Mar. 2020 may be utilized herein, in cooperation with elements of the present disclosure. U.S. patent application Ser. No. 16/813,710 is incorporated herein by reference in the entirety for all purposes.

Figure 59:
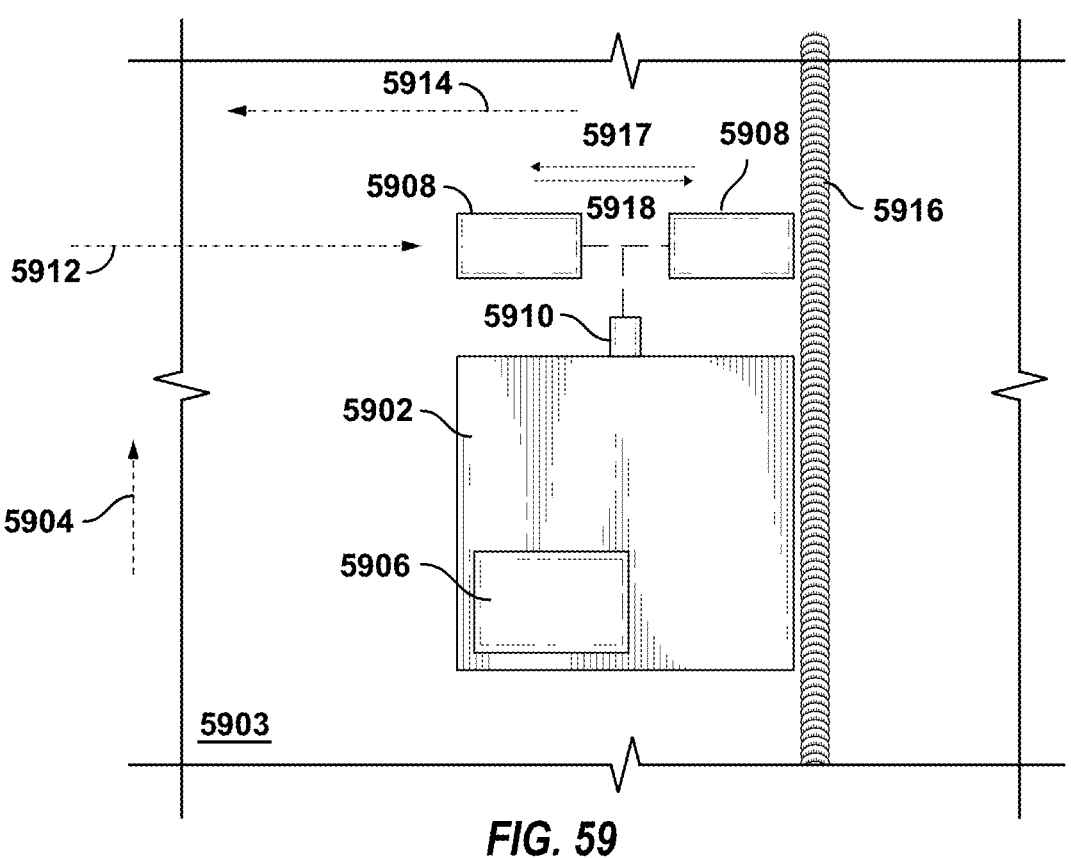
FIG. 59 is an example system for performing single pass, multi-direction inspection, in accordance with an embodiment of the current disclosure.

Referencing FIG. 59, an example system for performing a multi-direction (e.g., inspection using a number of axes), single-pass (e.g., inspecting the number of axes in a single pass of the inspection robot and/or an inspection array), inspection of an inspection surface 5903 is schematically depicted. The example system includes an inspection robot 5902 that moves in a direction of travel 5904 on an inspection surface 5903. The inspection robot 5902 may be of any type, and in certain embodiments includes an inspection robot body formed of a housing, and including a couplant tether to an operator. In certain embodiments, the inspection robot 5902 may be self-contained without a tether, for example where a couplant reservoir and/or power storage thereon is sufficient to provide power and couplant for operations of the inspection robot 5902 during an inspection operation. In certain embodiments, the inspection robot includes sufficient data storage and/or data processing power positioned thereon such that communications with an external computing device are not needed during inspection operations. In certain embodiments, the inspection robot includes sufficient wireless communications (e.g., WiFi, Bluetooth, line of sight optical communications, etc.) such that data communication through the tether is not needed during inspection operations, even where the inspection robot lacks sufficient data storage and/or data processing power to perform inspection operations without external data storage and/or processing assistance. Any operations set forth herein to provide commands, process data, and/or store data, may be performed utilizing resources directly positioned on the inspection robot, positioned on an external device, and/or a combination of these.

In certain embodiments, the couplant tether, where present, provides for any or all of power provision, couplant provision, and/or data communication between the inspection robot 5902 and an external device or devices. Example external devices include, without limitation, a power supply (e.g., providing configured power to the inspection robot, such as a 12V or 24V DC supply, and/or a 110V AC supply, although any power supply may be utilized), a couplant supply (e.g., a couplant reservoir and/or couplant pump), and/or an external computing device (e.g., an operator laptop, operator mobile device, local computing device located at a system including the inspection surface, a cloud computing device, a remotely connected computing device, etc.). Operations of an external computing device may include: data storage (e.g., storage of raw data, processed data, calibrations utilized, calibrations available, training data, etc.); data processing (e.g., processing of raw data, enhanced processing for beam forming, beam steering, and/or inspection feature detection, and/or overlaying of data on a virtual inspection surface such as depicted in FIG. 59); command determination (e.g., determining and/or providing commands for inspection robot movement, rastering device operations, inducing element operations of phased array(s), commands to other sensors such as visual imaging devices, time-of-flight sensors, mechanical property determination of the inspection surface, etc.); execution of an observation interface (e.g., displaying inspection information to a supervisor, administrator, customer, operator of a system including the inspection surface, etc.); and/or execution of an iterative improvement algorithm (e.g., post-processing analysis; verification and/or scenario operations for calibrations; operation of machine learning algorithms; adding inspection data or portions thereof to a training corpus, including allowing for tagging and/or classification of data elements, etc.).

The example inspection robot 5902 may be configured to move along the inspection surface 5903 in any manner, including without limitation moving by driving wheels (not shown) in contact with the inspection surface 5903 in a controllable and/or schedule manner. In certain embodiments, the inspection robot 5902 is engaged to the inspection surface 5903 by gravity (e.g., for a horizontal and/or sufficiently horizontal surface), using magnetic coupling (e.g., magnetized wheels and/or hubs engaged to a ferrous substrate of the inspection surface 5903), or by any other mechanism.

The example inspection robot 5902 includes a payload 5908 having UT phased arrays mounted thereon, configured in a position to interrogate the inspection surface 5903 and thereby perform a UT inspection of the surface. The payload 5908 may be mounted to the inspection robot 5902 in any manner, including mounting on a rail allowing for reciprocating motion 5917, 5918 (e.g., rastering back and forth) relative to the inspection robot 5902 and/or inspection surface 5903. The payload 5908 thereby provides for physical support of the UT phased arrays and execution of movement of the UT phased arrays along the inspection surface 5903 during inspection operations. Any example UT phased array(s) as set forth throughout the disclosure may be utilized in the example of FIG. 59.

The example inspection robot 5902 includes a rastering device 5910 operatively coupled to the payload 5908, and configured to execute the reciprocating motion 5917, 5918. Example and non-limiting rastering devices 5910 include, without limitation, a worm gear actuator, a linear actuator, and/or a motor (e.g., a servo motor, stepper motor, etc.) combined with a rotary-linear linkage (e.g., gear, crank, scotch yoke, etc.). The rastering device 5910 may be powered by any source, including at least electrical, pneumatic, or hydraulic. In certain embodiments, the rastering device 5910 may be configured to perform a specified rastering operation, such as from a first position along the rastering motion 5917, 5918 to a second position along the rastering motion 5917, 5918 (and back), and/or may be configured to move to any commandable position within the range of the available motion 5917, 5918. The type and capability of the rastering device 5910 is not limited, and any type or capability of the rastering device 5910 may be utilized in certain embodiments, for example depending upon the operations and capability of the inspection robot 5902 that are implemented for a given embodiment. The extent of the reciprocating motion 5917, 5918 is sufficient to perform inspection operations, for example having an extent of at least the width of the weld affected region 5914 (also referred to herein as the heat affected zone), and/or of a portion of the weld affected region 5914 that is to be supported by the payload 5908 (e.g., at least half of the weld affected region 5914 where two reciprocating payloads combine to inspect the weld affected region 5914). An example rastering device 5910 includes a reciprocating motion 5917, 5918 capability that is double the width of the weld affected region 5914 plus the width of the weld 5916—for example FIG. 79 and the related description. An example rastering device 5910 has a reciprocating motion 5917, 5918 capability of at least 3 inches, between 70 mm and 200 mm, and/or at least 15 inches.

The example inspection robot 5902 includes an inspection controller 5906. The example inspection controller 5906 includes one or more circuits configured to functionally execute operations of the controller 5906. The example inspection controller 5906 is depicted as a single device for clarity of the present description, but may include multiple devices, a distributed device, and/or may be positioned, in whole or part, on other parts of the system (e.g., on an external device in communication with the inspection robot 5902). The example inspection controller 5906 may include any aspect of any circuits, controllers, sensors, actuators, or other control devices as set forth throughout the present disclosure. In certain embodiments, elements of the inspection controller 5906 may be embodied as executable instructions stored on a computer readable medium, configured such that a processor executing the instructions performs one or more operations of the inspection controller 5906 set forth herein. In certain embodiments, elements of the inspection controller 5906 may be embodied as a sensor responsive to instructions of other elements of the inspection controller 5906 and/or from an external device (e.g., an operator computing device such as a laptop, tablet, mobile device, workstation, etc.), as a sensor providing inspection data (or other data, such as confirmation values, status values, diagnostic values, calibration values, etc.) to other elements of the inspection controller 5906 and/or to an external device, as an actuator responsive to instructions of other elements of the inspection controller 5906 and/or an external device, and/or as an actuator providing feedback data (e.g., position feedback, status feedback, diagnostic feedback, etc.) to other elements of the inspection controller 5906 and/or to an external device. In certain embodiments, elements of the inspection controller 5906 may be embodied as a data acquisition device, present on the inspection robot 5902 and/or on an external device, configured to capture raw data and/or processed data from any data provider in the system, including at least sensors, imaging devices, the UT phased arrays, actuators, or the like. In certain embodiments, elements of the inspection controller 5906 may be embodied as data storage elements configured to store sensor data (e.g., including raw data and/or processed data), any other data provided by sensors or actuators set forth herein, confirmation data (e.g., faults, status, calibrations, etc.), or the like. In certain embodiments, elements of the inspection controller 5906 may be embodied as communication devices, for example to accept commands, exercise interfaces, and/or exchange data with external devices. In certain embodiments, elements of the inspection controller 5906 may be implemented as logic circuits and/or hardware configurations, structured to respond to system conditions and thereby implement one or more operations of the inspection controller 5906 as set forth throughout the present disclosure.

An example inspection controller 5906 includes a positioning circuit that provides an inspection position command, and an inspection circuit that provides a rastering position command and an interrogation command. Further to the example, the inspection robot 5902 is responsive to the inspection position command to move to an inspection position (e.g., a position along the direction of travel 5904 where data is to be collected, for example at position 5912 in the example of FIG. 59), the rastering device 5910 is responsive to the rastering position command to move the payload 5908 through at least a portion of the range of reciprocating motion 5917, 5918, and where the UT phased array(s) are responsive to the interrogation command to perform a UT inspection of the inspection surface 5903 at the inspection position 5912 on at least three axes of inspection. Detailed operations of the inspection controller 5906 and related circuits are set forth throughout the present disclosure, including at least with regard to FIG. 67 and the related description.

Figure 60:
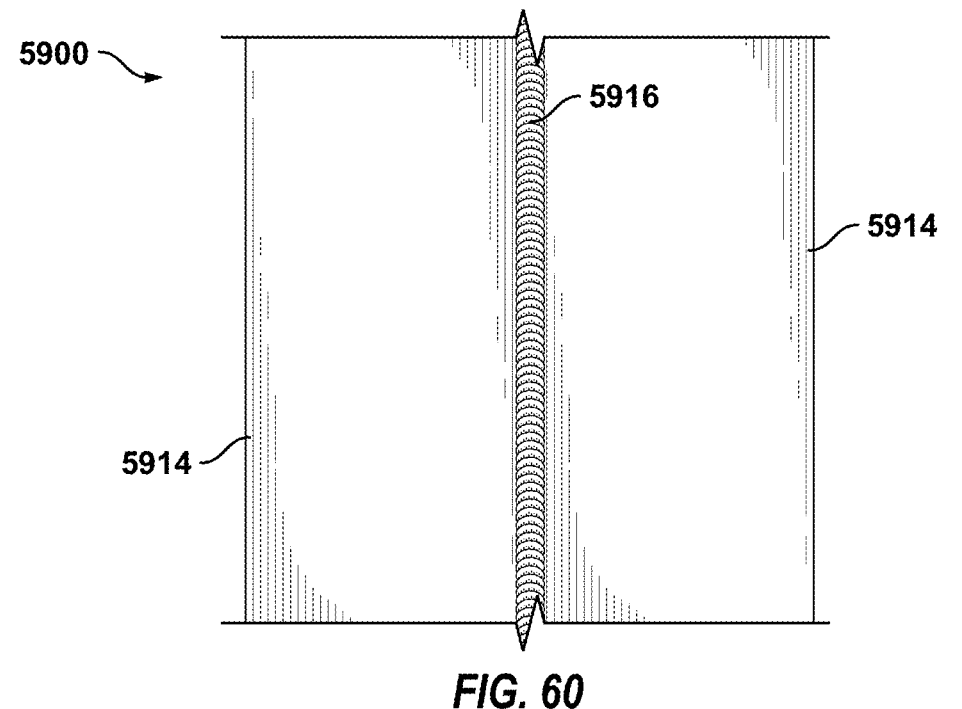
FIG. 60 depicts an example inspection surface, in accordance with an embodiment of the current disclosure.

Referencing FIG. 60, an example inspection surface 5900 is schematically depicted. In the example of FIG. 60, the inspection surface 5900 includes a weld 5916 and weld affected regions 5914. In certain embodiments, the portion of the inspection surface 5900 corresponding to the weld affected region(s) 5914 corresponds to an area of the inspection surface 5900 to be inspected. The weld affected region 5914 may be any weld affected region as set forth throughout the present disclosure. In certain embodiments, the weld affected region 5914 extends for several inches on each side of the weld 5916, for example about 6 inches on each side. The reciprocating motion 5917, 5918 of the payload 5908 moves the payload 5908 through the weld affected region 5914, providing for inspection of the weld affected region 5914. In certain embodiments, the reciprocating capability of the rastering device 5910 exceeds the width of the weld affected region 5914, for example an inspection robot 5902 having a capability to inspect various inspection surfaces 5900 having different sizes of weld affected regions 5914. Accordingly, the rastering device 5910 may only utilize a portion of the range of the reciprocating motion 5917, 5918, operations of the inspection controller 5906 may command inspection using the UT phased arrays only for taking data relevant to the weld affected region 5914 (e.g., to reduce utilization of data collection, processing, and/or storage resources as the UT phased arrays traverse areas of the inspection surface that are not of interest), and/or the UT phased arrays may be operated even when traversing areas that are not within the weld affected region 5914 (e.g., to simplify inspection operations).

In certain embodiments, a width of the weld affected region 5914 exceeds the range of the reciprocating motion 5917, 5918—for example where the inspection robot 5902 includes more than one payload 5908 that cooperate to inspect the weld affected region 5914 in a single pass, and/or where the inspection robot 5902 utilizes more than one pass to inspect the weld affected region 5914. The cooperating payloads may be mounted on the inspection robot 5902 side-by-side to provide for a full range of inspection across they weld affected region 5914, and/or may be displaced in the direction of travel 5904—for example with two payloads in front of the inspection robot 5902 but displaced in the direction of travel 5904, with one payload in front of the inspection robot 5902 and a second payload positioned behind the inspection robot 5902, or with both payloads positioned behind the inspection robot 5902. In certain embodiments, because inspection operations of systems and procedures of the present disclosure provide for improved inspection capability, performing more than one pass to complete inspection of the weld affected region 5914 nevertheless provides for an improvement in the inspection outcome relative to previously known systems. In certain embodiments, because inspection operations of systems and procedures of the present disclosure provide for improved speed of inspection operations, by a factor of 5× to 10× faster for a typical system, performing more than one pass to complete inspection of the weld affected region 5914 nevertheless provides for an improvement in the inspection completion time relative to previously known systems. An example system includes the inspection robot 5902 inspecting a weld affected region 5914 on a first side of the weld 5916 on a first inspection pass, and inspecting the weld affected region 5914 on a second side (opposite the first side) on a second inspection pass.

Figure 61:
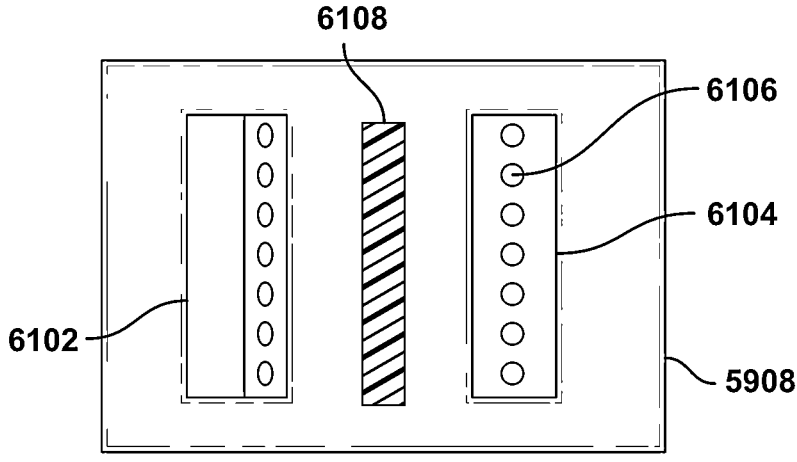
FIG. 61 is a schematic depiction of a portion of a payload, in accordance with an embodiment of the current disclosure.

Referencing FIG. 61, an example portion of a payload 5908 is schematically depicted, including two phased arrays 6102, 6104 that are configured to perform a UT inspection of the weld affected region 5914 on more than one axis. The example of FIG. 61 is a schematic bottom view of the payload 5908 portion, for example the bottom side of a shoe or sled of the payload as described throughout the present disclosure. In the example of FIG. 61, the UT phased arrays 6102, 6104 are linear one-dimensional phased arrays, that may include any number of UT elements 6106. The number of elements is selected to provide the desired inspection characteristics and resolution, as well as processing capabilities and beam management (beam forming and/or beam steering). In certain embodiments, at least about 4 elements should be present for each phased array 6102, 6104, but may be up to about 256 elements or more. An example payload 5908 includes two phased arrays 6102, 6104, each including 64 elements. It will be understood that a lower end of the number of elements may be related to one or more of: the imposed distance between elements to provide the desired inspection characteristics; the desired characteristics of beam management, including creation of interference artefacts and focusing characteristics; and/or the extent of inspection for each inspection operation (e.g., reference inspection extent 7752, FIG. 77, and the related description). It will be understood that an upper end of the number of elements may be related to one or more of: computing resources available to command UT elements, receive UT data, communicate UT data, and/or process the UT data; physical and/or structural limitations of the payload such as weight, size, and acoustic isolation of the UT phased arrays from each other; physical limitations of delivering couplant and/or power to the payload; and/or physical limitations of the rastering device 5910 such as reciprocating weight limits, speed, and/or range of motion. In certain embodiments, utilization of about 64 elements allows for an inspection extent 7752 of about 1.5 inches for each reciprocating motion 5917, 5918 operation, providing for greatly improved total inspection speed and resolution over previously known systems.

The example of FIG. 61 includes an acoustic isolator 6108 extending through the payload 5908 and providing acoustic isolation (e.g., preventing cross-talk) between the phased arrays 6102, 6104. The example acoustic isolator 6108 may be of any type sufficient to support inspection operations, including material selection (e.g., an elastomer, cardboard, air gap, and/or other sound insulating material), and further may have a size, position, thickness, and/or extent sufficient to support inspection operations. In certain embodiments, positioning of the acoustic isolator 6108 between direct line-of-sight orientations of the phased array 6102, 6104 elements is sufficient. In certain embodiments, an extent of the acoustic isolator 6108 exceeds the line-of-sight orientations, for example to extend the acoustic path between phased arrays 6102, 6104 elements to further reduce interference of cross-talk between array elements. In certain embodiments, the acoustic isolator 6108 is positioned to direct sound energy toward the sensor, and to absorb sound energy away from the sensor—for example in a void corner of the substrate block housing a diagonally positioned UT sensor, to prevent reflected sound creating significant noise reflecting from the unused volume within the substrate block. An example acoustic isolator 6108 completely divides a sled or payload, for example with a portion of the payload mounted on each side of the acoustic isolator 6108. An example acoustic isolator 6108 is an insert or other interposed portion between at least a part of the shortest acoustic path between elements of the phased arrays 6102, 6104 to be acoustically separated. One of skill in the art, having the benefit of the present disclosure, can readily determine an acoustic isolator 6108 configuration, including for example the positioning, geometry, and materials, sufficient for embodiments of the present disclosure. Certain considerations for configuring an acoustic isolator 6108 include, without limitation, any one or more of: a speed of sound in the material(s) of the inspection surface; a speed of sound in the substrate material(s) of the sled or payload; a speed of sound and/or sound dampening characteristic of the acoustic isolator 6108 material; a distance of a delay line between each phased array 6102, 6104 and/or a speed of sound in a couplant material positioned within each delay line; the schedule of inspection operations, including excitation and/or detection, for each phased array 6102, 6104, and/or further including a noise decay trajectory within any component of interest (e.g., the inspection surface, a substrate of the sled or payload, etc.); the availability of processing resources to perform deconvolution operations (e.g., allowing for some cross-talk), including the availability of sufficient characterization of excitation signals and response to allow for noise removal of cross-talk in acoustically coupled arrays; the inspection surface thickness and/ or inspection depth of interest (e.g., allowing for time cut-offs or other simple processing operations to remove some potential cross-talk); the inspection precision that is desired for the system (e.g., where a first low precision system may operate sufficiently without an acoustic isolator and/or with a low capability acoustic isolator, for example where processed noise removal is sufficient, but a second high precision system may utilize a high capability acoustic isolator); and/or any of these with frequency considerations taken into account (e.g., consideration of frequency specific sound characteristics such as transmission and decay, and/or using distinct excitation frequencies to enhance deconvolution of excitation signals of the phased arrays 6102, 6104, or the like).

An example system includes a first UT phased array 6102 in a first orientation (orthogonal to, or directly facing, the inspection surface in the example), and the second UT phased array 6104 tilted (e.g., at about 45 degrees, but selectable) relative to the first UT phased array 6102. Descriptions herein that describe a relationship to the inspection surface 5903 should be understood to contemplate, additionally or alternatively, a relationship to a local geometry of the inspection surface 5903. For example, wherein an axis is described as orthogonal to the inspection surface, and/or at an angle relative to the inspection surface, such a description contemplates that the described relationship is respective to the inspection surface in the region of the inspection robot, the payload, the phased array, and/or the inspection position. Where an inspection surface is a portion of a pipe wall, for example, other regions of the inspection surface have a different orientation (e.g., 90 degrees around the pipe from the inspection location), and the description of a relationship to the inspection surface references the local geometry of the inspection surface near the feature being described in relation to the inspection surface.

In certain embodiments, the UT phased arrays 6102, 6104 are linear and parallel to the direction of travel 5904, and orthogonal to the direction of the reciprocating motion 5917,

5918. While this arrangement provides certain benefits—for example maximizing the extent 7752 inspected during each reciprocating motion—other arrangements are possible and may be implemented in certain embodiments. For example, fabrication and/or configuration of the payloads 5908 and/or the inspection robot 5902, operation of the rastering device 5910, and/or inspection motion orientation relative to features of interest (e.g., expected propagation direction of cracks) may be improved with other arrangements, and are contemplated herein. Without limitation to any other aspect, arrangements of the linear UT phased arrays 6102, 6104 that are off-axis from the direction of travel 5904 (e.g., by up to about 30 degrees, but not limited to this), that are off-axis from being orthogonal to the reciprocating motion 5917, 5918 (e.g., by up to about 30 degrees, but not limited to this), and/or where the reciprocating motion 5917, 5918 direction is not orthogonal to the direction of travel 5904 (e.g., by up to about 45 degrees, but not limited to this), are contemplated herein. Further, the reciprocating motion 5917, 5918 may not be linear, for example traversing through a curved motion during rastering operations. It will be seen that full inspection coverage can be achieved in all of these arrangements through control of the inspection robot 5902 positioning during inspection operations, and further that the single-pass multi-axis operation of inspection operations herein can render the system agnostic, to a large extent, to the axes of: the direction of travel 5904, the reciprocating motion 5917, 5918, and the alignment of the UT phased arrays 6102, 6104, as the inspection operations set forth herein provide a multi-axis inspection that covers all desired axes of inspection within a given reference frame. The physical arrangement of the UT phased arrays 6102, 6104, such as depicted in the example of FIG. 61 and otherwise described herein, provide for ready inspection in two selected axes. In certain embodiments, a third selected axis of inspection is provided by beam steering operations of at least one of the UT phased arrays, for example using the phased array 6104. In certain embodiments, the third selected axis is on a plane with the nominal inspection axis for the UT phased array 6104, and is rotated by a selected angle according to the beam steering operations. The rotation may be about 30 degrees, but may additionally or alternatively be any achievable angle, for example between about 20 degrees and 60 degrees, and/or between about 10 degrees and 80 degrees. In certain embodiments, one or more, or all, of the inspection axes may be achieved using beam steering operations, for example with the UT phased array 6104 arranged at an intermediate angle between the two steered axes, with steering operations in one direction providing inspection on a first axis, and steering operations in the other direction providing inspection on a second axis. In certain embodiments, steering for more than one axis can be utilized to compensate for observed surface conditions (e.g., on a curved, dented, or damaged surface), to reduce maximum steering requirements (e.g., steering 15 degrees each way, instead of an unsteered and a 30 degree axis), to compensate for off-nominal conditions (e.g., fabrication tolerances during fabrication and/or assembly of the inspection robot 5902 and/or payload 5908, changes to the payload arrangement during operations, etc., that result in the payload 5908 being in an off-nominal position), and/or to investigate other axes during inspection operations (e.g., adding additional angles to inspect sensitive areas, to check features noted during the inspection at additional angles, etc.). The example of FIG. 61 provides for two linear UT phased arrays, but it will be understood that a given phased array may be two-dimensional, for example with a grid arrangement of elements, such that steering can be performed in two dimensions, allowing for rotation in a plane aligned with the linear UT elements, and/or rotation in a plane parallel to the inspection surface 5903. The steering options for a grid arrangement of elements are described in a particular reference frame for clarity of the description, but it will be understood that steering can be performed relative to other reference frames, including without limitation relative to the direction of travel, direction of the weld, direction of the reciprocating motion, orientation of the payload, etc.

Figure 62:
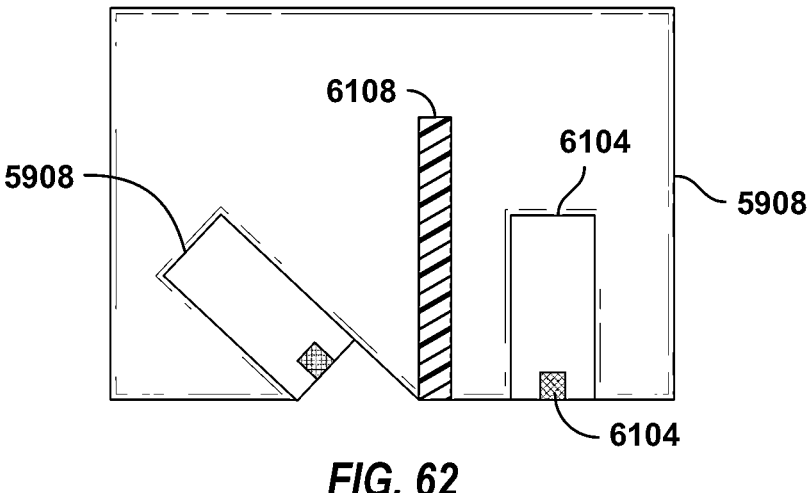
FIG. 62 is a schematic depiction of a portion of a payload, in accordance with an embodiment of the current disclosure.

Referencing FIG. 62, an example portion of a payload 5908 is schematically depicted, including two phased arrays 6102, 6104 that are configured to perform a UT inspection of the weld affected region 5914 on more than one axis. The example of FIG. 62 is a schematic side view of the payload 5908 portion, for example the bottom side of a shoe or sled of the payload as described throughout the present disclosure. The example of FIG. 62 is consistent with aspects of the example of FIG. 61. In the example of FIG. 62, the acoustic isolator 6108 is depicted as extending only partially upward within the sled or shoe. The acoustic isolator 6108 may extend fully through the shoe or sled, or only partially as shown, according to the acoustic characteristics of the phased arrays 6102, 6104, the sled or shoe substrate material, and the like.

Figures 63, 64, 65, 66:
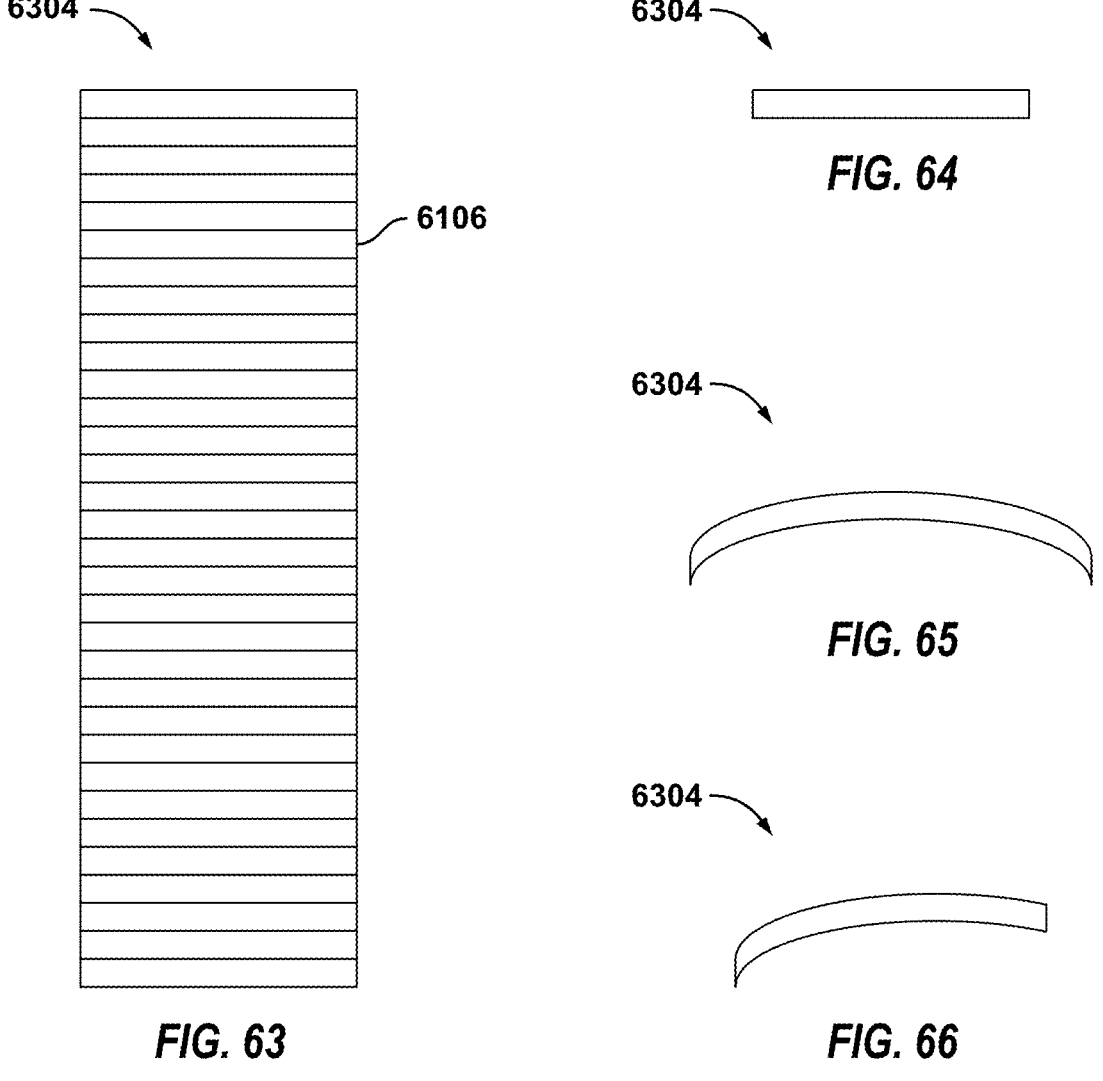
FIG. 63 is a schematic depiction of a UT phased array having a number of UT elements, in accordance with an embodiment of the current disclosure.
FIG. 64 is a schematic depiction of an end view of a UT phased array, in accordance with an embodiment of the current disclosure.
FIG. 65 is a schematic depiction of a UT phased array with symmetrically curved elements, in accordance with an embodiment of the current disclosure.
FIG. 66 is a schematic depiction of a UT phased array with asymmetrically curved elements, in accordance with an embodiment of the current disclosure.

Referencing FIG. 63, an example UT phased array 6304 having a number of UT elements 6106 is schematically depicted, from either a top or bottom view of the UT elements 6106. The number of elements may be configurable as described throughout the present disclosure. Referencing FIG. 64, an end view of the UT phased array 6304 is schematically depicted, with each element having a linear cross section. In certain embodiments, shaping of the elements may improve performance characteristics of the UT phased array 6304, for example providing for improved focusing or beam forming within the inspection surface, improved steering operations, and/or improved post processing (e.g., synthetic steering, processing of A-scans, B-scans, C-scans, D-scans, and/or S-scans, etc.). Referencing FIG. 65, an example UT phased array 6304 includes curved elements, where the curvature may be a selected shape such as a hyperbolic curve. Additionally or alternatively, the curvature may be cylindrical (e.g., a cross-section of a circle), parabolic, or another selected curve. The example of FIG. 65 depicts a symmetrical curve—for example centered on a vertex of the selected curve, but the elements need not be symmetrical. Referencing FIG. 66, an example UT phased array 6304 includes curved elements that are asymmetrical, but that still include the vertex of the curve within the element. In certain embodiments (not shown), the elements do not include the vertex of the curve. The elements may be shaped either concave upward or concave downward, and the selection of any shaping, if present, including the selected curve, which portion of the curve, and symmetry, may be made according to the operations enhanced by the inspection, for example improving beam steering operations (and which direction), improving focusing operations (and the depth or depths to be focused), and/or the type of processing to be improved. Additionally or alternatively, all of the elements of a given UT phased array 6304 do not need to have the same shape. For example, two or more groups of elements of a given UT phased array 6304 may have a first shape (e.g., one group to improve steering at a first angle, and another group to improve steering at a second angle), and/or alternating shapes (e.g., odd elements have a first shape, and even elements have a second shape). In a further example, grouping of elements may provide for capability differential while keeping a simplified steering scheme (e.g., control of element phasing, amplitude, and interference patterns), while alternating elements may provide for capability differential while keeping similar inspection capability across the full extent 7752. In certain embodiments, grouping and alternating may be mixed, for example with a first group of elements alternating with a second group of elements, for example to provide a hybrid improvement of simplified operation and capability coverage across the extent 7752.

Figure 67:
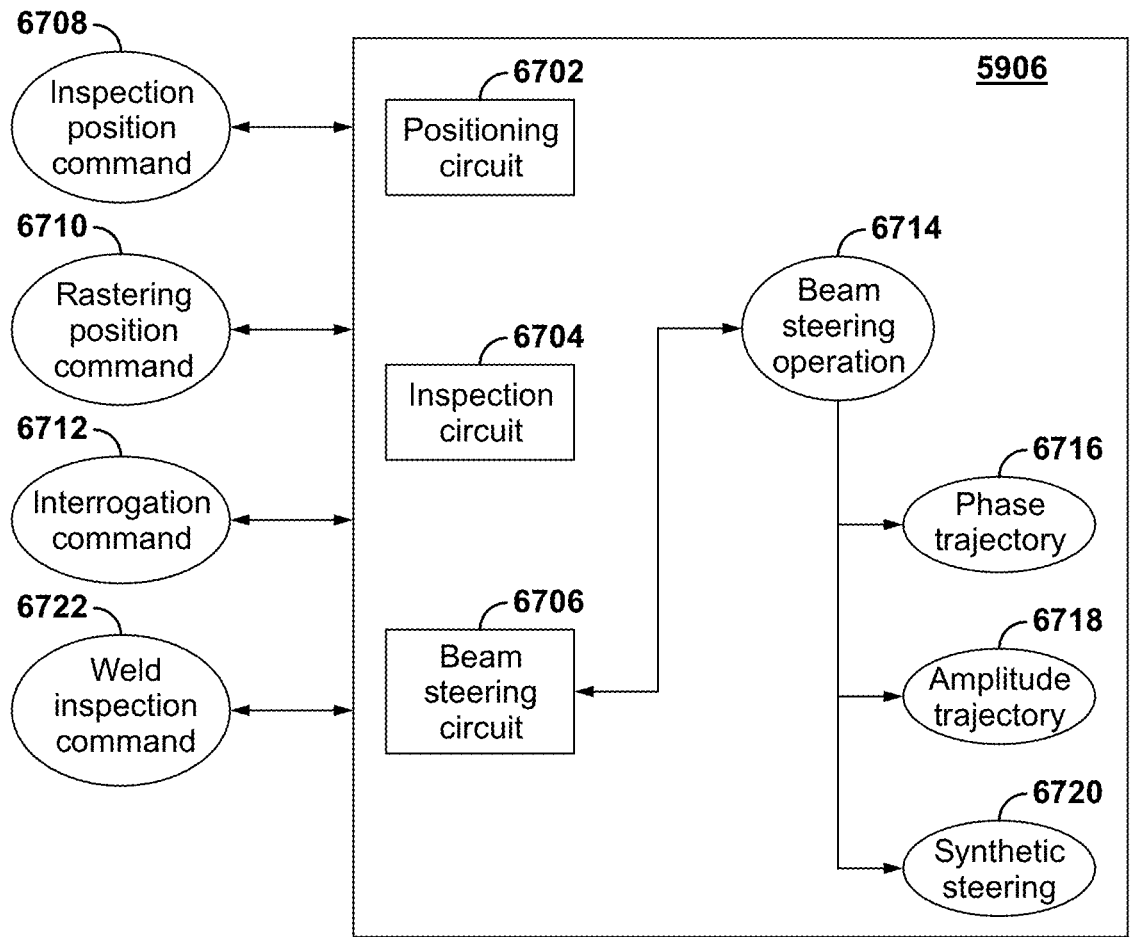
FIG. 67 is a schematic depiction of an inspection controller, in accordance with an embodiment of the current disclosure.

Referencing FIG. 67, an example inspection controller 5906 is schematically depicted. The example inspection controller 5906 may be utilized, in whole or in part, as a part of any system and/or to perform all or a part of any operations or procedures set forth in the present disclosure. Additionally or alternatively, the example inspection controller 5906 may be combined, in whole or part, and/or include in whole or part, any other controller, circuit, computing device, or other similar aspect as set forth throughout the present disclosure.

The example inspection controller 5906 includes a positioning circuit 6702 that provides an inspection position command 6708. In certain embodiments the positioning circuit 6702 provides the inspection position command 6708, and the inspection robot 5902 progresses to the inspection position 5912, to prepare for an inspection operation at the inspection position 5912. When inspection operations are completed, the positioning circuit 6702 provides the next inspection position command 6708, and the inspection robot 5902 progresses to the next inspection position 5912. In certain embodiments, for example where complete inspection coverage is indicated for the inspection surface, and where a single payload 5908 is present, and/or where more than one payload 5908 is utilized to provide coverage at a given inspection position 5912, a typical next inspection position command 6708 includes progression of the inspection robot 5902 in the direction of travel 5904 by about the inspection extent 7752. In certain embodiments, some inspection gaps are acceptable (e.g., where inspection of a fraction of the inspection surface 5903, such as 10%, 50%, 75%, etc., is acceptable), and the movement may be greater than the extent 7752. In certain embodiments, some inspection overlap is desirable, and the movement may be less than the extent 7752. Additionally or alternatively, an initial inspection position command 6708 may provide movement over an extended region of the inspection surface 5903, to the initial inspection position. Additionally or alternatively, an inspection position command 6708 may be provided to move the inspection robot 5902 around an obstacle, to an area of interest, to another general region to be inspected, and/or to change inspection direction (e.g., inspecting a weld affected region 5914 on a first side of the weld 5916 in one direction, and inspecting the opposing weld affected region 5914 in the other direction). In certain embodiments, for example where more than one payload 5908 is present and each payload 5908 inspects a distinct portion or sub-region of the weld affected region 5914 (e.g., distinct in the direction of travel, such as a first payload in front of the inspection robot 5902 and a second payload behind the inspection robot 5902), the inspection position command 6708 may be distinct from the extent 7752 while providing for full inspection coverage and/or overlapping inspection coverage. For example, inspection duty of the front payload may be assigned to odd inspection positions 5912, and inspection duty of the back payload may be assigned to even inspection positions 5912, such that each incremental movement of the inspection position command 6708 may be up to twice the extent 7752 while providing for a full coverage inspection of the inspection surface 5903 in the weld affected region 5914. Any other operations and/or utilization of the inspection position command 6708 set forth in embodiments herein may be supported by the positioning circuit 6702.

The example inspection controller 5906 includes an inspection circuit 6704 configured to provide a rastering position command 6710 and an interrogation command 6712. An example system includes the rastering device 5910 responsive to the rastering position command 6710 to move the payload 5908 through at least a portion of the reciprocating motion 5917, 5918 of the payload 5908, providing proximity of the payload 5908 (and thus the UT phased arrays) to the inspection surface 5903 through the weld affected region 5914. In certain embodiments, the rastering device 5910 moves the payload 5908 in a single direction at each inspection position 5912 (e.g., left-to-right at a first position, then right-to-left at a next position, etc.). In certain embodiments, the inspection circuit 6704 provides for simultaneous movement of the inspection robot 5902 during the rastering operations, for example coordinating movement of the payload 5908 and inspection robot 5902 to provide sufficient coverage of the inspection surface 5903 for the purposes of the inspection, despite some gaps that may be present in the inspection due to the simultaneous movement of the payload 5908 and inspection robot 5902. In certain embodiments, for example where the payload 5908 includes a degree of freedom of movement in the direction of travel 5904 (e.g., where the payload 5908 can be extended further away from the inspection robot 5902 or retracted toward the inspection robot 5902), greater freedom of movement of the inspection robot 5902 during rastering operations may be available, for example where the payload 5908 is extended fully, inspection operations are performed with simultaneous movement and rastering while the payload 5908 is progressively retracted, which allows for inspection operations to be performed through two or more inspection positions 5912 without a loss of inspection coverage, or with a reduced loss of inspection coverage. In the example, inspection operations may be continued with the payload 5908 retracted, and/or the inspection operations may be reset (e.g., extending the payload 5908 and/or adjusting the inspection robot 5902 position), whereupon several inspection positions 5912 can be performed sequentially while the inspection robot 5902 continues to move. Further, the extension or retraction of payloads 5908 may be utilized to accommodate inspection position 5912 lanes for two payloads 5908 at distinct positions in the direction of travel 5904 (e.g., reference FIG. 66 and the related description). Accordingly, an example inspection operation includes sequential operations, in order of, and repeating as needed: 1) position the inspection robot at a first inspection position, 2) raster in a first direction and perform the inspection, 3) position the inspection robot at a next inspection position, and 4) raster in a second direction and perform the inspection. However, it can be seen that the inspection robot movement and rastering operations of the payload are not exclusive to each other, and do not need to be performed independently.

An example system includes the UT phased arrays responsive to the interrogation command(s) 6712 to perform a UT inspection of the inspection surface 5903 at the inspection position 5912 on more than one axis of inspection. In certain embodiments, the UT phased arrays are positioned physically to inspect two separate axes of inspection in response to the interrogation command 6712. In certain embodiments, at least one of the UT phased arrays is configured to further inspect at a third axis of inspection, for example adding another axis of inspection utilizing beam steering operations to inspect two axes of inspection in response to the interrogation command 6712. An example system includes one UT phased array that inspects two axes on a plane (e.g., aligned with the linear elements of the UT phased array), and another UT phased array that inspects a third axis that is rotated relative to the plane. In a further example, the two axes on a plane include a first axis that is directed into the inspection surface at an approximately normal angle (which may be unsteered or steered as set forth herein), and a second axis that is directed into the inspection surface at a selected angle (e.g., which is steered) and progressing either forward (e.g., toward the direction of travel 5904) or rearward (e.g., away from the direction of travel 5904). In a further example, the third axis, provided by the other UT phased array, is directed into the inspection surface at a selected angle (e.g., defined by the physical arrangement of the UT phased array, such as depicted by UT phased array 6102 in FIG. 62), and transverse (e.g., perpendicular) to the direction of travel 5904. In certain embodiments, the inspection axis that is transverse to the direction of travel 5904 may be pointed toward the weld 5916, for example to ensure inspection coverage up to and/or through the weld 5916. Additionally or alternatively, the inspection axis that is transverse to the direction of travel 5904 may by pointed away from the weld 5916, either where that inspection arrangement provides sufficient data for the inspection, and/or where the rastering device 5910 provides sufficient movement of the payload 5908 to provide inspection coverage to the weld. In certain embodiments, inspection operations with an axis pointed away from the weld 5916 may be utilized for any reason, for example where a single payload 5908 provides for inspection of weld affected regions 5914 on both sides of the weld 5916 with a single rastering operation (e.g. traversing the weld and both regions in a single movement), where the inspection robot 5902 inspects the second weld affected region 5914 in a same orientation as the first weld affected region 5914 (e.g., where the inspection robot 5902 does not turn around on a return trip, but simply moves across the weld). In certain embodiments, an additional phased array may be provided to allow for a transverse inspection axis to have a desired configuration with respect to the weld 5916 even in the described circumstances (e.g., reference FIG. 76 and the related description). The inspection operations of the UT phased arrays may be responsive to the interrogation command 6712, and/or the rastering position command 6710 (e.g., using a predetermined inspection frequency during rastering operations, and/or modulating the inspection frequency in response to a rastering position and/or velocity, including the commanded position and/or velocity, and/or a feedback position and/or velocity such as a position feedback value provided by the rastering device). In certain embodiments, all three axes of inspection are performed during a single rastering movement (e.g., right-to-left), with rastering movement velocity selected such that the UT phased array inspecting two axes has sufficient time to execute inspection operations in both axes during the rastering movement. The described axes geometries are non-limiting examples. An example system includes the third axis, transverse in the example, rotated between 15 degrees and 80 degrees relative to the plane including the first two axes. An example system includes the first two axes on the plane, with a rotated angle difference of between 10 degrees and 75 degrees between these first two axes.

The example inspection controller 5906 includes a beam steering circuit 6706 that performs a beam steering operation 6714, for example utilizing the first UT phased array (and/or whichever UT phased array is supporting more than one inspection axis). In the example, the UT phased array supporting more than one inspection axis utilizes the beam steering operation 6714 to implement at least one of the two inspection axes. It will be understood, as described throughout the present disclosure, that any, or all, of the inspection axes may be supported by a beam steering operation 6714, and/or utilize beam steering during certain operating conditions and/or for certain inspection configurations, while not utilizing beam steering during other operating conditions and/or inspection configurations. In certain embodiments, the beam steering operation 6714 includes modulating a phase trajectory 6716 along the elements of the UT phased array (e.g., creating a steered wave front). In certain embodiments, the modulated phase trajectory 6716 may utilize some or all of the elements of the phased array, for example as set forth in relation to FIGS. 63-65 and the related description. In certain embodiments, the beam steering operation 6714 may further include modulating an amplitude trajectory 6718 of elements of the UT phased array, for example to apply a desired focus, to compensate for distances between elements and inspected portions of the inspection surface, to fine tune desired interference operations, to provide identifying characteristics to portions of the wavefront, or for any other reason as understood in the art. In certain embodiments, a beam steering operation 6714 includes performing a synthetic steering operation 6720, for example to implement a synthetic aperture for the phased array, to compensate for artefacts in the inspection surface, UT phased array execution, or the like that are not accounted for in the phase trajectory 6716, to reduce or eliminate phase modulation operations, and/or to perform post-processing that constructs additional inspection angles or the like from the inspection data. In certain embodiments, for example where sequential inspection positions 5912 have some overlap, synthetic steering operations 6720 can construct a steered beam from measurements taken in adjacent inspection positions 5912, providing for additional views of the inspection data, additional checks on the integrity of the inspection data, and/or providing additional training data for iterative improvement and/or machine learning operations. The utilization of synthetic steering operations 6720 can be utilized to shift the resource burdens between execution of the phase trajectory 6716 and/or amplitude trajectory 6718 to post-processing, and accordingly shift resources between execution control, data storage, data communication, and processing resources, according to the capabilities and priorities of the system, inspection robot 5902, and/or external devices.

In certain embodiments, the phase trajectory 6716 and/or amplitude trajectory 6718 may be executed in fixed manner, for example by a programmable logic circuit (PLC) or other similar hardware configuration, which can provide for high speed and low resource consumption steering operations. Additionally or alternatively, one or more post-processing operations, including selected synthetic steering operations, may be provided by a PLC or other similar hardware configuration. In certain embodiments, beam steering operations 6714 may be performed by a fully capable controller that commands, processes, and compensates beam steering operations 6714 in real time. In certain embodiments, a combination of implementations may be performed, for example with a PLC or other hardware configuration performing certain operations, and a feedback capable controller adjusting operations and/or performing compensation in addition to the PLC operations.

Certain descriptions herein reference sensor data or raw data. The terms sensor data or raw data should be understood broadly, but include at least one or more of: raw sensed feedback values from UT elements of a phased array; PLC and/or other hardware processed values from the raw sensed feedback values; and/or any other processed values, such as return times, thickness values, feature locations, grouped or lumped values from multiple elements, or the like, that at least in certain embodiments may be further utilized in post-processing, compensation, synthetic steering, and/or iterative improvement operations.

Figure 68:
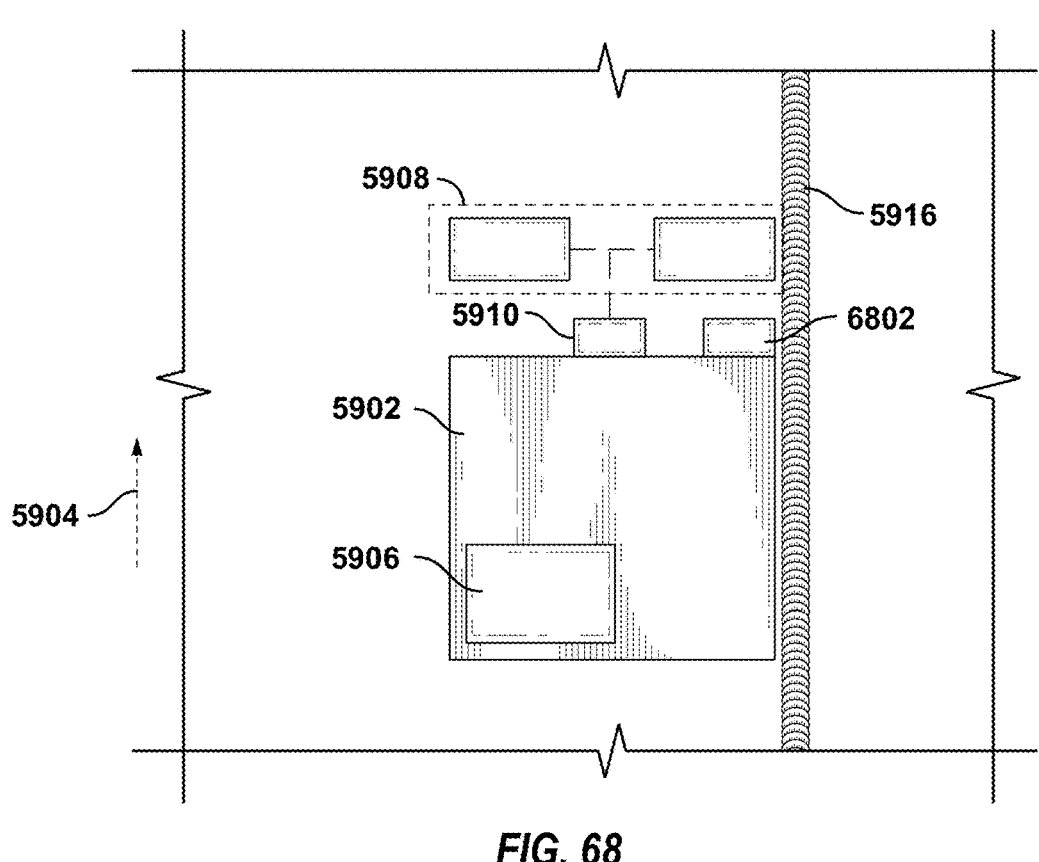
FIG. 68 is a schematic depiction of an inspection system including a weld inspection sensor, in accordance with an embodiment of the current disclosure.
Figure 74:
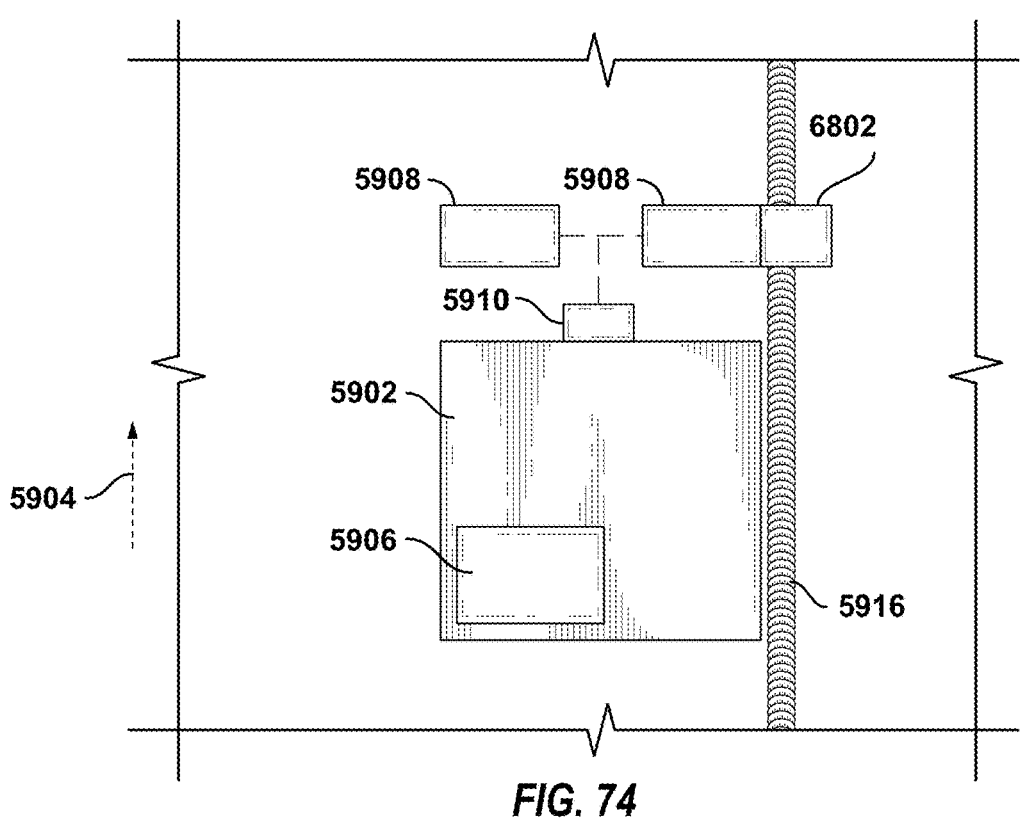
FIG. 74 is a schematic depiction of an inspection robot with two payloads and a weld inspection sensor on an inspection surface, in accordance with an embodiment of the current disclosure.
Figure 75:
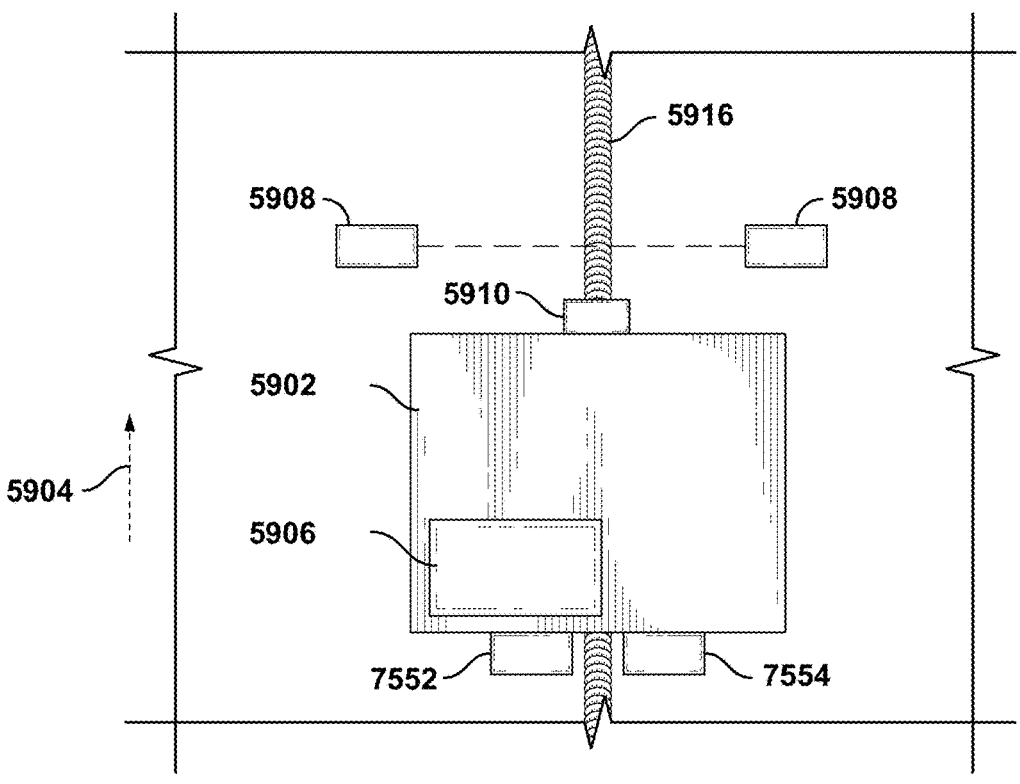
FIG. 75 is a schematic depiction of an inspection robot with two payloads and a weld inspection sensor on an inspection surface, in accordance with an embodiment of the current disclosure.

Referencing FIG. 68, an example system includes a second payload 6802 including a weld inspection sensor. An example weld inspection sensor includes a time-of-flight sensor that can be used to confirm the presence, condition, and/or quality of the weld. The example second payload 6802 is coupled to a body of the inspection robot 5902, and accordingly does not move with the reciprocating motion of the rastering device 5910. In certain embodiments, the second payload 6802 may be coupled to the first payload 5908, and/or the weld inspection sensor may be mounted on the first payload 5908, and accordingly it would move with the reciprocating motion of the rastering device 5910. For example, mounting the weld inspection sensor on the first payload 5908 may provide for more convenient fabrication, reduction in changeover time when swapping payloads, or the like. In another example, referencing FIGS. 74-75, coupling the weld inspection sensor to the first payload 5908 may allow for positioning of the weld inspection sensor to inspect both sides of the weld 5916 during the rastering operations (e.g., where the weld inspection sensor is mounted such that it will be on both sides of the weld within the range of the rastering motion). The inclusion of the weld inspection sensor allows for the inspection of both the weld 5916 and the weld affected region 5914 within a same inspection pass.

An example inspection controller 5906 includes the inspection circuit 6704 further providing a weld inspection command 6722, where the weld inspection sensor is responsive to the weld inspection command 6722 to perform a weld inspection of the weld. The inspection circuit 6704 may provide any other commands or perform any other operations to execute the weld inspection, such as delaying raster movement (where applicable) to support operations of the weld inspection sensor, adjusting movement of the inspection robot 5902 (e.g., providing sufficient delays in movement and/or controlling the movement speed, if applicable and if required for operations of the weld inspection sensor, for example where the inspection robot 5902 moves continuously through several inspection positions 5912), or the like.

An example system includes an imaging sensor, for example a camera, which may image the inspection surface within the visible spectrum, and/or outside the visible spectrum. For example, imaging may be utilized to enhance inspection information, tying pictures and/or videos to areas of interest. In certain embodiments, imaging may allow the inspection surface to be marked, and/or marks to be interpreted (e.g., during analysis or evaluation, and/or during a subsequent inspection operation), confirmation of temperatures, or the like. In certain embodiments, a mark may be made that is not in the visible spectrum (e.g., to avoid the appearance of clutter on the inspection surface), but that is visible-possibly under a UV light and/or with an infrared sensor—to the imaging sensor. Any other type of sensor may be present in certain embodiments, and attached to the payload 5908, attached using a separate payload (not shown), and/or coupled to a body of the inspection robot 5902.

Figure 69:
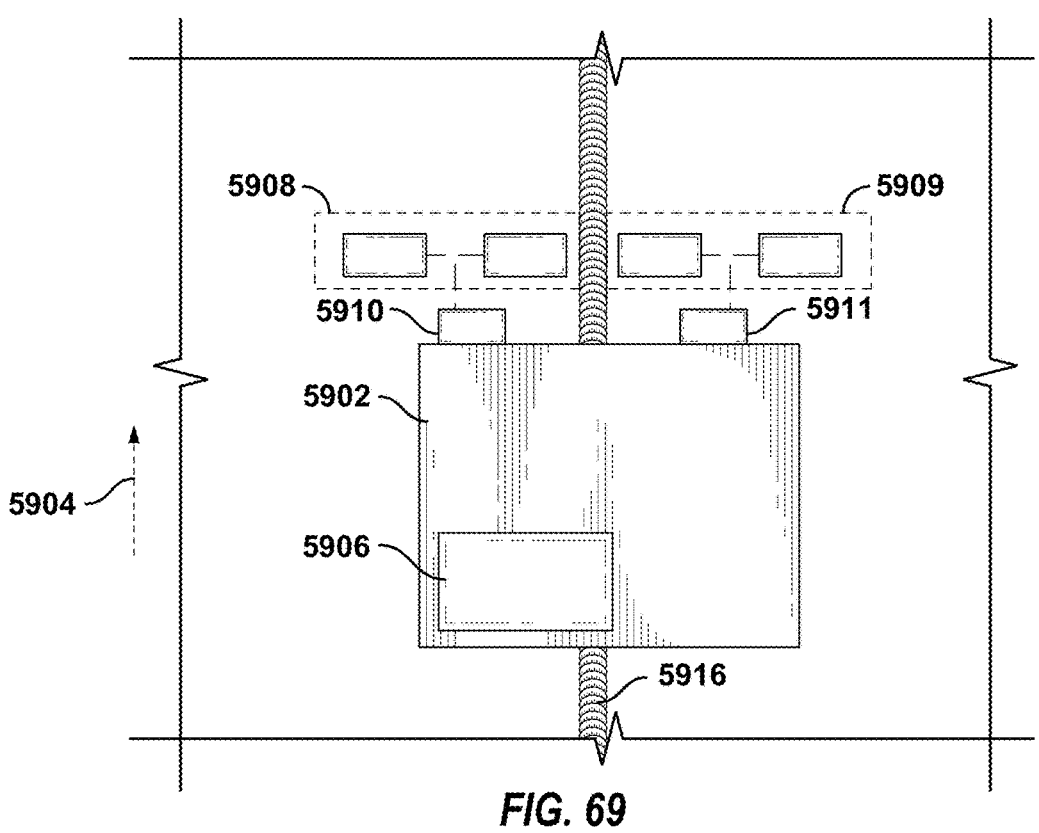
FIG. 69 is a schematic depiction of an inspection robot with two payloads, in accordance with an embodiment of the current disclosure.

Referencing FIG. 69, an example inspection robot 5902 includes two payloads 5908, 5909, one on each side of the weld 5916. Each payload 5908, 5909 includes at least two phased arrays, with support through physical orientation and/or beam steering operations as described throughout the present disclosure, to perform multi-axis UT inspections of the corresponding weld affected regions 5914. The example inspection robot 5902 includes a second rastering device 5911 coupled to the second payload 5909, and configured to execute reciprocating motion of the second payload 5909. The example of FIG. 69 allows for simultaneous inspection of both weld affected regions 5914, completing the full inspection operation, with multi-axis UT inspection of each weld affected region 5914, in a single pass of the inspection robot 5902. In the example of FIG. 69, the inspection circuit 6704 provides a first and second rastering position command 6710 to each rastering device 5910, 5911, and first and second interrogation commands 6712 to each payload 5908, 5909. The rastering devices 5910, 5911 are responsive to the rastering position commands 6710 to perform rastering movement to the payloads, and the UT phased arrays on each payload are responsive to the interrogation commands 6712 to perform inspection operations of each respective weld affected region 5914.

Referencing FIG. 70, an example system similar to that of FIG. 69 is schematically depicted, where the inspection robot 5902 includes additional payloads 5952, 6954, including weld inspection sensors that are positioned on each side of the weld 5916 when the inspection robot 5902 is in an inspection position. The example of FIG. 70 further allows for inspection of the weld 5916 in the single pass of the inspection robot 5902. In certain embodiments, a weld inspection sensor may be mounted on one of the payloads 5908, 5909, positioned such that the weld inspection sensor is capable to inspect both sides of the weld 5916 with a single sensor (e.g., reference FIGS. 74 and 75 and the related description), by being positioned on a first side of the weld 5916 at a first position of the corresponding payload, and on a second side of the weld 5916 at a second position of the corresponding payload. It will be seen that control operations for such an embodiment can be utilized to prevent collision of the weld inspection sensor with the opposing payload (e.g., the payload that the weld inspection sensor is not positioned on). Additionally or alternatively, collision of the payloads 5908, 5909 may be prevented by adjusting the position of the payloads 5908, 5909 along the direction of travel 5904, for example providing one payload extended further than the other payload, or providing one payload in front of the inspection robot 5902 and the other payload behind the inspection robot 5902. The example of FIG. 74 inspects both sides of the weld by rastering the payload 5908 adjacent to the weld, and passing a second payload 6802 (e.g., a weld specific sensor such as a time-of-flight sensor) over the weld 5916 in the rastering operations. The example of FIG. 75 inspects both sides of the weld by rastering the payload 5908 over the weld 5916 (e.g., encompassing a HAZ on both sides of the weld 5916), and operating a second payload 7552, 7554 across the weld 5916 with a weld specific sensing operation.

An example inspection circuit 6704 provides the rastering position commands 6710 to each payload 5908, 5909 as a synchronous or asynchronous command. As used herein, a synchronous rastering position command 6710 provides for coordinated movement between the rastering devices 5910, 5911. Coordinated movement may include movement at the same time, or movement at separate times. Additionally or alternatively, coordinated movement may relate to positions (e.g., a position of the first payload 5908 coordinated with a position of the second payload 5909), velocities, acceleration, or other considerations. Additionally or alternatively, coordinating movements may relate to absolute values (e.g., a position of payload 5908 as a function of a position of payload 5909), relative values (e.g., consideration of a distance between the payloads, a velocity differential, and/or acceleration differential), and/or limits (e.g., enforcing a minimum distance therebetween, maximum velocity differential, etc.). The coordination of movements between the payloads includes consideration of any factors relevant to the particular system, such as: power consumption (e.g., for sensors, data acquisition, data processing, and/or rastering devices); data acquisition rates (e.g., amount of data being collected by the UT phased arrays and/or other sensors in response to movement); data processing rates (e.g., processing of collected data, steering operations, compensation operations, capturing of additional data such as imaging data, etc.); couplant flow rates and/or capability (e.g., coupling losses during movement, coupling make-up operations due to detected conditions, etc.); data storage values (e.g., available intermediate data storage limits utilized during data collection and/or processing, data storage impacts due to loss of communication and/or communication bandwidth limits, etc.); physical system considerations (e.g., load balancing of a center of mass of the inspection robot as the payloads move, managing force loads between the inspection robot and the inspection surface, etc.); and/or aesthetic considerations (e.g., moving the payloads in a manner that appears to be controlled or competent, and/or that provides for case of operator evaluation of what inspection operations are being performed by predictable movement of the payloads). One of skill in the art, having the benefit of the present disclosure and information readily available for a contemplated system, can readily determine whether payload movement should be coordinated, and the parameters of coordinated movement between the payloads. Example considerations for determining whether the payload movement should be coordinated and the parameters therefore include, without limitation: the relative weight of payloads and the inspection robot as a whole; the coupling force of the inspection robot to the inspection surface; the coupling friction of the inspection robot to the inspection surface; response parameters (e.g., force, power availability, movement rate, etc.) of the rastering devices; the amount of data collected, processed, and/or stored during inspection operations; the immediate conditions of the inspection surface that affect any of the foregoing; power availability of the inspection robot; couplant availability and deliver capacity; processing capability of the inspection robot and/or supporting external devices; data storage capacity of the inspection robot and/or supporting external devices; data acquisition rate capability of the inspection robot; communication capacity of the inspection robot with supporting external devices; a possibility of collision between payloads based on the configuration of the inspection robot; and operational considerations related to the operator ability to determine the status and inspection stage of the inspection robot (e.g., the availability of diagnostic parameters, operating condition parameters, and/or non-visible status indicators; line-of-sight quality to observe the inspection robot, etc.). It will be seen that some considerations for controlling the movement of multiple payloads can be understood at design time, and some considerations are affected by specific run-time conditions. Accordingly, the inspection circuit 6704, in certain embodiments, can modulate the rastering position commands 6710 during run-time operations to respond to run-time conditions, for example adjusting movement of the payloads to decrease utilization of some limiting resource, to increase inspection speed in the absence of a limiting resource, etc.

As used herein, an asynchronous rastering position command 6710 allows for uncoordinated movement between the rastering devices 5910, 5911. For example, an inspection circuit 6704 providing an asynchronous rastering position command 6710 may command both rastering devices 5910, 5911 to execute the reciprocating movement, and allowing both devices to perform independent operations without consideration to the movement of the other device. In certain embodiments, the rastering position commands 6710 may be provided in a mixed manner, for example commanding asynchronously unless operating conditions appear that indicate coordinated movement (e.g., a change in friction of the inspection surface, the presence of an obstacle, a reduction in data communication capacity, loss, or reduction in line-of-sight to the inspection robot, etc.).

Referencing FIG. 71, an illustrative inspection angle diagram consistent with certain embodiments of the present disclosure is schematically depicted. The example of FIG. 71 depicts example inspection angles for each of two phased array UT inspection elements, with a first element directed at an angle 7152 toward (e.g., approximately perpendicular) the inspection surface, and a second element directed at an angle 7156 offset from (e.g., approximately 45 degrees) the inspection surface. The example of FIG. 71 depicts a third element directed at an angle 7154 toward the inspection surface, either diagonal toward or away from the view in FIG. 71, depending upon whether the angle of the third element is directed toward the front or rear of the inspection robot.

In certain embodiments, the angle 7154 is inspected with a same physical array utilized to inspect at angle 7152, for example utilizing a phase delay steering operation, which may be performed entirely virtually (e.g., calculating returns based on phase delay calculations to direct the inspection at the desired angle 7154), with support from the phased array element (e.g., adjusting excitation and/or detection delays to improve the precision of the steering, and/or to reduce processing burdens in determining the virtual steering values), and/or the third element may be performed with a separate angled phased array element. The simultaneous detection of the inspection surface at multiple angles enhances the ability of the inspection operation to detect certain types of corrosion or other off-nominal aspects of the inspection surface, such as parallel cracks which are difficult to detect for previously known inspection systems. Additionally, the simultaneous detection of the inspection surface at multiple angles allows for the inspection to be performed in a single pass. The example of FIG. 71 may be a schematic front view or rear view, relative to the payload, sensor array, and/or inspection robot. The selected view of FIG. 71 aligns the viewing angle of 7152 and 7154 to provide a clear illustration of the angle 7558 to the angle 7156 offset.

In certain embodiments, the angle 7152 toward the inspection surface may be referenced as a direct angle (e.g., toward the inspection surface), and/or as a 0° linear angle, noting that the actual orientation of the angle 7152 may not be exactly perpendicular, or a 0° linear angle. In certain embodiments, the angle 7154 may be referenced as a 30° linear angle (or other selected angle value). In the examples, the angles 7152, 7154 may be referenced as linear angles (where applicable), as the angles lie on a plane parallel to the direction of travel, and approximately perpendicular to the inspection surface in the local region of the inspection robot. In certain embodiments, angle 7156 may be referenced as a lateral angle, for example a 45° lateral angle, as the angle 7156 lies on a plane parallel to the direction of travel, but angled significantly relative to the inspection surface in the local region of the inspection robot. As noted throughout the present disclosure, the selected angles may be determined according to the hardware arrangement (e.g., the positioning and configuration of the phased arrays within a sled or payload, and/or adjusted orientation of the sled and/or payload), as adjusted by a beam steering operation (e.g., rotating the inspected angle within the linear and/or lateral planes), and/or a combination of these. In certain embodiments, the selected angles may be adjusted at design time (e.g., adjusting the hardware configuration, swapping out a sled or a payload, and/or moving an actuator configured to adjust an orientation of the sled, payload, and/or a phased array, and/or setting calibration values utilized to perform beam steering operations), and/or may be adjusted at run time (e.g., adjusting any hardware actuators and/or calibration values during operations, for example in response to detected features, to perform additional or adjusted inspection operations in response to known conditions, for example due to a change in the inspection surface, weld, heat treated area, previously detected conditions from a prior inspection operation, or the like).

Referencing FIG. 72, an illustrative inspection angle diagram consistent with certain embodiments of the present disclosure is schematically depicted. The example of FIG. 72 is consistent with the example of FIG. 71, with the angle 7152 coming directly toward, or directly away from, the viewing angle of FIG. 72. The selected view of FIG. 72 aligns the viewing angle to show the relationship between angles 7154 and 7156. Note that in typical embodiments, the angles 7154, 7156 will have a component toward or away from the view in FIG. 71, depending upon whether the angle of the second element is toward the left or right side of the inspection robot, and depending upon whether the angle of the third element is toward the front or rear of the inspection robot.

Referencing FIG. 73, an illustrative inspection angle diagram consistent with certain embodiments of the present disclosure is schematically depicted. The example of FIG. 73 is consistent with the examples of FIGS. 71 and 72, with the viewing angle selected to align the first angle 7152 and the third angle 7156, and to provide a clear illustration of the angle 7559 to the angle 7154 offset. The example angles of FIGS. 71-73 are non-limiting illustrations. For example, the first angle 7152 may not be perpendicular to the inspection surface, but may be varied due to tolerances in the inspection robot (e.g., leveling of the inspection robot on the surface), the payload(s) (e.g., differences in the size and/or geometry of a payload, payload mount, arms, sleds, etc.), the inspection surface (e.g., curved or undulating surfaces, surface anomalies, etc.), and/or due to selected angle values for a particular system, for example where an inspection angle of a few degrees, +/−1 degree, +/−5 degrees, +/−10 degrees, or the like, can provide for enhanced inspection operations (e.g., due to the surface material, the characteristics of corrosion, temperature degradation, or the like experienced on the surface, including the orientation of these aspects with regard to the inspection surface), and/or due to relaxed allowances in the manufacture, assembly, and/or configuration of the inspection robot, payloads, sleds, phased arrays, etc., that result in reduced costs, assembly time, inspection time, or the like, that nevertheless result in a sufficient inspection outcome. In another example, the angles 7558 and/or 7559 may be between about 10 degrees and 80 degrees, between about 30 degrees and 60 degrees, and/or between about 30 degrees and 45 degrees, although other values are possible. The selection of the angles 7558, 7559 may be made according to inspection criteria (e.g., due to the geometry of the inspection surface, the area to be inspected, the type and geometry of characteristics (e.g., corrosion, fatigue, or heat treated area failures) to be inspected, or the like. In certain embodiments, the selection of the angles 7558, 7559 may be determined in response to other criteria, such as the limits of available processing power, constraints for amplitude and/or frequency of the phased array element excitations and/or detection capability, preservation of sufficient precision for inspection operations, and/or preservation of sufficient signal for inspection operations (e.g., accounting for cosine losses at high beam steering angles).

In certain embodiments, one or more angles 7152, 7154, 7156 are adjustable in real time, for example by changing an angle of the phased array, payload, or associated sled, and/or utilizing beam steering operations. In certain embodiments, one or more of the angles 7152, 7154, 7156 aligns with the physical characteristics of the associated phased array, for example aligned with the neutral inspection operations of the associated phased array. In certain embodiments, one or more, or all, of the angles 7152, 7154, 7156 are not aligned with the neutral inspection operations of the associated phased array, for example with the selected angle 7152, 7154, 7156 being determined and/or adjusted using a beam steering operation. It will be seen that, with a typical linear or pseudo-linear phased array, at least two phased arrays will be utilized to provide inspection at all angles where at least one of the angles does not lie in a plane with the other angles. It will also be seen that non-planar angles can be supported with a selected phased array, for example using a two-dimensional phased array element.

Figure 76:
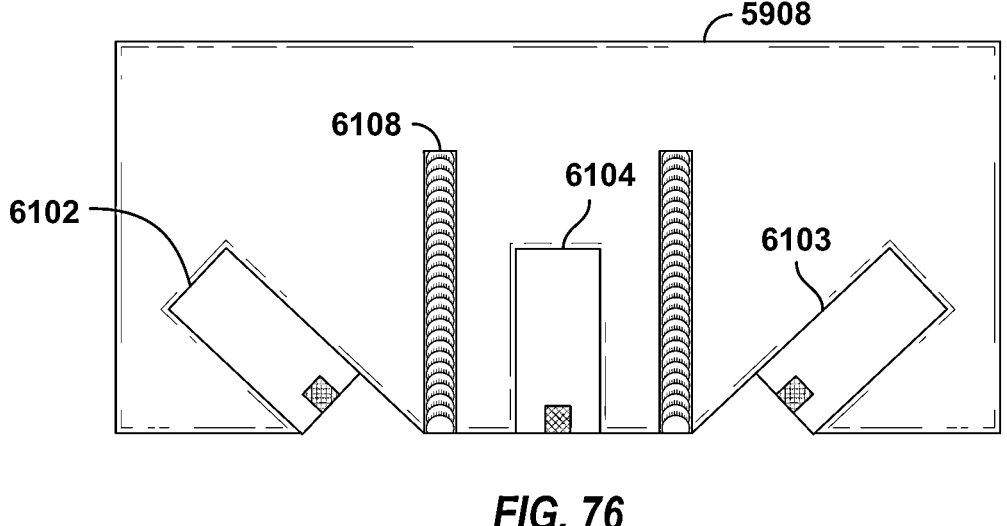
FIG. 76 is a schematic depiction of a payload, in accordance with an embodiment of the current disclosure.

Referencing FIG. 76, an example payload 5908 is depicted in schematic cross-section. The example of FIG. 76 is consistent with certain embodiments of the present disclosure, and depicts an example arrangement of a number of UT phased arrays provided on a payload 5908. The example of FIG. 76 depicts two angled UT phased arrays 6102, 6103 that provide lateral inspection, and a single direct UT phased array 6104 that provides perpendicular and/or linear inspection (e.g., utilizing beam steering to provide for linear inspection). The example payload 5908 of FIG. 76 is capable to inspect heat affected regions on both sides of a weld in a single inspection operation (e.g., a rastering operation across the inspected portion of the inspection surface). For example, each lateral array 6102, 6103 is capable to inspect the respective sides of the heat affected region, while the direct phased array 6104 is operated to inspect each side of the weld (or other inspected feature) in response to positioning on each side of the weld during rastering operations of the payload 5908. The example payload 5908 includes acoustic isolators 6108 positioned between each phased arrays 6102, 6104, 6103.

Figure 77:
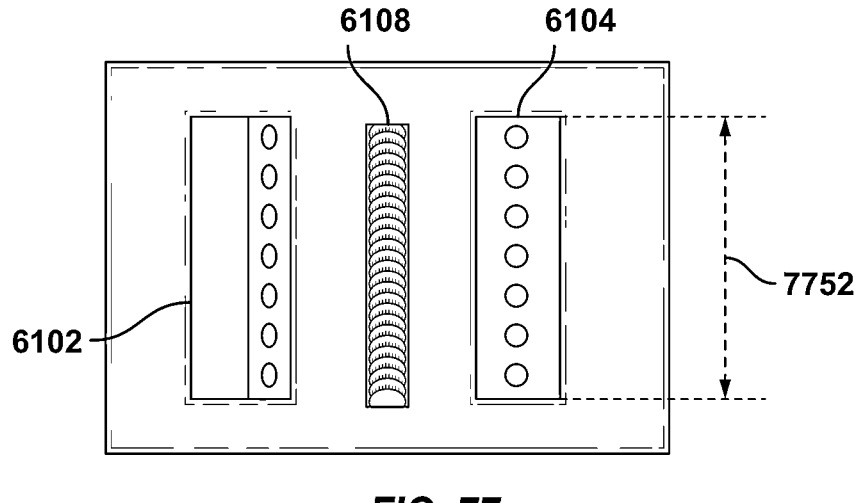
FIG. 77 is a schematic depiction of a payload, in accordance with an embodiment of the current disclosure.

Referencing FIG. 77, an example payload is schematically depicted from an underside view. In the example of FIG. 77, a direct phased array 6104 is oriented toward the inspection surface, which may be utilized to perform a perpendicular and/or a linear inspection (e.g., using beam steering operations), and an angled phased array 6102 may be utilized to perform a lateral inspection. The example of FIG. 77 includes an acoustic isolators 6108 positioned between the phased arrays 6102, 6104. The example of FIG. 77 includes an annotation of extent 7752, depicting the area of the inspection surface that can be inspected in a single inspection operation of the payload. In certain embodiments, the inspected region corresponds to the extent 7752 axially (e.g., in the direction of travel of the inspection robot), and to a rastered region (e.g., the lateral extent of the inspection surface exposed to inspection in response to a rastering operation of the payload). In certain embodiments, the inspected region corresponds to a number of the regions sequentially inspected, for example to inspect a selected axial length, or all, of the weld or other inspected feature of the inspection surface.

Figure 78:
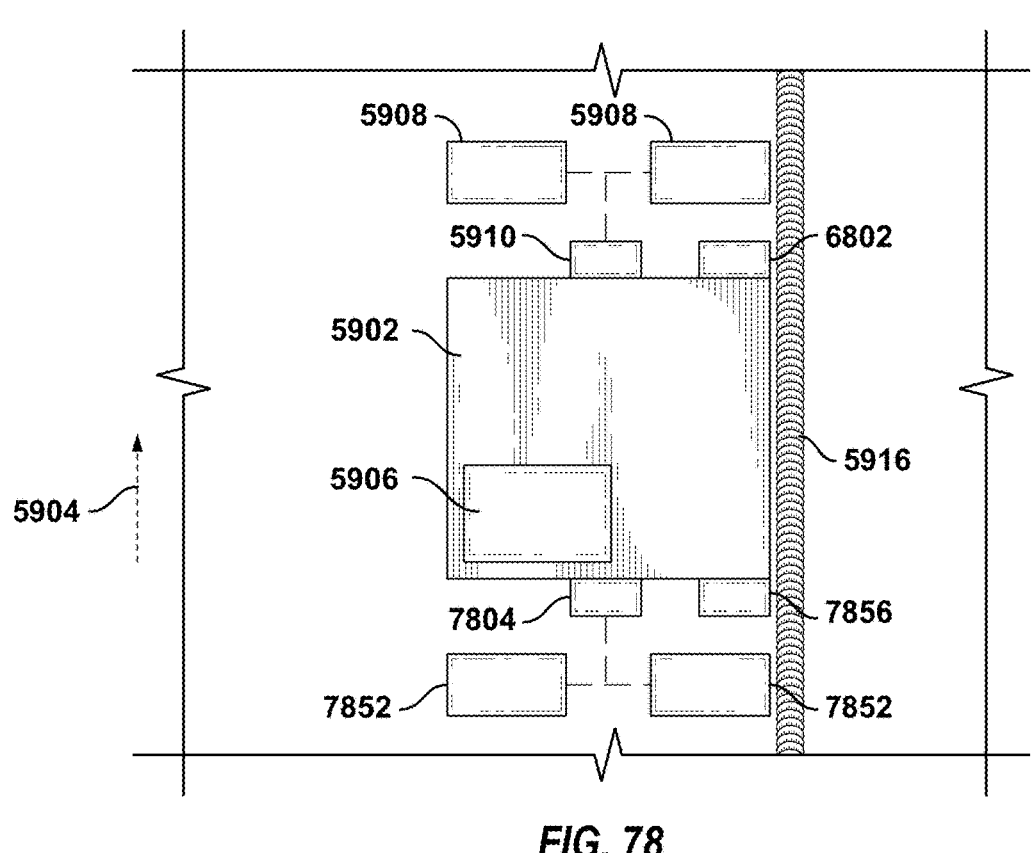
FIG. 78 is a schematic depiction of an inspection robot having forward and rearward payloads, in accordance with an embodiment of the current disclosure.

Referencing FIG. 78, an example inspection robot is schematically depicted to illustrate certain aspects of the present disclosure. The example of FIG. 78 is consistent with aspects of other embodiments depicted herein, with the addition of additional payloads 7852 in a rearward position of the inspection robot. The example additional payloads 7852 further include an associated rastering device 7804 configured to raster the payloads 7852 to perform inspection operations of selected areas of the inspection surface, for example a heat affected region of a weld. The example of FIG. 78 further includes an additional payload 7856, for example a weld inspection sensor payload. As for the forward payloads, the number and arrangement of rearward payloads may be configured as desired—for example allowing the inspection robot to inspect both sides of the weld in a single run, rastering payloads in cooperation or individually, and/or attaching the weld inspection sensor payload 7856 to one of the rastering payloads 7852. The rearward payloads 7852 may be arranged to inspect portions of the inspection surface that have not already been inspected by the forward payloads 5908, for example by alternating inspected portions such that the rearward payloads 7852 do not repeat inspection areas, allowing for the inspection robot to complete the inspection operations in a reduced time. In certain embodiments, the rearward payloads 7852 may be arranged to inspect portions of the inspection surface that have already been inspected by the forward payloads 5908, for example allowing for additional inspections using a re-calibrated sensor operation (e.g., adjusting calibrations such as expected return times, estimated thickness, and/or estimated speed of sound in materials), using sensors having distinct angle operations (e.g., with linear, lateral, and/or direct angles that are distinct from the angles of the forward payloads 5908), and/or using different sensors (e.g., electromagnetic sensors, cameras, temperature sensors, vibration sensors, etc.). In certain embodiments, the rearward payloads 7852 may be utilized selectively, for example in response to detected conditions from the forward payloads 5908, anomalies in the inspection data, or the like.

Figure 79:
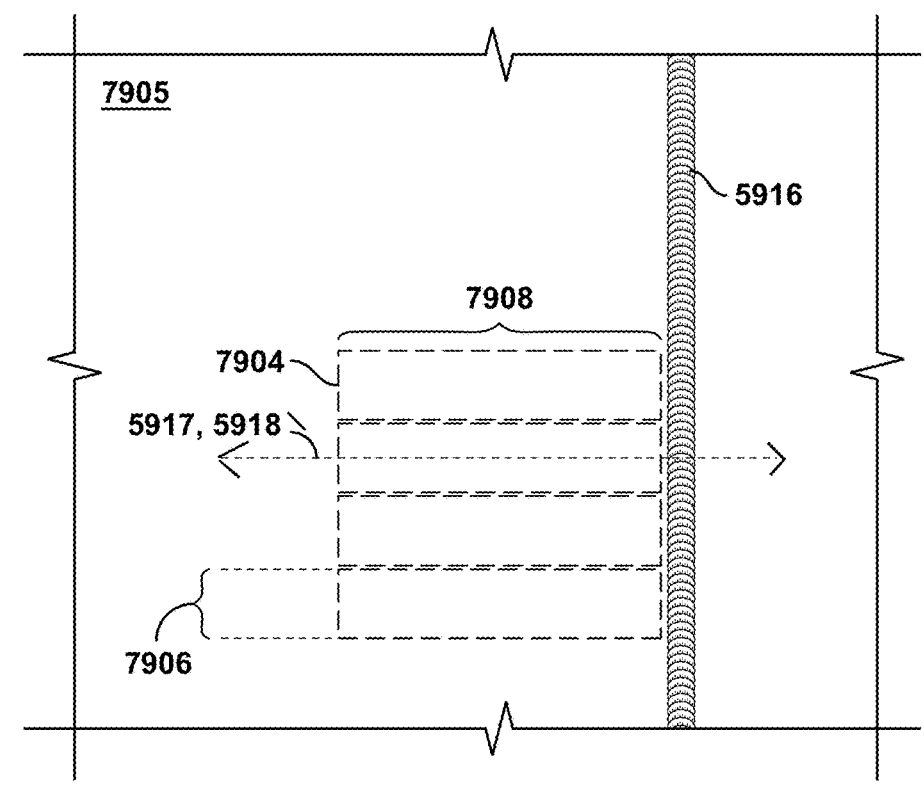
FIG. 79 is a schematic depiction of alternating inspection regions, in accordance with an embodiment of the current disclosure.

Referencing FIG. 79, an example inspection area of an inspection surface 7905 is schematically depicted, on a single side of the weld 5916 for purposes of the example. In the example of FIG. 79, alternating regions 7904 are inspected by a forward payload, and regions 7906 are inspected by a rearward payload. In the example of FIG. 79, the rastering devices are utilized to inspect a width 7908 according to the range of motion of the rastering device, and/or the configuration of the payload(s). In a given inspection operation, depending upon the size and configuration of the inspection robot and payload(s), a number of regions may be between the forward and rearward payloads—for example a first region inspected by the forward payload(s) may have adjacent regions inspected by the rearward payload(s) after several intervening regions have been inspected. In certain embodiments, for example with regard to terminating areas at the extent of the inspection surface, the alternating arrangement may be adjusted, for example with several terminating inspection areas consecutively inspected by one or the other of the forward or rearward payloads.

Figure 80:
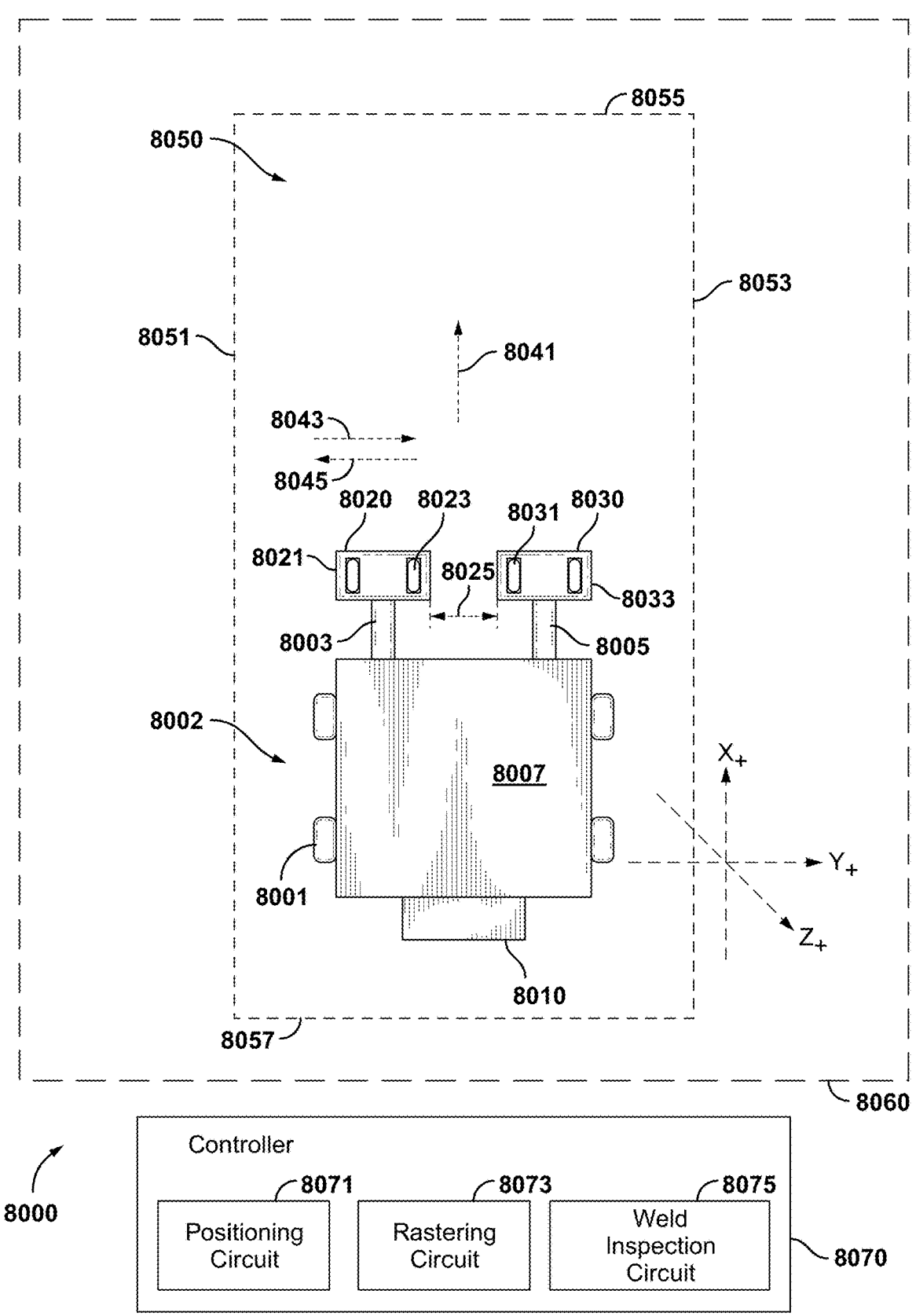
FIG. 80 is a block diagram illustrating an example inspection system on an inspection surface, in accordance with an embodiment of the current disclosure.

With reference to FIG. 80, there is illustrated an example inspection system 8000 including an inspection robot 8002 positioned on an inspection surface 8060 and an inspection controller 8070. It shall be appreciated that system 8000 may be implemented in a variety of applications, including pipe inspection, tank inspection, and other types of surface inspection.

Inspection surface 8060 extends in the X-Y plane of the illustrated Cartesian coordinate system. Inspection surface 8060 may include a weld, a crack, a blister, or other features of interest. As illustrated in FIG. 80, inspection surface 8060 includes a traversing region 8050, which is a portion of the inspection surface 8060 that inspection robot 8002 is configured to inspect. Traversing region 8050 includes side edges 8051 and 8053, front edge 8055, and back edge 8057.

Inspection robot 8002 includes a propulsion system 8001 structured to move inspection robot 8002 in a direction of travel 8041 on inspection surface 8060. In the illustrated embodiments, propulsion system 8001 includes a plurality of wheels coupled to a body 8007, but in other embodiments propulsion system 8001 may include tracks or other device structured to move inspection robot 8002 in direction of travel 8041.

In the illustrated embodiment, inspection robot 8002 includes rastering devices 8003, 8005, and payloads 8020, 8030. Rastering device 8003 is coupled to body 8007 and payload 8020, and structured to move payload 8020 back and forth (i.e., raster) in parallel directions of inspection 8043 and 8045, also known as a direction of inspection and a reverse direction of inspection, or a forward direction of inspection and a reverse direction of inspection. It shall be appreciated that either direction of inspection 8043 and 8045 may be referred to as the forward direction of inspection, and each feature of direction of inspection 8043 described herein may also apply to direction of inspection 8045.

Direction of inspection 8043 is distinct from direction of travel 8041. In the illustrated embodiment, direction of travel 8041 is parallel to the X axis and direction of inspection 8043 is parallel to the Y axis such that direction of travel 8041 and direction of inspection 8043 are orthogonal to each other in the XY plane. It shall be appreciated that orthogonal may include a range of angles around 90 degrees, such as +/−5 degrees, to name but one example. In certain embodiments, direction of travel 8041 and direction of inspection 8043 are at an oblique angle relative to each other in the XY plane. In certain embodiments, the directions of inspection 8043, 8045 are mirrored relative to an axis orthogonal to direction of travel 8041.

It shall be appreciated that orientations of inspection robot 8002 and its components relative to components of robot 8002, the illustrated directions, X-Y-Z coordinates, and inspection surface are meant to describe orientations while inspection robot 8002 is conducting an inspection operation during an inspection mode. The described orientations are not intended to describe inspection robot 8002 during other operations. For example, the described orientations are not intended to describe inspection robot 8002 while robot 8002 is removed from inspection surface 8060 for maintenance or repair. Unless otherwise specified, a described orientation of inspection robot 8002, or the components thereof, is maintained during the entirety of the inspection operation unless otherwise noted.

Rastering device 8003 is coupled to body 8007 and payload 8030, and structured to move payload 8030 back and forth along directions of inspection 8043 and 8045. It shall be appreciated that any or all of the features of rastering device 8003 may also be present in rastering device 8005.

Payload 8020 includes ultrasonic (UT) phased arrays 8021 and 8023. As described in more detail below, arrays 8021 and 8023 are arranged in a parallel configuration, the arrangement of elements of each array being parallel with direction of travel 8041. As payload 8020 is moved in direction of inspection 8043, arrays 8021 and 8023 move perpendicular to direction of inspection 8043. Each UT phased array is structured to measure characteristics of the inspection surface. For example, each UT phased array may emit a beam and in response receive a beam reflection corresponding to characteristics of a portion of inspection surface 8060.

Payload 8030 includes UT phased arrays 8031 and 8033 arranged in a parallel configuration relative to each other. Arrays 8031 and 8033 may also be arranged in parallel with arrays 8021 and 8023. It shall further be appreciated that any or all of the features of payload 8020 may be present in payload 8030.

In the illustrated embodiment, inspection robot 8002 includes a weld sensing assembly 8010. In the illustrated embodiment, weld sensing assembly 8010 is mounted to body 8007. In certain embodiments, weld sensing assembly 8010 is mounted to a third payload of inspection robot 8002. In certain embodiments, at least a portion of weld sensing assembly 8010 is mounted on at least one of payload 8020 and payload 8030. In certain embodiments, inspection robot 8002 does not include a weld sensing assembly 8010.

Weld sensing assembly 8010 is configured to measure characteristics of a weld region of inspection surface 8060 including a weld. The weld region may be interposed between two heated regions of inspection surface 8060.

In certain embodiments, weld sensing assembly 8010 includes a time-of-flight sensor system configured to measure the characteristics of the weld region. The time-of-flight sensor system may include a time-of-flight sensor positioned on at least one of a first side or a second side of the weld. The weld sensing assembly may include a first time-of-flight sensor positioned on the first side of the weld and a second time-of-flight sensor positioned on the second side of the weld.

Inspection controller 8070 is configured to monitor and control inspection robot 8002. In certain embodiments, controller 8070 is incorporated into robot 8002. In certain embodiments, controller 8070 is coupled to robot 8002 by way of one or more communication lines. In certain embodiments, controller 8070 and robot 8002 are structured to communicate wirelessly with each other. Controller 8070 may be located proximate to robot 8002 or located remotely from robot 8002.

Traversing region 8050 may be divided into a plurality of widths. In certain embodiments, controller 8070 is configured to determine a width of traversing region 8050 for each rastering device 8003, 8005. Controller may determine the widths of traversing region 8050 for rastering devices 8003, 8005 in response to measured characteristics provided by payloads 8020 or 8030.

In the illustrated embodiment, controller 8070 includes a positioning circuit 8071, a rastering circuit 8073, and a weld inspection circuit 8075. In certain embodiments, controller 8070 may include more or fewer circuits.

Positioning circuit 8071 may be structured to position inspection robot 8002 at a selected inspection position using propulsion system 8001. Positioning circuit 8071 may be further structured to position inspection robot 8002 at a second selected inspection position, wherein the second selected inspection position comprises a position offset in direction of travel 8041 relative to the selected inspection position. The position offset may include an offset value determined in response to an axial extent, also known as length, of at least one UT phased array of payloads 8020 and 8030. In certain embodiments, the position offset includes an offset of about 45 mm (i.e., +/−10%). In certain embodiments, the position offset includes an offset of between 1 inch and 2 inches, inclusive.

Rastering circuit 8073, also known as inspection circuit, may be structured to raster payload 8020 and payload 8030. Rastering circuit 8073 may also be structured to provide an interrogation command in response to inspection robot 8002 being positioned at the selected inspection position. The interrogation command may be provided to the UT phased arrays of payloads 8020 and 8030, which are responsive to the interrogation command.

Weld inspection circuit 8075 is structured to provide a weld inspection command in response to a position value of inspection robot 8002. Weld sensing assembly 8010 may be responsive to the weld inspection command to measure characteristics of a weld region of traversing region 8050 interposed between other regions of traversing region 8050, such as the width of traversing region 8050 for rastering device 8003 and the width of traversing region 8050 for rastering device 8005. In certain embodiments, such as where inspection robot 8002 does not include weld sensing assembly 8010, controller 8070 does not include weld inspection circuit 8075.

In certain embodiments, controller 8070 is configured to operate rastering device 8003 and rastering device 8005 in an inspection mode by moving the rastering devices in directions of inspection 8043 or 8045, which are distinct from direction of travel 8041. For example, rastering device 8003 may move payload 8020 in direction of inspection 8045 and rastering device 8005 may move payload 8030 in direction of inspection 8043. In certain embodiments, moving the rastering devices includes simultaneously moving payloads 8020 and 8030 in the same direction of inspection or different directions of inspection. In certain embodiments, controller 8070 is configured to move payload 8020 in direction of inspection 8045, then move robot 8002 in direction of travel 8041, then move payload 8020 in reverse direction of inspection 8043.

In certain embodiments, controller 8070 is configured to implement a synchronous mode inspection or an asynchronous mode inspection. Rastering circuit 8073 may be structured to provide the interrogation command to implement the synchronous mode inspection or the asynchronous mode inspection.

Synchronous mode inspection may include a position coordination profile between rastering device 8003 and rastering device 8005. For example, synchronous mode inspection may include moving payload 8020 in a direction of inspection and moving payload 8030 in a same direction of inspection while maintaining a selected distance 8025 between payloads 8020 and 8030. In certain embodiments, the selected distance is fixed. In another example, where the selected distance is varying, a synchronous mode inspection may include maintaining the selected distance 8025 effective to move payload 8020 in direction of inspection 8043 while moving payload 8030 in reverse direction of inspection 8045.

Synchronous mode inspection may include a velocity coordination profile between rastering device 8003 and rastering device 8005. For example, synchronous mode inspection may include moving payloads 8020 and 8030 based on a selected velocity.

Synchronous mode inspection may include a time-based coordination of operations of rastering device 8003 and rastering device 8005. For example, synchronous mode inspection may include moving rastering device 8003 and rastering device 8005 from one point of inspection in the directions of inspection to another point in the direction of inspection simultaneously.

Synchronous mode inspection may include mitigating force on inspection robot 8002 orthogonal to direction of travel 8041 based on a combined movement of payloads 8020 and 8030. In certain embodiments, mitigating the force on inspection robot 8002 orthogonal to direction of travel 8041 includes moving payload 8020 and payload 8030 in opposite directions.

Asynchronous mode inspection may include moving payload 8020 independent of a direction of inspection of payload 8030. Asynchronous mode inspection may also include moving payload 8020 independent of a velocity or speed of payload 8030. For example, asynchronous mode inspection may include repeatedly moving payload 8020 while payload 8030 is positioned at a position of inspection and measuring characteristics of a portion of inspection surface 8060, and then moving payload 8030 while payload 8020 is positioned at another position of inspection and measuring characteristics of another portion of inspection surface 8060.

It shall be appreciated that any or all of the foregoing features of inspection robot 8002, inspection controller 8070, and inspection surface 8060 may also be present in the other inspection robots, inspection controllers, and inspection surfaces disclosed herein.

Figure 81:
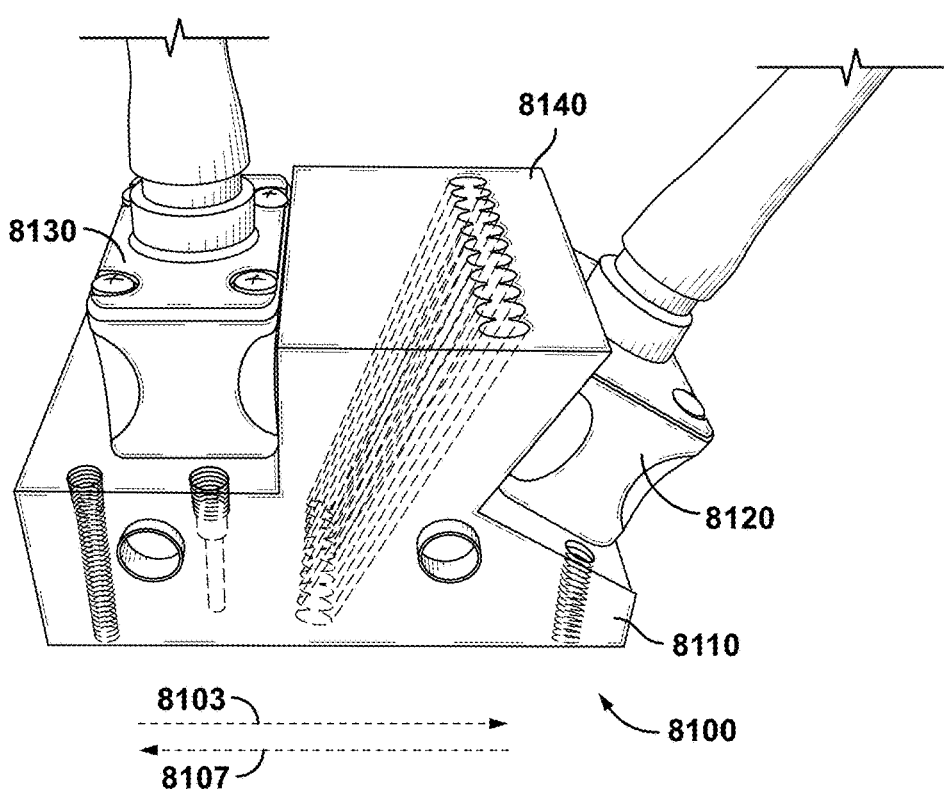
FIG. 81 is a front view illustrating an example payload, in accordance with an embodiment of the current disclosure.
Figure 82:
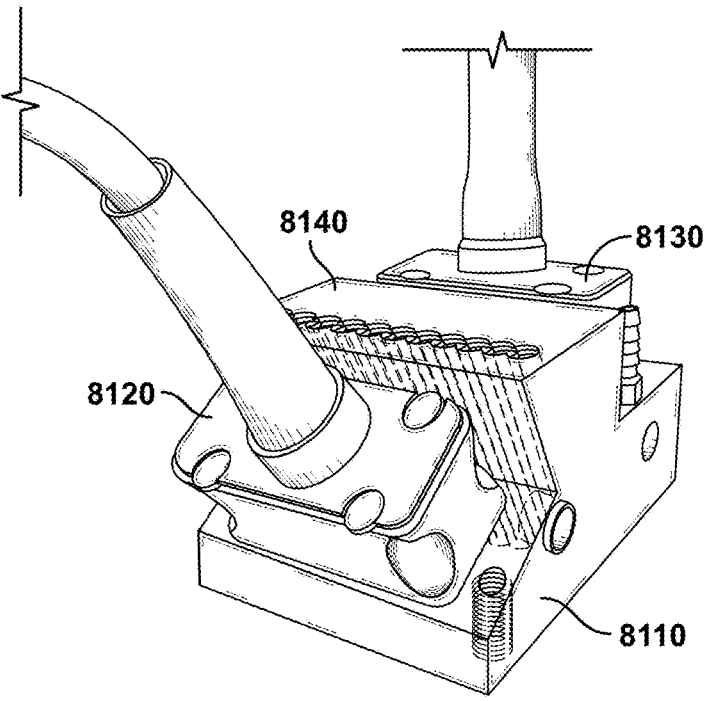
FIG. 82 is a perspective view illustrating the example payload of FIG. 81, in accordance with an embodiment of the current disclosure.

With reference to FIGS. 81 and 82, there is illustrated an example payload 8100, such as payloads 8020 or 8030 of robot 8002 in FIG. 80. Payload 8100 is coupled to a rastering device and structured to measure characteristics of a portion of an inspection surface.

Payload 8100 includes UT phased arrays 8120 and 8130 attached to a base 8110 including an acoustic barrier 8140 interposed between UT phased arrays 8120 and 8130. Each of UT phased arrays 8120 and 8130 include a plurality of elements arranged linearly along a length of the UT phased array. UT phased arrays 8120 and 8130 may include an equal number of elements. The plurality of elements for each UT phased array may include 32 elements, 64 elements, or 72 elements, to name but a few examples. The plurality of elements for each UT phased array are arranged in a parallel configuration, distinct from directions of inspection 8103 and 8107. In certain embodiments, the plurality of elements for each UT phased array are arranged in a parallel configuration, perpendicular from directions of inspection 8103 and 8107.

UT phased array 8130 is oriented orthogonally relative to a bottom surface of base 8110 and the inspection surface while UT phased array 8120 is oriented obliquely relative to the bottom surface of base 8110 and the inspection surface. In certain embodiments, UT phased array 8120 is oriented at an angle between 30 degrees and 60 degrees, inclusive, relative to the inspection surface. Without beam steering, UT phased array 8130 is oriented to emit a beam through base 8110 toward the inspection surface at a 0 degree angle and UT phased array 8120 is oriented to emit a beam through base 8110 toward the inspection surface at an oblique angle. UT phased array 8130 is structured to selectively steer an emitted beam directed through base 8110 to the inspection surface. UT phased array 8130 may also be structured to selectively steer an emitted beam directed through base 8110 to the inspection surface. In certain embodiments, payload 8100 does not include a UT phased array oriented orthogonally or obliquely relative to the parallel configuration of the plurality of elements of UT phased arrays 8120 and 8130, and payload does not include a UT phased array oriented parallel to directions of inspection 8103 or 8107.

At each inspection position along a direction of inspection, payload 8100 may emit three beams in succession. UT phased array 8130 is configured to emit a first unsteered 0 degree beam, and a second steered beam having a second angle between 15 and 45 degrees relative to the 0 degree beam emitted by the UT phased array 8130. At the same inspection point, UT phased array 8120 is configured to emit a third beam, which may be steered or unsteered. The first, second, and third beam may be emitted in any order.

Figure 86:
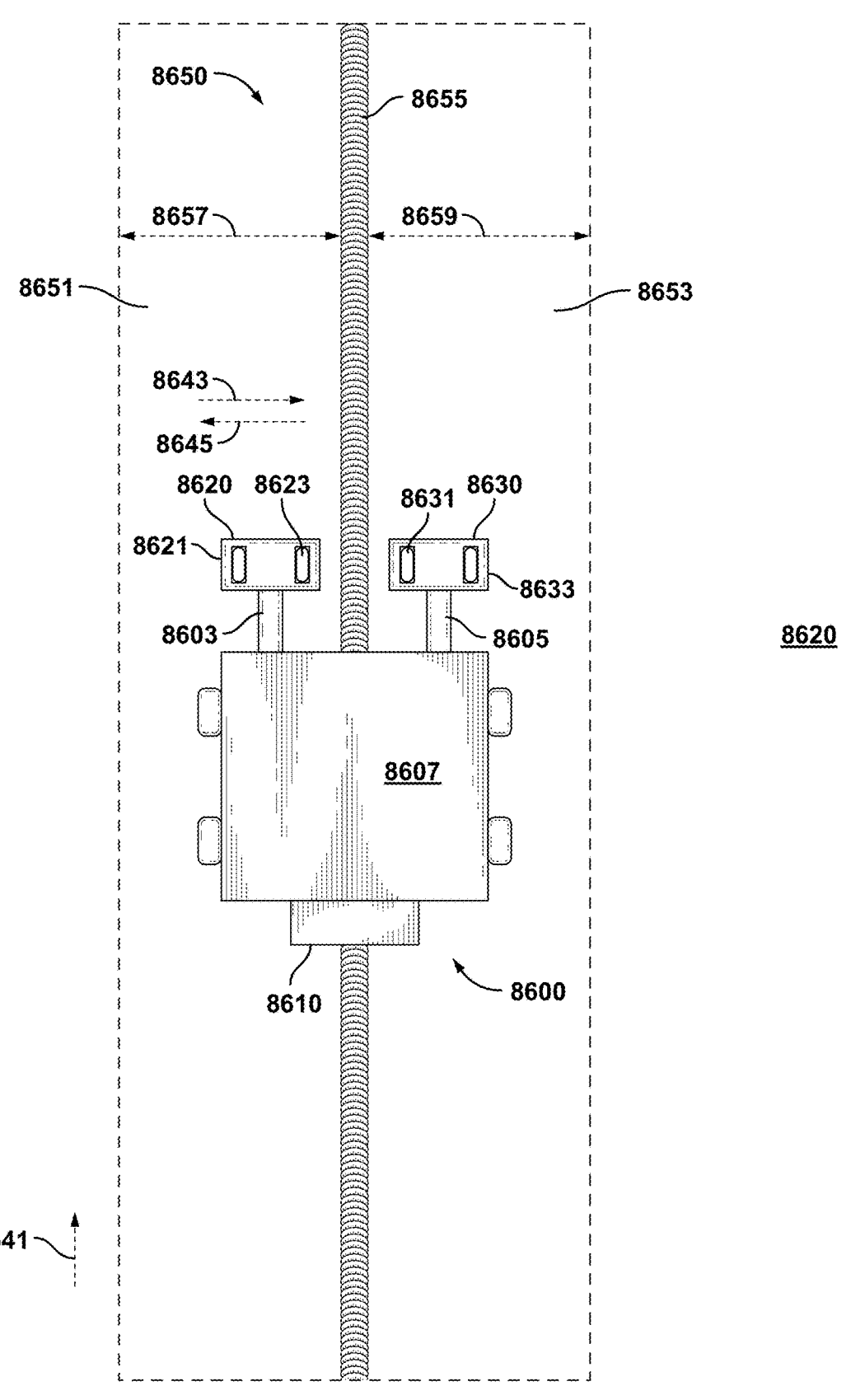
FIG. 86 is a top view illustrating an example inspection robot on an inspection surface including a weld, in accordance with an embodiment of the current disclosure.

It shall be appreciated that any or all of the foregoing features of payload 8100 and the components thereof may also be present in the other payloads disclosed herein, such as the payloads of FIGS. 80 and 86.

Figure 83:
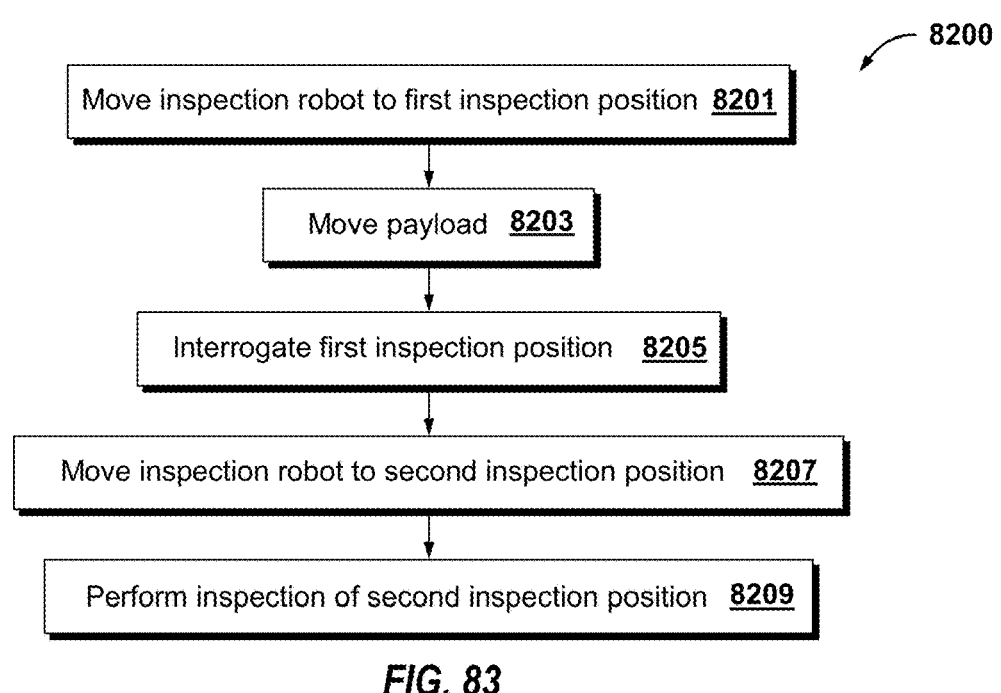
FIG. 83 is a flowchart illustrating an example inspection process, in accordance with an embodiment of the current disclosure.

With reference to FIG. 83, there is illustrated an example inspection process 8200 for inspecting a surface. Process 8200 may be implemented in whole or in part in one or more of the inspection robots disclosed herein. It shall be further appreciated that variations of and modifications to process 8200 are contemplated including, for example, the omission of one or more aspects of process 8200, the addition of further conditionals and operations, or the reorganization or separation of operations and conditionals into separate processes.

Process 8200 begins at operation 8201 where the inspection robot moves the inspection robot in a first inspection direction, also known as a direction of travel, to a first inspection position of an inspection surface.

Process 8200 proceeds to perform an inspection of the first inspection position of the inspection surface, including operations 8203 and 8205.

During operation 8203, the inspection robot moves a payload of the inspection robot in a second direction, also known as a direction of inspection, distinct from the first inspection direction, wherein the payload comprises a first ultrasonic (UT) phased array and a second UT phased array.

During operation 8205, the inspection robot interrogates the first inspection position with the first UT phased array and the second UT phased array during the moving the payload. Interrogating the first inspection position with the first UT phased array further comprises interrogating the first inspection position in two directions with the first UT phased array. The two directions may include a first orthogonal direction that is perpendicular to the inspection surface, and a second steered direction, wherein the second steered direction is rotated in a plane including a first axis orthogonal to the second direction and a second axis orthogonal to the inspection surface at a position of the first UT phased array.

Interrogating the first inspection position in two directions may include utilizing a single energizing data sequence to perform the interrogating in both directions. Alternatively, Interrogating the first inspection position in two directions comprises utilizing a first energizing data sequence to perform the interrogating in a first orthogonal direction, and utilizing a second energizing data sequence to perform the interrogating in the second direction.

Process 8200 proceeds to operation 8207 where the inspection robot moves the inspection robot in the first inspection direction to a second inspection position of the inspection surface.

Process 8200 proceeds to operation 8209 where the inspection robot performs an inspection of the second inspection portion of the inspection surface. In certain embodiments, moving the payload of the inspection robot in the second direction comprises moving the payload from a first payload side to a second payload side and performing the inspection of the second inspection position comprises moving the payload from the second payload side to the first payload side.

It shall be appreciated that any or all of the foregoing features of example process 8200 may also be present in the other processes disclosed herein, such as the processes illustrated in FIGS. 83-84 and 87-90, to name but a few examples.

Figure 84:
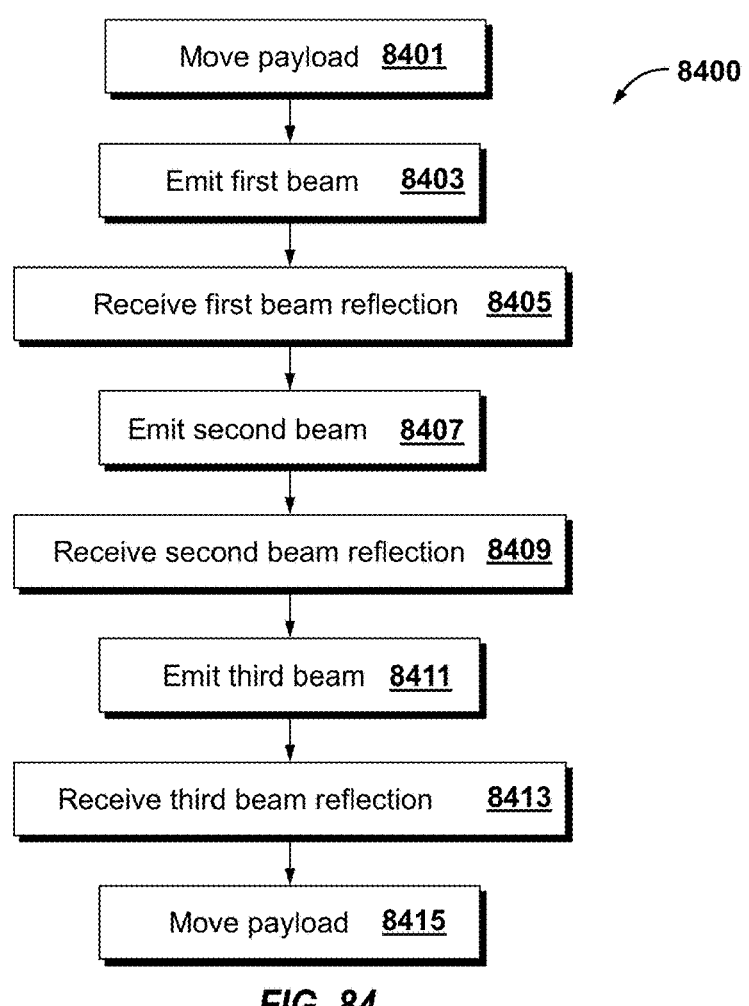
FIG. 84 is a flowchart illustrating an example payload data collection process, in accordance with an embodiment of the current disclosure.

With reference to FIG. 84, there is illustrated an example inspection process 8400 for moving a payload of an inspection robot in a direction of inspection. Process 8400 may be implemented in whole or in part in one or more of the inspection robots disclosed herein. It shall be further appreciated that variations of and modifications to process 8400 are contemplated including, for example, the omission of one or more aspects of process 8400, the addition of further conditionals and operations, or the reorganization or separation of operations and conditionals into separate processes. In certain embodiments, process 8400 is performed repeatedly until the payload reaches a side edge of a traversing region of an inspection surface.

Process 8400 begins at operation 8401 where the inspection robot positions the payload including two UT phased array at a first position along the direction of inspection.

Process 8400 proceeds to operation 8403 where the inspection robot emits a first beam with the first UT phased array at a first angle. In certain embodiments, the first angle of the first beam is 0 degrees relative to the orientation of the first UT phased array.

Process 8400 proceeds to operation 8405 where the inspection robot receives a first beam reflection in response to emitting the first beam. The first beam reflection corresponds to characteristics of the inspection surface.

Process 8400 proceeds to operation 8407 where the inspection robot emits a second beam with the first UT phased array at a second angle. In certain embodiments, the second angle is between 15 and 45 degrees relative to the orientation of the first UT phased array. In certain embodiments, emitting the second beam includes steering the second beam.

Process 8400 proceeds to operation 8409 where the inspection robot receives a second beam reflection in response to emitting the second beam. The second beam reflection may correspond to characteristics of the inspection surface that are different than the characteristics corresponding to the first beam reflection. In certain embodiments, emitting the first beam and the emitting the second beam occurs while the first UT phased array maintains an orientation relative to the inspection surface.

Process 8400 proceeds to operation 8411 where the inspection robot emits a third beam with the second UT phased array.

Process 8400 proceeds to operation 8413 where the inspection robot receives a third beam reflection in response to emitting the third beam.

Process 8400 proceeds to operation 8415 where the inspection robot moves the payload one increment in the direction of inspection.

It shall be appreciated that any or all of the foregoing features of example process 8400 may also be present in the other processes disclosed herein, such as the processes illustrated in FIGS. 83, 85, and 87-90, to name but a few examples.

Figure 85:
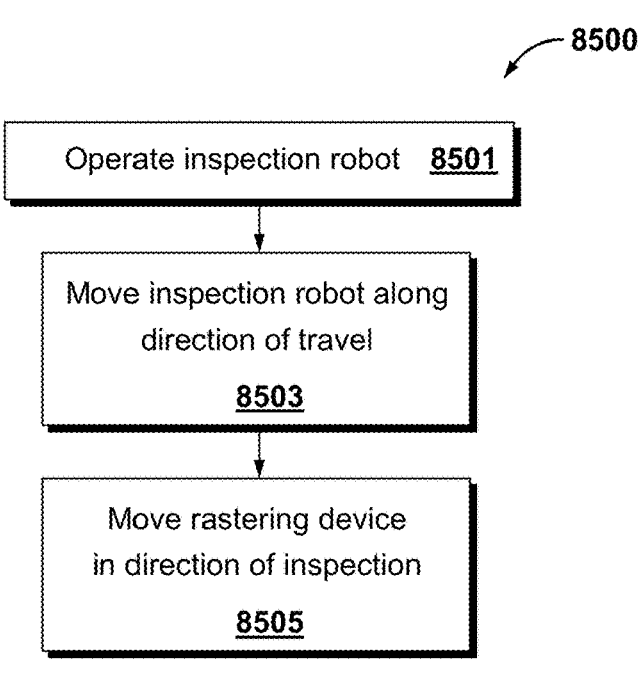
FIG. 85 is a flowchart illustrating another example inspection process, in accordance with an embodiment of the current disclosure.

With reference to FIG. 85, there is illustrated an example inspection process 8500. Process 8500 may be implemented in whole or in part in one or more of the inspection robots disclosed herein. It shall be further appreciated that variations of and modifications to process 8500 are contemplated including, for example, the omission of one or more aspects of process 8500, the addition of further conditionals and operations, or the reorganization or separation of operations and conditionals into separate processes.

Process 8500 begins at operation 8501 including operating an inspection robot including a payload including a first ultrasonic (UT) phased array and a second UT phased array, the first UT phased array and the second UT phased array being arranged in a parallel configuration, and a rastering device.

Process 8500 proceeds to operation 8503, where the inspection robot moves the inspection robot in a direction of travel on an inspection surface.

Process 8500 proceeds to operation 8505, where the rastering device moves the payload in a direction of inspection, the direction of inspection being distinct from the direction of travel and the direction of inspection being distinct from the parallel configuration of the first UT phased array and the second UT phased array.

It shall be appreciated that any or all of the foregoing features of example process 8500 may also be present in the other processes disclosed herein, such as the processes illustrated in FIGS. 83-84 and 87-90, to name but a few examples.

With reference to FIG. 86, there is illustrated an example inspection robot 8600 on an inspection surface 8650. While robot 8600 described hereinafter may not specifically describe features analogous to the features of inspection robot 8002 in FIG. 80, such features may nonetheless be employed in connection with the described robot 8600.

Inspection surface includes region 8651, region 8653, and weld region 8655. Weld region 8655 includes a weld and is interposed between regions 8651 and 8653. Region 8651 is adjacent to weld region 8655. In certain embodiments, region 8651 corresponds to a portion of inspection surface 8650 heated during the creation of the weld of weld region 8655. Region 8651 includes a width 8657. In certain embodiments, width 8657 is between three and twelve inches, inclusive. The payload 8620 may be rastered back and forth 8643, 8645.

Region 8653 is adjacent to weld region 8655. In certain embodiments, region 8653 corresponds to a portion of inspection surface 8650 heated during the creation of the weld of weld region 8655. Region 8653 includes a width 8659. In certain embodiments, width 8659 is between three and twelve inches, inclusive.

Inspection robot 8600 includes a body 8607, rastering devices 8603 and 8605, payloads 8620 and 8630, and weld sensing assembly 8610. Payload 8620 includes UT phased arrays 8621 and 8623. Payload 8630 includes UT phased arrays 8631 and 8633. Inspection robot 8600 is configured to move along a direction of travel 8641 corresponding to weld region 8655 while straddling weld region 8655. In certain embodiments, payload 8620 is structured to measure characteristics of region 8651 while payload 8630 is structured to measure characteristics of region 8653.

In certain embodiments, a controller is configured to determine widths 8657 and 8659 in response to measured characteristics provided by one or more of payloads 8620 or 8630. In certain embodiments, a controller is configured to determine a size of region 8651 in response to the measured characteristics provided by payload 8620 or payload 8630, or configured to determine a size of region 8653 in response to the measured characteristics provided by payload 8620 or payload 8630.

Weld sensing assembly 8610 is configured to measure characteristics of weld region 8655. In certain embodiments, weld sensing assembly 8610 includes a time-of-flight sensor system configured to measure the characteristics of the weld region.

Figure 87:
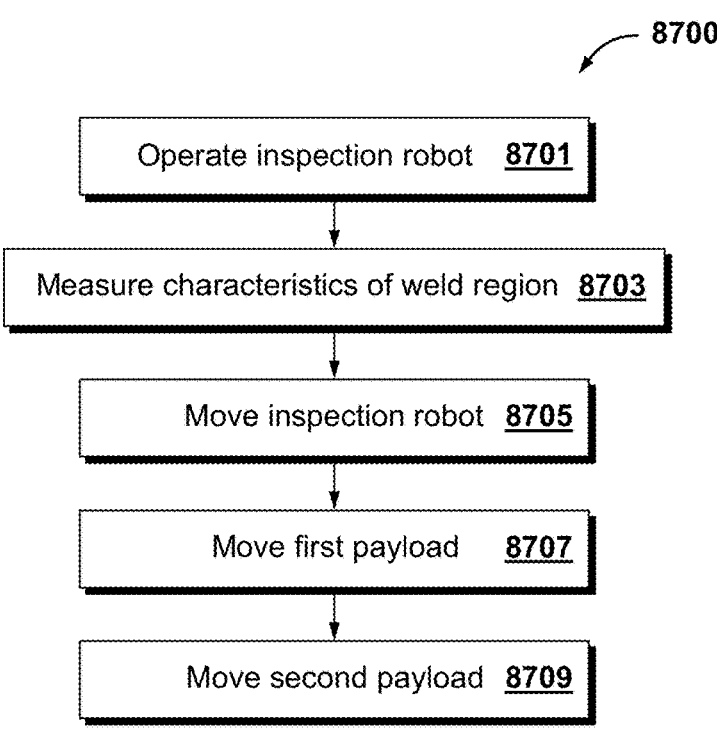
FIG. 87 is a flowchart illustrating an example process for inspecting a weld, in accordance with an embodiment of the current disclosure.

With reference to FIG. 87, there is illustrated an example inspection process 8700 for inspecting a weld. Process 8700 may be implemented in whole or in part in one or more of the inspection robots disclosed herein. It shall be further appreciated that variations of and modifications to process 8700 are contemplated including, for example, the omission of one or more aspects of process 8700, the addition of further conditionals and operations, or the reorganization or separation of operations and conditionals into separate processes.

Process 8700 begins at operation 8701 including operating an inspection robot including a first payload including a first plurality of ultrasonic (UT) phased arrays, a second payload including a second plurality of UT phased arrays, and a weld sensing assembly. For example, the inspection robot may be inspection robot 8002 of FIG. 80 or inspection robot 8600 of FIG. 86.

Process 8700 proceeds to operation 8703 including measuring characteristics of the weld region using the weld sensing assembly. In certain embodiments, measuring characteristics of the weld region using the weld sending assembly includes measuring while the inspection robot is moving in the direction of travel. In certain embodiments, process 8700 includes moving the inspection robot one increment, also known as a position offset, in the direction of travel immediately before measuring characteristics of the weld region. In certain embodiments, process 8700 includes moving the inspection robot one increment in the direction of travel in response to measuring characteristics of the weld region.

Process 8700 proceeds to operation 8705 including positioning the inspection robot at a first position in the direction of travel.

Process 8700 proceeds to operation 8707 including moving the first payload in a first direction of inspection distinct from the direction of travel while the inspection robot is at the first position of the direction of travel. In certain embodiments, the inspection robot is stopped at the first position of the direction of travel. In certain embodiments, the first direction of inspection is orthogonal to the direction of travel.

Process 8700 proceeds to operation 8709 including moving the second payload in a second direction of inspection distinct from the direction of travel while the inspection robot is at the first position of the direction of travel. In certain embodiments, the second direction of inspection is orthogonal to the direction of travel. In certain embodiments, the inspection robot is stopped at the first position of the direction of travel.

In certain embodiments, the first direction of inspection or the second direction of inspection are not orthogonal relative to the direction of travel. For example, either direction of inspection may be oriented relative to the direction of travel in order to allow for flexibility in configuration and footprint of the inspection robot; to allow for manufacturing tolerances of payload mount elements and mounting; or to adjust to a selected direction for inspection movement (e.g., improve detection of cracks in certain orientations).

Figure 88:
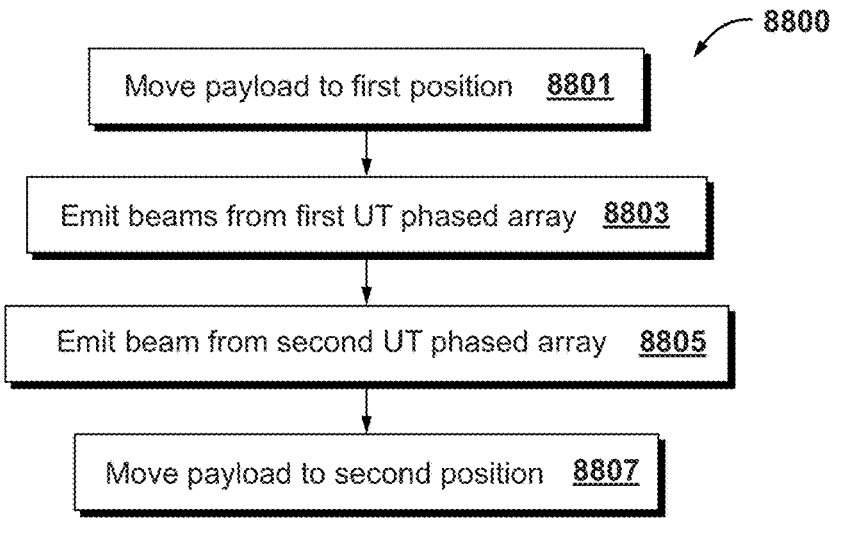
FIG. 88 is a flowchart illustrating an example process for moving a payload in a direction of inspection, in accordance with an embodiment of the current disclosure.

With reference to FIG. 88, there is illustrated an example inspection process 8800 for moving a payload in a direction of inspection. Process 8800 may be implemented in whole or in part in one or more of the inspection robots disclosed herein. It shall be further appreciated that variations of and modifications to process 8800 are contemplated including, for example, the omission of one or more aspects of process 8800, the addition of further conditionals and operations, or the reorganization or separation of operations and conditionals into separate processes.

Process 8800 begins at operation 8801 where the rastering device moves the first payload to a first position along the direction of inspection.

Process 8800 proceeds to operation 8803, where the payload emits beams from a first UT phased array of the first plurality of UT phased arrays including a first beam orthogonal to the inspection surface and a second beam at a first oblique angle relative to the first beam. In certain embodiments, the payload steers the second beam.

Process 8800 proceeds to operation 8805, where the payload emits a third beam from a second UT phased array of the first plurality of UT phased arrays at a second oblique angle relative to the inspection surface.

Process 8800 proceeds to operation 8807 where the rastering device moves the payload one increment to a second position along the direction of inspection. Process 8800 repeats operations 8803-8807 until the payload reaches a side edge of a traversing region of the inspection surface.

It shall be appreciated that any or all of the foregoing features of example process 8800 may also be present in the other processes disclosed herein, such as the processes illustrated in FIGS. 83-85, 87, and 89-90, to name but a few examples.

Figure 89:
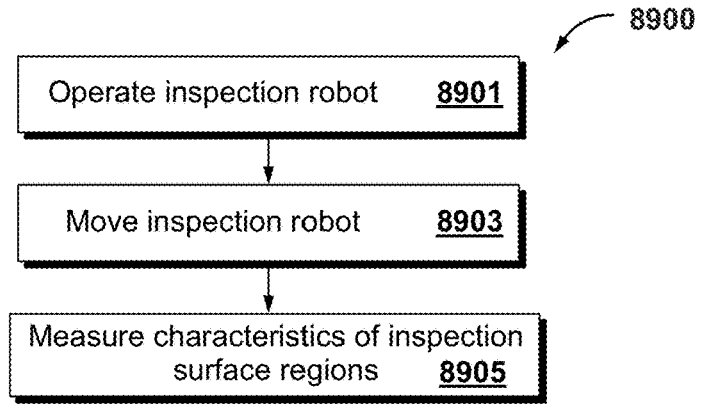
FIG. 89 is a flowchart illustrating another example process for inspecting a weld, in accordance with an embodiment of the current disclosure.

With reference to FIG. 89, there is illustrated an example inspection process 8900 for moving a payload in a direction of inspection. Process 8900 may be implemented in whole or in part in one or more of the inspection robots disclosed herein. It shall be further appreciated that variations of and modifications to process 8900 are contemplated including, for example, the omission of one or more aspects of process 8900, the addition of further conditionals and operations, or the reorganization or separation of operations and conditionals into separate processes.

Process 8900 begins at operation 8901 including operating an inspection robot including: a first payload including a first plurality of ultrasonic (UT) phased arrays, and a second payload including a second plurality of ultrasonic (UT) phased arrays.

Process 8900 proceeds to operation 8903, the inspection robot moves in a direction of travel corresponding to a weld of an inspection surface.

Process 8900 proceeds to operation 8905, where the inspection robot, with the first payload, measures characteristics of a first region of the inspection surface on a first side of the weld while the second payload is structured to measure characteristics of a second region of the inspection surface on a second side of the weld.

It shall be appreciated that any or all of the foregoing features of example process 8900 may also be present in the other processes disclosed herein, such as the processes illustrated in FIGS. 83-85, 87-88, and 90, to name but a few examples.

Figure 90:
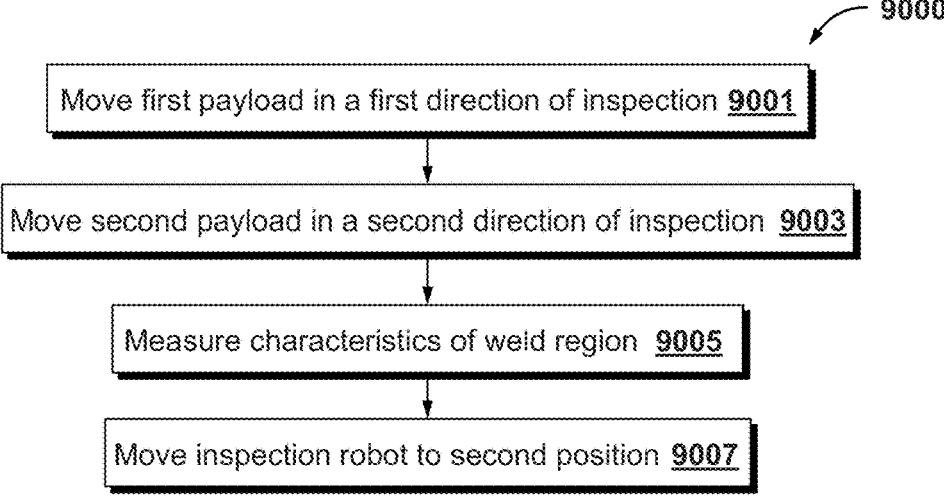
FIG. 90 is a flowchart illustrating still another example process for inspecting a weld, in accordance with an embodiment of the current disclosure.
Figure 91:
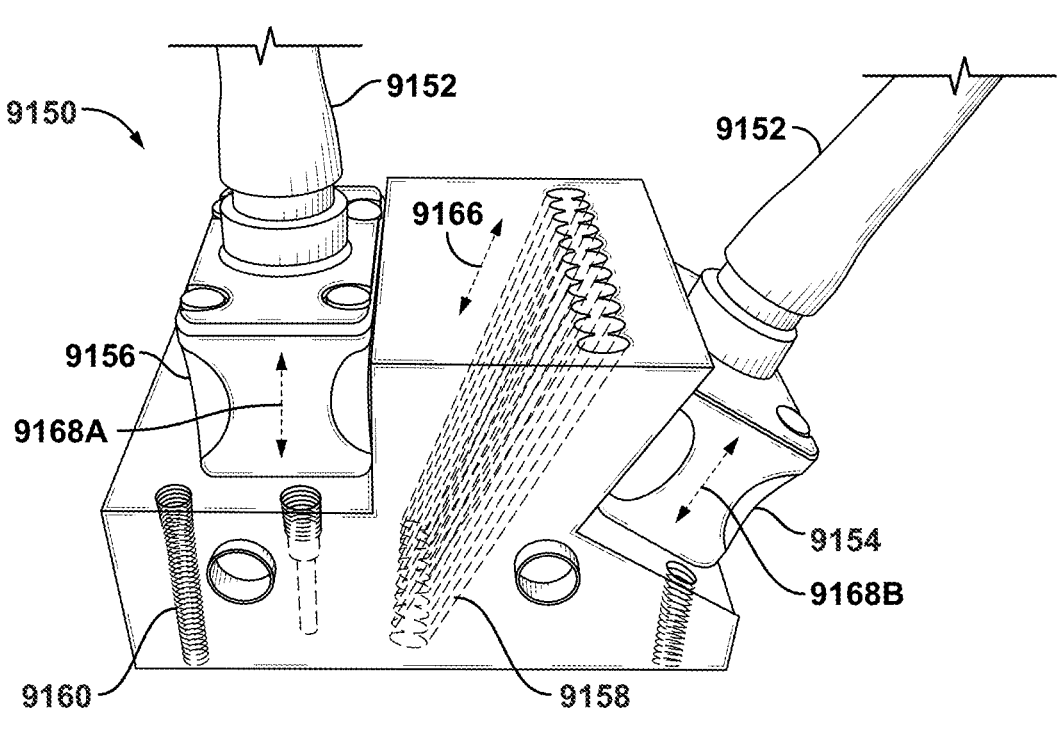
FIG. 91 is a front perspective view illustrating an example inspection element of FIG. 95, in accordance with an embodiment of the current disclosure.
Figure 92:
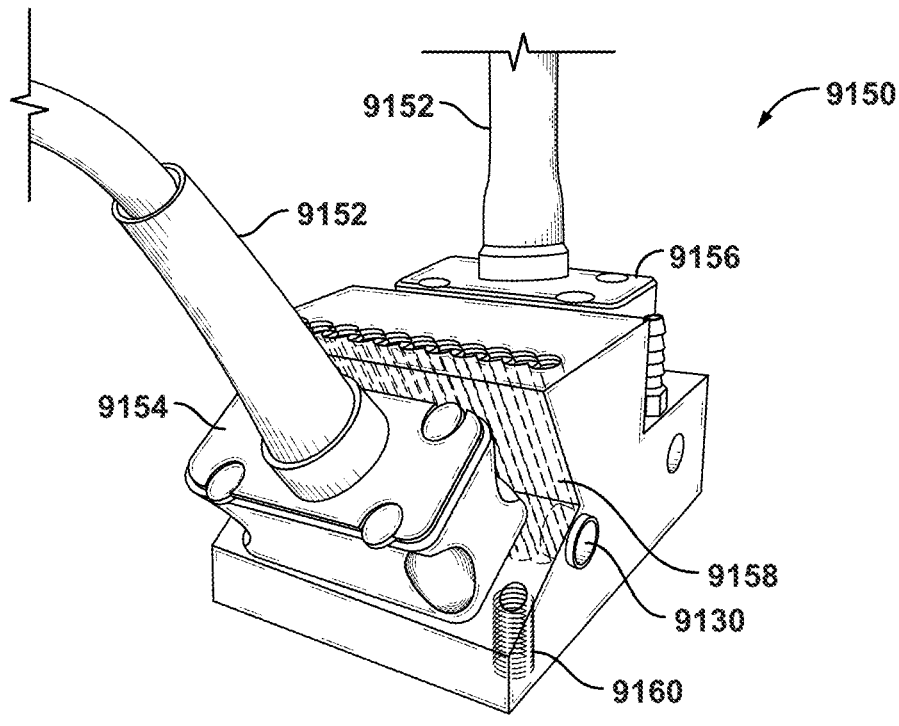
FIG. 92 is a side perspective view illustrating an example inspection element of FIG. 95, in accordance with an embodiment of the current disclosure.
Figure 93:
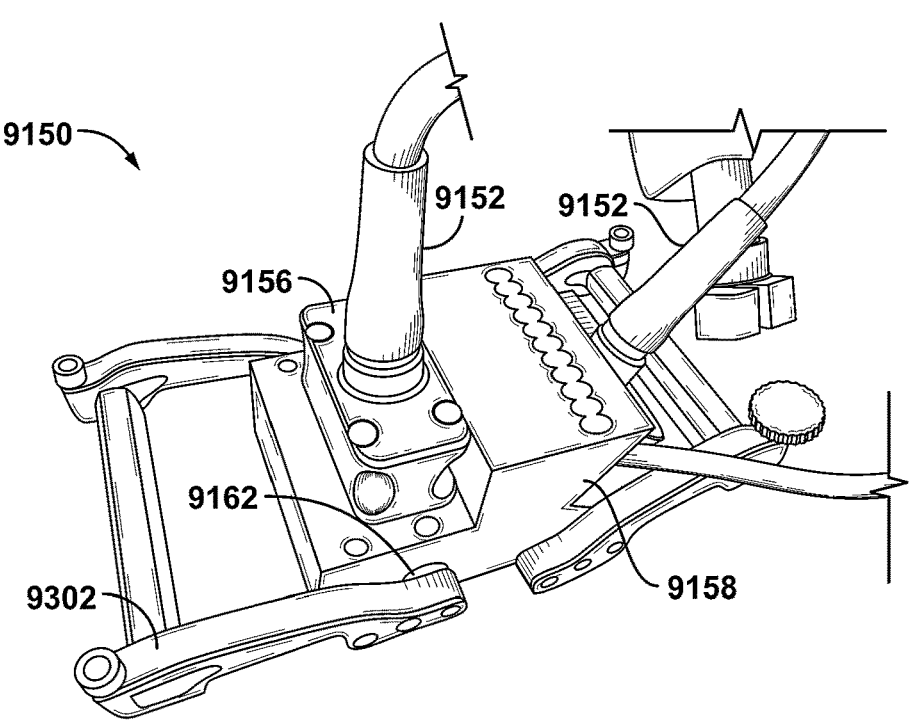
FIG. 93 is a side perspective view illustrating an example inspection element of FIG. 95, in accordance with an embodiment of the current disclosure.
Figure 94:
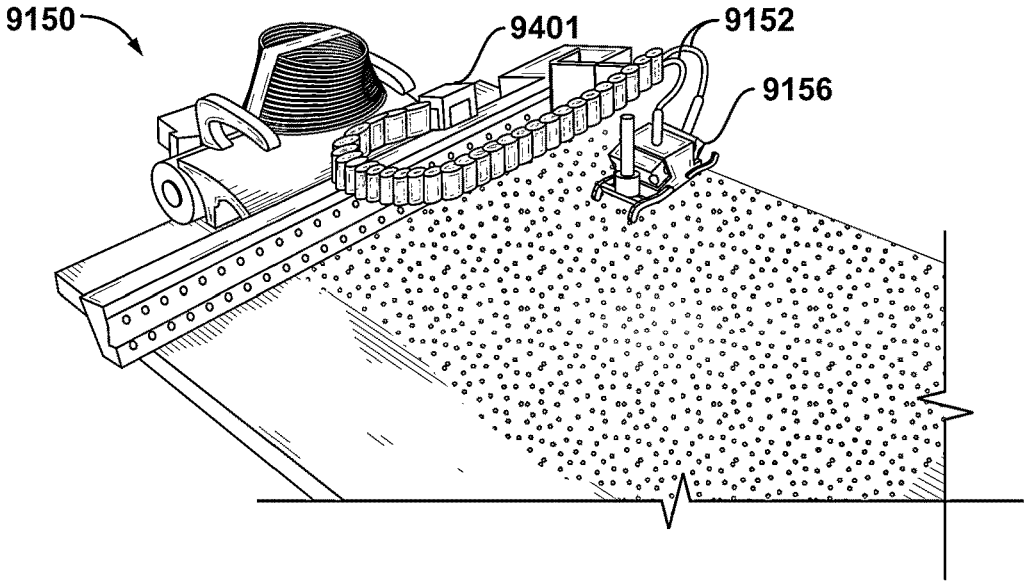
FIG. 94 is a perspective view illustrating an example inspection device, in accordance with an embodiment of the current disclosure.

With reference to FIG. 90, there is illustrated an example inspection process 9000 for moving a payload in a direction of inspection. Process 9000 may be implemented in whole or in part in one or more of the inspection robots disclosed herein. It shall be further appreciated that variations of and modifications to process 9000 are contemplated including, for example, the omission of one or more aspects of process 9000, the addition of further conditionals and operations, or the reorganization or separation of operations and conditionals into separate processes.

Process 9000 begins at operation 9001 wherein a rastering device moves the first payload in a first direction of inspection distinct from the direction of travel and the first plurality of UT phased arrays while the inspection robot is at a first position along the direction of travel.

Process 9000 proceeds to operation 9003, where another rastering device moves the second payload in a second direction of inspection distinct from the direction of travel and the second plurality of UT phased arrays while the inspection robot is at the first position along the direction of travel.

Process 9000 proceeds to operation 9005, where the weld sensing assembly measures characteristics of the weld region.

Process 9000 proceeds to operation 9007 where the inspection robot moves to a second position of the direction of travel. In certain embodiments, process 9000 repeats operations 9001-9007 until the inspection robot reaches a forward side of a traversing region of the inspection surface.

It shall be appreciated that any or all of the foregoing features of example process 9000 may also be present in the other processes disclosed herein, such as the processes illustrated in FIGS. FIGS. 83-85 and 87-89, to name but a few examples.

Referring to FIGS. 91-94, an inspection assembly 9150 may include an inspection body structured to support a first UT phased array 9154 and a second UT phased array 9156 at a constant, defined, distance from an inspection surface. The first UT phased array 9154 may be at a first surface orientation relative to an inspection surface. The second UT phased array 9156 may be at a third surface orientation relative to the inspection surface. The inspection body may be structured to support the first UT phased array 9154 and a second UT phased array 9156 at the first and third surface orientations respectfully. The first UT phased array 9154 and the second UT phased array 9156 may be connected to a controller, data storage, a raw data collection device (see FIG. 95), and the like by individual data cables 9152. The inspection assembly 9150 may include an acoustic barrier 9158 supported at a fourth surface orientation positioned between the first UT phased array 9154 and the second UT phased array 9156 to reduce acoustic cross talk between the two UT phased arrays 9154, 9156. The inspection assembly 9150 may include a couplant channel 9160 to provide a couplant to the inspection surface and form an acoustic connection between at least one of the two UT phased arrays 9154, 9156 and the inspection surface.

The inspection assembly 9150 may include one or mount locations 9162 to enable the inspection assembly 9150 to be connected to a mount 9302 and attached to a raster device 9401. Note that the embodiments of FIGS. 91-94 are meant to be illustrative but not limiting.

Referring to FIGS. 95 and 96, an example system 9500 may include an inspection robot 9502 supporting a first inspection payload 9504. The first inspection payload 9504, may include a first inspection element 5150A (e.g., such as embodiments shown in FIGS. 91-94). The first inspection element 5150A may include a first UT phased array 9554A at a first surface orientation and a second UT phased array 9556A at a second surface orientation. The first surface orientation may be distinct from the second surface orientation. The first UT phased array 9554A may be longitudinally aligned with the approximate direction of travel of the robot and have a first surface orientation, relative to the inspection surface of approximate+/−5' inclusive relative to the inspection surface. The second UT phased array 9556A may be longitudinally aligned with the approximate direction of travel of the robot (approximately parallel to the first UT phased array 9554A) and have a second surface orientation, relative to the inspection surface of 40-50' inclusive, 30-60' inclusive, 30-75' inclusive, and the like. The range may be symmetrical or asymmetrical around 45'. The first UT phased array 9554A and the second UT phased array 9556A may be arranged opposing one another such that they inspect a common location on the inspection surface 9602.

In embodiments, the first inspection payload may include a second inspection element 5150B (an embodiment of which is shown in FIGS. 91-94). The second inspection element 5150B may include a third UT phased array 9554B and a fourth UT phased array 9556B. The third UT phased array 9554B may be longitudinally aligned with the approximate direction of travel of the robot and have a third surface orientation, relative to the inspection surface of approximate+/−5' inclusive relative to the inspection surface. The fourth UT phased array 9556B may be longitudinally aligned with the approximate direction of travel of the robot and have a fourth surface orientation, relative to the inspection surface of 40-50' inclusive, 30-60' inclusive, 30-75' inclusive, and the like. The range may or may not be symmetrical around 45'. The third UT phased array 9554B and the fourth UT phased array 9556B may be arranged such that they inspect a common location on the inspection surface 9602.

The first inspection element 5150A may include an acoustic barrier 9158 supported at a third surface orientation 9166 positioned between the first UT phased array 9554A and the second UT phased array 9556A to reduce acoustic cross talk between the two UT phased arrays 9554A, 9556A. The acoustic barrier may have a third surface orientation 9166 where the third surface orientation 9166 is at an intermediate angle between the first surface orientation 9168A and the second surface orientation 9168B. The first inspection element may include a coupler connection 9516 to receive coupler from the robot 9502. The couplant may be supplied to the inspection surface, via a couplant channel to form an acoustic connection between at least one of the two UT phased arrays 9154, 9156 and the inspection surface.

The example system 9500 may include a tether 9512 to provide a couplant connection 9524 between the robot 9502 and a couplant source 9514. In embodiments, raw data 9522 may be communicated back from the robot by a wireless communication 9530, or via a data connection 9528 incorporated in the tether 9512 to communicate raw data from the robot to a local inspection device 9529. In some embodiments, the raw data is communicated via the individual data cables 9152 to a local inspection device 9529. Raw data 9522 as used here may have undergone some initial processing such as noise reduction, calibration, normalization, and the like as described throughout the present disclosure. The robot 9502 may include a raw data collection device 9534 which receives data from the UT phased arrays 9154A,

9154B, 9156A, 9156B. The collected data may be stored in a robotic data storage 9532 or remote data storage 9538 on the local inspection device 9529. In embodiments, the data from the UT phased arrays 9154A, 9154B, 9156A, 9156B may be transmitted to a remote raw data collection circuit 9520 of the local inspection device 9529 and stored in local data storage 9538.

Figure 97:
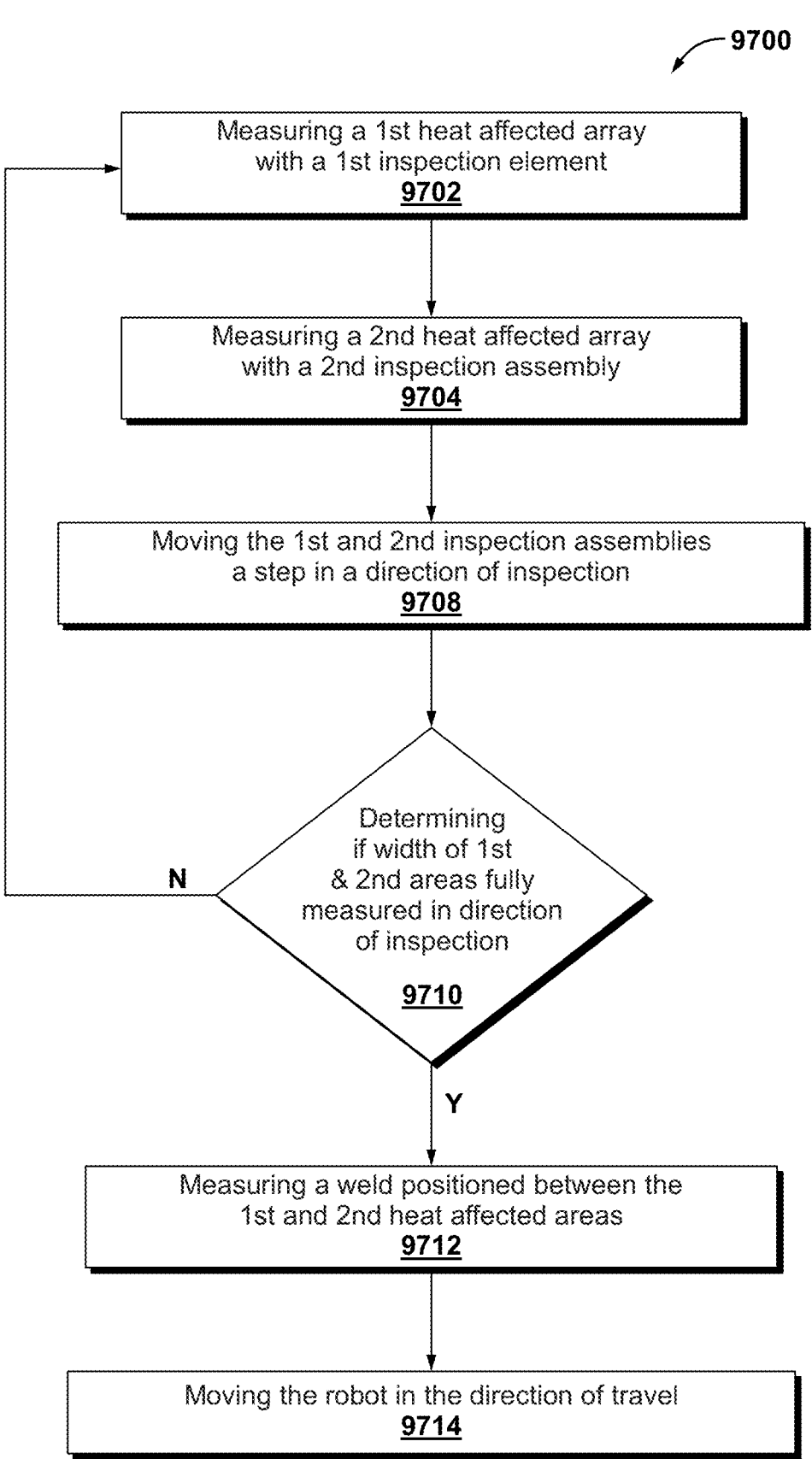
FIG. 97 is a flowchart illustrating another example process for inspecting a weld, in accordance with an embodiment of the current disclosure.

Referring to FIG. 97, a method for inspecting a heat affected zone and weld 9700 may include measuring a first heat affected zone 9610 with a first inspection assembly 9150A (step 9702) and measuring a second heat affected zone 9612 with a second inspection assembly 9150B (step 9704). The first and second inspection assemblies 9150A, 9150B are then moved a step in a direction of inspection 9605 (step 9708). In embodiments, the first and second inspection assemblies 9150A, 9150B may be moved by a single raster device 9401 (FIG. 94) in parallel, where the speed and distance that the first and second inspection assemblies 9150A, 9150B are moved is the same although they are measuring a first heat affected zone 9610 and a second heat affected zone 9612 respectively. In embodiments, the first and second inspection assemblies 9150A, 9150B may be moved (rastered) by different raster devices 9620A, 9620B such that the distance traveled by first and second inspection assemblies 9150A, 9150B may be the same or different. The ability to move asynchronously may enable obstacle avoidance and the like. After the measurements have been taking, a determination is made regarding whether the width (the dimension of the inspection surface in the direction of inspection) has been fully measured (step 9710). If the width has been fully measured, a measurement of a weld 9608 between the first and second heat affected zone 9610, 9612 is made by the weld sensor 9603 (step 9712) and the robot is moved an incremental step in the direction of travel (step 9714). The weld sensor 9603 may be a time of flight sensor, pulse echo probe, or the like.

Referring to FIG. 98, the method of measuring a first heat affected array with a first inspection assembly (step 9702) is described in more depth. A first measurement of a first sample of the first heat affected zone 9610 is made by the first phased array 9154A at a first orientation (step 9802) and then the first measured data is stored (step 9804). The focus (see focus or beam forming disclosure as described throughout the present disclosure) of the first phased array is changed from the first surface orientation to a second surface orientation (step 9808) and a measurement of a first sample of the first heat affected zone 9610 is made with the first phased array at the second surface orientation (step 9810). The second measured data is then stored (step 9812). A third measurement of the first sample of the first heat affected zone 9610 is made by the second phased array 9156A at a third orientation (step 9814) and then the third measured data is stored (step 9818). The focus of the first phased array is then changed from the second surface orientation back to the first surface orientation (step 9822).

Figure 99:
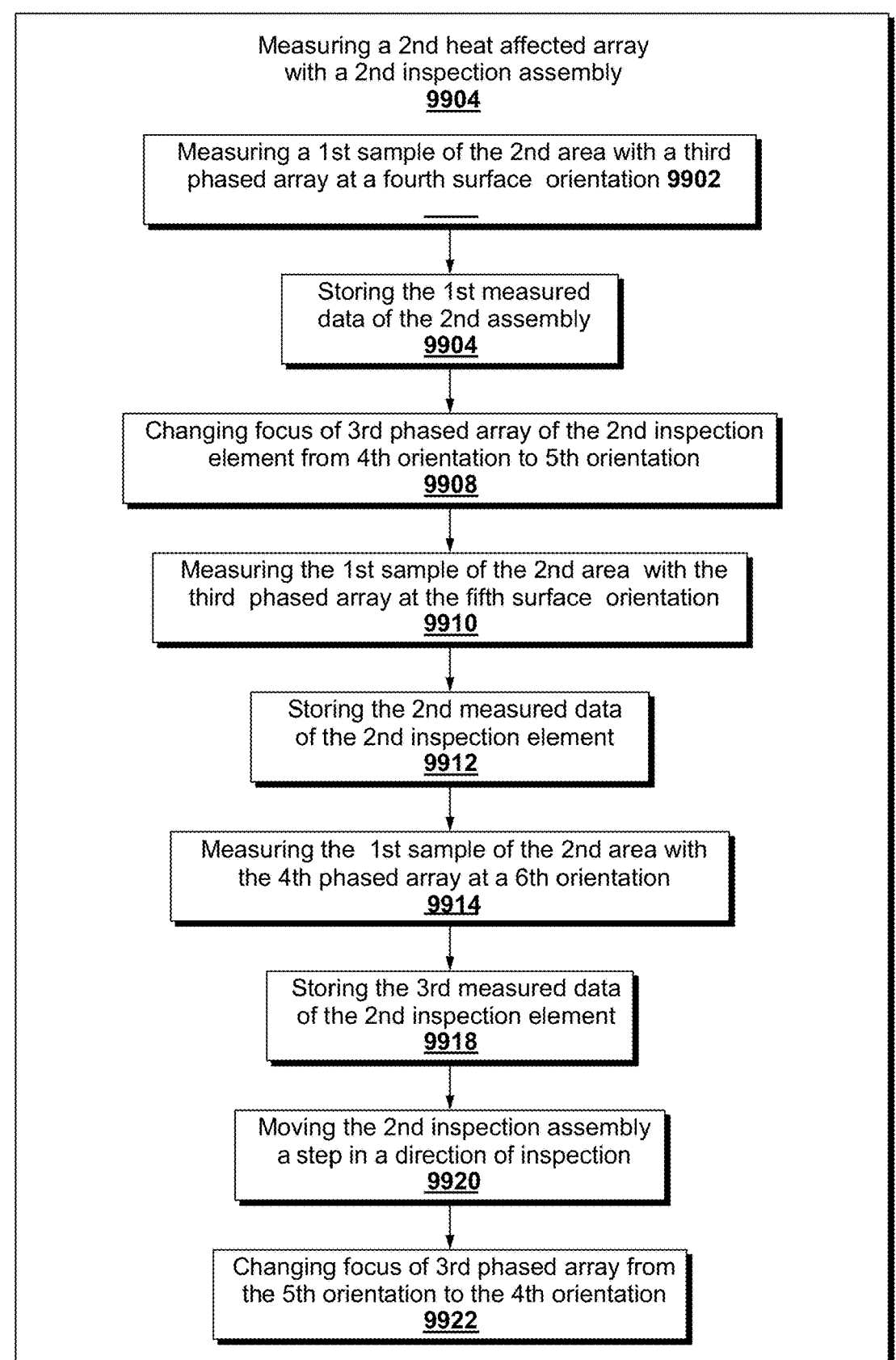
FIG. 99 is a flowchart illustrating an example step in a process for inspecting a weld, in accordance with an embodiment of the current disclosure.

Referring to FIG. 99, the method of measuring a second heat affected array with a second inspection element (step 9702) is described in more depth. A first measurement of a first sample of the second heat affected zone 9612 is made by the third phased array 9154B at a fourth surface orientation (step 9902) and the first measured data of the second inspection assembly 9150B is stored (step 9904). The focus of the third phased array is changed from the fourth surface orientation to a fifth surface orientation (step 9908) and a measurement of a first sample of the second heat affected zone 9612 is made with the fourth phased array at the fifth surface orientation (step 9910). The second measured data of the second inspection assembly 9150B is then stored (step 9912). A third measurement of the first sample of the second heat affected zone 9612 is made by the fourth phased array 9156B at a sixth orientation (step 9914) and then the third measured data is stored (step 9918). The second inspection assembly 9150B is then moved a step in a direction or inspection (step 9920) and the focus of the third phased array is then changed from the fifth surface orientation back to the fourth surface orientation (step 9922).

Figure 100:
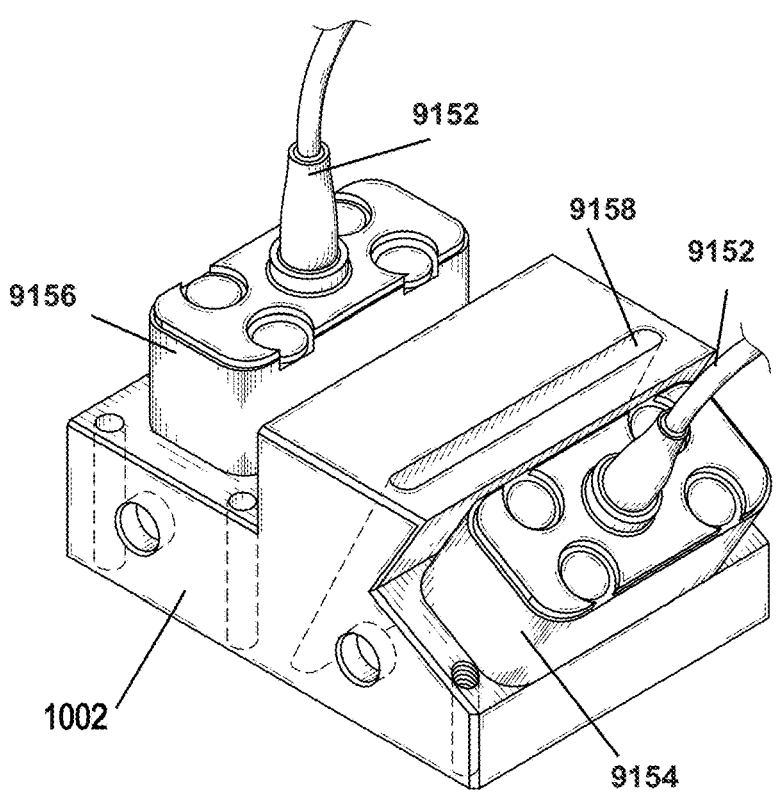
FIG. 100 is an upper right perspective view of an inspection element, in accordance with an embodiment of the current disclosure.
Figure 101:
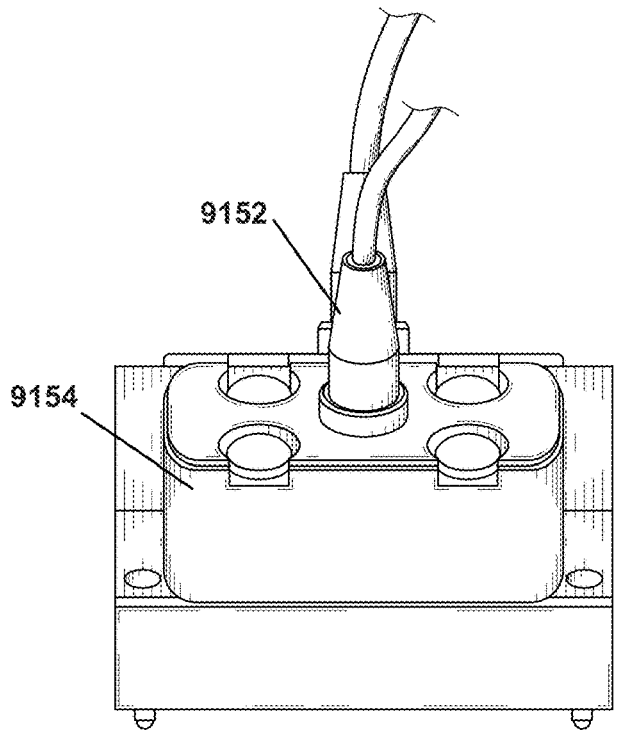
FIG. 101 is side view of an inspection element, in accordance with an embodiment of the current disclosure.
Figure 102:
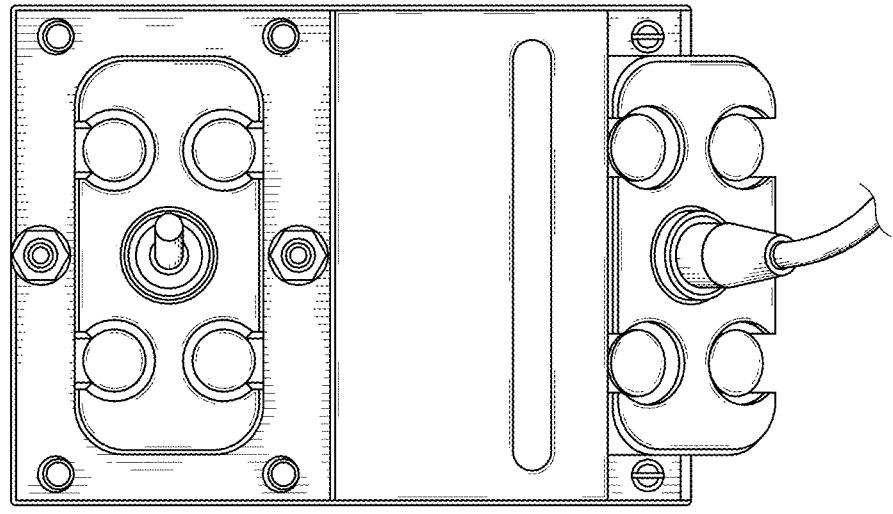
FIG. 102 is a top-down view of an inspection element, in accordance with an embodiment of the current disclosure.
Figure 103:
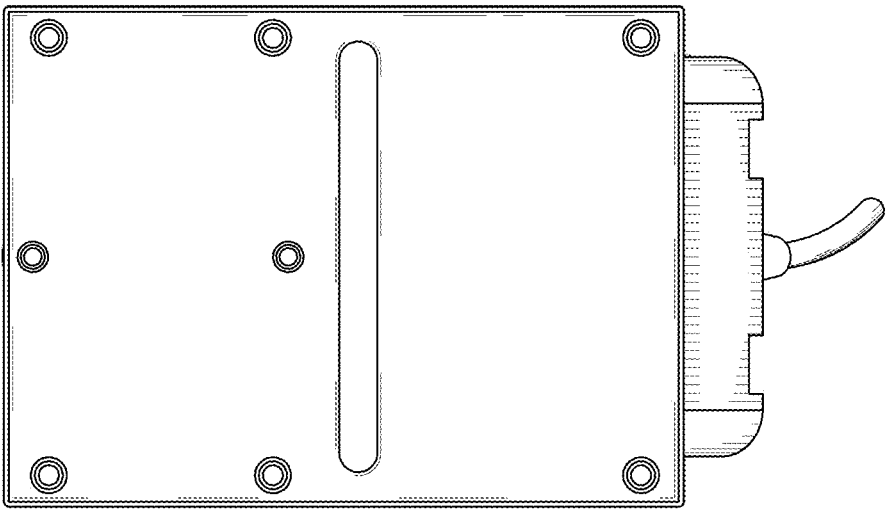
FIG. 103 is a bottom view of an inspection element, in accordance with an embodiment of the current disclosure.
Figure 104:
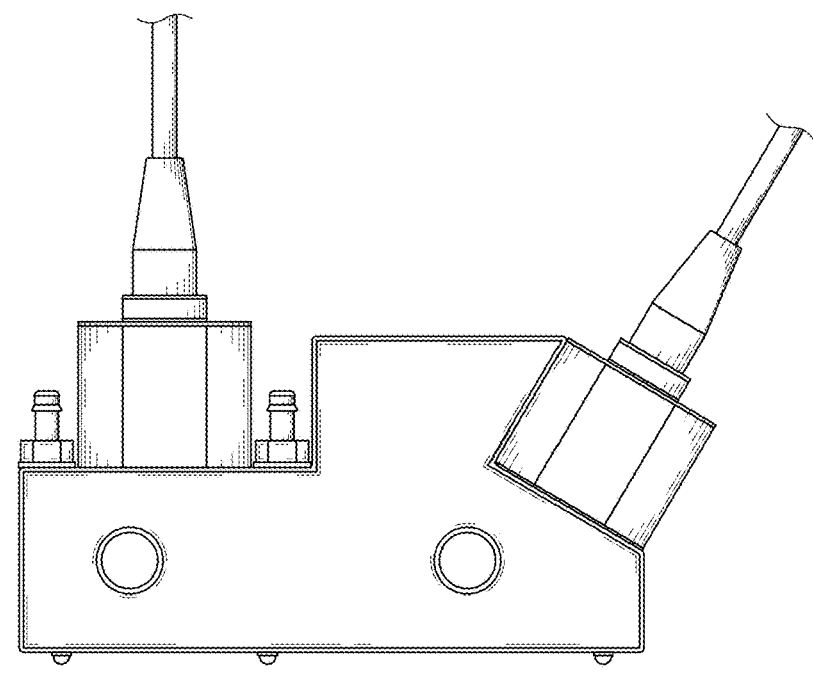
FIG. 104 is a front view of an inspection element, in accordance with an embodiment of the current disclosure.

Referring to FIGS. 100-104, an embodiment of an inspection assembly 9150 is depicted. The example inspection assembly 9150 includes a holder for two inspection arrays 9154, 9156, and may be provided as a sled mounted on a payload according to embodiments herein, and/or may be provided as a payload mounted to the inspection robot as set forth herein. The example inspection assembly 9150 includes a block substrate 1002 having the arrays 9154, 9156 mounted thereon, and having an acoustic isolation slot configured to accept an acoustic isolator material (e.g., as an acoustic barrier 9158), and/or configured to provide sufficient acoustic isolation (e.g., operating as an air gap, where the slot operates as the acoustic barrier 9158). The example inspection assembly 9150 further includes mounting locations 9130, for example to allow the inspection assembly 9150 to be mounted to a payload, a pivoting holder, or the like. The example of FIGS. 100-104 is similar to the example of FIGS. 105-109, except that the inspection assembly 9150 of FIGS. 105-109 is split for an additional degree of pivoting movement. In the example of FIG. 100, the array 9156 is a linear array capable of providing a direct and/or linear angled inspection (e.g., utilizing beam steering operations), and the array 9154 is a lateral array capable of providing lateral inspection at a selected angle. The example inspection element including the array 9156 further includes coupling for power, communications, and/or couplant provision (if applicable). The example of FIG. 101 depicts the example inspection assembly 9150 from a side perspective with the lateral array 9154. The example of FIG. 102 depicts the example assembly 9150 from a top perspective, showing the arrays 9154, 9156 and the top of the acoustic isolation slot, which passes all the way through the assembly 9150 in the example. The example of FIG. 103 depicts the example assembly 9150 from a bottom perspective, for example the surface oriented toward the inspection surface during operations of the inspection robot. The example of FIG. 104 depicts the example assembly 9150 from a side view, with the arrays and mounting locations visible. The example of FIGS. 100-104 is a simple and conveniently fabricated (e.g., molding, casting, additive manufacturing, and/or utilizing simple machining operations such as single pass drilling, etc.) holder utilizable in various embodiments of the present disclosure, which can readily be adjusted to accommodate various mounting systems (e.g., adjusting the size, spacing, and/or other aspects of the mounting locations 9130), inspection angles, or the like.

Figure 105:
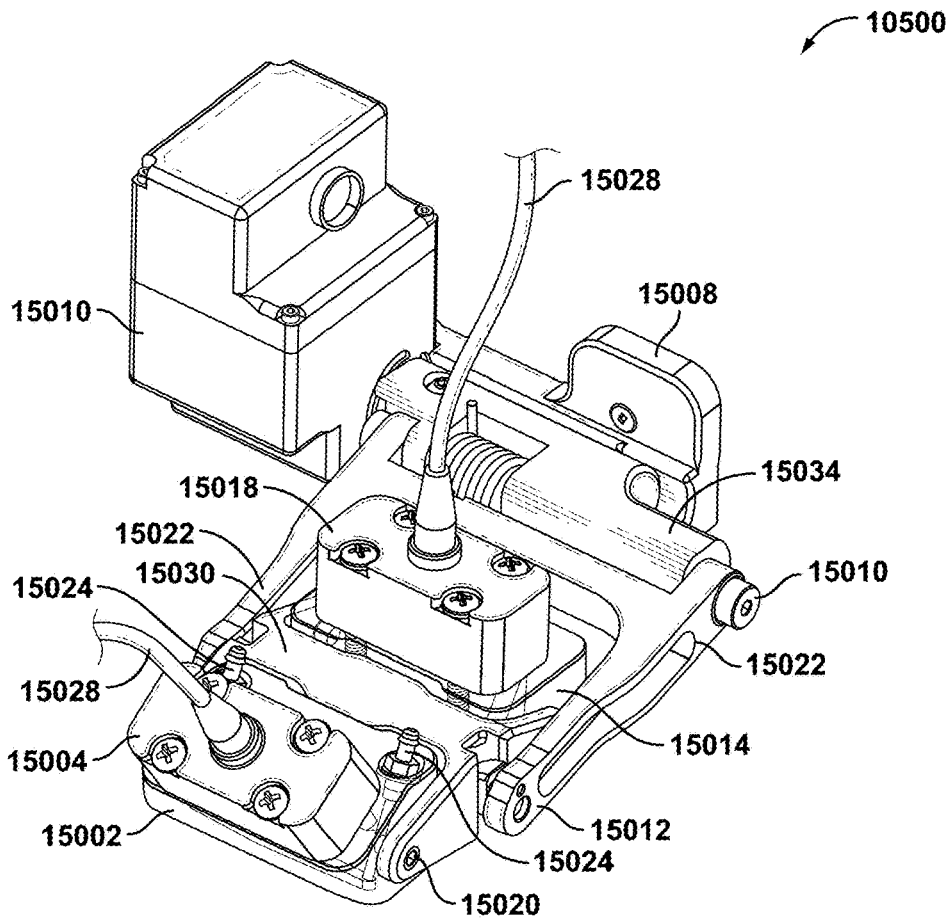
FIG. 105 is a perspective view of an inspection element, in accordance with an embodiment of the current disclosure.
Figures 111, 112, 113:
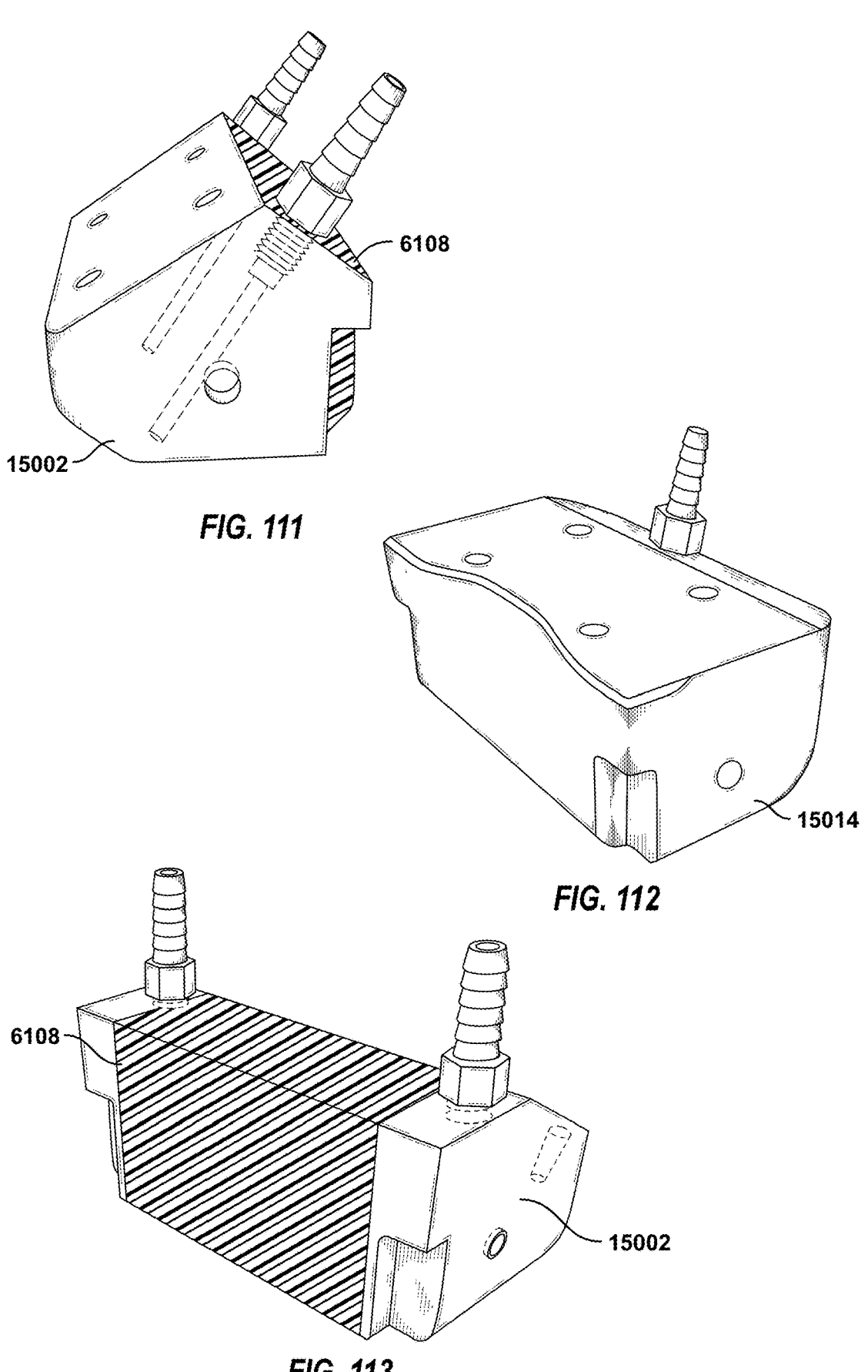
FIG. 111 is a perspective view of a portion of an example sensor holder, in accordance with an embodiment of the current disclosure.
FIG. 112 is a perspective view of a portion of an example sensor holder, in accordance with an embodiment of the current disclosure.
FIG. 113 is a perspective view of a portion of an example sensor holder, in accordance with an embodiment of the current disclosure.

Referring to FIGS. 105-109, an embodiment of an inspection element with a split holder is depicted. The example embodiment depicted in FIGS. 105-109 provides for improved capability to traverse obstacles, for example reducing the pulling force required by the inspection robot and/or rastering device to move the payload (and/or sensor sled) over the obstacle, improving the capability of the arrays 15004, 15018 to remain in proper contact with the inspection surface (e.g., allowing inspection closer to the obstacle than would otherwise be available), reducing the chance of damage to the inspection robot or components thereof, and providing for improved obstacle traversal such as the capability to lift the payload entirely from the inspection surface as required. Referring to FIG. 105, an inspection assembly 10500 is depicted, including a lift element 15034, two sensor holders 15002, 15014, two phased UT arrays 15004, 15018, and a sensor holder linking component 15030. The lift element 15034 may include an attachment point 15008 for connecting the lift element 15034 to a robotic device, pivot points 15010, 15012, and an arm 15022 which is interacts with the sensor holder linking component 15030. The sensor holder linking component 15030 interacts with the two sensor holders 15002, 15014. The exterior (relative to lift element 15034) sensor holder 15002 holds a first phased UT array 15004 at a first angle. The interior (relative to lift element 15034) sensor holder 15014 holds a second phased UT array 15018 at a second angle. The first angle and the second angle may be the same or distinct. The sensor holders 15002, 15014 may include one or more couplant connectors 15024. Both of the sensor holders 15002, 15014 may include a couplant connector 15024 or a single couplant connector may provide couplant connector for providing the couplant for the phased UT arrays 15004, 15018. The phased arrays 15004, 15018 may each connect to a data cable 15028 to convey data back to an inspection robot. In certain embodiments, as seen in FIGS. 111-113, an acoustic isolator is positioned between the UT sensors on each of the holders 15002, 15014, for example with an acoustic isolator positioned on the diagonal block 15002, to reduce cross-talk between the phased arrays 15004, 15018 and/or to control sound energy progression within a given block 15002.

Figure 106:
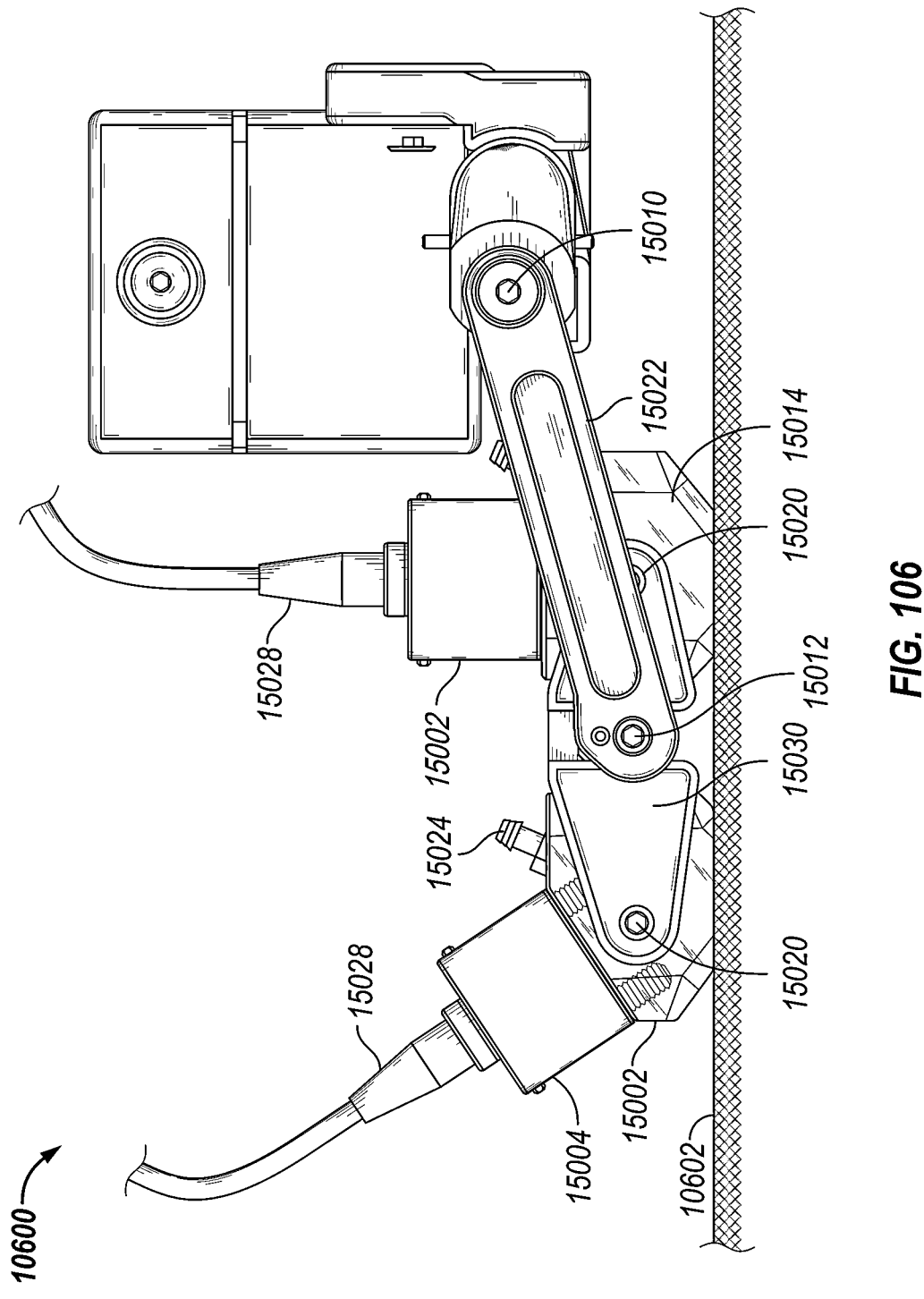
FIG. 106 is a side view of an inspection element on flat inspection surface, in accordance with an embodiment of the current disclosure.

Referring to FIG. 106, a side view of an inspection assembly 10600 with a split holder is depicted. As shown, both the sensor holders 15002, 15014 are engaged with a flat inspection surface 10602.

Figure 107:
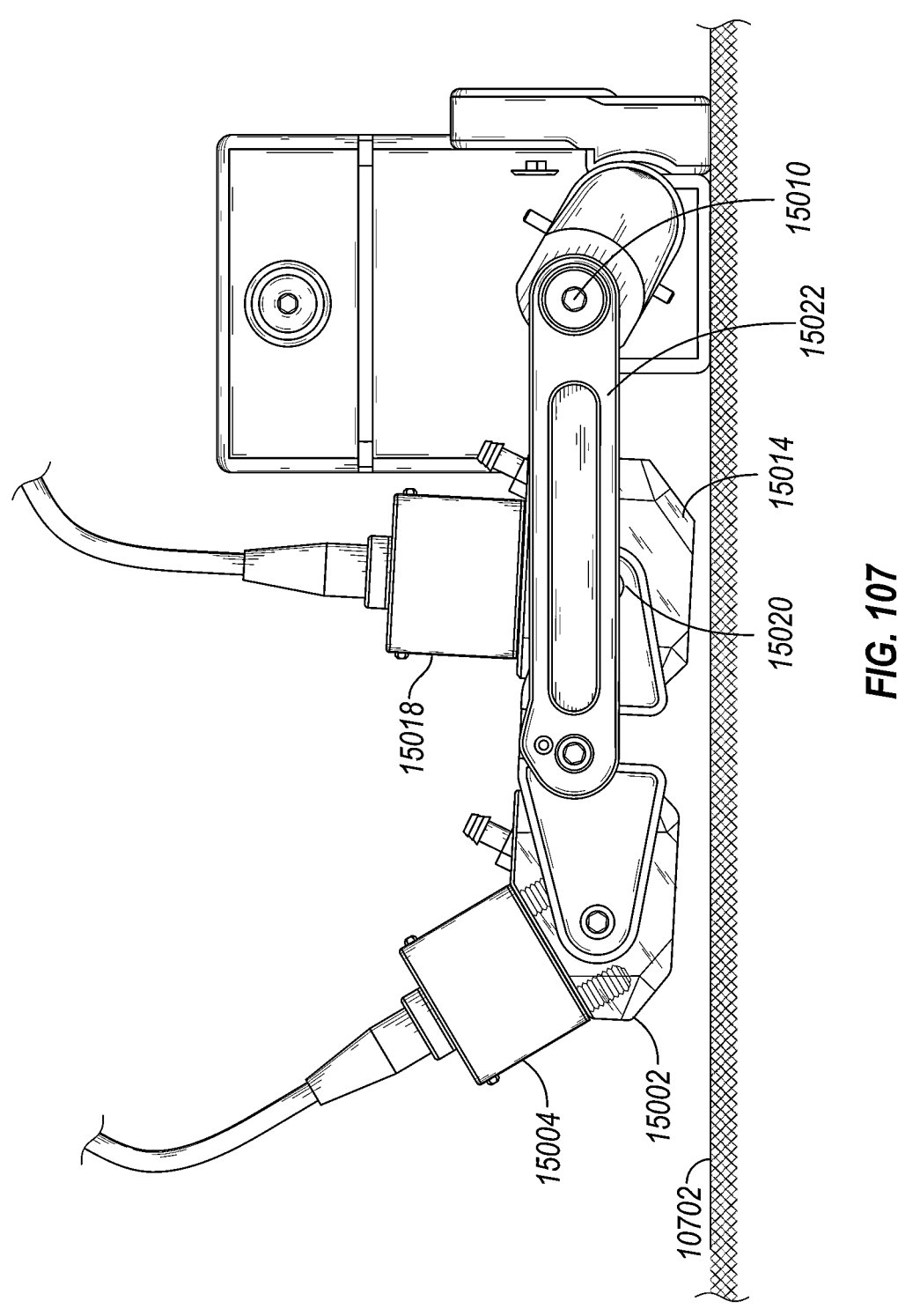
FIG. 107 is a side view of a raised inspection element, in accordance with an embodiment of the current disclosure.

Referring to FIG. 107, a side view of an inspection assembly where the sensor holders are raised is depicted. The lift element 15034 has rotated the arm 15022 around a pivot point 15010, lifting the sensor holders 15002, 15014, and associated phased arrays 15004, 15018, and sensors, above the inspection surface 10702.

Figure 108:
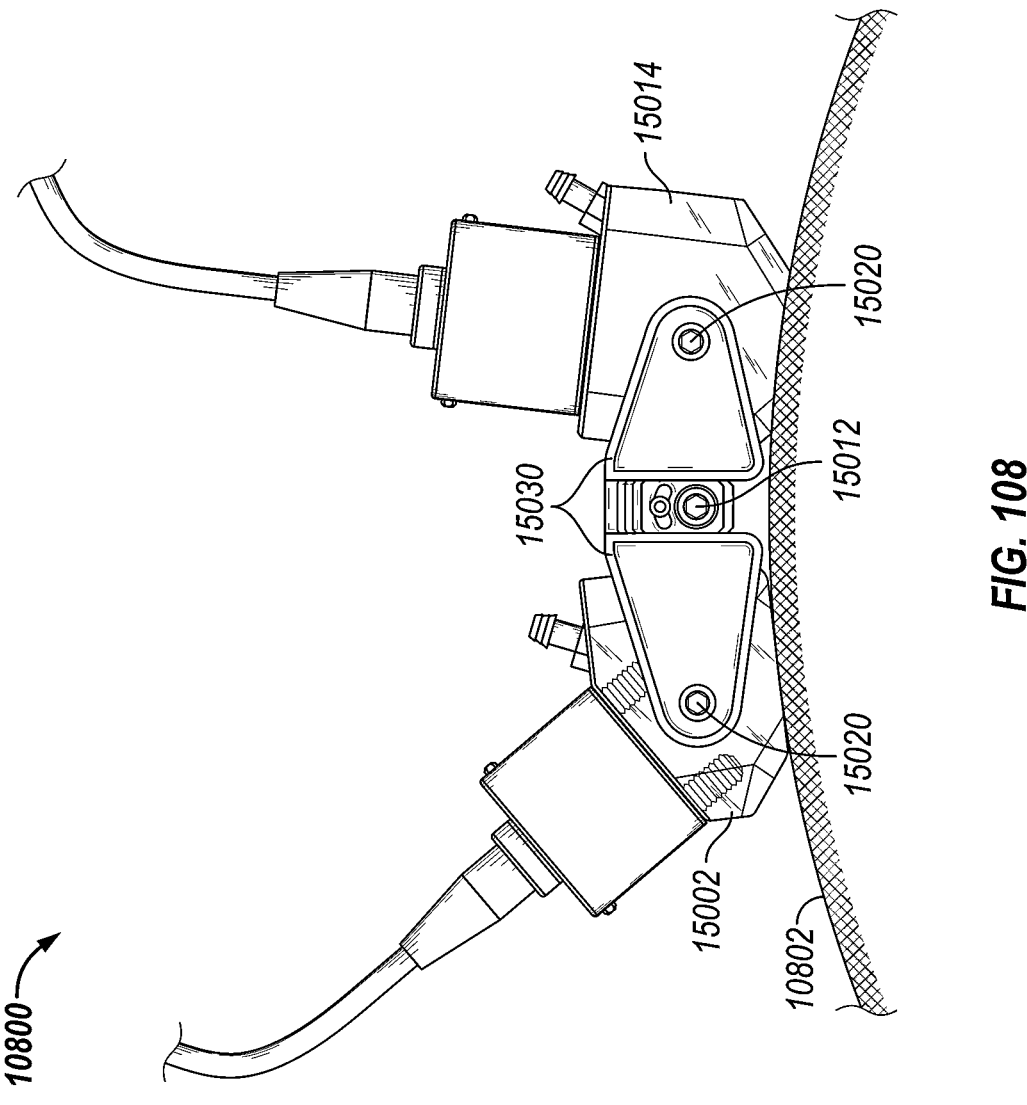
FIG. 108 is a side view of an inspection element on curved inspection surface, in accordance with an embodiment of the current disclosure.

Referring to FIG. 108, a side view 10800 of an inspection assembly where the sensor holders are engaged with a non-level (e.g., rounded) inspection surface 10802. The sensor holders 15002, 15014 are able to independently rotate relative to sensor holder linking component 15030. Each sensor holder 15002, 15014 is able to rotate around a corresponding pivot point 15020.

Figure 109:
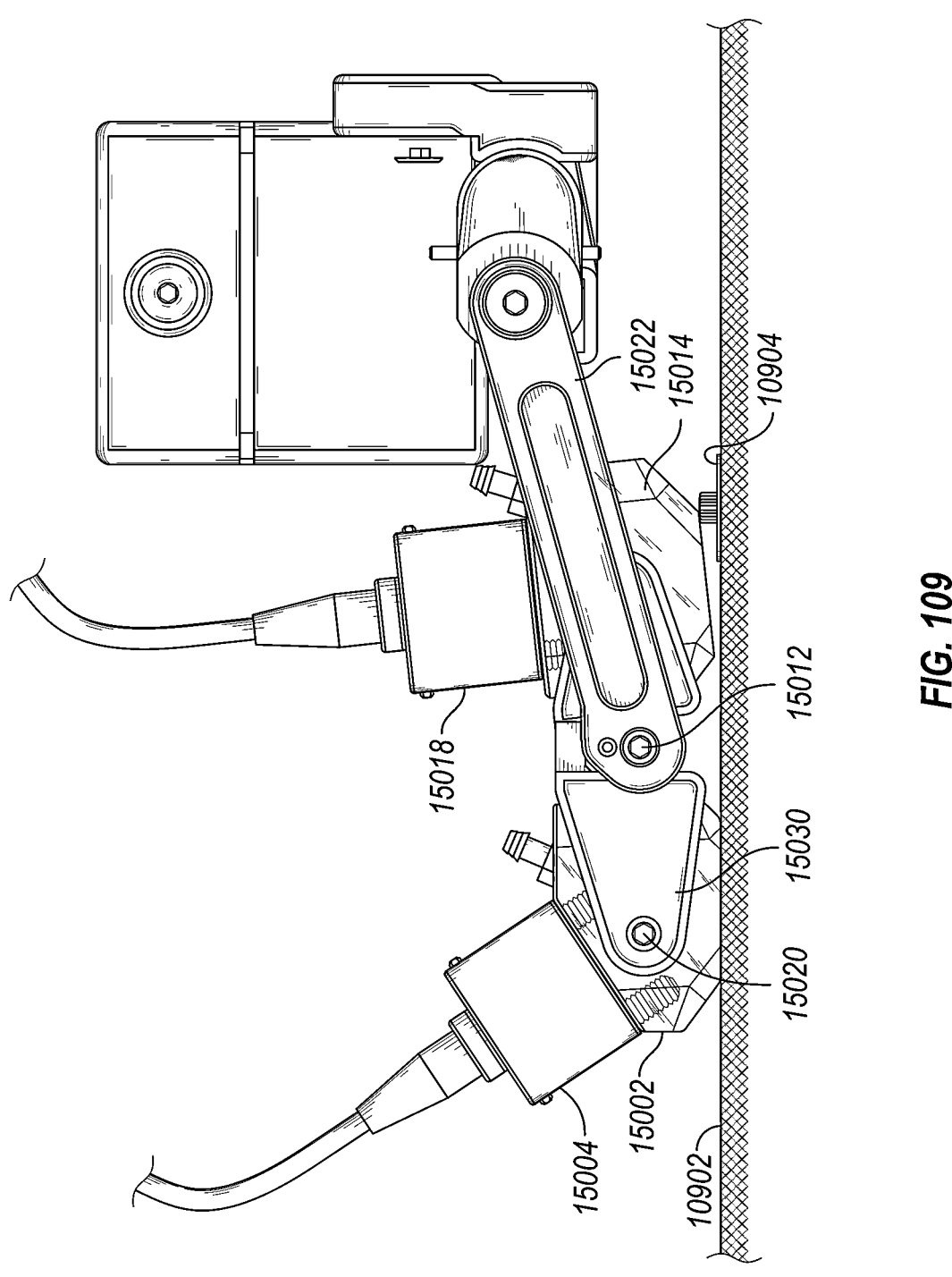
FIG. 109 is a side view of an inspection element traversing an obstacle, in accordance with an embodiment of the current disclosure.

Referring to FIG. 109, a side view of an inspection assembly traversing an obstacle is depicted. The independent movement of the sensor holders may allow for measurements of the inspection surface 10902 to be made closer to an obstacle 10904 over which the inspection element moves. The sensor holder linking component 15030 is able to rotate relative to the arm 15022 around pivot point 15012. This enables the exterior sensor holder 15002 to contact the inspection surface 10902 while the interior sensor holder 15014 is still on the obstacle 10904. The ability of the individual sensor holders 15002, 15014 to rotate relative to the sensor holder linking component 15030 allows the exterior sensor holder 15002 to fully engage the inspection surface 10902 while the interior sensor holder 15014 is still on the obstacle 10904. Thus, the first phased UT array 15004 on the exterior sensor holder 15002 is able to begin to measure the inspection surface 10902 while the second phased UT array 15018 on the interior sensor holder 15014 is still lifted from the inspection surface 10902 by the obstacle 10904.

Referring now to FIG. 114, embodiments of the current disclosure provide for another payload 11400 having one or more sensor holders 11410, 11412, which may also be referenced herein as sensor housings. The payload 11400 may include a lift effector 11414 and a payload coupler, e.g., a u-shaped structure with one or more arms 11416 and 11418. The payload 11400 may further include a sensor frame, e.g., sled 11420. As explained in greater detail herein, embodiments of the payload 11400 may provide for one or more degrees of freedom for the holders 11410 and 11412 which, in turn, may provide for improved sensor coupling to an inspection surface (e.g., to improve the quality and/or consistency of inspection information provided by the sensors) and/or for improved robustness, e.g., the ability for the payload to traverse obstacles on an inspection surface without the need for manual human assistance, and/or stopping inspection operations to re-assert and/or confirm proper operation.

Figure 118:
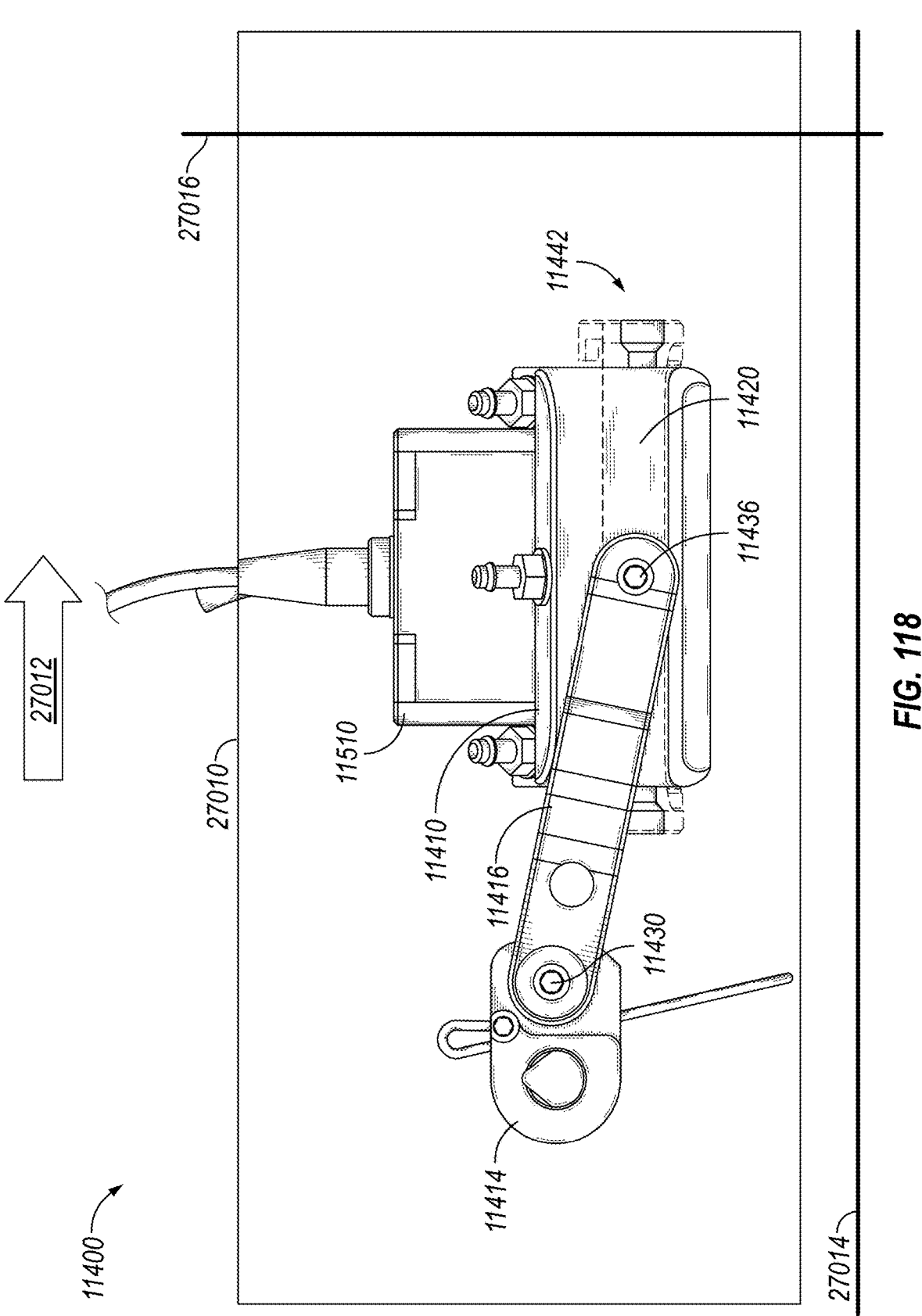
FIG. 118 is a side-profile view of a first side of the example payload of FIG. 114, in accordance with embodiments of the current disclosure.
Figure 119:
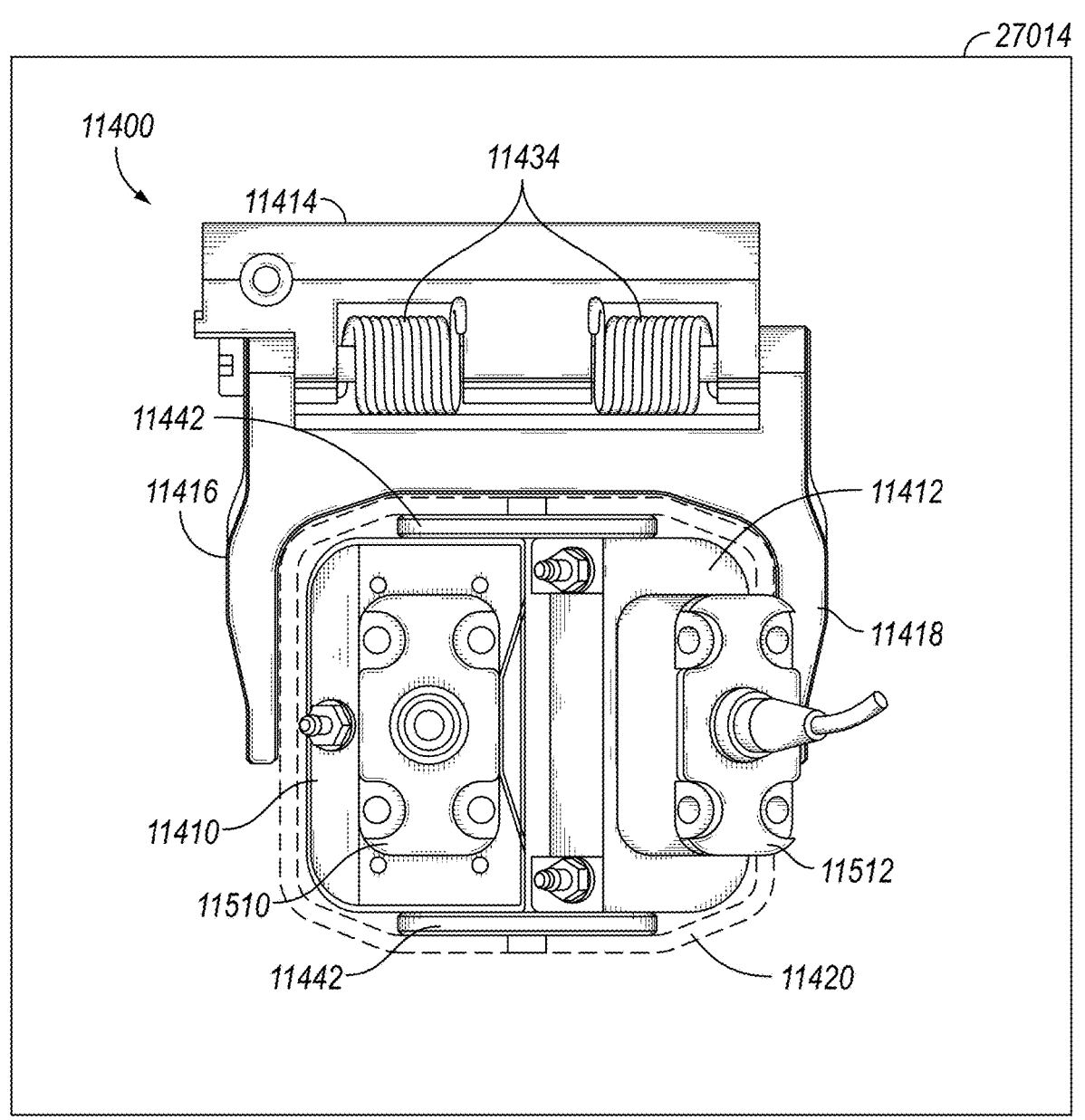
FIG. 119 is a top-down face view of the example payload of FIG. 114, in accordance with embodiments of the current disclosure.

The lift effector 11414 may be structured to couple the one or more arms 11416, 11418 to a portion of an inspection robot, e.g., 5902 (FIG. 59). For example, the lift effector 11414 may include a mounting end 11422 structured to interface with a motor forming part of a rastering device, e.g., 8603 and 8605 (e.g., FIGS. 86, 94), or another actuator on the inspection robot, so as to provide for rotation of the payload 11400 about axis 11424 in the direction of arrows 11426. In embodiments, the lifting effector 11414 may couple to the arms 11416 and 11418 via a joint 11428 which may provide for rotation of the arms 11416, 11418 about axis 11430 in the direction of arrows 11432. As such, in embodiments, the payload coupler, e.g., arms 11416 and 11418, may pivotally couple to the inspection robot, e.g., 5902 (FIG. 59) to pivot in a plane 27010 (FIG. 118) substantially (e.g., within about +−60° or less) parallel to a direction of travel (indicated by arrow 27012 in FIG. 118) of the inspection robot along an inspection surface plane 27014 (FIGS. 118 and 119) defined, in part, by a surface being inspected, e.g., an inspection surface. While FIG. 118 depicts the inspection surface plane 27014 as being flat, it will be understood that the inspection surface plane 27014 may be a curved surface. In embodiments, the inspection surface plane 27014 may match the shape of the inspection surface. In embodiments, the inspection surface plane 27014 may deviate from the inspection surface. In embodiments, the inspection surface plane 27014 may be a general representation of the shape of the inspection surface.

In embodiments, the lift effector 11414 may include an electromechanical actuator, a hydraulic actuator, a magnetic actuator, and/or a pneumatic actuator. In embodiments, the lift effector 11414 may lift an entire payload. In embodiments, the lift effector 11414 may lift the sensor housings/holders 11410 and 11412 together or independently of each other.

In embodiments, the lift effector 11414 may include a biasing element 11434 structured to apply a biasing force on the one or more arms 11416 and 11418 about axis 11430 in a direction towards an inspection surface and/or the plane 27014 (FIGS. 118 and 119) defined, in part, by the inspection surface, which may improve coupling of sensors disposed in the holders 11410 and/or 11412 during an inspection run. Nonlimiting examples of the biasing element 11434 include springs (e.g., as shown in FIG. 114), pneumatics, hydraulics, electric motors, and the like. While joint 11428 is depicted herein as providing for rotation of the arms 11416 and 11418, in embodiments, joint 11428 may be a stationary joint, e.g., no rotation about axis 11430 and/or a joint having alternative freedom of movement (e.g., a lifting/sliding motion). During inspection operations, the lift effector 11414 may be used to "reset" the sled 11420, sensor holders 11410 and/or 11412 if any of the former become misaligned, e.g., tipped over, due to encountering obstacles on the inspection surface. "Resetting" via the lift effector 11414 may include raising and lowering the sled 11420 with respect to the inspection surface. As will be appreciated, such "resetting" may decrease the time it takes to complete an inspection run by avoiding the need for a human operator to travel to the location of an inspection robot equipped with the payload 11400, and/or for the inspection robot to travel to a location accessible by the human operator, so that the human operator can manually reset the sled. Such automated resetting via the lift effector 11414 may be particularly useful in scenarios where the inspection robot is inspecting a surface that is not easily accessible via a human and/or hazardous to a human, e.g., the outside of an active pressure vessel in a steam plant which may have a temperature sufficient to burn a human, an inspection surface located in a radioactive environment, an enclosed space, an elevated surface, and/or a surface positioned in a restricted area (e.g., due to high temperatures, pressures, high voltage equipment in proximity to the inspection surface), etc. In embodiments, the lift effector 11414 may provide for improved traversal of obstacles by allowing the payload 11400 to be raised up so that the inspection robot can pass the obstacle, and then lowered back to the inspection surface once the obstacle has been cleared. Lifting of the sled 11420 via the lift effector 11414 may also be used to improve sensor coupling to the inspection surface by "reseating", e.g., raising the sled 11420 up off the inspection surface and then lowering the sled 11420 back onto the inspection surface.

The one or more arms 11416 and 11418 may be structured to couple the sled 11420 to the lift effector 11414. The one or more arms 11416, 11418 may form a unitary structure, e.g., made from a single piece of material (as shown in FIG. 114) and/or otherwise connected together so as to act as a single piece of material; or be non-unitary structures, e.g., made of separate pieces not directly connected together so as to move independently of each other. The one or more arms 11416, 11418 may couple to the sled 11420 via joints 11436 which may provide for rotation of the sled 11420 about axis 11438 in the direction of arrows 11440. As such, in embodiments, the sled/sensor frame 11420 may pivotally couple to the arms/payload coupler 11416, 11418 to pivot in the plane 27010 (FIG. 118) substantially (e.g., within about +−60° or less) parallel to the direction of travel 27012 of the inspection robot along the inspection surface plane 27014 defined, in part, by an inspection surface. While joints 11436 are depicted herein as providing for rotation of the sled 11420, in embodiments, joints 11436 may be stationary joints, e.g., no rotation about axis 11438. As shown in FIG. 114, the arms 11416 and 11418 may form a u-shape. Further, while the arms 11416 and 11418 are depicted herein as coupling to an exterior of the sled 11420, it is to be understood that embodiments of the arms 11416 and 11418 may couple to an interior of the sled 11420 and/or have a combination of interior and/or exterior couple points. For example arm 11416 may couple to the exterior of sled 11420 and arm 11418 may couple to an interior of sled 11420, or vice-versa.

Figure 120:
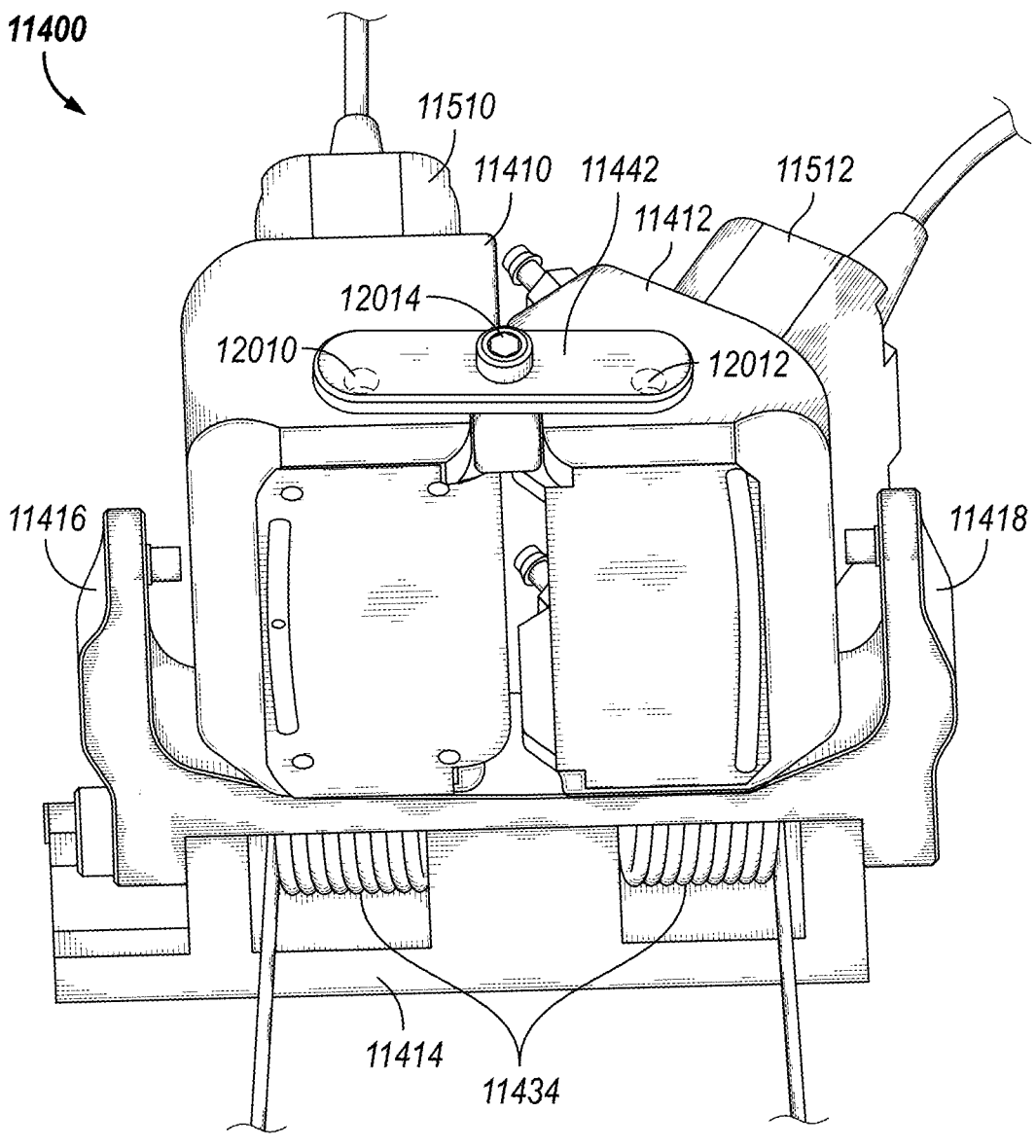
FIG. 120 is a top-bottom perspective view of the example payload of FIG. 114, in accordance with embodiments of the current disclosure.

The sled 11420 may be structured to couple the sensor holders 11410, 11412 to the one or more arms 11416, 11418. In embodiments, the sled 11420 may couple to the sensor holders 11410, 11412 via a differential pivoting mechanisms 11442 (e.g., also shown in FIGS. 121 and 123A-123C) that may be structured to provide for independent rotation of the holders 11410, 11412 with respect to each other via rotational axes 11444, 11446 and differential axis 11448. For example, referring to FIG. 120, in embodiments, each of the differential pivoting mechanisms 11442 may include rotational pivot joints 12010 and 12012 and a differential pivot joint 12014, where the differential pivot joint 12014 couples the differential pivoting mechanism 11442 to the sled 11420, and rotational joints 12010 and 12012 couple the differential pivoting mechanism 11442 respectively to sensor holders 11410 and 11412. Accordingly, pivot joints 12010, 12012 may respectively provide for rotation of sensor housing 11410 about rotational axis 11446, and for rotation of sensor housing 11412 about rotational axis 11444, while the differential pivot joint 12014 provides for rotation of the pivot joints 12010, 12012 (collectively) about the differential axis 11448. As such, the first sensor housing/holder 11410 may pivotally couple to the sensor frame/sled 11420 to pivot in a plane 27016 (e.g., FIGS. 117 and 118) substantially perpendicular to the direction of travel 27012 (FIG. 118) of the inspection robot along an inspection surface plane 27014 (e.g., FIGS. 118 and 119) defined, in part, by an inspection surface; and, the second sensor housing 11412 may pivotally couple to the sensor frame/sled 11420 to pivot in the plane 27016 (FIGS. 117 and 118) substantially (e.g., within about +−60° or less) perpendicular to the direction of travel 27012. While sensor holders 11410 and 11412 are depicted as being arranged with respect to each other such that axes 11444, 11446 are parallel, it is to be understood that the sensor holder 11410, 11412 may be arranged such that axes 11444, 11446 are angled, e.g., sensors holder 11410, 11412 may be arranged such that axes 11444, 11446 form a concave or a convex angle.

In embodiments, the sensors holders 11410 and 11412 may rotate together (relative to the sled 11420) via the differential pivot joint 12014 while also rotating independently with respect to each other via rotational joints 12010, 12012. In certain embodiments, the inclusion of the differential axis 11448 improves the ability of the sensor housings 11410, 11412 to maintain a proper position for inspection operations, provides for more even loading of the housings 11410, 11412 (e.g., normalizing relative wear, and/or reducing the likelihood of failure modes such as digging in to the surface, sticking a holder to the surface, and/or disrupting positioning of sensors in proximity to the inspection surface). It will be understood, however, that, in embodiments, differential pivoting mechanisms 11442 may not include differential pivot joint 12014, or the differential pivot joint 12014 may not be coupled to the sled 11420. In such embodiments, the sensor housings 11410, 11412 may be pivotally coupled to the sled 11420 directly or via other means.

Referring to FIGS. 115-119, the sensor holders 11410 and 11412 may each be structured to hold one or more sensors 11510, 11512 (shown with electrical connection lines 11514, 11516). In embodiments, sensor holder 11410 may be structured to orient sensor 11510 such that its scanning face is substantially perpendicular and/or in a selected orientation relative to an inspection surface, e.g., the sensor 11510 may be oriented such that its "scanning view" is about ninety (90) degrees down into the inspection surface; and sensor holder 11412 may be structured to orient sensor 11512 such that its scanning face is angled/tilted with respect to the inspection surface, e.g., the sensor 11512 may be oriented such that its "scanning view" is tilted/angled at about forty-five (45) down into the inspection surface. In other words, sensor holder 11410 may be a "vertical" holder for "vertical" sensor 11510 that looks straight down into the inspection surface, while sensor holder 11412 may be a "shear" holder for "shear" sensor 11512 that looks into the inspection surface along an angled direction and/or using a shear wave acoustic analysis. In embodiments, sensor holder 11410 and sensor 11510 may have a similar orientation (in a resting position) similar to UT phased array 8130 (e.g., FIG. 81) and sensor holder 11412 and sensor 11512 may have a similar orientation (in a resting position) similar to UT phased array 8120 (e.g., FIG. 81). In embodiments, sensors 11510, 11512 may be UT phased arrays of the types disclosed herein, e.g., UT phased arrays 8130 and 8120, and/or otherwise capable of beam steering in the manner described herein. The phased arrays may be shaped, as disclosed herein, which may assist with depth inspection control and/or provide for a reduction in noise. Shaped arrays may also reduce the processing burden associated with analyzing and/or conditioning sensor data, which may further provide for reduced costs associated with either manufacturing and/or operating an inspection robot. In embodiments, the sensor housing 11410, 11412 may orient their respective sensors 11510, 11512 so that the sensors 11510, 11512 are aligned with a direction of travel 27012 of the inspection robot along an inspection surface. The sensors 11510, 11512 may be aligned with the direction of travel 27012 when they are oriented such that they can produce usable scanning data, as would be understood by one skilled in the art, while the robot moves in the direction of travel 27012, which may be in incremental steps. For example, axis 11448 (FIG. 114) may be parallel with the direction of travel 27012 or within +−45° of being parallel with the direction of travel 27012. In embodiments, where the sensors 11510, 11512 are phased array ultra-sonic (UT) sensors, the sensors 11510, 11512 may be aligned with the direction of travel 27012 when their arrays are longitudinally aligned with the direction of travel, as disclosed herein.

Figure 117:
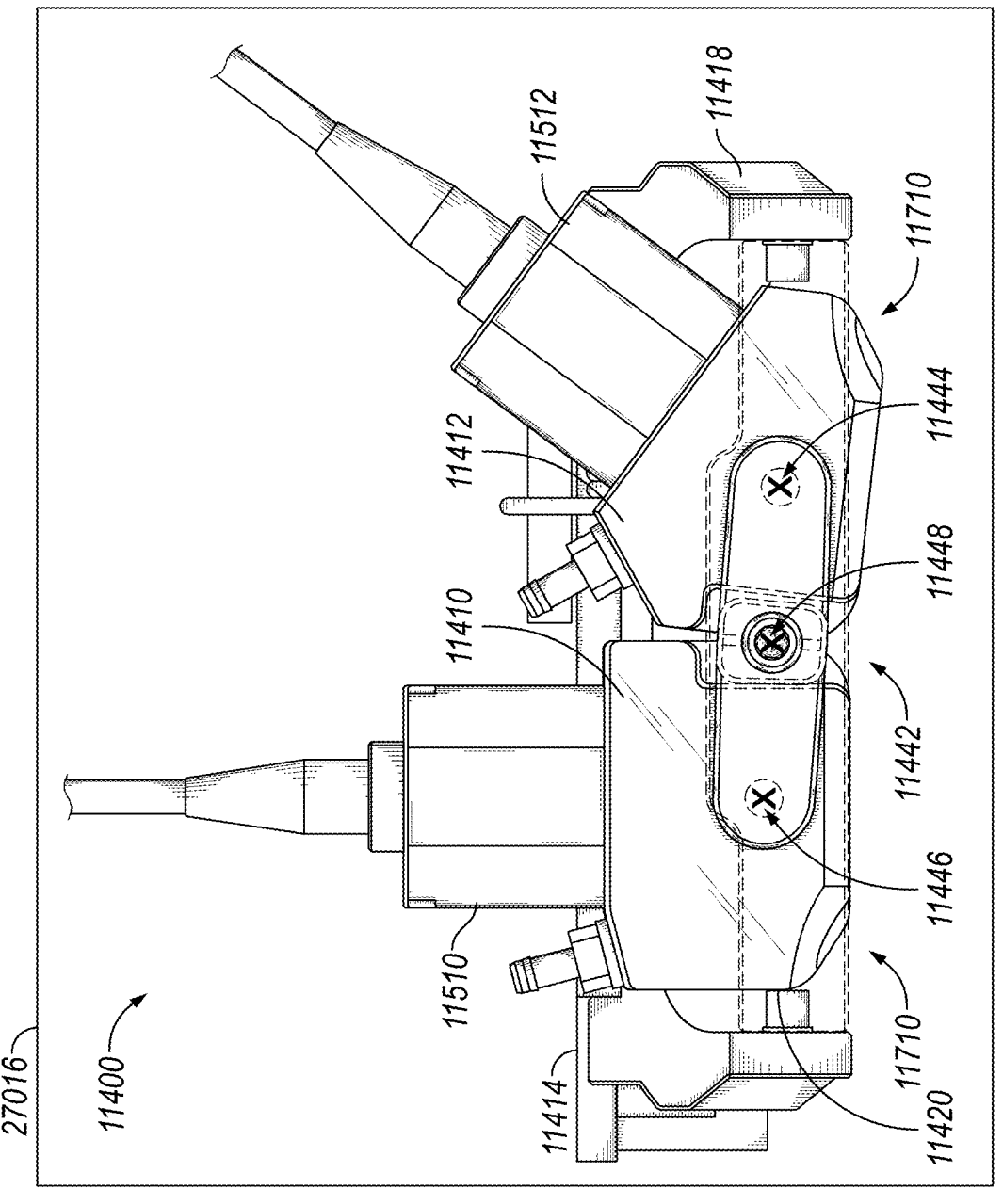
FIG. 117 is a front face view of the example payload of FIG. 114, in accordance with embodiments of the current disclosure.

While holder 11410 and sensor 11510 are shown as being adjacent arm 11416 and holder 11412 and sensor 11512 are shown as being adjacent arm 11418, in embodiments, holder 11410 and sensor 11510 may be adjacent arm 11418 and holder 11412 and sensor 11512 may be adjacent arm 11416. Further, while holder 11412 and sensor 11512 are depicted herein as being angled such that the view of sensor 11512 is angled towards arm 11416, it is to be understood that the holder 11412 and sensor 11512 may be oriented such that the view of sensor 11512 is angled towards arm 11418, e.g., holder 11412 and sensor 11512 may be rotated (180) degrees from the orientation shown in FIG. 115. In embodiments, sensor holder 11412 may have a wedge shape (as shown in FIG. 117) that provides for the two sensors 11510, 11512 to be about 0.25" apart. As such, embodiments of the payload 11400 may be of smaller size than other types of payloads and, therefore, better able to inspect certain portions of an inspection surface, e.g., crevasses, corners, and the like, and/or may be better suited to traverse obstacles, rough surfaces, or the like.

In embodiments, the sensors holders 11410, 11412 may have rounded and/or beveled outer edges 11710 (e.g., reference FIG. 117) structured to improve traversal of inspection surface obstacles. The edges 11710 may be those along portions of the sensor housings 11410 and/or 11412 that are likely to contact inspection surface obstacles as the payload 11400 is moved over the inspection surface during an inspection run.

In certain embodiments, an acoustic isolator 11450 (e.g., reference FIG. 121) may be acoustically interposed between the sensors 11510, 11512, e.g., disposed between sensor holder 11410 and sensor holder 11412. In embodiments, acoustic isolator 11450 may be disposed on and/or otherwise integrated into sensor holder 11412. In embodiments, sensor holder 11412 may have a portion 11518 (FIG. 115) structured to receive the acoustic isolator 11450. In embodiments, the acoustic isolator 11450 may be secured to the portion 11518 via an adhesive and/or other suitable bonding material. The acoustic isolator 11450 may be similar in form and/or function to acoustic isolator 6108 (FIG. 61) and/or any other acoustic isolator disclosed herein. In embodiments, the acoustic isolator 11450 may be structured to provide and/or improve acoustic isolation between sensors 11510, 11512. In embodiments, the acoustic isolator 11450 may be made of and/or include: an elastomer, cardboard, air gap, and/or other sound insulating material. In embodiments, the acoustic isolator 11450 may have a size, position, thickness, and/or extent sufficient to support inspection operations.

Figure 115:
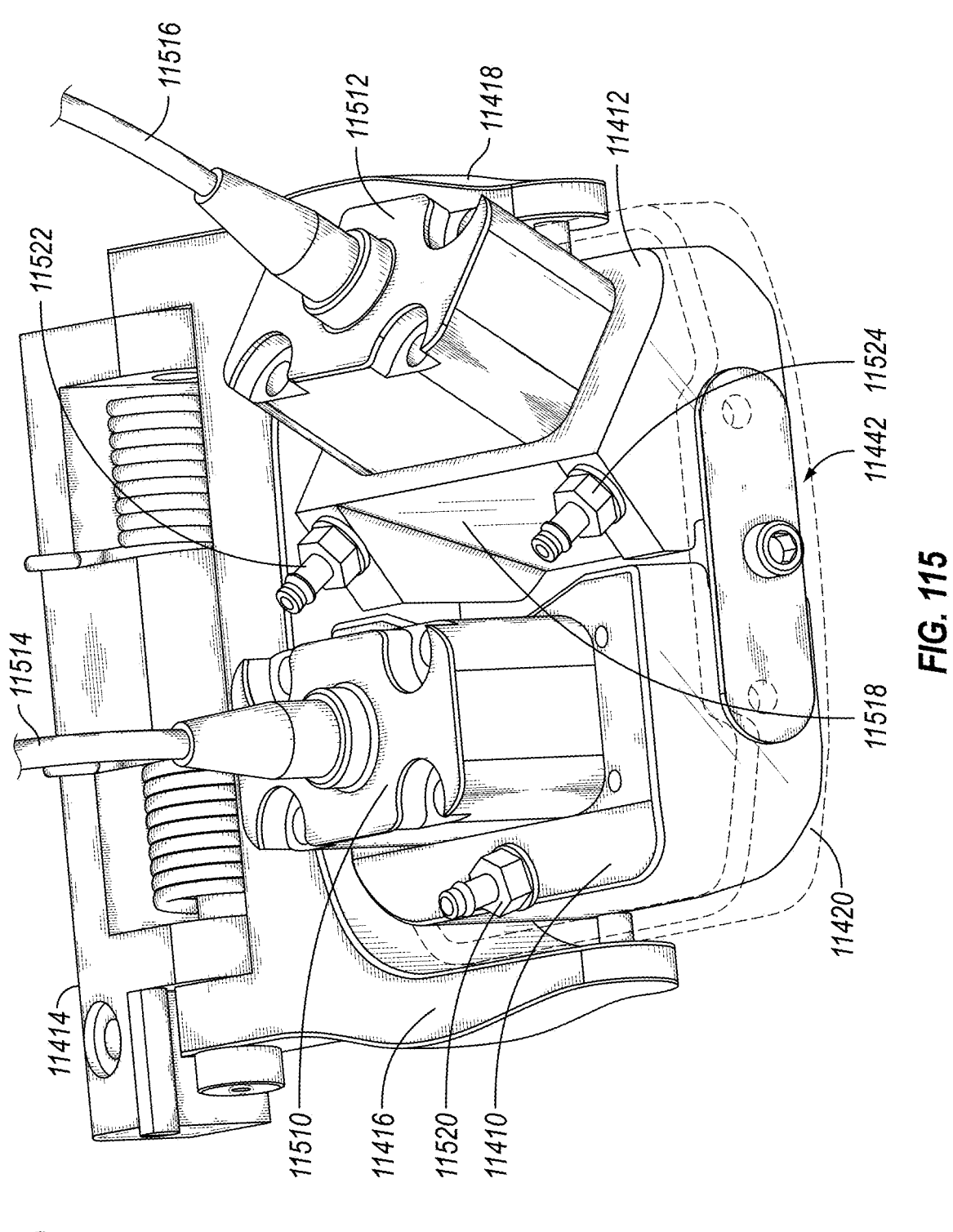
FIG. 115 is another perspective view of the example payload of FIG. 114, in accordance with embodiments of the current disclosure.
Figure 116:
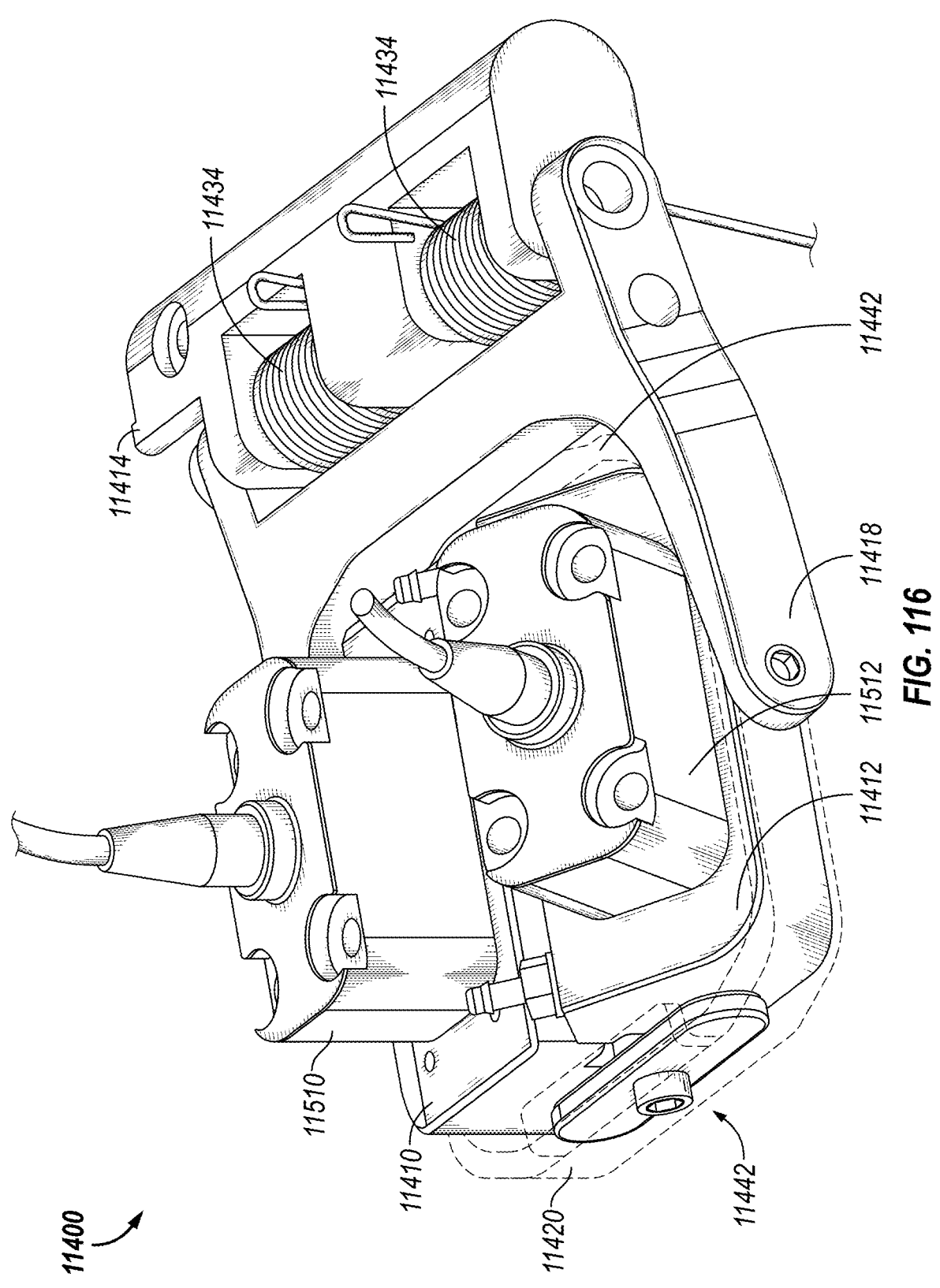
FIG. 116 is another perspective view of the example payload of FIG. 114, in accordance with embodiments of the current disclosure.

As further shown in FIG. 115, sensor holder 11410 may include a first couplant port 11520 and sensor holder 11412 may include a second and a third couplant ports 11522, 11524. The first couplant port 11520 may be disposed at and/or close to the longitudinal center of the sensor holder 11410, as shown in FIG. 115, which may, in embodiments, provide for improved dispersal, e.g., even thickness, of the couplant between the sensor holder 11410 and an inspection surface. In embodiments, the second and third couplant ports 11522, 11524 may be disposed on opposite sides of the acoustic isolator 11450, as shown in FIG. 114, to provide for improved dispersal, e.g., even thickness, of the couplant between the sensor hold 11412 and an inspection surface.

Figure 121:
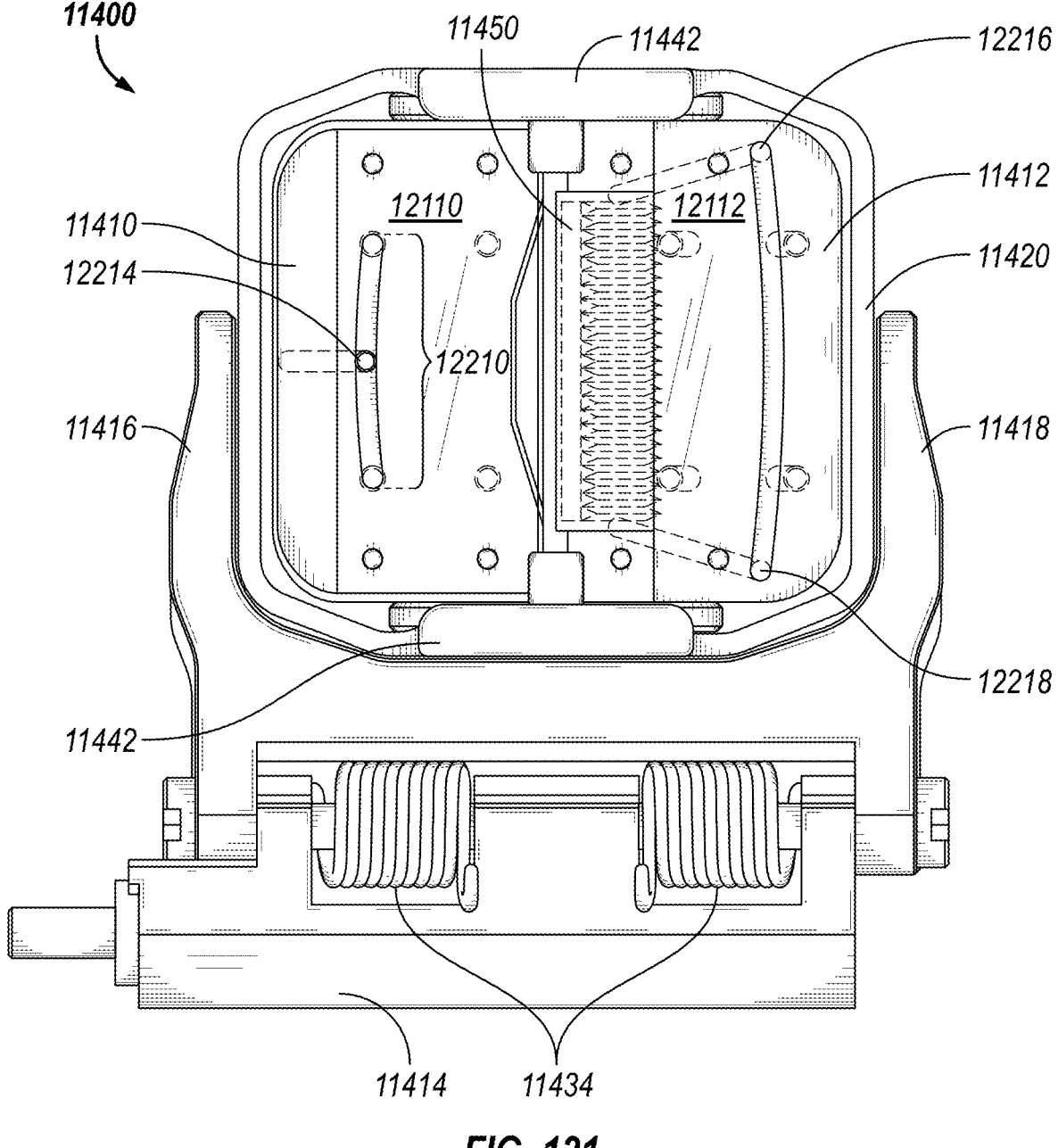
FIG. 121 is a bottom-top face view of the example payload of FIG. 114, in accordance with embodiments of the current disclosure.
Figure 122:
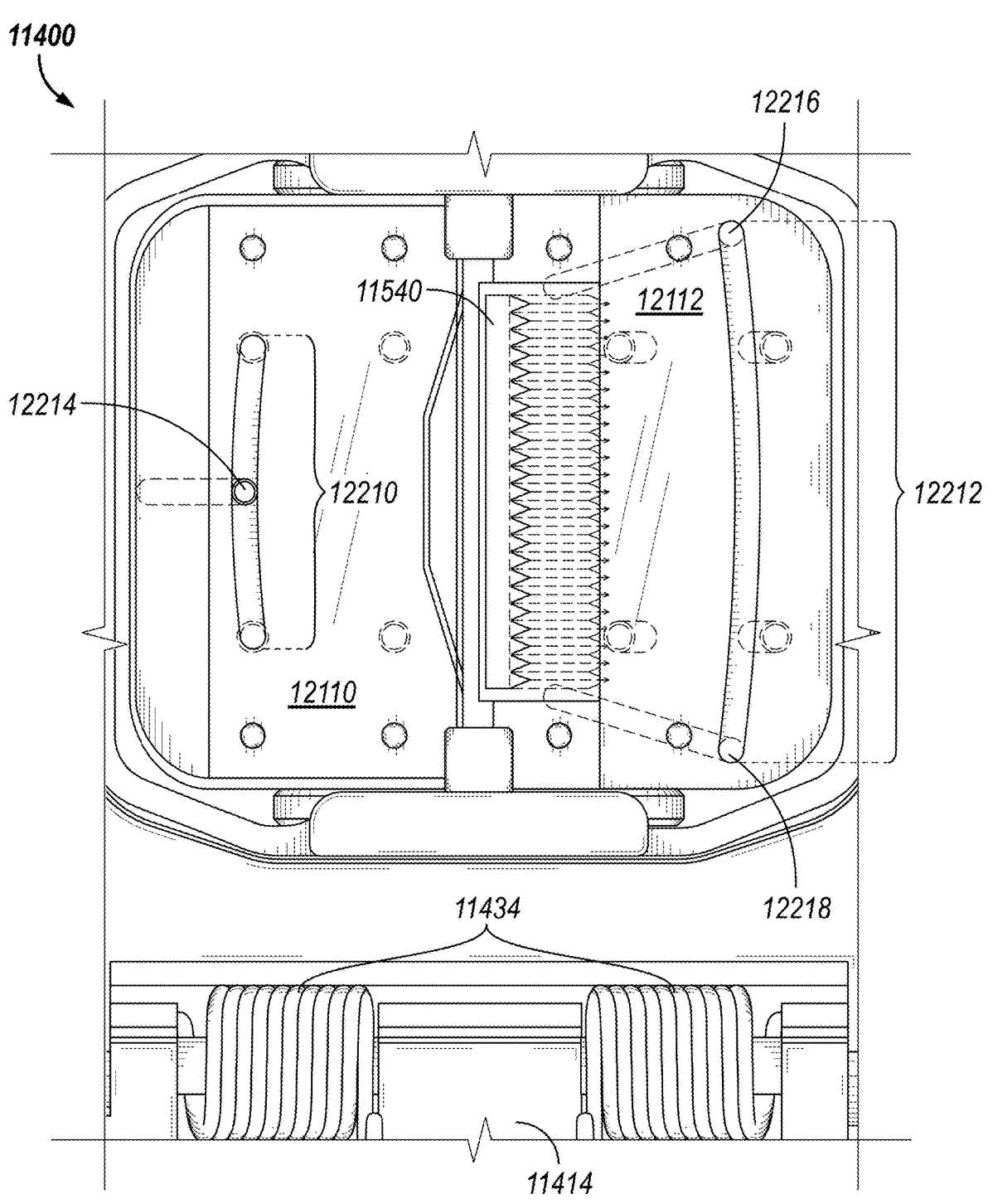
FIG. 122 is another bottom-top face view of the example payload of FIG. 114, in accordance with embodiments of the current disclosure.
Figure 136B:
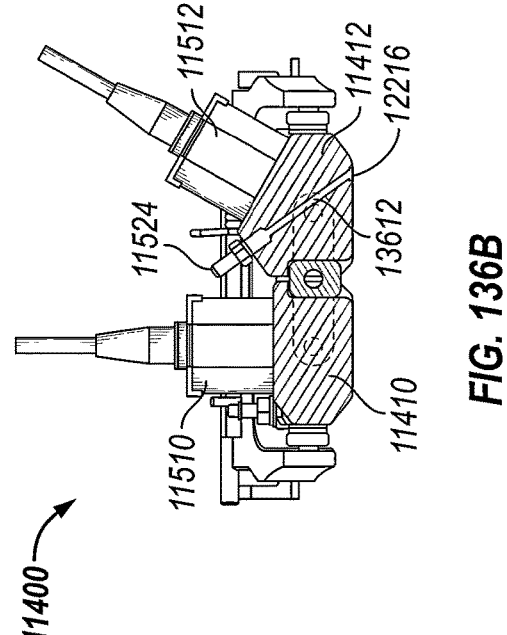

Referring to FIGS. 121 and 122, in embodiments, the face/side 12110, 12112 of the sensors holders 11410, 11412 may include channels 12210, 12212. Channel 12210 may include a couplant port 12214 which may be fluidly connected (via a conduit 13610 (reference FIG. 136D)) to couplant port 11520 (FIG. 115) and/or positioned in at and/or close to the longitudinal center of the channel 12210. Couplant ports 12216 and 12218 may be respectively fluidly connected to couplant ports 11524 and 11522 (FIG. 115) and/or be disposed at opposite ends of the acoustic isolator 11540 as shown in FIG. 122. For example, as shown in FIG. 136B, couplant port 12216 may be fluidly connected via conduit 13612 to couplant port 11524, and couplant port 12218 may be fluidly connected to couplant port 11522 via a conduit similar to conduit 13612. In embodiments, channels 12210 and 12212 may run along the outer longitudinal edge of the faces 12110 and 12112, as shown in FIG. 122.

Figure 123A:
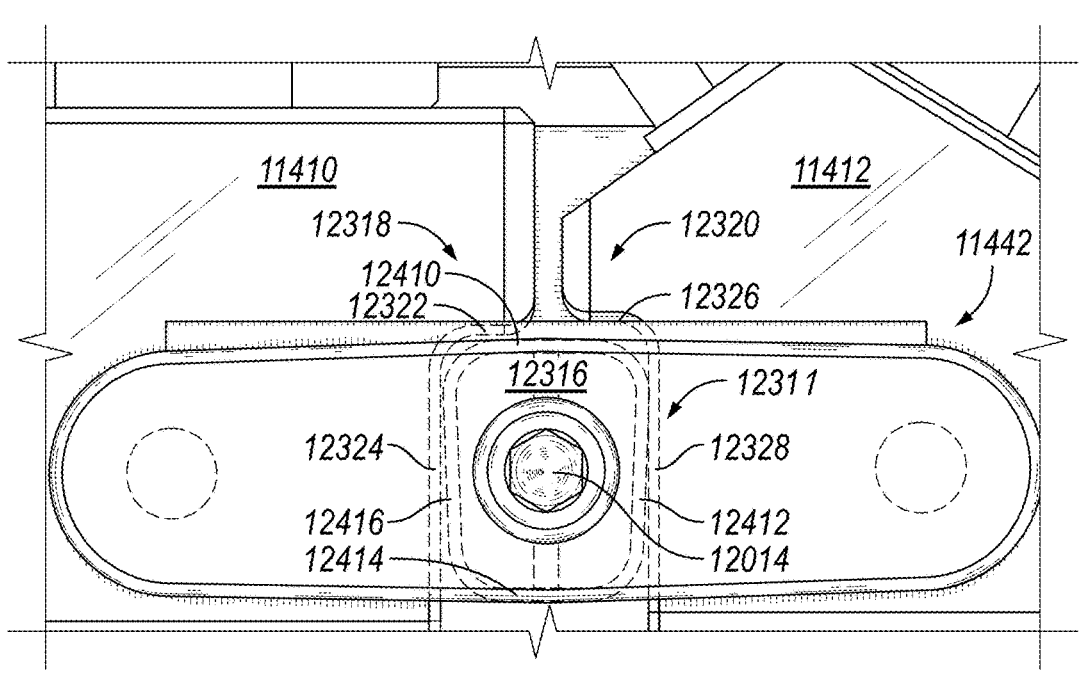
FIGS. 123A-C depict operation of a differential pivoting mechanism of the payload of FIG. 114, in accordance with embodiments of the current disclosure.
Figure 123B:
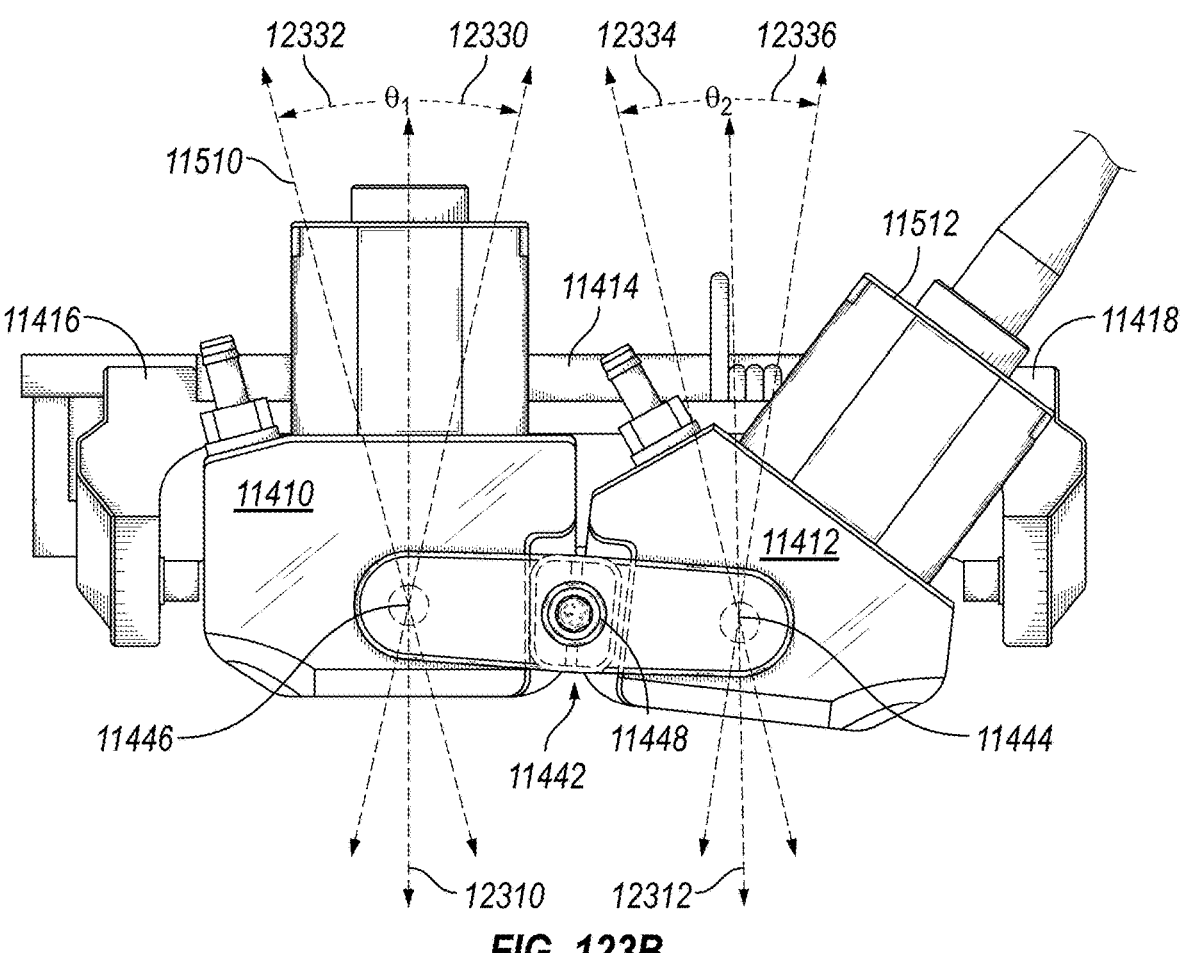
Figure 123C:
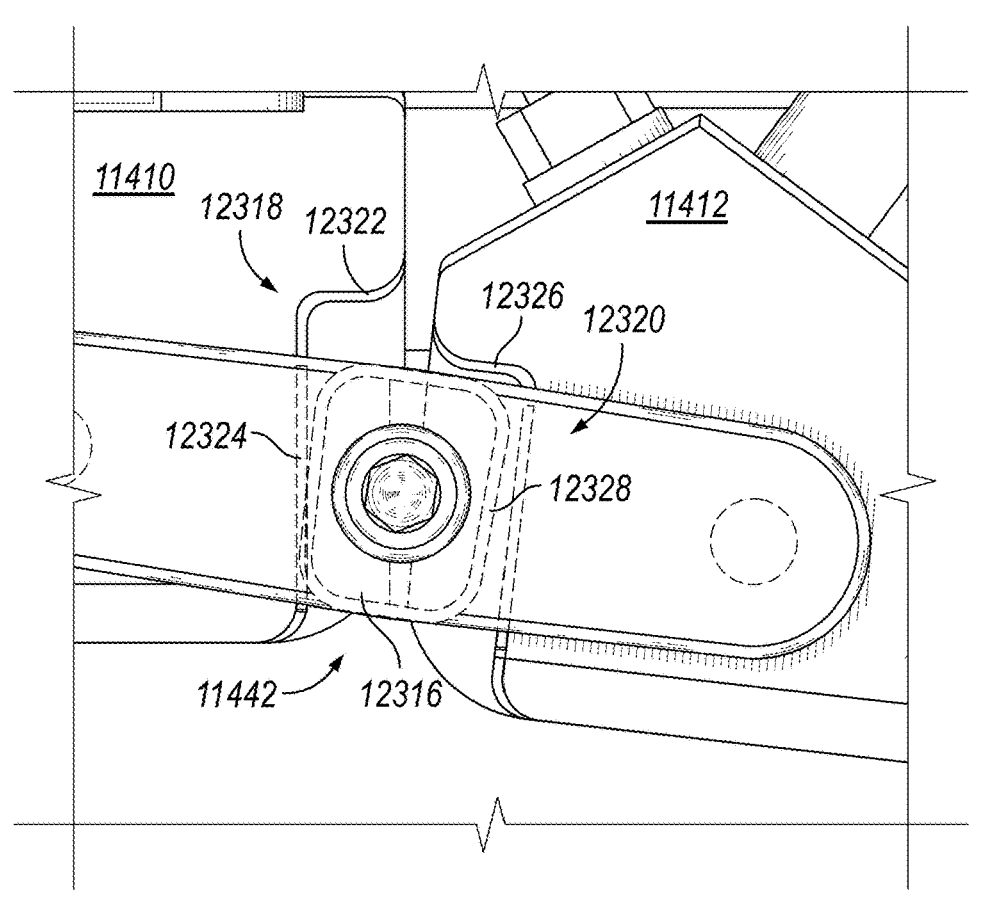

Referring now to FIGS. 123A-C, in embodiments, the sensor holders 11410 and 11412 and the differential pivoting mechanism 11442 may have a geometry (e.g., a positive and negative geometry with a differential link), interfering stop for the rotation, and/or other mechanical mechanism for restricting the degree of rotation of the holders 11410 and 11412 to within respective angles $\theta_1$ and $\theta_2$ about rotational axes 11444, 11446 (FIG. 123B and also shown in FIG. 114) as measured with respect to vertical axes 12310 and 12312, as shown in FIG. 123B. In embodiments, $\theta_1$ and/or $\theta_2$ may be from/between about 0° to about 45°, e.g., −5° to 50°. In embodiments, $\theta_1$ and/or $\theta_2$ may be from/between about 0° to about 35°. In embodiments, $\theta_1$ and/or $\theta_2$ may be from/between about 0° to about 25°. In embodiments, $\theta_1$ and/or $\theta_2$ may be from/between about 0° to about 15°. In embodiments, $\theta_1$ and/or $\theta_2$ may be from/between about 0° to about 5°. In embodiments, $\theta_1$ may be locked (held constant) while 02 is allowed to change or vise-versa. In embodiments, $\theta_1$ may be greater than 02 or vise-versa. In embodiments, $\theta_1$ and/or $\theta_2$ may be the same value. In embodiments, $\theta_1$ and/or $\theta_2$ may be different values. In embodiments, the mechanical mechanism 12311 may include a shaped washer 12316 coupled to the differential pivot joint 12014.

Figure 124:
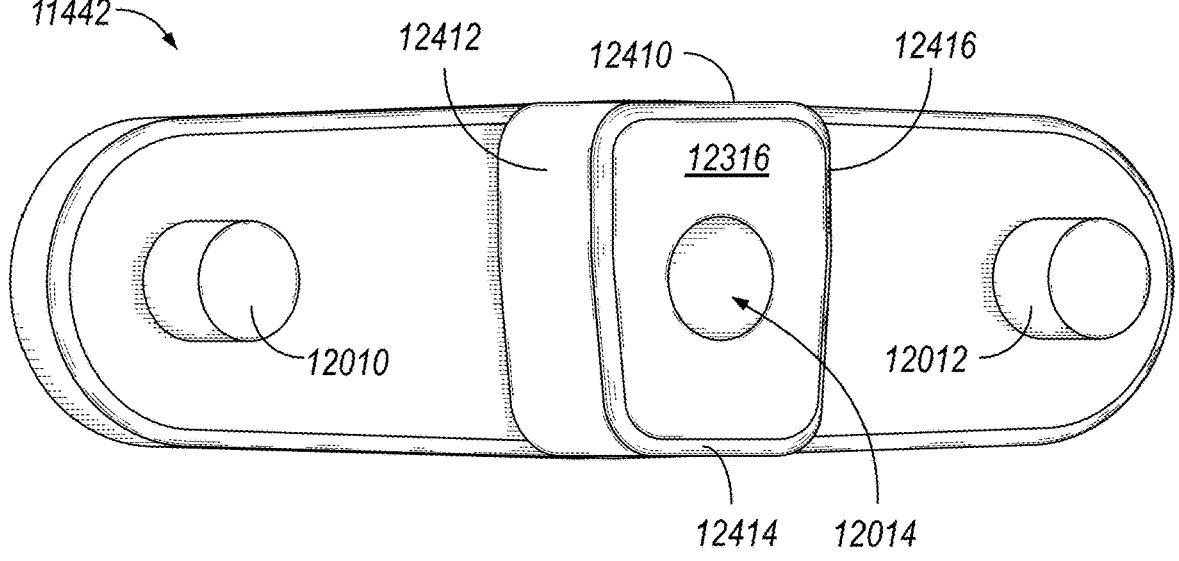

As shown in FIG. 124, the shaped washer 12316 may include four edges 12410, 12412, 12414, and 12416, where edge 12410 may be longer than edge 12414, and where edges 12416 and 12412 may be the same length. In embodiments, the shaped washer 12316 may be secured to the differential pivoting mechanism 11442 such that the shaped washer 12316 is fixed in place with respect to the pivoting mechanism 11442. In embodiments, the shaped washer 12316 and the differential pivoting mechanism may be a unitary piece of materials, e.g., a single casting.

Referring back to FIGS. 123A-C, in embodiments, sensor holders 11410 and 11412 may have shaped portions 12318 and 12320 (FIG. 123A) with edges 12322, 12324, 12326, and 12328. Accordingly, shaped washer edge 12410 restricts movement of sensor holder 11410 in direction 12330 (FIG. 123B) via impacting sensor holder edge 12322, and shaped washer edge 12416 may restrict movement of sensor holder 11410 in direction 12332 (FIG. 123B) via impacting sensor holder edge 12324. Similarly, shaped washer edge 12410 may restrict movement of sensor holder 11412 in direction 12334 via impacting sensor holder edge 12326, and shaped washer edge 12412 may restrict movement of sensor holder 11412 in direction 12336 (FIG. 123B) via impacting sensor holder edge 12328.

As will be appreciated, the differential pivot joint 12014 may improve the weight loading of sensors 11510, 11512 and/or the sensor housings 11410, 11412 as the payload 11400 traverses obstacles on an inspection surface. Further, the independent rotation of the sensor housings 11410, 11412 about axes 11446, 11444 may improve sensor coupling as one sensor, e.g., 11510, may become de-coupled due to an inspection surface obstacle while the other sensor, e.g., 11512, may remain coupled to the inspection surface. Further, the independent rotation of the sensor housings 11410, 11412 minimizes the inspection disruption due to sensor lift-off, as well as improves the recovery time for the sensor to return to an inspection compliant position. As will be appreciated, pivoting of the sensor holders/housing 11410, 11412 may be related to each other, e.g., pivoting of one of the holder 11410 may be based at least in part on one or more of a direction of pivoting of holder 11412, a speed/rate of pivoting of holder 11412, or a timing of the pivoting of the holder 11412. In embodiments, holder 11412 may pivot in the same direction and/or rate as holder 11410. In embodiments, the rate of pivoting of holder 11412 may be a ratio of the rate of pivoting of holder 11410, e.g., holder 11412 may pivot at half the rate of holder 11410. In embodiments, holder 11412 may pivot in a different direction from holder 11410 but at a same rate as holder 11410.

FIGS. 125A-C depict various sensor types that may be integrated into the holders 11410 and 11412 (FIG. 114), where reference numerals 12510 and 12512 label sensor arrays that may be respectively integrated into sensor holders 11410 and 11412. In other words, sensor 11510 (FIG. 115) may take the form of one or more of the sensor arrays labeled 12510 and sensor 11512 (FIG. 115) may take the form of one or more of the sensor arrays labeled 12512. For example, embodiments of the current disclosure may integrate: 0.5″ arrays 12510 and 12512 (FIG. 125A); 1.5″ arrays 12510 and 12512 (FIG. 125B); and 2.5″ arrays 12510 and 12512 (FIG. 125C). The 0.5″ arrays 12510 and 12512 (FIG. 125A) may each have: (16), (32), and/or (64) elements and/or pitches (e.g., spacing between elements) of about 0.5 mm, 1.0 mm, and/or 2.0 mm; and/or any other suitable sensor element configuration. The 1.5″ arrays 12510 and 12512 (FIG. 125B) may each have: (32), (64), and/or (128) elements and/or pitches of about 0.5 mm, 0.6 mm, 1.0 mm, 1.2 mm; and/or any other suitable sensor element configuration. The 2.5" arrays 12510 and 12512 (FIG. 125C) may each have: (60) and/or (128) elements, and/or pitches of about (0.5) mm and/or (1.0) mm pitch; and/or any other suitable sensor element configuration. Embodiments may also integrate other sensor arrays having sizes of about 0.25"-5.0", etc. and/or other sensor element pitches between about (3-128) elements.

FIG. 126 is a font face view of an example payload 11400, in accordance with embodiments of the current disclosure, which provides an orienting view for aspects of the example payload 11400. FIG. 127 is a front face view of the example payload 11400 of FIG. 126 wherein a portion of the sled has been shown with transparency to show the differential pivoting mechanism, in accordance with embodiments of the current disclosure. FIG. 128 is another front face view of the example payload 11400 of FIG. 126 wherein a portion of the sled has been shown with transparency to show the differential pivoting mechanism, at a slightly distinct pivoting position relative to the example of FIG. 127, in accordance with embodiments of the current disclosure.

FIG. 129 is a perspective side view of the example payload 11400 of FIG. 126, in accordance with embodiments of the current disclosure. FIG. 130 is another perspective side view of the example payload 11400 of FIG. 126, in accordance with embodiments of the current disclosure. The examples of FIGS. 129-130 show the joint 11436 rotated to distinct angles, for example in response to traversal of a surface anomaly, bump, obstacle, or the like on an inspection surface.

FIGS. 131A-B depict an example differential pivoting mechanism 11442, from a side view and a side perspective view, in accordance with embodiments of the current disclosure.

Figure 136D:
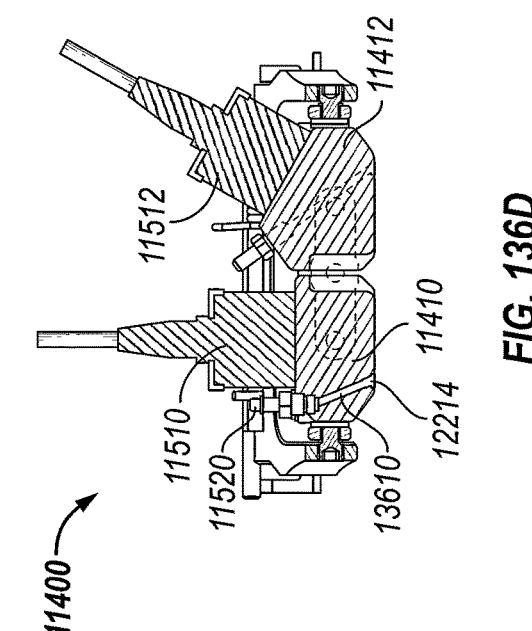
Figure 136A:
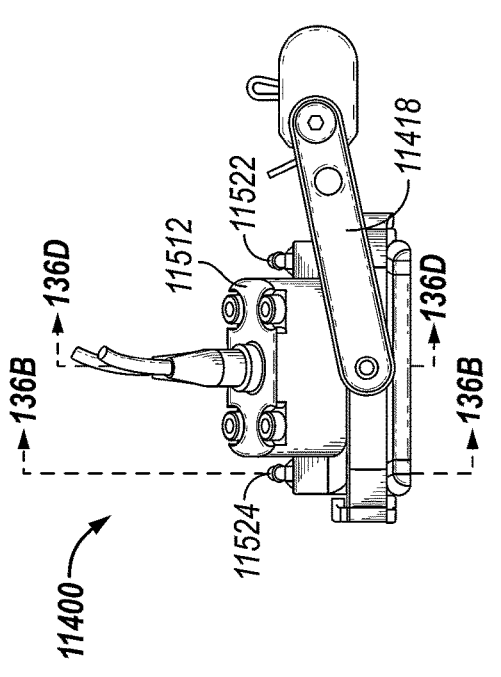
Figure 136C:
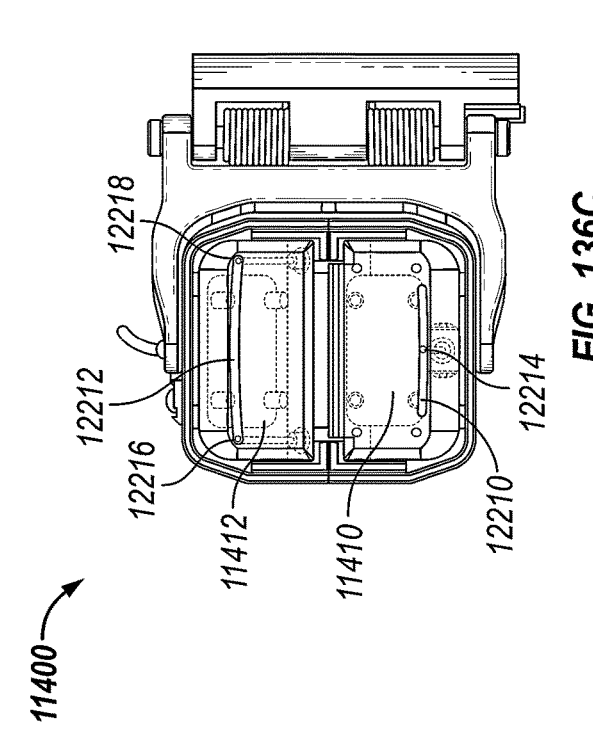

FIGS. 132A-D depict views of an example payload 11400 having a 0.75" vertical sensor, in accordance with embodiments of the current disclosure. FIGS. 133A-D depict views of an example payload 11400 having a 1.0" vertical sensor, in accordance with embodiments of the current disclosure. FIGS. 134A-D depict views of an example payload 11400 having a 1.25" vertical sensor, in accordance with embodiments of the current disclosure. FIGS. 135A-D depict views of an example payload 11400 having a 1.5" vertical sensor, in accordance with embodiments of the current disclosure. FIGS. 136A-D depict couplant flow for an example payload, in accordance with embodiments of the current disclosure. FIG. 136A is a schematic depiction of a payload 11400, and FIG. 136B is a cutaway front view of the payload 11400 depicting conduit 13612 for couplant flow (reference FIGS. 121, 122 and the related description). FIG. 136D is a second cutaway front view of the payload 11400, depicting conduit 13610 for couplant flow (reference FIGS. 121, 122 and the related description). FIG. 136C is a partially transparent bottom view of the payload 11400, depicting example couplant ports 12216, 12218 (reference FIGS. 121, 122 and the related description).

FIG. 137 depicts a method 13700 for inspecting a surface with an inspection robot, in accordance with embodiments of the current disclosure. The method 13700 includes moving 13710 the inspection robot in the direction of travel along the inspection surface plane defined, at least in part, by the surface. The method 13700 further includes pivoting 13712 the payload coupler in a plane substantially parallel to the direction of travel. The method 13700 further includes pivoting 13714 the sensor frame in the plane substantially parallel to the direction of travel. The method 13700 further includes pivoting 13716 the first sensor housing in the plane substantially perpendicular to the direction of travel. The method 13700 further includes pivoting 13718 the second sensor housing in the plane substantially perpendicular to the direction of travel. The method 13700 further includes obtaining 13720 scan data of the surface, e.g., via the sensors 11510, 11512, and transmitting 13728 the scan data, e.g., to one or more of the computing devices disclosed herein for processing/analysis.

FIG. 138 depicts certain further aspects of method 13700, any one or more of which may be incorporated into certain embodiments. For example, the method 13700 may include raising 13722 the sensor frame, with respect to the surface, via pivoting the payload coupler in the plane substantially parallel to the direction of travel; and/or lowering 13724 the sensor frame, with respect to the surface, via pivoting the payload coupler in the plane substantially parallel to the direction of travel. In embodiments, raising 13722 and/or lowering 13724 the sensor frame may form part of a reseating 13726 of the sensor frame with respect to the surface. In embodiments, the method 13700 may include moving 13738 couplant through at last one of the first or second sensor holdings/housings 11410, 11412 to couple at least one of the first 11510 or second 11512 sensors to the surface. In embodiments, the method 13700 may include analyzing 13730 the scan data to detect features of the surface, e.g., features indicative of degradation of the surface. In embodiments, the method 13700 may include biasing 13732 the sensor frame in a direction towards the surface. In embodiments, the method 13700 may include restricting 13734, 13736 a degree of pivoting/freedom θ, e.g., $\theta_1$ and/or $\theta_2$ in FIG. 123B, of the first and/or second sensor housings 11410, 11412 in the plane substantially perpendicular to the direction of travel.

As will be understood, the degrees of pivotal freedom of the sensors 11510 and/or 11512 in certain embodiments of the current disclosure may provide for improved coupling of the sensors 11510 and/or 11512 to an inspection surface as each sensor may adjust to the contour of the surface as the inspection robot traverses the surface. The degrees of pivotal freedom of the sensors 11510 and/or 11512 may also improve coupling of the sensors 11510 and/or 11512 by providing for a first sensor 11510 to remain substantially aligned with an inspection surface while the other sensor 11512 negotiates an obstacle (or other feature) of the inspection surface, or vice-versa. Further, the ability to reseat the sled/sensor frame and/or the sensors, as disclosed herein, may provide for improved inspection times by minimizing the amount of human/manual reseating of the sensors due to the sensors becoming decoupled and/or misaligned after encountering an obstacle and/or other feature of the inspection surface. For example, the ability to automatically and/or remotely reseat the sensors may reduce the amount of time to complete an inspection by 20% or more, e.g., 30%, 40%, 50%, 60%, 70%, 80%, or 90%. Further, the ability to automatically and/or remotely reseat the sensors may minimize and/or eliminate the need for a human to enter a hazardous environment, e.g., the interior of a boiler or furnace, in order to manually reseat the sensors.

Accordingly, one non-limiting use case of the payload 11400 may include inspecting a "bumpy" surface, or a surface which has features likely to negatively impact a traditional sensor payload that does not provide for the pivotal degrees of freedom disclosed herein. Such bumpy surfaces are contemplated to include surfaces with designed bumps such as corrugated surfaces and/or features on the surface that evidence as bumps (e.g., bolts, rivets, fixtures, etc.), and/or any type of surface anomalies such a bubbling, corrosion, dents, or the like.

Another non-limiting use case of the payload 11400 includes inspecting a surface located in a hazardous environment, e.g., the interior of a furnace, the interior of a boiler, the interior of a high-pressure vessel, the exterior of a high pressure vessel that may have been damaged in an accident (e.g., a pressurized chemical tank of a derailed train or the like) the exterior of an object in a vacuum (e.g., an object in outer space or the like).

One or more certain further aspects of the example systems, apparatuses, and methods are described following, any one or more of which may be incorporated in certain embodiments.

Accordingly, an example payload includes a payload coupler, a sensor frame, a first sensor housing, and a second sensor housing. The payload coupler pivotally couples to the inspection robot to pivot in a plane substantially parallel to a direction of travel of the inspection robot along an inspection surface plane defined, at least in part, by the surface. The sensor frame is pivotally coupled to the payload coupler to pivot in the plane substantially parallel to the direction of travel. The first sensor housing includes a first phased array ultra-sonic (UT) sensor aligned with the direction of travel; and the first sensor housing is pivotally coupled to the sensor frame to pivot in a plane substantially perpendicular to the direction of travel. The second sensor housing includes a second phased array UT sensor aligned with the direction of travel; and the second sensor housing is pivotally coupled to the sensor frame to pivot in the plane substantially perpendicular to the direction of travel.

In certain aspects, the payload further includes a differential pivoting mechanism that pivotally couples the first sensor housing and the second sensor housing to the sensor frame. The differential pivoting mechanism includes: a first pivot joint pivotally coupled to the first sensor housing to pivot the first sensor housing in the plane substantially perpendicular to the direction of travel; a second pivot joint pivotally coupled to the second sensor housing to pivot the second sensor housing in the plane substantially perpendicular to the direction of travel; and a differential pivot joint pivotally coupled to the sensor frame to pivot the first sensor housing with the second sensor housing in the plane substantially perpendicular to the direction of travel. In certain aspects, the differential pivoting mechanism includes a shaped washer coupled to the differential pivot joint and including one or more edges that restrict a degree θ of pivoting of the first sensor housing and/or the second sensor housing in the plane substantially perpendicular to the direction of travel. In certain aspects, θ is restricted to between about −5° to about 50°. In certain aspects, the first sensor housing pivots independently of the second sensor housing. In certain aspects, pivoting of the first sensor housing is related to pivoting of the second sensor housing. In certain aspects, the payload further includes a biasing element that applies a force on the payload coupler in a direction towards the inspection surface plane. In certain aspects, the biasing element comprises a spring. In certain aspects, the second phased array UT sensor is disposed within the second sensor housing such that the second phased array UT sensor is tilted with respect to the surface during an inspection of the surface by the inspection robot. In certain aspects, the payload is pivotally coupled to the inspection robot via a quick disconnect. In certain aspects, the payload coupler includes at least one arm. In certain aspects, the payload coupler has a u-shaped body with two arms that pivotally couple to the sensor frame. In certain aspects, at least one of the first or the second phased array UT sensor comprises a linear phased array. In certain aspects, at least one of the first or the second phased array UT sensor comprises a shaped phased array. In certain aspects, the payload coupler includes a lift effector that raises and lowers the sensor frame with respect to the surface during an inspection of the surface by the inspection robot. In certain aspects, the payload further includes an acoustic isolator acoustically interposed between the first sensor housing and the second sensor housing. In certain aspects, the acoustic isolator comprises of at least one of: an elastomer; cardboard; or an air gap. In certain aspects, at least one of the first sensor housing or the second sensor housing has beveled edges.

An example method for inspecting a surface with an inspection robot includes: moving the inspection robot in a direction of travel along an inspection surface plane defined, at least in part, by the surface; pivoting a payload coupler, pivotally coupled to the inspection robot, in a plane substantially parallel to the direction of travel; and pivoting a sensor frame, pivotally coupled to the payload coupler, in a plane substantially parallel to the direction of travel. The method further includes pivoting a first sensor housing, pivotally coupled to the sensor frame, in a plane substantially perpendicular to the direction of travel, the first sensor housing comprising a first phased array ultra-sonic (UT) sensor aligned with the direction of travel; and pivoting a second sensor housing, pivotally coupled to the sensor frame, in the plane substantially perpendicular to the direction of travel, the second sensor housing comprising a second phased array UT sensor aligned with the direction of travel. The method further includes obtaining scan data of the surface via the first phased array UT sensor and the second phased array UT sensor; and transmitting the scan data. In certain aspects, the method further includes raising the sensor frame, with respect to the surface, via pivoting the payload coupler in the plane substantially parallel to the direction of travel. In certain aspects, the method further includes lowering the sensor frame, with respect to the surface, via pivoting the payload coupler in the plane substantially parallel to the direction of travel. In certain aspects, raising and lowering of the sensor frame forms part of a reseating of the sensor frame with respect to the surface. In certain aspects, moving couplant though at least one of the first sensor housing and the second sensor housing to couple at least one of the first phased array UT sensor or the second phased array UT sensor to the surface. In certain aspects, the method further includes analyzing the scan data to detect features of the surface. In certain aspects, the features are indicative of degradation of the surface. In certain aspects, the method further includes biasing the sensor frame in a direction towards the surface. In certain aspects, the biasing is performed via a biassing force applied via a biasing mechanism to the payload coupler. In certain aspects, the method further includes restricting a degree of pivoting θ of the first sensor housing and/or the second sensor housing in the plane substantially perpendicular to the direction of travel. In certain aspects, θ is restricted to between about −5° to about 50°. In certain aspects, pivoting the first sensor housing is independent of pivoting the second sensor housing. In certain aspects, pivoting the first sensor housing is related to pivoting the second sensor housing. In certain aspects, the second phased array UT sensor is disposed within the second sensor housing such that the second phased array UT sensor is tilted with respect to the surface.

Yet another example payload includes: a first sensor housing; a second sensor housing; and means for providing each of the first sensor housing and the second sensor housing with three degrees of pivotal freedom while the inspection robot travels on the surface. The first sensor housing includes a first phased array UT sensor aligned with a direction of travel of the inspection robot along an inspection surface plane defined, at least in part, by the surface. The second sensor housing includes a second phased array UT sensor aligned with the direction of travel. In certain aspects, two of the three degrees of pivotal freedom are shared by the first sensor housing and the second sensor housing. In certain aspects, the shared degrees of pivotal freedom are in a plane substantially parallel to a direction of travel of the inspection robot along an inspection surface pane defined, in part, but the surface. In certain aspects, a third degree of freedom $\theta$ of the three degrees of pivotal freedom is in a plane substantially perpendicular to the direction of travel. In certain aspects, the payload further includes means for restricting $\theta$. In certain aspects, $\theta$ is restricted to between about $-5°$ to about $50°$. In certain aspects, the payload further includes means for biasing the first sensor housing and the second sensor housing in a direction towards the surface. In certain aspects, the second phased array UT sensor is disposed within the second sensor housing such that the second phased array UT sensor is tilted with respect to the surface.

An example differential pivoting mechanism for a payload of an inspection robot includes: a first rotational pivot joint; a second rotational pivot joint; and a differential pivot joint. The first rotational pivot joint pivotally couples to a first sensor housing to pivot the first sensor housing in a first degree of freedom in a plane substantially perpendicular to a direction of travel of the inspection robot along an inspection surface plane defined, at least in part, by the surface; and the first sensor housing includes a first phased array ultrasonic (UT) sensor aligned with the direction of travel. The second rotational pivot joint pivotally couples to a second sensor housing to pivot the second sensor housing in the first degree of freedom in the plane substantially perpendicular to the direction of travel; and the first sensor housing comprising a second phased array UT sensor aligned with the direction of travel. The differential pivot joint pivotally couples to a sensor frame of the inspection robot to pivot the first sensor housing with the second sensor housing in a second degree of freedom in the plane substantially perpendicular to the direction of travel. In certain aspects, the differential pivoting mechanism further includes a shaped washer coupled to the differential pivot joint. In certain aspects, the shaped washer includes four edges that restrict pivoting of the first sensor housing and the second sensor housing in the first degree of freedom. In certain aspects, at least a first two shorter edges of the four edges are shorter than a second two longer edges of the four edges. In certain aspects, each of the shorter edges are coupled to each of the longer edges. In certain aspects, the shaped washer further includes four shaped portions, wherein the shorter edges are coupled to the longer edges via the shaped portions. In certain aspects, a first of the shorter edges is longer than a second of the shorter edges. In certain aspects, the longer edges are a same size.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be:

a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may function as a storage medium for methods, program code, instructions, and/or programs.

The methods, program code, instructions, and/or programs may be associated with a client that may include a file client, print client, domain client, internet client, intranet client and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may function as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM, and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon.

Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCS, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionalities may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

What is claimed is:

1. A differential pivoting mechanism for a payload for an inspection robot that inspects a surface, the differential pivoting mechanism comprising:
   a first rotational pivot joint that pivotally couples to a first sensor housing to pivot the first sensor housing in a first degree of freedom in a plane substantially perpendicular to a direction of travel of the inspection robot along an inspection surface plane defined, at least in part, by the surface, the first sensor housing comprising a first phased array ultra-sonic (UT) sensor aligned with the direction of travel;
   a second rotational pivot joint that pivotally couples to a second sensor housing to pivot the second sensor housing in the first degree of freedom in the plane substantially perpendicular to the direction of travel, the first sensor housing comprising a second phased array UT sensor aligned with the direction of travel; and
   a differential pivot joint that pivotally couples to a sensor frame of the inspection robot to pivot the first sensor housing with the second sensor housing in a second degree of freedom in the plane substantially perpendicular to the direction of travel.

2. The differential pivoting mechanism of claim 1 further comprising:
   a shaped washer coupled to the differential pivot joint, wherein the shaped washer includes four edges that restrict pivoting of the first sensor housing and the second sensor housing in the first degree of freedom.

3. The differential pivoting mechanism of claim 2, wherein at least a first two shorter edges of the four edges are shorter than a second two longer edges of the four edges.

4. The differential pivoting mechanism of claim 3, wherein each of the shorter edges are coupled to each of the longer edges.

5. The differential pivoting mechanism of claim 4, wherein the shaped washer further includes four shaped portions, wherein the shorter edges are coupled to the longer edges via the shaped portions.

6. The differential pivoting mechanism of claim 5, wherein a first of the shorter edges is longer than a second of the shorter edges.

7. The differential pivoting mechanism of claim 6, wherein the longer edges are a same size.

* * * * *